(12) United States Patent
Zhu et al.

(10) Patent No.: US 11,194,467 B2
(45) Date of Patent: Dec. 7, 2021

(54) KEYBOARD MANAGEMENT USER INTERFACES

(71) Applicant: Apple Inc., Cupertino, CA (US)

(72) Inventors: Botao Zhu, Sunnyvale, CA (US);
Jiabao Li, Belmont, CA (US); Karan Misra, San Francisco, CA (US); Julian Missig, Redwood City, CA (US); Chun Kin Minor Wong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/814,770

(22) Filed: Mar. 10, 2020

(65) Prior Publication Data
US 2020/0379638 A1 Dec. 3, 2020

Related U.S. Application Data

(60) Provisional application No. 62/856,037, filed on Jun. 1, 2019.

(51) Int. Cl.
*G06F 3/041* (2006.01)
*G06F 3/0488* (2013.01)
*G06F 3/023* (2006.01)
*G06F 3/0484* (2013.01)

(52) U.S. Cl.
CPC ........ *G06F 3/04883* (2013.01); *G06F 3/0237* (2013.01); *G06F 3/04842* (2013.01)

(58) Field of Classification Search
USPC ................ 345/173, 156, 168, 179; 382/189; 715/261, 268, 234
See application file for complete search history.

(56) References Cited

U.S. PATENT DOCUMENTS

| | | |
|---|---|---|
| 4,317,109 A | 2/1982 | Odaka et al. |
| 4,685,142 A | 8/1987 | Ooi et al. |
| 5,128,672 A | 7/1992 | Kaehler |
| 5,252,951 A | 10/1993 | Tannenbaum et al. |
| 5,313,528 A | 5/1994 | Nishida et al. |
| 5,347,295 A | 9/1994 | Agulnick et al. |
| 5,428,736 A | 6/1995 | Kahl et al. |
| 5,438,631 A | 8/1995 | Dai et al. |
| 5,491,758 A | 2/1996 | Bellegarda et al. |
| 5,500,937 A | 3/1996 | Thompson-Rohrlich |
| 5,524,201 A | 6/1996 | Shwarts et al. |
| 5,526,440 A | 6/1996 | Sakano et al. |
| 5,528,260 A | 6/1996 | Kent |
| 5,539,839 A | 7/1996 | Bellegarda et al. |

(Continued)

FOREIGN PATENT DOCUMENTS

| | | |
|---|---|---|
| AU | 2015100705 A4 | 6/2015 |
| CN | 101123044 A | 2/2008 |

(Continued)

OTHER PUBLICATIONS

Applicant-Initiated Interview Summary received for U.S. Appl. No. 16/245,140, dated Apr. 2, 2021, 4 pages.

(Continued)

*Primary Examiner* — Thuy N Pardo
(74) *Attorney, Agent, or Firm* — Dentons US LLP

(57) ABSTRACT

The present disclosure relates to user interfaces for receiving handwriting input, accessing predictive text candidates, and accessing keyboards.

33 Claims, 74 Drawing Sheets

(56) References Cited

U.S. PATENT DOCUMENTS

| | | |
|---|---|---|
| 5,544,257 A | 8/1996 | Bellegarda et al. |
| 5,544,264 A | 8/1996 | Bellegarda et al. |
| 5,581,484 A | 12/1996 | Prince |
| 5,655,094 A | 8/1997 | Cline et al. |
| 5,677,708 A | 10/1997 | Matthews et al. |
| 5,687,254 A | 11/1997 | Poon et al. |
| 5,710,831 A | 1/1998 | Beernink et al. |
| 5,734,597 A | 3/1998 | Molnar et al. |
| 5,751,851 A | 5/1998 | Guzik et al. |
| 5,781,662 A | 7/1998 | Mori et al. |
| 5,796,867 A | 8/1998 | Chen et al. |
| 5,805,161 A | 9/1998 | Tiphane |
| 5,805,165 A | 9/1998 | Thorne et al. |
| 5,812,697 A | 9/1998 | Sakai et al. |
| 5,818,437 A | 10/1998 | Grover et al. |
| 5,828,999 A | 10/1998 | Bellegarda et al. |
| 5,847,709 A | 12/1998 | Card et al. |
| 5,850,477 A | 12/1998 | Takada |
| 5,864,636 A | 1/1999 | Chisaka |
| 5,880,733 A | 3/1999 | Horvitz et al. |
| 5,896,321 A | 4/1999 | Miller et al. |
| 5,903,666 A | 5/1999 | Guzik et al. |
| 5,926,566 A | 7/1999 | Wang et al. |
| 5,943,052 A | 8/1999 | Allen et al. |
| 5,949,408 A | 9/1999 | Kang et al. |
| 5,991,441 A | 11/1999 | Jourjine |
| 6,006,227 A | 12/1999 | Freeman et al. |
| 6,011,865 A | 1/2000 | Fujisaki et al. |
| 6,035,063 A | 3/2000 | Nakashima et al. |
| 6,069,606 A | 5/2000 | Sciammarella et al. |
| 6,069,626 A | 5/2000 | Cline et al. |
| 6,073,036 A | 6/2000 | Heikkinen et al. |
| 6,094,197 A | 7/2000 | Buxton et al. |
| 6,181,339 B1 | 1/2001 | Decarmo et al. |
| 6,212,298 B1 | 4/2001 | Yoshii et al. |
| 6,259,436 B1 | 7/2001 | Moon et al. |
| 6,285,916 B1 | 9/2001 | Kadaba et al. |
| 6,307,548 B1 | 10/2001 | Flinchem et al. |
| 6,313,855 B1 | 11/2001 | Shuping et al. |
| 6,323,859 B1 | 11/2001 | Gantt |
| 6,377,965 B1 | 4/2002 | Hachamovitch et al. |
| 6,401,060 B1 | 6/2002 | Critchlow et al. |
| 6,426,761 B1 | 7/2002 | Kanevsky et al. |
| 6,438,631 B1 | 8/2002 | Kawase et al. |
| 6,462,733 B1 | 10/2002 | Murakami |
| 6,479,949 B1 | 11/2002 | Nerone et al. |
| 6,486,895 B1 | 11/2002 | Robertson et al. |
| 6,489,975 B1 | 12/2002 | Patil et al. |
| 6,559,869 B1 | 5/2003 | Lui et al. |
| 6,570,594 B1 | 5/2003 | Wagner |
| 6,573,844 B1 | 6/2003 | Venolia et al. |
| 6,597,345 B2 | 7/2003 | Hirshberg |
| 6,629,793 B1 | 10/2003 | Miller |
| 6,636,163 B1 | 10/2003 | Hsieh |
| 6,683,628 B1 | 1/2004 | Nakagawa et al. |
| 6,707,942 B1 | 3/2004 | Cortopassi et al. |
| 6,801,659 B1 | 10/2004 | O'Dell |
| 6,856,318 B1 | 2/2005 | Lewak |
| 6,970,599 B2 | 11/2005 | Longe et al. |
| 6,987,991 B2 | 1/2006 | Nelson |
| 6,990,452 B1 | 1/2006 | Ostermann et al. |
| 7,030,861 B1 | 4/2006 | Westerman et al. |
| 7,167,731 B2 | 1/2007 | Nelson |
| 7,231,231 B2 | 6/2007 | Kokko et al. |
| 7,283,126 B2 | 10/2007 | Leung |
| 7,319,957 B2 | 1/2008 | Robinson et al. |
| 7,408,538 B2 | 8/2008 | Hinckley et al. |
| 7,419,469 B2 | 9/2008 | Vacca et al. |
| 7,443,316 B2 | 10/2008 | Lim |
| 7,479,949 B2 | 1/2009 | Jobs et al. |
| 7,487,147 B2 | 2/2009 | Bates et al. |
| 7,502,017 B1 | 3/2009 | Ratzlaff et al. |
| 7,508,324 B2 | 3/2009 | Suraqui |
| 7,584,093 B2 | 9/2009 | Potter et al. |
| 7,634,137 B2 | 12/2009 | Simard et al. |
| 7,650,562 B2 | 1/2010 | Bederson et al. |
| 7,669,135 B2 | 2/2010 | Cunningham et al. |
| 7,669,149 B2 | 2/2010 | Dietl et al. |
| 7,676,763 B2 | 3/2010 | Rummel et al. |
| 7,679,534 B2 | 3/2010 | Kay et al. |
| 7,683,886 B2 | 3/2010 | Willey |
| 7,712,053 B2 | 5/2010 | Bradford et al. |
| 7,720,316 B2 | 5/2010 | Shilman et al. |
| 7,725,838 B2 | 5/2010 | Williams |
| 7,768,501 B1 | 8/2010 | Maddalozzo et al. |
| 7,793,228 B2 | 9/2010 | Mansfield et al. |
| 7,797,269 B2 | 9/2010 | Rieman et al. |
| 7,864,163 B2 | 1/2011 | Ording et al. |
| 7,941,762 B1 | 5/2011 | Tovino et al. |
| 7,957,955 B2 | 6/2011 | Christie et al. |
| 8,010,901 B1 | 8/2011 | Rogers et al. |
| 8,074,172 B2 | 12/2011 | Kocienda et al. |
| 8,094,941 B1 | 1/2012 | Rowley et al. |
| 8,112,529 B2 | 2/2012 | Van et al. |
| 8,117,195 B1 | 2/2012 | Dave et al. |
| 8,136,052 B2 | 3/2012 | Shin et al. |
| 8,175,389 B2 | 5/2012 | Matic et al. |
| 8,232,973 B2 | 7/2012 | Kocienda et al. |
| 8,245,156 B2 | 8/2012 | Mouilleseaux et al. |
| 8,255,810 B2 | 8/2012 | Moore et al. |
| 8,286,085 B1 | 10/2012 | Denise |
| 8,290,478 B2 | 10/2012 | Shim et al. |
| 8,299,943 B2 | 10/2012 | Longe et al. |
| 8,310,461 B2 | 11/2012 | Morwing et al. |
| 8,400,417 B2 | 3/2013 | Kocienda et al. |
| 8,423,916 B2 | 4/2013 | Chihara et al. |
| 8,504,946 B2 | 8/2013 | Williamson et al. |
| 8,543,927 B1 | 9/2013 | Mckinley et al. |
| 8,564,544 B2 | 10/2013 | Jobs et al. |
| 8,566,403 B2 | 10/2013 | Pascal et al. |
| 8,601,389 B2 | 12/2013 | Schulz et al. |
| 8,645,825 B1 | 2/2014 | Cornea et al. |
| 8,669,950 B2 | 3/2014 | Forstall et al. |
| 8,671,343 B2 | 3/2014 | Oberstein |
| 8,706,750 B2 | 4/2014 | Hansson et al. |
| 8,825,484 B2 | 9/2014 | Yamada et al. |
| 8,843,845 B2 | 9/2014 | Bi et al. |
| 8,884,905 B2 | 11/2014 | Morwig et al. |
| 8,893,023 B2 | 11/2014 | Ron et al. |
| 8,896,556 B2 | 11/2014 | Frazier et al. |
| 8,996,639 B1 | 3/2015 | Faaborg et al. |
| 9,007,311 B2 | 4/2015 | Kwak et al. |
| 9,021,380 B2 | 4/2015 | Zhai et al. |
| 9,026,428 B2 | 5/2015 | Sternby et al. |
| 9,046,928 B2 | 6/2015 | Kumhyr |
| 9,058,092 B2 | 6/2015 | Rogers |
| 9,086,802 B2 | 7/2015 | Kocienda et al. |
| 9,111,139 B2 | 8/2015 | Morwig et al. |
| 9,116,551 B2 | 8/2015 | Huang et al. |
| 9,143,907 B1 | 9/2015 | Caldwell et al. |
| 9,213,754 B1 | 12/2015 | Zhang et al. |
| 9,250,797 B2 | 2/2016 | Roberts et al. |
| 9,310,889 B2 | 4/2016 | Griffin et al. |
| 9,317,870 B2 | 4/2016 | Tew et al. |
| 9,329,770 B2 | 5/2016 | Williamson et al. |
| 9,330,331 B2 | 5/2016 | Kasthuri |
| 9,335,924 B2 | 5/2016 | Jobs et al. |
| 9,338,242 B1 | 5/2016 | Suchland et al. |
| 9,355,090 B2 | 5/2016 | Goldsmith et al. |
| 9,436,380 B2 | 9/2016 | Chmielewski et al. |
| 9,465,985 B2 | 10/2016 | Xia et al. |
| 9,495,620 B2 | 11/2016 | Dolfing et al. |
| 9,535,597 B2 | 1/2017 | Wong et al. |
| 9,557,913 B2 | 1/2017 | Griffin et al. |
| 9,557,916 B2 | 1/2017 | Robinson et al. |
| 9,633,191 B2 | 4/2017 | Fleizach et al. |
| 9,740,399 B2 * | 8/2017 | Paek .................. G06F 3/023 |
| 9,904,906 B2 | 2/2018 | Kim et al. |
| 9,906,928 B2 | 2/2018 | Kim et al. |
| 9,921,744 B2 | 3/2018 | Ha et al. |
| 9,928,651 B2 | 3/2018 | Mariappan |
| 9,952,759 B2 | 4/2018 | Jobs et al. |
| 9,998,888 B1 | 6/2018 | Chang et al. |
| 10,003,938 B2 | 6/2018 | Chang et al. |

(56) References Cited

U.S. PATENT DOCUMENTS

| | | |
|---|---|---|
| 10,013,162 B2 | 7/2018 | Fleizach et al. |
| 10,013,601 B2 | 7/2018 | Ebersman et al. |
| 10,019,136 B1 | 7/2018 | Ozog |
| 10,037,139 B2 | 7/2018 | Pasquero et al. |
| 10,051,103 B1 | 8/2018 | Gordon et al. |
| 10,083,213 B1 | 9/2018 | Podgorny et al. |
| 10,133,397 B1 | 11/2018 | Smith |
| 10,341,826 B2 | 7/2019 | Chang et al. |
| 10,445,425 B2 | 10/2019 | Jon et al. |
| 2001/0015718 A1 | 8/2001 | Hinckley et al. |
| 2001/0024195 A1 | 9/2001 | Hayakawa |
| 2002/0010726 A1 | 1/2002 | Rogson |
| 2002/0015064 A1 | 2/2002 | Robotham et al. |
| 2002/0019731 A1 | 2/2002 | Masui et al. |
| 2002/0030667 A1 | 3/2002 | Hinckley et al. |
| 2002/0033848 A1 | 3/2002 | Sciammarella et al. |
| 2002/0036618 A1 | 3/2002 | Wakai et al. |
| 2002/0056575 A1 | 5/2002 | Keely et al. |
| 2002/0067854 A1 | 6/2002 | Reintjes et al. |
| 2002/0126097 A1 | 9/2002 | Savolainen |
| 2002/0149605 A1 | 10/2002 | Grossman |
| 2002/0167545 A1 | 11/2002 | Kang et al. |
| 2002/0186201 A1 | 12/2002 | Gutta et al. |
| 2003/0001898 A1 | 1/2003 | Bernhardson |
| 2003/0016252 A1 | 1/2003 | Noy et al. |
| 2003/0038788 A1 | 2/2003 | Demartines et al. |
| 2003/0041147 A1 | 2/2003 | Van et al. |
| 2003/0043189 A1 | 3/2003 | Rieffel et al. |
| 2003/0086611 A1 | 5/2003 | Loudon et al. |
| 2003/0095135 A1 | 5/2003 | Kaasila et al. |
| 2003/0098871 A1 | 5/2003 | Kawano et al. |
| 2003/0099398 A1 | 5/2003 | Izumi et al. |
| 2003/0122787 A1 | 7/2003 | Zimmerman et al. |
| 2003/0154292 A1 | 8/2003 | Spriestersbach et al. |
| 2003/0159113 A1 | 8/2003 | Bederson et al. |
| 2003/0174149 A1 | 9/2003 | Fujisaki et al. |
| 2003/0177067 A1 | 9/2003 | Cowell et al. |
| 2003/0185444 A1 | 10/2003 | Honda |
| 2003/0212961 A1 | 11/2003 | Soin et al. |
| 2003/0229607 A1 | 12/2003 | Zellweger et al. |
| 2004/0008222 A1 | 1/2004 | Hovatter et al. |
| 2004/0017946 A1 | 1/2004 | Longé et al. |
| 2004/0023696 A1 | 2/2004 | Kim et al. |
| 2004/0049541 A1 | 3/2004 | Swahn et al. |
| 2004/0078752 A1 | 4/2004 | Johnson |
| 2004/0095395 A1 | 5/2004 | Kurtenbach |
| 2004/0100479 A1 | 5/2004 | Nakano et al. |
| 2004/0119754 A1 | 6/2004 | Bangalore et al. |
| 2004/0135818 A1 | 7/2004 | Thomson et al. |
| 2004/0136244 A1 | 7/2004 | Nakamura et al. |
| 2004/0140956 A1 | 7/2004 | Kushler et al. |
| 2004/0150670 A1 | 8/2004 | Feldman et al. |
| 2004/0155869 A1 | 8/2004 | Robinson et al. |
| 2004/0155908 A1 | 8/2004 | Wagner |
| 2004/0160419 A1 | 8/2004 | Padgitt |
| 2004/0181804 A1 | 9/2004 | Billmaier et al. |
| 2004/0183833 A1 | 9/2004 | Chua |
| 2004/0223004 A1 | 11/2004 | Lincke et al. |
| 2004/0230912 A1 | 11/2004 | Clow et al. |
| 2005/0012723 A1 | 1/2005 | Pallakoff |
| 2005/0020317 A1 | 1/2005 | Koyama |
| 2005/0024239 A1 | 2/2005 | Kupka |
| 2005/0052427 A1 | 3/2005 | Wu et al. |
| 2005/0057524 A1 | 3/2005 | Hill et al. |
| 2005/0081150 A1 | 4/2005 | Beardow et al. |
| 2005/0091596 A1 | 4/2005 | Anthony et al. |
| 2005/0093826 A1 | 5/2005 | Huh |
| 2005/0099398 A1 | 5/2005 | Garside et al. |
| 2005/0114324 A1 | 5/2005 | Mayer |
| 2005/0114785 A1 | 5/2005 | Finnigan et al. |
| 2005/0131687 A1 | 6/2005 | Sorrentino |
| 2005/0134578 A1 | 6/2005 | Chambers et al. |
| 2005/0156873 A1 | 7/2005 | Walter et al. |
| 2005/0162395 A1 | 7/2005 | Unruh |
| 2005/0169527 A1 | 8/2005 | Longe et al. |
| 2005/0190970 A1 | 9/2005 | Griffin |
| 2005/0192727 A1 | 9/2005 | Shostak et al. |
| 2005/0192924 A1 | 9/2005 | Drucker et al. |
| 2005/0222848 A1 | 10/2005 | Napper et al. |
| 2005/0237311 A1 | 10/2005 | Nakajima |
| 2005/0243069 A1 | 11/2005 | Yorio et al. |
| 2005/0246365 A1 | 11/2005 | Lowles et al. |
| 2005/0256712 A1 | 11/2005 | Yamada et al. |
| 2005/0275633 A1 | 12/2005 | Varanda |
| 2005/0283726 A1 | 12/2005 | Lunati |
| 2005/0289173 A1 | 12/2005 | Vacca et al. |
| 2006/0001650 A1 | 1/2006 | Robbins et al. |
| 2006/0001652 A1 | 1/2006 | Chiu et al. |
| 2006/0007176 A1 | 1/2006 | Shen |
| 2006/0026521 A1 | 2/2006 | Hotelling et al. |
| 2006/0026535 A1 | 2/2006 | Hotelling et al. |
| 2006/0033724 A1 | 2/2006 | Chaudhri et al. |
| 2006/0033751 A1 | 2/2006 | Keely et al. |
| 2006/0038796 A1 | 2/2006 | Hinckley et al. |
| 2006/0044278 A1 | 3/2006 | Fux et al. |
| 2006/0047386 A1 | 3/2006 | Kanevsky et al. |
| 2006/0050962 A1 | 3/2006 | Geiger et al. |
| 2006/0053386 A1 | 3/2006 | Kuhl et al. |
| 2006/0055662 A1 | 3/2006 | Rimas-Ribikauskas et al. |
| 2006/0062461 A1 | 3/2006 | Longe et al. |
| 2006/0092128 A1 | 5/2006 | Gao et al. |
| 2006/0101354 A1 | 5/2006 | Hashimoto et al. |
| 2006/0125799 A1 | 6/2006 | Hillis et al. |
| 2006/0132460 A1 | 6/2006 | Kolmykov-Zotov et al. |
| 2006/0136576 A1 | 6/2006 | Ookuma et al. |
| 2006/0143573 A1 | 6/2006 | Harrison et al. |
| 2006/0161846 A1 | 7/2006 | Van Leeuwen |
| 2006/0161861 A1 | 7/2006 | Holecek et al. |
| 2006/0161870 A1 | 7/2006 | Hotelling et al. |
| 2006/0164399 A1 | 7/2006 | Cheston et al. |
| 2006/0190256 A1 | 8/2006 | Stephanick et al. |
| 2006/0190833 A1 | 8/2006 | SanGiovanni et al. |
| 2006/0206454 A1 | 9/2006 | Forstall et al. |
| 2006/0227116 A1 | 10/2006 | Zotov et al. |
| 2006/0241944 A1 | 10/2006 | Potter et al. |
| 2006/0265208 A1 | 11/2006 | Assadollahi |
| 2006/0265648 A1 | 11/2006 | Rainisto et al. |
| 2006/0274051 A1 | 12/2006 | Longe et al. |
| 2006/0277478 A1 | 12/2006 | Seraji et al. |
| 2007/0002077 A1 | 1/2007 | Gopalakrishnan et al. |
| 2007/0005537 A1 | 1/2007 | Abdulkader et al. |
| 2007/0046641 A1 | 3/2007 | Lim |
| 2007/0061753 A1 | 3/2007 | Ng et al. |
| 2007/0067738 A1 | 3/2007 | Flynt et al. |
| 2007/0106950 A1 | 5/2007 | Hutchinson et al. |
| 2007/0130128 A1 | 6/2007 | Garg et al. |
| 2007/0140561 A1 | 6/2007 | Abdulkader et al. |
| 2007/0143262 A1 | 6/2007 | Kasperski |
| 2007/0146340 A1 | 6/2007 | Webb et al. |
| 2007/0152978 A1 | 7/2007 | Kocienda et al. |
| 2007/0152980 A1 | 7/2007 | Kocienda et al. |
| 2007/0156747 A1 | 7/2007 | Samuelson et al. |
| 2007/0174387 A1 | 7/2007 | Jania et al. |
| 2007/0180392 A1 | 8/2007 | Russo |
| 2007/0229476 A1 | 10/2007 | Huh |
| 2007/0238489 A1 | 10/2007 | Scott |
| 2007/0250786 A1 | 10/2007 | Jeon et al. |
| 2007/0262964 A1 | 11/2007 | Zotov et al. |
| 2007/0271340 A1 | 11/2007 | Goodman et al. |
| 2007/0300140 A1 | 12/2007 | Makela et al. |
| 2008/0019591 A1 | 1/2008 | Iwayama et al. |
| 2008/0036743 A1 | 2/2008 | Westerman et al. |
| 2008/0057926 A1 | 3/2008 | Forstall et al. |
| 2008/0059876 A1 | 3/2008 | Hantler et al. |
| 2008/0082934 A1 | 4/2008 | Kocienda et al. |
| 2008/0094370 A1 | 4/2008 | Ording et al. |
| 2008/0098456 A1 | 4/2008 | Alward et al. |
| 2008/0109401 A1 | 5/2008 | Sareen et al. |
| 2008/0114591 A1 | 5/2008 | Williamson |
| 2008/0122796 A1 | 5/2008 | Jobs et al. |
| 2008/0133479 A1 | 6/2008 | Zelevinsky et al. |
| 2008/0168144 A1 | 7/2008 | Lee |
| 2008/0177717 A1 | 7/2008 | Kumar et al. |
| 2008/0195388 A1 | 8/2008 | Bower et al. |

(56) References Cited

U.S. PATENT DOCUMENTS

| | | |
|---|---|---|
| 2008/0201650 A1 | 8/2008 | Lemay et al. |
| 2008/0209358 A1 | 8/2008 | Yamashita |
| 2008/0240570 A1 | 10/2008 | Shi et al. |
| 2008/0260252 A1 | 10/2008 | Borgaonkar et al. |
| 2008/0266261 A1 | 10/2008 | Idzik et al. |
| 2008/0270118 A1 | 10/2008 | Kuo et al. |
| 2008/0304890 A1 | 12/2008 | Shin et al. |
| 2008/0310723 A1 | 12/2008 | Manu et al. |
| 2008/0316183 A1 | 12/2008 | Westerman et al. |
| 2009/0005011 A1 | 1/2009 | Christie et al. |
| 2009/0007017 A1 | 1/2009 | Anzures et al. |
| 2009/0033633 A1 | 2/2009 | Newman et al. |
| 2009/0041354 A1 | 2/2009 | Liu et al. |
| 2009/0058823 A1 | 3/2009 | Kocienda |
| 2009/0085881 A1 | 4/2009 | Keam |
| 2009/0106695 A1 | 4/2009 | Perry et al. |
| 2009/0109188 A1 | 4/2009 | Ohshita et al. |
| 2009/0113315 A1 | 4/2009 | Fisher et al. |
| 2009/0119289 A1 | 5/2009 | Gibbs et al. |
| 2009/0161958 A1 | 6/2009 | Markiewicz et al. |
| 2009/0177981 A1 | 7/2009 | Christie et al. |
| 2009/0189904 A1 | 7/2009 | Roth |
| 2009/0193332 A1 | 7/2009 | Lee |
| 2009/0226091 A1 | 9/2009 | Goldsmith et al. |
| 2009/0228842 A1 | 9/2009 | Westerman et al. |
| 2009/0254840 A1 | 10/2009 | Churchill et al. |
| 2009/0256808 A1 | 10/2009 | Kun et al. |
| 2009/0259969 A1 | 10/2009 | Pallakoff |
| 2009/0262076 A1 | 10/2009 | Brugger et al. |
| 2009/0284471 A1 | 11/2009 | Longe et al. |
| 2009/0295750 A1 | 12/2009 | Yamazaki et al. |
| 2009/0306969 A1 | 12/2009 | Goud et al. |
| 2009/0319172 A1 | 12/2009 | Almeida et al. |
| 2009/0326918 A1 | 12/2009 | Georgiev et al. |
| 2009/0327976 A1 | 12/2009 | Williamson et al. |
| 2010/0066691 A1 | 3/2010 | Li et al. |
| 2010/0088616 A1 | 4/2010 | Park et al. |
| 2010/0104189 A1 | 4/2010 | Aravamudhan et al. |
| 2010/0123724 A1 | 5/2010 | Moore et al. |
| 2010/0125785 A1 | 5/2010 | Moore et al. |
| 2010/0179991 A1 | 7/2010 | Lorch et al. |
| 2010/0246964 A1 | 9/2010 | Matic et al. |
| 2010/0287486 A1 | 11/2010 | Coddington et al. |
| 2010/0299601 A1 | 11/2010 | Kaplan et al. |
| 2010/0306185 A1 | 12/2010 | Smith et al. |
| 2010/0309147 A1 | 12/2010 | Fleizach et al. |
| 2010/0325194 A1 | 12/2010 | Williamson et al. |
| 2010/0329562 A1 | 12/2010 | Zhu et al. |
| 2010/0333030 A1 | 12/2010 | Johns |
| 2011/0004849 A1 | 1/2011 | Oh |
| 2011/0009109 A1 | 1/2011 | Hyon |
| 2011/0012919 A1 | 1/2011 | Tai et al. |
| 2011/0087747 A1 | 4/2011 | Hirst et al. |
| 2011/0183720 A1 | 7/2011 | Dinn |
| 2011/0201387 A1 | 8/2011 | Paek et al. |
| 2011/0202876 A1 | 8/2011 | Badger et al. |
| 2011/0209098 A1 | 8/2011 | Hinckley et al. |
| 2011/0279323 A1 | 11/2011 | Hung et al. |
| 2011/0279379 A1 | 11/2011 | Morwing et al. |
| 2011/0294525 A1 | 12/2011 | Jonsson |
| 2012/0008526 A1 | 1/2012 | Borghei et al. |
| 2012/0014601 A1 | 1/2012 | Jiang et al. |
| 2012/0036469 A1 | 2/2012 | Suraqui |
| 2012/0047135 A1 | 2/2012 | Hansson et al. |
| 2012/0060089 A1 | 3/2012 | Heo et al. |
| 2012/0089632 A1 | 4/2012 | Zhou et al. |
| 2012/0095748 A1 | 4/2012 | Li et al. |
| 2012/0113007 A1 | 5/2012 | Koch et al. |
| 2012/0117506 A1 | 5/2012 | Koch et al. |
| 2012/0119997 A1 | 5/2012 | Gutowitz et al. |
| 2012/0136855 A1 | 5/2012 | Ni et al. |
| 2012/0136897 A1 | 5/2012 | Kawauchi |
| 2012/0139859 A1 | 6/2012 | Ohira et al. |
| 2012/0167009 A1 | 6/2012 | Davidson et al. |
| 2012/0216113 A1 | 8/2012 | Li |
| 2012/0216141 A1 | 8/2012 | Li et al. |
| 2012/0239395 A1 | 9/2012 | Foo et al. |
| 2012/0240036 A1 | 9/2012 | Howard et al. |
| 2012/0302256 A1 | 11/2012 | Pai et al. |
| 2012/0308143 A1 | 12/2012 | Bellegarda et al. |
| 2012/0311032 A1 | 12/2012 | Murphy et al. |
| 2012/0319985 A1 | 12/2012 | Moore et al. |
| 2013/0002553 A1 | 1/2013 | Colley et al. |
| 2013/0034303 A1 | 2/2013 | Morwing et al. |
| 2013/0036387 A1 | 2/2013 | Murata |
| 2013/0054634 A1 | 2/2013 | Chakraborty et al. |
| 2013/0104068 A1 | 4/2013 | Murphy et al. |
| 2013/0120274 A1 | 5/2013 | Ha et al. |
| 2013/0125037 A1 | 5/2013 | Pasquero et al. |
| 2013/0136360 A1 | 5/2013 | Maruyama et al. |
| 2013/0159919 A1 | 6/2013 | Leydon |
| 2013/0182956 A1 | 7/2013 | Wang et al. |
| 2013/0187858 A1 | 7/2013 | Griffin et al. |
| 2013/0204897 A1 | 8/2013 | McDougall |
| 2013/0205210 A1 | 8/2013 | Jeon et al. |
| 2013/0212511 A1 | 8/2013 | Kim et al. |
| 2013/0246329 A1 | 9/2013 | Pasquero et al. |
| 2013/0251247 A1 | 9/2013 | Khorsheed et al. |
| 2013/0251249 A1 | 9/2013 | Huo et al. |
| 2013/0275923 A1 | 10/2013 | Griffin et al. |
| 2013/0275924 A1 | 10/2013 | Weinberg et al. |
| 2013/0285927 A1 | 10/2013 | Pasquero et al. |
| 2013/0300645 A1 | 11/2013 | Fedorov |
| 2013/0314337 A1 | 11/2013 | Asano |
| 2013/0325970 A1 | 12/2013 | Roberts et al. |
| 2013/0326334 A1 | 12/2013 | Williamson et al. |
| 2013/0339283 A1 | 12/2013 | Grieves et al. |
| 2014/0002363 A1 | 1/2014 | Griffin et al. |
| 2014/0025737 A1 | 1/2014 | Kruglick |
| 2014/0028571 A1 | 1/2014 | St. et al. |
| 2014/0035823 A1 | 2/2014 | Khoe et al. |
| 2014/0035851 A1 | 2/2014 | Kim et al. |
| 2014/0044357 A1 | 2/2014 | Moorthy et al. |
| 2014/0063067 A1 | 3/2014 | Compton et al. |
| 2014/0066105 A1 | 3/2014 | Bridge et al. |
| 2014/0085215 A1 | 3/2014 | Och et al. |
| 2014/0085311 A1 | 3/2014 | Gay et al. |
| 2014/0093161 A1 | 4/2014 | Oda et al. |
| 2014/0108004 A1 | 4/2014 | Sternby et al. |
| 2014/0129931 A1 | 5/2014 | Hashiba |
| 2014/0143721 A1 | 5/2014 | Suzuki et al. |
| 2014/0156262 A1 | 6/2014 | Yuen et al. |
| 2014/0160032 A1 | 6/2014 | Che et al. |
| 2014/0163954 A1 | 6/2014 | Joshi et al. |
| 2014/0176776 A1 | 6/2014 | Morita |
| 2014/0181205 A1 | 6/2014 | Sherrets et al. |
| 2014/0195979 A1 | 7/2014 | Branton et al. |
| 2014/0210759 A1 | 7/2014 | Toriyama et al. |
| 2014/0214398 A1 | 7/2014 | Sanders et al. |
| 2014/0244234 A1 | 8/2014 | Huang et al. |
| 2014/0245221 A1 | 8/2014 | Dougherty et al. |
| 2014/0267072 A1 | 9/2014 | Andersson et al. |
| 2014/0270529 A1 | 9/2014 | Sugiura et al. |
| 2014/0282211 A1 | 9/2014 | Ady et al. |
| 2014/0285460 A1 | 9/2014 | Morwing et al. |
| 2014/0294167 A1 | 10/2014 | Kim et al. |
| 2014/0310639 A1 | 10/2014 | Zhai et al. |
| 2014/0317547 A1 | 10/2014 | Bi et al. |
| 2014/0327629 A1 | 11/2014 | Jobs et al. |
| 2014/0337438 A1 | 11/2014 | Govande et al. |
| 2014/0340333 A1 | 11/2014 | Hoshi et al. |
| 2014/0344684 A1 | 11/2014 | Jang |
| 2014/0361983 A1 | 12/2014 | Dolfing et al. |
| 2014/0363074 A1 | 12/2014 | Dolfing et al. |
| 2014/0363082 A1 | 12/2014 | Dixon et al. |
| 2014/0363083 A1 | 12/2014 | Xia et al. |
| 2014/0365944 A1 | 12/2014 | Moore et al. |
| 2014/0365949 A1 | 12/2014 | Xia et al. |
| 2015/0040213 A1 | 2/2015 | Fleizach et al. |
| 2015/0046828 A1 | 2/2015 | Desai et al. |
| 2015/0058720 A1 | 2/2015 | Smadja et al. |
| 2015/0067488 A1 | 3/2015 | Liu |
| 2015/0089660 A1 | 3/2015 | Song et al. |
| 2015/0100537 A1 | 4/2015 | Grieves et al. |

(56) References Cited

U.S. PATENT DOCUMENTS

| | | |
|---|---|---|
| 2015/0113435 A1 | 4/2015 | Phillips |
| 2015/0121285 A1 | 4/2015 | Eleftheriou et al. |
| 2015/0139550 A1 | 5/2015 | Kuno |
| 2015/0142602 A1 | 5/2015 | Williams et al. |
| 2015/0161463 A1 | 6/2015 | Morwing et al. |
| 2015/0169948 A1 | 6/2015 | Motoi |
| 2015/0172393 A1 | 6/2015 | Oplinger et al. |
| 2015/0180980 A1 | 6/2015 | Welinder et al. |
| 2015/0185995 A1 | 7/2015 | Shoemaker et al. |
| 2015/0188861 A1 | 7/2015 | Esplin et al. |
| 2015/0193141 A1 | 7/2015 | Goldsmith et al. |
| 2015/0201062 A1 | 7/2015 | Shih et al. |
| 2015/0220774 A1 | 8/2015 | Ebersman et al. |
| 2015/0222586 A1 | 8/2015 | Lessin et al. |
| 2015/0234588 A1 | 8/2015 | Andersson et al. |
| 2015/0235097 A1 | 8/2015 | Wang et al. |
| 2015/0242114 A1* | 8/2015 | Hirabayashi ........ G06F 3/04883 345/156 |
| 2015/0248235 A1 | 9/2015 | Offenberg et al. |
| 2015/0256491 A1 | 9/2015 | Eatough et al. |
| 2015/0268768 A1 | 9/2015 | Woodhull et al. |
| 2015/0269432 A1* | 9/2015 | Motoi ................ G06K 9/00402 382/189 |
| 2015/0281788 A1 | 10/2015 | Noguerol et al. |
| 2015/0294145 A1 | 10/2015 | Bouaziz et al. |
| 2015/0310267 A1 | 10/2015 | Nicholson et al. |
| 2015/0317069 A1 | 11/2015 | Clements et al. |
| 2015/0317078 A1 | 11/2015 | Kocienda et al. |
| 2015/0324011 A1 | 11/2015 | Czelnik et al. |
| 2015/0331605 A1 | 11/2015 | Park et al. |
| 2015/0347007 A1 | 12/2015 | Jong et al. |
| 2015/0347379 A1 | 12/2015 | Jong et al. |
| 2015/0347985 A1 | 12/2015 | Gross et al. |
| 2015/0370529 A1 | 12/2015 | Zambetti et al. |
| 2015/0370779 A1 | 12/2015 | Dixon et al. |
| 2015/0378982 A1 | 12/2015 | Mckenzie et al. |
| 2016/0019201 A1 | 1/2016 | Qian et al. |
| 2016/0026730 A1* | 1/2016 | Hasan ................ G06F 40/143 715/234 |
| 2016/0044269 A1 | 2/2016 | Kang |
| 2016/0070441 A1 | 3/2016 | Paek et al. |
| 2016/0073223 A1 | 3/2016 | Woolsey et al. |
| 2016/0088335 A1 | 3/2016 | Zucchetta |
| 2016/0092431 A1* | 3/2016 | Motoi ................ G06F 3/04883 715/261 |
| 2016/0098186 A1* | 4/2016 | Sugiura ............. G06F 40/171 345/173 |
| 2016/0132232 A1* | 5/2016 | Baba ................ G06F 3/04883 715/268 |
| 2016/0139805 A1 | 5/2016 | Kocienda et al. |
| 2016/0165032 A1 | 6/2016 | Chang |
| 2016/0179225 A1 | 6/2016 | Black et al. |
| 2016/0182410 A1 | 6/2016 | Janakiraman et al. |
| 2016/0202889 A1 | 7/2016 | Shin et al. |
| 2016/0224540 A1 | 8/2016 | Stewart et al. |
| 2016/0239724 A1 | 8/2016 | Arfvidsson et al. |
| 2016/0246473 A1 | 8/2016 | Jobs et al. |
| 2016/0259548 A1 | 9/2016 | Ma |
| 2016/0274686 A1 | 9/2016 | Alonso Ruiz et al. |
| 2016/0274756 A1 | 9/2016 | Sakaguchi |
| 2016/0294958 A1 | 10/2016 | Zhang et al. |
| 2016/0295384 A1 | 10/2016 | Shan et al. |
| 2016/0337301 A1 | 11/2016 | Rollins et al. |
| 2016/0357752 A1 | 12/2016 | Yang et al. |
| 2016/0359771 A1 | 12/2016 | Sridhar |
| 2017/0010802 A1 | 1/2017 | Xia et al. |
| 2017/0017835 A1 | 1/2017 | Dolfing et al. |
| 2017/0026430 A1 | 1/2017 | Beckhardt et al. |
| 2017/0041549 A1 | 2/2017 | Kim et al. |
| 2017/0048686 A1 | 2/2017 | Chang et al. |
| 2017/0063753 A1 | 3/2017 | Probasco et al. |
| 2017/0075878 A1 | 3/2017 | Jon et al. |
| 2017/0090748 A1 | 3/2017 | Williamson et al. |
| 2017/0093780 A1 | 3/2017 | Lieb et al. |
| 2017/0115875 A1 | 4/2017 | Ha et al. |
| 2017/0300559 A1 | 10/2017 | Fallah |
| 2017/0344257 A1 | 11/2017 | Gnedin et al. |
| 2017/0351420 A1 | 12/2017 | Rigouste |
| 2017/0357438 A1 | 12/2017 | Dixon et al. |
| 2017/0359302 A1 | 12/2017 | Van os et al. |
| 2018/0018073 A1 | 1/2018 | Lemay et al. |
| 2018/0034765 A1 | 2/2018 | Keszler et al. |
| 2018/0039406 A1 | 2/2018 | Kong et al. |
| 2018/0047189 A1* | 2/2018 | DiVerdi ............. G06F 3/04845 |
| 2018/0063324 A1 | 3/2018 | Van Meter, II |
| 2018/0091732 A1 | 3/2018 | Wilson et al. |
| 2018/0121074 A1* | 5/2018 | Peron .................... G06F 40/177 |
| 2018/0143761 A1 | 5/2018 | Choi et al. |
| 2018/0146349 A1 | 5/2018 | Chang et al. |
| 2018/0173415 A1 | 6/2018 | Xia et al. |
| 2018/0239520 A1* | 8/2018 | Hinckley .............. G06F 3/0482 |
| 2018/0270627 A1 | 9/2018 | Chang et al. |
| 2018/0309801 A1 | 10/2018 | Rathod |
| 2018/0329622 A1 | 11/2018 | Missig et al. |
| 2018/0349020 A1* | 12/2018 | Jon ..................... G06F 3/04883 |
| 2019/0147035 A1 | 5/2019 | Chaudhri et al. |
| 2019/0163359 A1 | 5/2019 | Dixon et al. |
| 2019/0187892 A1 | 6/2019 | Kocienda et al. |
| 2019/0303423 A1* | 10/2019 | Thimbleby ........ G06K 9/00456 |
| 2019/0320301 A1 | 10/2019 | Chang et al. |
| 2019/0332259 A1 | 10/2019 | Xia et al. |
| 2019/0339822 A1 | 11/2019 | Devine et al. |
| 2020/0026405 A1 | 1/2020 | Lemay et al. |
| 2020/0057556 A1 | 2/2020 | Dixon et al. |
| 2020/0089374 A1* | 3/2020 | Hill ..................... G06F 3/04845 |
| 2020/0110524 A1 | 4/2020 | Lemay et al. |
| 2020/0110798 A1 | 4/2020 | Jon et al. |
| 2020/0118325 A1* | 4/2020 | Sasikumar ............. G06T 13/00 |
| 2020/0174658 A1 | 6/2020 | Xia et al. |
| 2020/0174663 A1 | 6/2020 | Kocienda et al. |
| 2020/0211250 A1* | 7/2020 | Sasikumar ............ G06F 3/0486 |
| 2020/0380208 A1 | 12/2020 | Garcia, III et al. |
| 2021/0034860 A1* | 2/2021 | Bednarowicz ..... G06K 9/00476 |
| 2021/0124485 A1 | 4/2021 | Dixon et al. |
| 2021/0149549 A1* | 5/2021 | Ubillos ................. H04N 1/3877 |
| 2021/0150121 A1* | 5/2021 | Thimbleby ........ G06F 3/04845 |

FOREIGN PATENT DOCUMENTS

| | | |
|---|---|---|
| CN | 101676838 A | 3/2010 |
| CN | 101893987 A | 11/2010 |
| CN | 101894266 A | 11/2010 |
| CN | 102135838 A | 7/2011 |
| CN | 102243570 A | 11/2011 |
| CN | 102449640 A | 5/2012 |
| CN | 102455911 A | 5/2012 |
| CN | 102566933 A | 7/2012 |
| CN | 102722240 A | 10/2012 |
| CN | 103294257 A | 9/2013 |
| CN | 104471521 A | 3/2015 |
| CN | 104487927 A | 4/2015 |
| CN | 104487928 A | 4/2015 |
| CN | 104685470 A | 6/2015 |
| CN | 105247540 A | 1/2016 |
| CN | 105874447 A | 8/2016 |
| CN | 106843711 A | 6/2017 |
| CN | 107710197 A | 2/2018 |
| EP | 0269364 A2 | 6/1988 |
| EP | 0651544 A2 | 5/1995 |
| EP | 0827094 A2 | 3/1998 |
| EP | 1124175 A2 | 8/2001 |
| EP | 1517228 A2 | 3/2005 |
| EP | 2031485 A1 | 3/2009 |
| EP | 2172833 A1 | 4/2010 |
| EP | 2336871 A1 | 6/2011 |
| EP | 2386984 A2 | 11/2011 |
| EP | 2386984 A3 | 6/2013 |
| EP | 2650766 A1 | 10/2013 |
| EP | 3065083 A1 | 9/2016 |
| GB | 2331204 A | 5/1999 |
| GB | 2470585 A | 12/2010 |
| GB | 2550639 A | 11/2017 |
| HK | 1220276 A1 | 4/2017 |

(56) References Cited

FOREIGN PATENT DOCUMENTS

| | | |
|---|---|---|
| JP | 60-153574 A | 8/1985 |
| JP | 61-272890 A | 12/1986 |
| JP | 62-251922 A | 11/1987 |
| JP | 5-224869 A | 9/1993 |
| JP | 6-95794 A | 4/1994 |
| JP | 6-149531 A | 5/1994 |
| JP | 7-37041 A | 2/1995 |
| JP | 7-57053 A | 3/1995 |
| JP | 7-57053 B2 | 6/1995 |
| JP | 7-200723 A | 8/1995 |
| JP | 8-55182 A | 2/1996 |
| JP | 8-339415 A | 12/1996 |
| JP | 9-507936 A | 8/1997 |
| JP | 9-507937 A | 8/1997 |
| JP | 10-91346 A | 4/1998 |
| JP | 10-307675 A | 11/1998 |
| JP | 11-143604 A | 5/1999 |
| JP | 11-338600 A | 12/1999 |
| JP | 2000-75851 A | 3/2000 |
| JP | 2000-75979 A | 3/2000 |
| JP | 2000-101879 A | 4/2000 |
| JP | 2000-105772 A | 4/2000 |
| JP | 2000-163031 A | 6/2000 |
| JP | 2000-194493 A | 7/2000 |
| JP | 2002-15282 A | 1/2002 |
| JP | 2002-123355 A | 4/2002 |
| JP | 2003-76846 A | 3/2003 |
| JP | 2003-162687 A | 6/2003 |
| JP | 2003-173226 A | 6/2003 |
| JP | 2003-178257 A | 6/2003 |
| JP | 2003-198975 A | 7/2003 |
| JP | 2003-263256 A | 9/2003 |
| JP | 2003-330613 A | 11/2003 |
| JP | 2003-330700 A | 11/2003 |
| JP | 2004-118434 A | 4/2004 |
| JP | 2004-220128 A | 8/2004 |
| JP | 2004-363707 A | 12/2004 |
| JP | 2005-43676 A | 2/2005 |
| JP | 2005-44036 A | 2/2005 |
| JP | 2005-130133 A | 5/2005 |
| JP | 2005-150936 A | 6/2005 |
| JP | 2005-185361 A | 7/2005 |
| JP | 2005-269243 A | 9/2005 |
| JP | 2005-328242 A | 11/2005 |
| JP | 2005-341387 A | 12/2005 |
| JP | 2005-341411 A | 12/2005 |
| JP | 2005-352924 A | 12/2005 |
| JP | 2006-80878 A | 3/2006 |
| JP | 2006-164275 A | 6/2006 |
| JP | 2006-166248 A | 6/2006 |
| JP | 2006-211690 A | 8/2006 |
| JP | 2007-526548 A | 9/2007 |
| JP | 2009-110092 A | 5/2009 |
| JP | 2009-289188 A | 12/2009 |
| JP | 2011-65623 A | 3/2011 |
| JP | 2013-88925 A | 5/2013 |
| JP | 2013-89131 A | 5/2013 |
| JP | 2013-206141 A | 10/2013 |
| JP | 2014-178954 A | 9/2014 |
| JP | 2015-501022 A | 1/2015 |
| JP | 2015-97103 A | 5/2015 |
| JP | 2015-148946 A | 8/2015 |
| JP | 6427703 B2 | 11/2018 |
| KR | 1998-032331 A | 7/1998 |
| KR | 2003-0088374 A | 11/2003 |
| KR | 10-2005-0052720 A | 6/2005 |
| KR | 10-2005-0078690 A | 8/2005 |
| KR | 10-0537280 B1 | 12/2005 |
| KR | 10-2006-0135056 A | 12/2006 |
| KR | 10-1417286 B1 | 7/2014 |
| KR | 10-2016-0003112 A | 1/2016 |
| KR | 10-2016-0065174 A | 6/2016 |
| KR | 10-2023663 B1 | 9/2019 |
| TW | I286708 B | 9/2007 |
| TW | 201142627 A | 12/2011 |
| TW | 201201113 A | 1/2012 |
| TW | 201216124 A | 4/2012 |
| TW | 201234280 A | 8/2012 |
| TW | 201237764 A | 9/2012 |
| TW | 201305925 A | 2/2013 |
| WO | 2000/08757 A1 | 2/2000 |
| WO | 2000/38041 A1 | 6/2000 |
| WO | 2002/08881 A2 | 1/2002 |
| WO | 2005/001680 A1 | 1/2005 |
| WO | 2005/018129 A2 | 2/2005 |
| WO | 2006/020304 A2 | 2/2006 |
| WO | 2006/020305 A2 | 2/2006 |
| WO | 2006/037545 A2 | 4/2006 |
| WO | 2006/055675 A1 | 5/2006 |
| WO | 2006/115825 A2 | 11/2006 |
| WO | 2008/005304 A2 | 1/2008 |
| WO | 2008/030976 A2 | 3/2008 |
| WO | 2010/117505 A2 | 10/2010 |
| WO | 2010/117505 A3 | 1/2011 |
| WO | 2012/071730 A1 | 6/2012 |
| WO | 2013/048880 A1 | 4/2013 |
| WO | 2013/169854 A2 | 11/2013 |
| WO | 2013/169870 A1 | 11/2013 |
| WO | 2013/169877 A2 | 11/2013 |
| WO | 2014/197340 A1 | 12/2014 |
| WO | 2014/200736 A1 | 12/2014 |
| WO | 2014/205648 A1 | 12/2014 |
| WO | 2015/087084 A1 | 6/2015 |
| WO | 2015/094587 A1 | 6/2015 |
| WO | 2015/122885 A1 | 8/2015 |
| WO | 2017/027632 A1 | 2/2017 |

OTHER PUBLICATIONS

Applicant-Initiated Interview Summary received for U.S. Appl. No. 16/572,314, dated Mar. 25, 2021, 4 pages.
Notice of Allowance received for Chinese Patent Application No. 201680031609.2, dated Mar. 18, 2021, 2 pages. (1 page of English Translation and 1 page of Official).
Notice of Allowance received for Chinese Patent Application No. 201711258408.9, dated Mar. 12, 2021, 2 pages (1 page of English Translation and 1 page of Official).
Notice of Allowance received for U.S. Appl. No. 16/270,396, dated Apr. 1, 2021, 10 pages.
Notice of Allowance received for Chinese Patent Application No. 201710424212.6, dated Mar. 4, 2021, 4 pages (1 page of English Translation and 3 pages of Official).
Advisory Action received for U.S. Appl. No. 16/270,396, dated Apr. 9, 2020, 5 pages.
Decision on Appeal received for Korean Patent Application No. 10-2017-7023591, dated Apr. 14, 2020, 30 pages (3 pages of English Translation and 27 pages of Official).
Final Office Action received for U.S. Appl. No. 14/846,574, dated Jun. 4, 2020, 25 pages.
Non-Final Office Action received for U.S. Appl. No. 16/270,396, dated Jun. 12, 2020, 9 pages.
Applicant-Initiated Interview Summary received for U.S. Appl. No. 16/270,396, dated Feb. 22, 2021, 4 pages.
Final Office Action received for U.S. Appl. No. 16/601,064, dated Mar. 8, 2021, 8 pages.
Notice of Allowance received for Chinese Patent Application No. 201680049868.8, dated Feb. 9, 2021, 4 pages (1 page of English Translation and 3 pages of Official).
Notice of Allowance received for U.S. Appl. No. 16/505,044, dated Mar. 4, 2021, 11 pages.
Applicant-Initiated Interview Summary received for U.S. Appl. No. 16/454,884, dated Dec. 4, 2020, 4 pages.
Applicant-Initiated Interview Summary received for U.S. Appl. No. 16/572,314, dated Dec. 16, 2020, 5 pages.
Applicant-Initiated Interview Summary received for U.S. Appl. No. 16/601,064, dated Dec. 14, 2020, 5 pages.
Final Office Action received for U.S. Appl. No. 16/736,711, dated Dec. 10, 2020, 11 pages.
Notice of Acceptance received for Australian Patent Application No. 2020200191, dated Nov. 30, 2020, 3 pages.

(56) References Cited

OTHER PUBLICATIONS

Notice of Allowance received for Korean Patent Application No. 10-2020-0010129, dated Dec. 1, 2020, 5 pages (2 pages of English Translation and 3 pages of Official).
Notice of Allowance received for Korean Patent Application No. 10-2020-7016098, dated Dec. 16, 2020, 4 pages (2 pages of English Translation and 2 pages of Official).
Applicant-Initiated Interview Summary received for U.S. Appl. No. 16/145,033, dated Jun. 29, 2020, 5 pages.
Office Action received for Japanese Patent Application No. 2019-040836, dated May 15, 2020, 5 pages (2 pages of English Translation and 3 pages of Official).
Office Action received for Korean Patent Application No. 10-2020-7016098, dated Jun. 15, 2020, 5 pages (2 pages of English Translation and 3 pages of Official).
Office Action received for Chinese Patent Application No. 201680049868.8, dated May 25, 2020, 30 pages (19 pages of English Translation and 11 pages of Official).
Applicant Initiated Interview Summary received for U.S. Appl. No. 16/782,380, dated Apr. 27, 2021, 5 pages.
Office Action received for Japanese Patent Application No. 2020-076922, dated Mar. 19, 2021, 7 pages (4 pages of English Translation and 3 pages of Official).
Office Action received for Korean Patent Application No. 10-2021-7005264, dated Apr. 16, 2021, 9 pages (4 pages of English Translation and 5 pages of Official).
Supplemental Notice of Allowance received for U.S. Appl. No. 14/846,574, dated Apr. 30, 2021, 3 pages.
Corrected Notice of Allowance received for U.S. Appl. No. 16/663,070, dated Nov. 5, 2020, 2 pages.
Corrected Notice of Allowance received for U.S. Appl. No. 16/663,070, dated Nov. 18, 2020, 2 pages.
Notice of Allowance received for Japanese Patent Application No. 2019-077312, dated Oct. 30, 2020, 4 pages (1 page of English Translation and 3 pages of Official).
Docomo PRIME series F-04B, user's manual, NTT Docomo, Inc., Mar. 31, 2010, 21 pages (Official Only) (See Communication under 37 CFR § 1.98(a) (3)).
Non-Final Office Action received for U.S. Appl. No. 16/572,314, dated Apr. 21, 2021, 12 pages.
Notice of Allowance received for U.S. Appl. No. 16/736,711, dated Apr. 21, 2021, 8 pages.
Office Action received for European Patent Application No. 16807953.1, dated Apr. 7, 2021, 4 pages.
Office Action received for European Patent Application No. 19171354.4, dated Apr. 14, 2021, 8 pages.
Office Action received for Japanese Patent Application No. 2020-197242, dated Mar. 12, 2021, 6 pages (3 pages of English Translation and 3 pages of Official).
Supplemental Notice of Allowance received for U.S. Appl. No. 14/846,574, dated Apr. 15, 2021, 3 pages.
Tokuda Ichiro, "Built-in software: Inspirium", vol. 63, No. 4, Fujitsu, Fujitsu Limited, Jul. 10, 2012, 9 pages (Official only) (See Communication under 37 CFR § 1.98(a) (3)).
Applicant-Initiated Interview Summary received for U.S. Appl. No. 16/245,140, dated Feb. 1, 2021, 4 pages.
Extended European Search Report received for European Patent Application No. 20197945.7, dated Feb. 9, 2021, 8 pages.
Final Office Action received for U.S. Appl. No. 16/245,140, dated Feb. 11, 2021, 23 pages.
Non-Final Office Action received for U.S. Appl. No. 16/145,033, dated Feb. 9, 2021, 55 pages.
Non-Final Office Action received for U.S. Appl. No. 16/782,380, dated Feb. 3, 2021, 12 pages.
Notice of Allowance received for U.S. Appl. No. 14/846,574, dated Feb. 9, 2021, 12 pages.
Notice of Allowance received for U.S. Appl. No. 16/703,472, dated Feb. 3, 2021, 5 pages.
Non-Final Office Action received for U.S. Appl. No. 16/245,140, dated Oct. 30, 2020, 20 pages.
Advisory Action received for U.S. Appl. No. 14/292,138, dated Aug. 30, 2018, 6 pages.
Advisory Action received for U.S. Appl. No. 14/292,138, dated May 10, 2019, 7 pages.
Anonymous, "Swipe to Edit Using BetterTouchTool : Mac Automation Tips", Mac Automation Tips, Online available at: https:jjmacautomationtips.wordpress.com/2011/03/11/swipe-to-edit-using-bettertouchtool/, Mar. 11, 2011, 1 page.
Applicant-Initiated Interview Summary received for U.S. Appl. No. 14/846,574, dated Feb. 3, 2020, 6 pages.
Applicant-Initiated Interview Summary received for U.S. Appl. No. 16/270,396, dated Apr. 6, 2020, 5 pages.
ARCHOS Team, "English Language User Manual Pocket Media Assistant PMA430(TM) Video Player & Recorder/Music & Audio/ Wifi /Linux/Personal Information Manager (PIM)", XP055525286, Dec. 31, 2015, 39 pages.
Board Opinion received for Chinese Patent Application No. 200780001219.1, dated Mar. 25, 2015, 7 pages (2 pages of English Translation and 5 pages of Official).
Board Opinion received for Chinese Patent Application No. 200780001219.1, dated Sep. 18, 2014, 10 pages (5 pages of English Translation and 5 pages of Official).
Certificate of Examination received for Australian Patent Application No. 2019100490, dated Oct. 16, 2019, 2 pages.
Chavda, Prekesh, "Swipe to Edit", Dribbble, Online available at: https://dribbble.comjshots/1320750-Swipe-to-Edit-animation, Nov. 21, 2013, 7 pages.
Corrected Notice of Allowability received for U.S. Appl. No. 16/265,676, dated Aug. 26, 2019, 4 pages.
Corrected Notice of Allowance received for U.S. Appl. No. 14/290,935, dated Dec. 18, 2017, 6 pages.
Corrected Notice of Allowance received for U.S. Appl. No. 15/614,276, dated Dec. 10, 2018, 2 pages.
Das, et al., "A statistical-topological feature combination for recognition of handwritten numerals", Applied Soft Computing, vol. 12, 2012, pp. 2486-2495.
Decision to Grant received for Danish Patent Application No. PA201670624, dated Feb. 5, 2018, 3 pages.
Decision to Grant received for Danish Patent Application No. PA201670626, dated Mar. 21, 2018, 2 pages.
Decision to Grant received for Danish Patent Application No. PA201870385, dated Mar. 26, 2020, 2 pages.
Decision to Grant received for European Patent Application No. 12175086.3, dated Nov. 10, 2016, 3 pages.
Decision to Grant received for European Patent Application No. 15716372.6, dated Aug. 16, 2019, 2 pages.
Decision to Grant received for European Patent Application No. 17173810.7, dated Apr. 4, 2019, 2 pages.
Decision to Grant received for European Patent Application No. 17211174.2, dated Aug. 29, 2019, 2 pages.
Decision to Refuse received for European Patent Application No. 12175083.0, dated Dec. 14, 2018, 11 Pages.
Extended European Search Report (includes Supplementary European Search Report and Search Opinion) received for European Patent Application No. 12175083.0, dated Oct. 26, 2012, 7 pages.
Extended European Search Report (includes Supplementary European Search Report and Search Opinion) received for European Patent Application No. 12175086.3, dated Dec. 4, 2012, 7 pages.
Extended European Search Report received for European Patent Application No. 16844879.3, dated Mar. 1, 2019, 6 pages.
Extended European Search Report received for European Patent Application No. 17173810.7, dated Oct. 17, 2017, 24 pages.
Extended European Search Report received for European Patent Application No. 17211174.2, dated Mar. 27, 2018, 13 pages.
Extended European Search Report received for European Patent Application No. 19171354.4, dated Sep. 23, 2019, 11 pages.
Extended European Search Report received for European Patent Application No. 16807953.1, dated Dec. 4, 2018, 7 pages.
Filipowicz, Luke, "How to use the QuickType keyboard in iOS 8", available online at <https://www.imore.com/comment/568232>, Oct. 11, 2014, pp. 1-17.
Final Office Action Received for U.S. Appl. No. 14/502,711, dated Sep. 22, 2017, 27 pages.

(56) References Cited

OTHER PUBLICATIONS

Final Office Action received for U.S. Appl. No. 11/549,624, dated Apr. 10, 2009, 9 pages.
Final Office Action received for U.S. Appl. No. 11/549,624, dated Feb. 1, 2010, 9 pages.
Final Office Action received for U.S. Appl. No. 11/620,641, dated Jun. 25, 2010, 31 pages.
Final Office Action received for U.S. Appl. No. 11/850,635, dated Apr. 24, 2012, 10 pages.
Final Office Action received for U.S. Appl. No. 11/850,635, dated Jan. 28, 2011, 21 pages.
Final Office Action received for U.S. Appl. No. 12/163,899 dated Apr. 13, 2012, 16 pages.
Final Office Action received for U.S. Appl. No. 13/559,495, dated Sep. 8, 2014, 7 pages.
Final Office Action received for U.S. Appl. No. 14/290,935, dated Apr. 10, 2017, 15 pages.
Final Office Action received for U.S. Appl. No. 14/290,945, dated Jan. 21, 2016, 12 pages.
Final Office Action received for U.S. Appl. No. 14/292,138, dated Jan. 10, 2019, 35 pages.
Final Office Action received for U.S. Appl. No. 14/292,138, dated Jun. 1, 2018, 31 pages.
Final Office Action received for U.S. Appl. No. 14/292,138, dated Jun. 3, 2016, 28 pages.
Final Office Action received for U.S. Appl. No. 14/502,711, dated Apr. 12, 2017, 29 pages.
Final Office Action Received for U.S. Appl. No. 14/503,147, dated Jun. 15, 2017, 18 pages.
Final Office Action received for U.S. Appl. No. 14/800,378, dated Sep. 7, 2018, 18 pages.
Final Office Action received for U.S. Appl. No. 14/846,574, dated May 10, 2019, 36 pages.
Final Office Action received for U.S. Appl. No. 15/148,417, dated Jul. 17, 2017, 13 pages.
Final Office Action received for U.S. Appl. No. 15/188,081, dated Dec. 13, 2018, 10 pages.
Final Office Action received for U.S. Appl. No. 15/662,174, dated Sep. 4, 2018, 17 pages.
Final Office Action received for U.S. Appl. No. 15/662,174, dated Sep. 4, 2019, 19 pages.
Final Office Action received for U.S. Appl. No. 16/270,396, dated Mar. 6, 2020, 11 pages.
Ghosh, et al., "Script Recognition—A Review", IEEE Transactions on Pattern Analysis and Machine Intelligence, vol. 32, No. 12, Dec. 2010, pp. 2142-2161.
Hazra, et al., "Sentiment Learning Using Twitter Ideograms", 8th Annual Industrial Automation and Electromechanical Engineering Conference, 2017, pp. 115-120.
HOWpc, "Windows XP Manual", Online available at: http://cfile208.uf.daum.net/attach/152FF50A4968C827141411, pp. Feb. 2003, 1-4.
Yoshino, Mariko, "Let's use! Outlook Express", Nikkei PC Beginners, Nikkei Business Publications, Inc., vol. 7, No. 24, Dec. 13, 2002, 75 pages.
Wikipedia, ""Framebuffer"", Online available at: https://en.wikipedia.org/wiki/Framebuffer, (retrieved on Dec. 7, 2015), pp. 1-7.
Huang, et al., "A Hybrid HMM-SVM Method for Online Handwriting Symbol Recognition", Proceedings of the Sixth International Conference on Intelligent Systems Design and Applications, Jinan, 2006, pp. 887-891.
Ikeda, Masaru, "beGlobal Seoul 2015 Startup Battle: Talkey", YouTube Publisher, Online Available at: https://www.youtube.com/watch?v=4Wkp7sAAldg, May 14, 2015, 1 page.
INews and Tech, "How to Use The QuickType Keyboard In IOS 8", Available online at: http://www.inewsandtech.com/how-to-use-the-quicktype-keyboard-in-ios-8/, Sep. 17, 2014, 6 pages.
Intention to Grant received for Danish Patent Application No. PA201670624, dated Oct. 17, 2017, 2 pages.
Intention to grant received for Danish Patent Application No. PA201670626, dated Jan. 26, 2018, 2 pages.
Intention to Grant received for Danish Patent Application No. PA201870385, dated Jan. 24, 2020, 2 pages.
Intention to Grant received for European Patent Application No. 12175086.3 dated Jun. 28, 2016, 8 pages.
Intention to Grant received for European Patent Application No. 15716372.6, dated Apr. 3, 2019, 7 pages.
Intention to Grant Received for European Patent Application No. 17173810.7, dated Nov. 21, 2018, 8 pages.
Intention to Grant received for European Patent Application No. 17211174.2, dated Apr. 9, 2019, 7 pages.
Intention to Grant received for European Patent Application No. 17211174.2, dated Aug. 20, 2019, 6 pages.
International Preliminary Report on Patentability Received for PCT Application No. PCT/US2015/023946, dated Dec. 15, 2016, 17 pages.
International Preliminary Report on Patentability received for PCT Patent Application No. PCT/US2007/077777, dated Oct. 13, 2009, 11 pages.
International Preliminary Report on Patentability received for PCT Patent Application No. PCT/US2007/088872, dated Jul. 7, 2009, 7 pages.
International Preliminary Report on Patentability received for PCT Patent Application No. PCT/US2014/040417, dated Dec. 23, 2015, 8 pages.
International Preliminary Report on Patentability received for PCT Patent Application No. PCT/US2016/025418, dated Dec. 21, 2017, 16 pages.
International Preliminary Report on Patentability received for PCT Patent Application No. PCT/US2016/046828, dated Mar. 1, 2018, 19 pages.
International Preliminary Report on Patentability received for PCT Patent Application No. PCT/US2016/048044, dated Mar. 22, 2018, 8 pages.
International Search Report and Written Opinion Received for PCT Application No. PCT/US2015/023946, dated Oct. 12, 2015, 22 pages.
International Search Report and Written Opinion received for PCT Patent Application No. PCT/US2007/077777, dated Oct. 8, 2009, 15 pages.
International Search Report and Written Opinion received for PCT Patent Application No. PCT/US2007/088872, dated May 8, 2008, 8 pages.
International Search Report and Written Opinion received for PCT Patent Application No. PCT/US2014/040417, dated Sep. 25, 2014, 10 pages.
International Search Report and Written Opinion received for PCT Patent Application No. PCT/US2016/025418, dated Jul. 1, 2016, 20 pages.
International Search Report and Written Opinion received for PCT Patent Application No. PCT/US2016/046828, dated Dec. 15, 2016, 22 pages.
International Search Report and Written Opinion received for PCT Patent Application No. PCT/US2016/048044, dated Oct. 31, 2016, 9 pages.
International Search Report and Written Opinion received for PCT Patent Application No. PCT/US2019/024790, dated Sep. 11, 2019, 18 pages.
Invitation to Pay Additional Fee received for PCT Patent Application No. PCT/US2019/024790, dated Jul. 18, 2019, 10 pages.
Invitation to Pay Additional Fees received for PCT Patent Application No. PCT/US2016/046828, dated Sep. 23, 2016, 2 pages.
IOS 8 Release, "Quick Type Keyboard on iOS 8 Makes Typing Easier", Online available at: https://www.youtube.com/watch?v=0CIdLR4fhVU, Jun. 3, 2014, 3 pages.
K.C., et al., "A Comprehensive Survey on On-Line Handwriting Recognition Technology and its Real Application to the Nepalese Natural Handwriting", Kathmandu University Journal of Science, Engineering, and Technology, vol. 5, No. 1, Jan. 2009, pp. 31-55.
Kessentini, et al., "A Multi-Stream HMM-based Approach for Off-line Multi-Script Handwritten Word Recognition", Proceedings of the ICFHR'08, Jan. 1, 2011, 6 pages.
Komninos, et al., "Text Input on a Smart Watch", IEEE, 2014, pp. 50-58.

(56) References Cited

OTHER PUBLICATIONS

Malaviya, et al., "Fuzzy handwriting description language: FOHDEL", Pattern Recognition, vol. 33, 2000, pp. 119-131.
Milic-Frayling, Natasa, et al., "SmartView: Enhanced Document Viewer for Mobile Devices", Microsoft Technical Report, Online available at: ftp://ftp.research.microsoft.com/pub/tr/tr-2002-114.pdf, Nov. 15, 2002, 10 pages.
Minutes of Oral Proceedings received for European Patent Application No. 12175083.0, dated Dec. 14, 2018, 6 pages.
Minutes of the Oral Proceedings received for European Patent Application No. 15716372.6, dated Feb. 21, 2019, 6 pages.
Minutes of the oral proceedings received for European Patent Application No. 15716372.6, dated Mar. 29, 2019, 9 pages.
Natarajan, et al., "Multilingual Machine Printed OCR", International Journal of Pattern Recognition and Artificial Intelligence, vol. 15, No. 1, 2001, pp. 43-63.
Natarajan, et al., "Multi-lingual Offline Handwriting Recognition Using Hidden Markov Models: A Script-Independent Approach", Arabic and Chinese Handwriting Recognition, Lecture Notes in Computer Science, Sep. 27, 2006, pp. 231-250.
Non-Final Office Action received for U.S. Appl. No. 11/620,641, dated Nov. 20, 2009, 20 pages.
Non-Final Office Action received for U.S. Appl. No. 12/163,899, dated Oct. 7, 2011, 16 pages.
Non-Final Office Action received for U.S. Appl. No. 12/163,899, dated Sep. 14, 2012, 16 pages.
Non-Final Office Action received for U.S. Appl. No. 15/898,025, dated Jul. 11, 2019, 9 pages.
Non-Final Office Action received for U.S. Appl. No. 11/549,624, dated Jul. 22, 2009, 9 pages.
Non-Final Office Action received for U.S. Appl. No. 11/549,624, dated Sep. 30, 2008, 8 pages.
Non-Final Office Action received for U.S. Appl. No. 11/850,635, dated Oct. 6, 2010, 28 pages.
Non-Final Office Action received for U.S. Appl. No. 12/165,554, dated Nov. 21, 2011, 12 pages.
Non-Final Office Action received for U.S. Appl. No. 13/458,995, dated Jul. 5, 2012, 13 pages.
Non-Final Office Action received for U.S. Appl. No. 13/559,495, dated Dec. 16, 2013, 6 pages.
Non-Final Office Action received for U.S. Appl. No. 13/559,495, dated Dec. 7, 2012, 10 pages.
Non-Final Office Action received for U.S. Appl. No. 13/959,631, dated Jul. 20, 2015, 14 pages.
Non-Final Office Action received for U.S. Appl. No. 14/056,350, dated Nov. 13, 2014, 10 pages.
Non-Final Office Action received for U.S. Appl. No. 14/290,935, dated Jun. 7, 2016, 12 pages.
Non-Final Office Action received for U.S. Appl. No. 14/290,945, dated Jul. 16, 2015, 11 pages.
Non-Final Office Action received for U.S. Appl. No. 14/291,722, dated Aug. 26, 2016, 17 pages.
Non-Final Office Action received for U.S. Appl. No. 14/291,865, dated Sep. 24, 2015, 27 pages.
Non-Final Office Action received for U.S. Appl. No. 14/292,138, dated Aug. 10, 2017, 28 pages.
Non-Final Office Action received for U.S. Appl. No. 14/292,138, dated Dec. 15, 2016, 25 pages.
Non-Final Office Action received for U.S. Appl. No. 14/292,138, dated Sep. 10, 2015, 29 pages.
Non-Final Office Action received for U.S. Appl. No. 14/292,138, dated Sep. 12, 2018, 33 pages.
Non-Final Office Action received for U.S. Appl. No. 14/502,711, dated Apr. 26, 2018, 21 pages.
Non-Final Office Action Received for U.S. Appl. No. 14/502,711, dated Nov. 21, 2016, 23 pages.
Non-Final Office Action Received for U.S. Appl. No. 14/503,147, dated Nov. 2, 2016, 21 pages.
Non-Final Office Action received for U.S. Appl. No. 14/800,378, dated Feb. 23, 2018, 10 pages.
Non-Final Office Action received for U.S. Appl. No. 14/846,574, dated Jun. 22, 2017, 21 pages.
Non-Final Office Action received for U.S. Appl. No. 14/846,574, dated Nov. 29, 2017, 27 pages.
Non-Final Office Action received for U.S. Appl. No. 14/846,574, dated Sep. 20, 2018, 61 pages.
Non-Final Office Action received for U.S. Appl. No. 14/846,574, dated Sep. 30, 2019, 29 pages.
Non-Final Office Action received for U.S. Appl. No. 15/142,661, dated Jan. 25, 2017, 29 pages.
Non-Final Office Action received for U.S. Appl. No. 15/143,902, dated Mar. 30, 2017, 20 pages.
Non-Final Office Action received for U.S. Appl. No. 15/148,417, dated Jan. 27, 2017, 12 pages.
Non-Final Office Action received for U.S. Appl. No. 15/188,081, dated Jun. 8, 2017, 17 pages.
Non-Final Office Action received for U.S. Appl. No. 15/188,081, dated Mar. 30, 2018, 21 pages.
Non-Final Office Action received for U.S. Appl. No. 15/275,309, dated Feb. 27, 2018, 17 pages.
Non-Final Office Action received for U.S. Appl. No. 15/280,749, dated Jan. 17, 2017, 18 pages.
Non-Final Office Action received for U.S. Appl. No. 15/614,276, dated Jul. 12, 2018, 13 pages.
Non-Final Office Action received for U.S. Appl. No. 15/662,174, dated Apr. 2, 2019, 21 pages.
Non-Final Office Action received for U.S. Appl. No. 15/662,174, dated Jan. 10, 2018, 25 pages.
Non-Final Office Action received for U.S. Appl. No. 15/985,570, dated Aug. 16, 2018, 23 pages.
Non-Final Office Action received for U.S. Appl. No. 16/145,033, dated Mar. 4, 2020, 50 pages.
Non-Final Office Action received for U.S. Appl. No. 16/270,396, dated Aug. 22, 2019, 9 pages.
Non-Final Office Action received for U.S. Appl. No. 16/454,884, dated Jan. 14, 2020, 41 pages.
Non-Final Office Action received for U.S. Appl. No. 90/012,308, dated Dec. 3, 2012, 47 pages.
Non-Final Office Action, received for U.S. Appl. No. 11/850,635, dated Jan. 4, 2012, 10 pages.
Notice of Acceptance received for Australian Patent Application No. 2013200529, dated Feb. 9, 2016, 3 pages.
Notice of Acceptance received for Australian Patent Application No. 2016203172, dated Jan. 24, 2018, 3 pages.
Notice of Acceptance received for Australian Patent Application No. 2017203816, dated Jul. 30, 2018, 3 pages.
Notice of Acceptance received for Australian Patent Application No. 2018260930, dated Nov. 11, 2019, 3 pages.
Notice of Allowance received for Canadian Patent Application No. 2,735,309, dated Dec. 9, 2014, 1 page.
Notice of Allowance received for Canadian Patent Application No. 2,893,513, dated May 29, 2017, 1 page.
Notice of Allowance received for Canadian Patent Application No. 2,986,582, dated Mar. 22, 2019, 1 page.
Notice of Allowance received for Chinese Patent Application No. 200780001219.1, dated Apr. 20, 2016, 3 pages (2 pages of English Translation and 1 page of Official).
Notice of Allowance received for Chinese Patent Application No. 201480030897.0, dated Aug. 3, 2018, 2 pages (1 page of English Translation and 1 page of Official).
Notice of Allowance received for Japanese Patent Application No. 2012-173257, dated Dec. 1, 2014, 3 pages (Official Only) (See Communication under 37 CFR § 1.98(a) (3)).
Notice of Allowance Received for Japanese Patent Application No. 2014-259188, dated Jan. 6, 2017, 3 pages (Official only) (See Communication under 37 CFR § 1.98(a) (3)).
Notice of Allowance Received for Japanese Patent Application No. 2016-518366, dated May 8, 2017, 3 pages (Only Official) (See Communication under 37 CFR § 1.98(a) (3)).
Notice of Allowance received for Japanese Patent Application No. 2017-108227, dated Feb. 4, 2019, 4 pages (1 page of English Translation and 3 pages of Official).

(56) References Cited

OTHER PUBLICATIONS

Notice of Allowance received for Japanese Patent Application No. 2017-109294, dated Jun. 24, 2019, 4 pages (1 page of English Translation and 3 pages of Official).
Notice of Allowance received for Japanese Patent Application No. 2018-089430, dated Oct. 1, 2018, 4 pages (1 page of English Translation and 3 pages of Official).
Notice of Allowance received for Japanese Patent Application No. 2018-203160, dated Mar. 27, 2020, 5 pages (2 page of English Translation and 3 pages of Official).
Notice of Allowance received for Korean Patent Application No. 10-2009-7006231, dated Sep. 23, 2014, 3 pages (Official Only) (See Communication under 37 CFR § 1.98(a) (3)).
Notice of Allowance received for Korean Patent Application No. 10-2012-7023375, dated Sep. 30, 2014, 3 pages (Official Only) (See Communication under 37 CFR § 1.98(a) (3)).
Notice of Allowance received for Korean Patent Application No. 10-2013-7019464, dated Sep. 30, 2014, 3 pages (Official Only) (See Communication under 37 CFR § 1.98(a) (3)).
Notice of Allowance received for Korean Patent Application No. 10-2014-7013454, dated Mar. 15, 2016, 6 pages (2 pages of English Translation and 4 pages of Official).
Notice of Allowance received for Korean Patent Application No. 10-2015-7033627, dated May 28, 2018, 4 pages (1 page of English Translation and 3 pages of Official).
Notice of Allowance received for Korean Patent Application No. 10-2017-0068927, dated Feb. 25, 2019, 3 pages (1 page of English Translation and 2 pages of Official).
Notice of Allowance received for Korean Patent Application No. 10-2018-7024261, dated Apr. 24, 2019, 7 pages (1 page of English Translation and 6 pages of Official).
Notice of Allowance received for Korean Patent Application No. 10-2018-7029349, dated Jun. 14, 2019, 6 pages (2 pages of English Translation and 4 pages of Official).
Notice of Allowance received for Korean Patent Application No. 10-2019-0054454, dated Oct. 24, 2019, 3 pages (1 page of English Translation and 2 pages of Official).
Notice of Allowance received for Taiwanese Patent Application No. 103119279, dated Nov. 29, 2018, 5 pages (2 pages of English Translation and 3 pages of Official).
Notice of Allowance received for Taiwanese Patent Application No. 103119324, dated Sep. 30, 2016, 2 pages (Official only) (See Communication under 37 CFR § 1.98(a) (3)).
Notice of Allowance received for Taiwanese Patent Application No. 103119951, dated Aug. 23, 2016, 2 pages (Official only) (See Communication under 37 CFR § 1.98(a) (3)).
Notice of Allowance received for U.S. Appl. No. 15/898,025, dated Nov. 27, 2019, 11 pages.
Notice of Allowance received for U.S. Appl. No. 11/549,624, dated Jun. 3, 2010, 6 pages.
Notice of Allowance received for U.S. Appl. No. 11/620,641, dated Apr. 13, 2011, 6 pages.
Notice of Allowance received for U.S. Appl. No. 11/620,641, dated Mar. 18, 2011, 12 pages.
Notice of Allowance received for U.S. Appl. No. 11/850,635, dated Jun. 11, 2013, 9 pages.
Notice of Allowance received for U.S. Appl. No. 12/101,832, dated Feb. 2, 2009, 6 pages.
Notice of Allowance received for U.S. Appl. No. 12/101,832, dated Sep. 26, 2008, 9 pages.
Notice of Allowance received for U.S. Appl. No. 12/163,899, dated Apr. 2, 2013, 9 pages.
Notice of Allowance received for U.S. Appl. No. 12/165,554, dated Apr. 2, 2012, 9 pages.
Notice of Allowance received for U.S. Appl. No. 13/458,995, dated Nov. 13, 2012, 8 pages.
Notice of Allowance received for U.S. Appl. No. 13/559,495, dated Aug. 15, 2013, 6 pages.
Notice of Allowance received for U.S. Appl. No. 13/559,495, dated Dec. 12, 2014, 5 pages.
Notice of Allowance received for U.S. Appl. No. 13/559,495, dated Jun. 25, 2013, 6 pages.
Notice of Allowance received for U.S. Appl. No. 13/559,495, dated Mar. 13, 2015, 5 pages.
Notice of Allowance received for U.S. Appl. No. 13/959,631, dated Jan. 5, 2016, 7 pages.
Notice of Allowance received for U.S. Appl. No. 14/056,350, dated Apr. 24, 2015, 10 pages.
Notice of Allowance received for U.S. Appl. No. 14/056,350, dated Jan. 7, 2016, 5 pages.
Notice of Allowance received for U.S. Appl. No. 14/056,350, dated Sep. 16, 2015, 7 pages.
Notice of Allowance received for U.S. Appl. No. 14/290,935, dated Oct. 12, 2017, 11 pages.
Notice of Allowance received for U.S. Appl. No. 14/290,945, dated Jun. 8, 2016, 9 pages.
Notice of Allowance received for U.S. Appl. No. 14/291,865, dated Apr. 8, 2016, 9 pages.
Notice of Allowance received for U.S. Appl. No. 14/502,711, dated Sep. 28, 2018, 9 pages.
Notice of Allowance received for U.S. Appl. No. 14/503,147, dated Jan. 28, 2019, 7 pages.
Notice of Allowance received for U.S. Appl. No. 14/503,147, dated Sep. 12, 2018, 7 pages.
Notice of Allowance received for U.S. Appl. No. 15/142,661, dated Feb. 15, 2018, 9 pages.
Notice of Allowance received for U.S. Appl. No. 15/142,661, dated Oct. 4, 2017, 22 pages.
Notice of Allowance received for U.S. Appl. No. 15/148,417, dated Dec. 7, 2017, 7 pages.
Notice of Allowance received for U.S. Appl. No. 15/188,081, dated Jun. 26, 2019, 8 pages.
Notice of Allowance received for U.S. Appl. No. 15/188,081, dated Mar. 20, 2019, 6 pages.
Notice of Allowance received for U.S. Appl. No. 15/275,309, dated Sep. 27, 2018, 7 pages.
Notice of Allowance received for U.S. Appl. No. 15/280,749, dated Jul. 11, 2017, 10 pages.
Notice of Allowance received for U.S. Appl. No. 15/280,749, dated Nov. 29, 2017, 9 pages.
Notice of Allowance received for U.S. Appl. No. 15/614,276, dated Jan. 17, 2019, 4 pages.
Notice of Allowance received for U.S. Appl. No. 15/614,276, dated Oct. 31, 2018, 11 pages.
Notice of Allowance received for U.S. Appl. No. 15/876,673, dated May 4, 2018, 27 pages.
Notice of Allowance received for U.S. Appl. No. 15/985,570, dated Mar. 13, 2019, 22 pages.
Notice of Allowance received for U.S. Appl. No. 16/265,676, dated Jul. 3, 2019, 11 pages.
Notice of Amendment Dismissal received for Korean Patent Application No. 10-2016-7016026, dated Sep. 18, 2017, 10 pages (5 pages of English Translation and 5 pages of Official).
Notice of Intent to Issue Ex-Parte Reexamination Certificate received for U.S. Appl. No. 90/012,308, dated Aug. 23, 2013, 9 pages.
Office Action received for Australian Patent Application No. 2013200529, dated Dec. 12, 2014, 3 pages.
Office Action received for Australian Patent Application No. 2016203172, dated Apr. 21, 2017, 4 pages.
Office Action received for Australian Patent Application No. 2017203816, dated Feb. 12, 2018, 3 pages.
Office Action received for Australian Patent Application No. 2018203219, dated Nov. 1, 2019, 5 pages.
Office Action received for Australian Patent Application No. 2018260930, dated Jun. 26, 2019, 3 pages.
Office Action received for Australian Patent Application No. 2019100490, dated Jul. 26, 2019, 4 pages.
Office Action received for Canadian Patent Application No. 2,893,513, dated Jun. 14, 2016, 5 pages.
Office Action received for Canadian Patent Application No. 2,986,582, dated Sep. 11, 2018, 3 pages.

(56) References Cited

OTHER PUBLICATIONS

Office Action received for Chinese Patent Application No. 201480030897.0, dated Mar. 12, 2018, 10 pages (5 pages of English Translation and 5 pages of Official).
Office Action received for Chinese Patent Application No. 201610525800.4, dated Apr. 10, 2019, 8 pages (3 pages of English Translation and 5 pages of Official).
Office Action received for Chinese Patent Application No. 201610525800.4, dated Aug. 22, 2019, 8 pages (4 pages of English Translation and 4 pages of Official).
Office Action received for Chinese Patent Application No. 201610525800.4, dated Aug. 27, 2018, 13 pages (6 pages of English Translation and 7 pages of Official).
Office Action received for Chinese Patent Application No. 201610525800.4, dated Feb. 18, 2020, 7 pages (3 pages of English Translation and 4 pages of Official).
Office Action received for Chinese Patent Application No. 201680031609.2, dated Jan. 15, 2020, 20 pages (7 pages of English Translation and 13 pages of Official).
Office Action received for Chinese Patent Application No. 201710424212.6, dated Oct. 28, 2019, 20 pages (7 pages of English Translation and 13 pages of Official).
Office Action received for Danish Patent Application No. PA201670624, dated Jun. 28, 2017, 3 pages.
Office Action received for Danish Patent Application No. PA201670624, dated Oct. 20, 2016, 8 pages.
Office Action received for Danish Patent Application No. PA201670626, dated Jun. 30, 2017, 3 pages.
Office Action received for Danish Patent Application No. PA201670626, dated Oct. 24, 2016, 8 pages.
Office Action received for Danish Patent Application No. PA201770921, dated Apr. 26, 2019, 6 pages.
Office Action received for Danish Patent Application No. PA201770921, dated Dec. 6, 2018, 6 pages.
Office Action received for Danish Patent Application No. PA201770921, dated May 3, 2018, 3 pages.
Office Action received for Danish Patent Application No. PA201870385, dated Aug. 23, 2019, 3 pages.
Office Action received for European Patent Application No. 07841984.3, dated Jul. 6, 2010, 10 pages.
Office Action received for European Patent Application No. 07869922.0, dated Dec. 7, 2010, 5 pages.
Office Action received for European Patent Application No. 07869922.0, dated May 26, 2010, 5 pages.
Office Action Received for European Patent Application No. 121750830, dated Nov. 30, 2015, 5 pages.
Office Action received for European Patent Application No. 15716372.6, dated Nov. 15, 2017, 8 pages.
Office Action received for Japanese Patent Application No. 2012-173257, dated Dec. 13, 2013, 2 pages (English Translation Only).
Office Action received for Japanese Patent Application No. 2014-259187, dated Feb. 3, 2017, 4 pages (2 pages of English Translation and 2 pages of Official).
Office Action received for Japanese Patent Application No. 2014-259187, dated Feb. 14, 2020, 44 pages (17 pages of English Translation and 27 pages of Official).
Office Action received for Japanese Patent Application No. 2014-259187, dated Jan. 4, 2018, 6 pages (3 pages of English translation and 3 pages of official).
Office Action Received for Japanese Patent Application No. 2014-259187, dated Mar. 11, 2016, 4 pages (2 pages of English Translation and 2 pages of Official).
Office Action received for Japanese Patent Application No. 2014-259187, dated May 31, 2019, 44 pages (23 pages of English Translation and 21 pages of Official).
Office Action Received for Japanese Patent Application No. 2014-259188, dated Feb. 1, 2016, 8 pages (4 pages of English Translation and 4 pages of Official).
Office Action Received for Japanese Patent Application No. 2016-518366, dated Nov. 7, 2016, 8 pages (4 pages of English Translation and 4 pages of Official).
Office Action received for Japanese Patent Application No. 2017-108227, dated Aug. 6, 2018, 8 pages (4 pages of English Translation and 4 pages of Official).
Office Action received for Japanese Patent Application No. 2017-109294, dated Aug. 3, 2018, 9 pages (4 pages of English Translation and 5 pages of Official).
Office Action received for Japanese Patent Application No. 2017-109294, dated Dec. 14, 2018, 4 pages (2 pages of English Translation and 2 pages of Official).
Office Action received for Japanese Patent Application No. 2018-203160, dated Oct. 11, 2019, 5 pages (2 pages of English Translation and 3 pages of Official).
Office Action received for Korean Patent Application No. 10-2009-7006231, dated Mar. 19, 2014, 5 pages (1 page of English Translation and 4 pages of Official).
Office Action received for Korean Patent Application No. 10-2012-7023375, dated Nov. 5, 2013, 8 pages (3 pages of English Translation and 5 pages of Official).
Office Action received for Korean Patent Application No. 10-2013-7019464, dated Nov. 5, 2013 6 pages (2 pages of English translation & 4 pages of Official).
Office Action received for Korean Patent Application No. 10-2014-7013454, dated Apr. 17, 2015, 11 pages (4 pages of English Translation and 7 pages of Official).
Office Action received for Korean Patent Application No. 10-2014-7013454, dated Aug. 11, 2014, 11 pages (4 pages of English Translation and 7 pages of Official).
Office Action received for Korean Patent Application No. 10-2014-7013455, dated Apr. 14, 2015, 8 pages (3 pages of English Translation and 5 pages of Official).
Office Action received for Korean Patent Application No. 10-2014-7013455, dated Aug. 11, 2014, 12 pages (5 pages of English Translation and 7 pages of Official).
Office Action Received for Korean Patent Application No. 10-2014-7013455, dated Jan. 28, 2016, 7 pages (3 pages of English Translation and 4 pages of Official).
Office Action received for Korean Patent Application No. 10-2015-7033627, dated Jul. 26, 2017, 5 pages (2 pages of English Translation and 3 pages of Official).
Office Action Received for Korean Patent Application No. 10-2016-7016026, dated Apr. 24, 2017, 7 pages (3 pages of English translation and 4 pages of official).
Office Action Received for Korean Patent Application No. 10-2016-7016026, dated Jul. 29, 2016, 9 pages (3 pages of English Translation and 6 pages of Official).
Office Action received for Korean Patent Application No. 10-2017-0068927, dated Jun. 11, 2018, 14 pages (7 pages of English Translation and 7 pages of Official).
Office Action received for Korean Patent Application No. 10-2017-7023591, dated Oct. 31, 2017, 12 pages (5 pages of English Translation and 7 pages of Official).
Office Action received for Korean Patent Application No. 10-2017-7023591, dated Sep. 10, 2018, 7 pages (3 pages of English Translation and 4 pages Official).
Office Action received for Korean Patent Application No. 10-2018-7024261, dated Oct. 24, 2018, 5 pages (2 pages of English Translation and 3 pages of Official).
Office Action received for Korean Patent Application No. 10-2018-7029349, dated Dec. 17, 2018, 8 pages (3 pages of English Translation and 5 pages of Official).
Office Action Received for Korean Patent Application No. 10-2019-0054454, dated May 20, 2019, 7 pages (3 pages of English Translation and 4 pages of Official).
Office Action received for Korean Patent Application No. 10-2019-7021958, dated Oct. 21, 2019, 5 pages (2 pages of English Translation and 3 pages of Official).
Office Action received for Korean Patent Application No. 10-2019-7026997, dated Nov. 18, 2019, 9 pages (3 pages of English translation and 6 pages of Official).

(56) References Cited

OTHER PUBLICATIONS

Office Action received for Taiwanese Patent Application No. 103119279, dated Aug. 1, 2018, 14 pages (6 pages of English Translation and 8 pages of Official).
Office Action received for Taiwanese Patent Application No. 103119279, dated Dec. 21, 2016, 15 pages (6 pages of English Translation and 9 pages of Official).
Office Action received for Taiwanese Patent Application No. 103119279, dated May 4, 2016, 13 pages (5 pages of English Translation and 8 pages of Official).
Office Action received for Taiwanese Patent Application No. 103119279, dated Sep. 21. 2015, 21 pages (9 pages of English translation and 12 pages of official).
Office Action received for Taiwanese Patent Application No. 103119324, dated Mar. 10, 2016, 23 pages (9 pages of English Translation and 14 pages of Official).
Office Action received for Taiwanese Patent Application No. 103119816, dated Jun. 22, 2016, 9 pages (4 pages of English Translation and 5 pages of Official).
Office Action received for Taiwanese Patent Application No. 103119951, dated Nov. 20, 2015, 6 pages (3 pages of English Translation and 3 pages of Official).
Office Action received for Taiwanese Patent Application No. 103119952, dated Apr. 27, 2016, 2 pages (Official Only) (See Communication under 37 CFR § 1.98(a) (3))
Office Action received for Taiwanese Patent Application No. 103119952, dated Oct. 8, 2015, 16 pages (7 pages of English Translation and 9 pages of Official).
Pham, Dũng VIỆT., "Online handwriting recognition using multi convolution neural networks", In Proceedings of the $9^{th}$ International Conference on Simulated Evolution and Learning (SEAL '12). Springer-Verlag, Berlin, Heidelberg, 2012, pp. 310-319.
Pogue, David, "iPhone: The Missing Manual", Aug. 2007, 306 pages.
Rodríguez-Serrano, et al., "Handwritten word-spotting using hidden Markov models and universal vocabularies", Pattern Recognition, vol. 42, 2009, pp. 2106-2116.
Rubine, D., "Specifying Gestures by Example", Computer Graphics vol. 25, No. 4, Jul. 1991, pp. 329-337.
Search Report and Opinion received for Danish Patent Application No. PA201870385, dated Nov. 16, 2018, 10 pages.
Search Report received for Danish Patent Application No. PA201770921, dated Jan. 23, 2018, 7 pages.
Summons to Attend Oral Proceedings received for European Patent Application No. 07841984.3, dated Jun. 28, 2011, 18 pages.
Summons to Attend Oral Proceedings received for European Patent Application No. 12175083.0, dated Jun. 25, 2018, 9 pages.
Summons to Attend Oral Proceedings received for European Patent Application No. 15716372.6, dated Jul. 13, 2018, 9 pages.
Summons to Oral Proceedings received for European Patent Application No. 07841984.3, dated Dec. 22, 2015, 11 pages.
Suresh, et al., "Fuzzy Technique Based Recognition of Handwritten Characters", Image and Vision Computing, vol. 25, 2007, pp. 230-239.
Tomic, et al., "Emoticons", FIP—Journal of Finance and Law, vol. 1, No. 1, 2013, pp. 35-42.
Warren, Tom, "Microsoft Android Wear keyboard", Online Available at: https://www.youtube.com/watch?v=_Iu7bUKKrJE, Oct. 11, 2014, 4 pages.
Applicant-Initiated Interview Summary received for U.S. Appl. No. 16/245,140, dated Sep. 16, 2020, 6 pages.
Applicant-Initiated Interview Summary received for U.S. Appl. No. 16/270,396, dated Sep. 14, 2020, 5 pages.
Final Office Action received for U.S. Appl. No. 16/454,884, dated Sep. 11, 2020, 28 pages.
Notice of Allowance received for U.S. Appl. No. 16/663,070, dated Sep. 3, 2020, 10 pages.
Office Action received for Chinese Patent Application No. 201680031609.2, dated Aug. 20, 2020, 6 pages (3 pages of English Translation and 3 pages of Official).
Office Action received for European Patent Application No. 16807953.1, dated Sep. 10, 2020, 4 pages.
Corrected Notice of Allowance received for U.S. Appl. No. 16/663,070, dated Oct. 20, 2020, 2 pages.
Final Office Action received for U.S. Appl. No. 16/270,396, dated Oct. 19, 2020, 10 pages.
Non-Final Office Action received for U.S. Appl. No. 14/846,574, dated Sep. 24, 2020, 29 pages.
Non-Final Office Action received for U.S. Appl. No. 16/505,044, dated Oct. 22, 2020, 18 pages.
Notice of Allowance received for Japanese Patent Application No. 2014-259187, dated Oct. 16, 2020, 3 pages (1 page of English Translation and 2 pages of Official).
Notice of Allowance received for Korean Patent Application No. 10-2019-7026997, dated Oct. 16, 2020, 6 pages (2 pages of English Translation and 4 pages of Official).
Office Action received for Chinese Patent Application No. 201710424212.6, dated Sep. 9, 2020, 6 pages (3 pages English Translation and 3 pages of Official).
Ritchie Rene, "QuickType keyboard in iOS 8: Explained", Retrieved via URL: https://www.imore.com/quicktype-keyboards-ios-8-explained, Jun. 21, 2014, pp. 1-19.
Non-Final Office Action received for U.S. Appl. No. 16/572,314, dated Aug. 12, 2020, 16 pages.
Notice of Acceptance received for Australian Patent Application No. 2018203219, dated Jul. 21, 2020, 3 pages.
Office Action received for Chinese Patent Application No. 201711258408.9, dated Jun. 23, 2020, 14 pages (7 pages of English Translation and 7 pages of Official).
Office Action received for Korean Patent Application No. 10-2020-0010129, dated Jul. 27, 2020, 11 pages (5 pages of English Translation and 6 pages of Official).
Decision to Grant received for European Patent Application No. 16844879.3, dated Sep. 24, 2020, 2 pages.
Final Office Action received for U.S. Appl. No. 16/145,033, dated Sep. 22, 2020, 49 pages.
Office Action received for Japanese Patent Application No. 2019-040836, dated Aug. 14, 2020, 4 pages (2 pages of English Translation and 2 pages of Official).
Result of Consultation received for European Patent Application No. 16807953.1, dated Sep. 24, 2020, 3 pages.
Non-Final Office Action received for U.S. Appl. No. 16/601,064, dated Oct. 7, 2020, 13 pages.
Office Action received for Australian Patent Application No. 2020200191, dated Sep. 25, 2020, 3 pages.
Intention to Grant received for European Patent Application No. 16844879.3, dated May 11, 2020, 8 pages.
Notice of Allowance received for Korean Patent Application No. 10-2019-7021958, dated Apr. 28, 2020, 4 pages (1 page of English Translation and 3 pages of Official).
Office Action received for Australian Patent Application No. 2018203219, dated May 13, 2020, 3 pages.
Office Action received for Korean Patent Application No. 10-2019-7026997, dated May 7, 2020, 10 pages (4 pages of English Translation and 6 pages of Official).
Applicant-Initiated Interview Summary received for U.S. Appl. No. 16/454,884, dated Jun. 2, 2020, 3 pages.
Non-Final Office Action received for U.S. Appl. No. 16/245,140, dated Jun. 2, 2020, 23 pages.
Applicant-Initiated Interview Summary received for U.S. Appl. No. 14/846,574, dated Jan. 14, 2021, 5 pages.
Office Action received for Chinese Patent Application No. 201711258408.9, dated Jan. 4, 2021, 6 pages (3 pages of English Translation and 3 pages of Official).
Advisory Action received for U.S. Appl. No. 16/454,884, dated Jan. 1, 2021, 6 pages.
Final Office Action received for U.S. Appl. No. 16/572,314, dated Dec. 30, 2020, 11 pages.
Non-Final Office Action received for U.S. Appl. No. 16/703,472, dated Jan. 12, 2021, 8 pages.

(56) References Cited

OTHER PUBLICATIONS

Summons to Attend Oral Proceedings received for European Patent Application No. 19724963.4, dated Dec. 23, 2020, 8 pages.
Office Action received for Japanese Patent Application No. 2019-077312, dated Jul. 17, 2020, 8 pages (4 pages of English Translation and 4 pages of Official).
Applicant-Initiated Interview Summary received for U.S. Appl. No. 16/145,033, dated Nov. 24, 2020, 4 pages.
Applicant-Initiated Interview Summary received for U.S. Appl. No. 16/736,711, dated Oct. 16, 2020, 3 pages.
International Preliminary Report on Patentability received for PCT Patent Application No. PCT/US2019/024790, dated Nov. 19, 2020, 11 pages.
International Search Report and written Opinion received for PCT Patent Application No. PCT/US2020/028215, dated Aug. 10, 2020, 18 pages.
Invitation to Pay Additional Fees received for PCT Patent Application No. PCT/US2020/028215, dated Jun. 19, 2020, 11 pages.
Non-Final Office Action received for U.S. Appl. No. 16/736,711, dated Jun. 11, 2020, 10 pages.
Office Action received for Chinese Patent Application No. 201680049868.8, dated Oct. 20, 2020, 8 pages (4 pages of English Translation and 4 pages of Official).
Office Action received for Chinese Patent Application No. 201811136445.7, dated Oct. 28, 2020, 17 pages (10 pages of English Translation and 7 pages of Official).
Applicant-Initiated Interview Summary received for U.S. Appl. No. 16/145,033, dated Apr. 30, 2021, 4 pages.
Notice of Allowance received for Korean Patent Application No. 10-2021-7001726, dated Apr. 16, 2021, 4 pages (1 page of English Translation and 3 pages of Official).
Office Action received for Chinese Patent Application No. 201811136445.7, dated Apr. 14, 2021, 7 pages (4 pages of English Translation and 3 pages of Official).
Advisory Action received for U.S. Appl. No. 14/846,574, dated Jul. 31, 2020, 8 pages.
Applicant-Initiated Interview Summary received for U.S. Appl. No. 14/846,574, dated Jul. 21, 2020, 7 pages.
Office Action received for European Patent Application No. 19724963.4, dated Jul. 28, 2020, 6 pages.
Applicant-Initiated Interview Summary received for U.S. Appl. No. 16/572,314, dated Aug. 11, 2021, 4 pages.
Brief Communication Regarding Oral Proceedings received for European Patent Application No. 19724963.4, dated Jun. 22, 2021, 2 pages.
Corrected Notice of Allowance received for U.S. Appl. No. 16/736,711, dated Jun. 17, 2021, 6 pages.
Corrected Notice of Allowance received for U.S. Appl. No. 16/736,711, dated May 17, 2021, 6 pages.
Corrected Notice of Allowance received for U.S. Appl. No. 16/782,380, dated Jul. 16, 2021, 6 pages.
Final Office Action received for U.S. Appl. No. 16/145,033, dated Jul. 6, 2021, 113 pages.
Final Office Action received for U.S. Appl. No. 16/572,314, dated Aug. 31, 2021, 14 pages.
Notice of Allowance received for Chinese Patent Application No. 201811136445.7, dated Aug. 11, 2021, 2 pages (1 page of English Translation and 1 page of Official Copy).
Notice of Allowance received for Japanese Patent Application No. 2020-197242, dated May 24, 2021, 4 pages (1 page of English Translation and 3 pages of Official Copy).
Notice of Allowance received for U.S. Appl. No. 16/245,140, dated Jul. 30, 2021, 8 pages.
Notice of Allowance received for U.S. Appl. No. 16/245,140, dated May 18, 2021, 14 pages.
Notice of Allowance received for U.S. Appl. No. 16/601,064, dated May 17, 2021, 9 pages.
Notice of Allowance received for U.S. Appl. No. 16/736,711, dated Jun. 8, 2021, 8 pages.
Notice of Allowance received for U.S. Appl. No. 16/782,380, dated Jul. 1, 2021, 10 pages.
Office Action received for Australian Patent Application No. 2019266054, dated Aug. 23, 2021, 4 pages.
Office Action received for Australian Patent Application No. 2019266054, dated Jun. 29, 2021, 3 pages.
Office Action received for Korean Patent Application No. 10-2021-0024638, dated May 6, 2021, 9 pages (4 pages of English Translation and 5 pages of Official Copy).
Office Action received for Korean Patent Application No. 10-2021-7022553, dated Aug. 20, 2021, 10 pages (4 page of English Translation and 6 pages of Official Copy).
Result of Consultation received for European Patent Application No. 19724963.4, dated Jul. 8, 2021, 3 pages.
Result of Consultation received for European Patent Application No. 19724963.4, dated May 31, 2021, 3 pages.

* cited by examiner

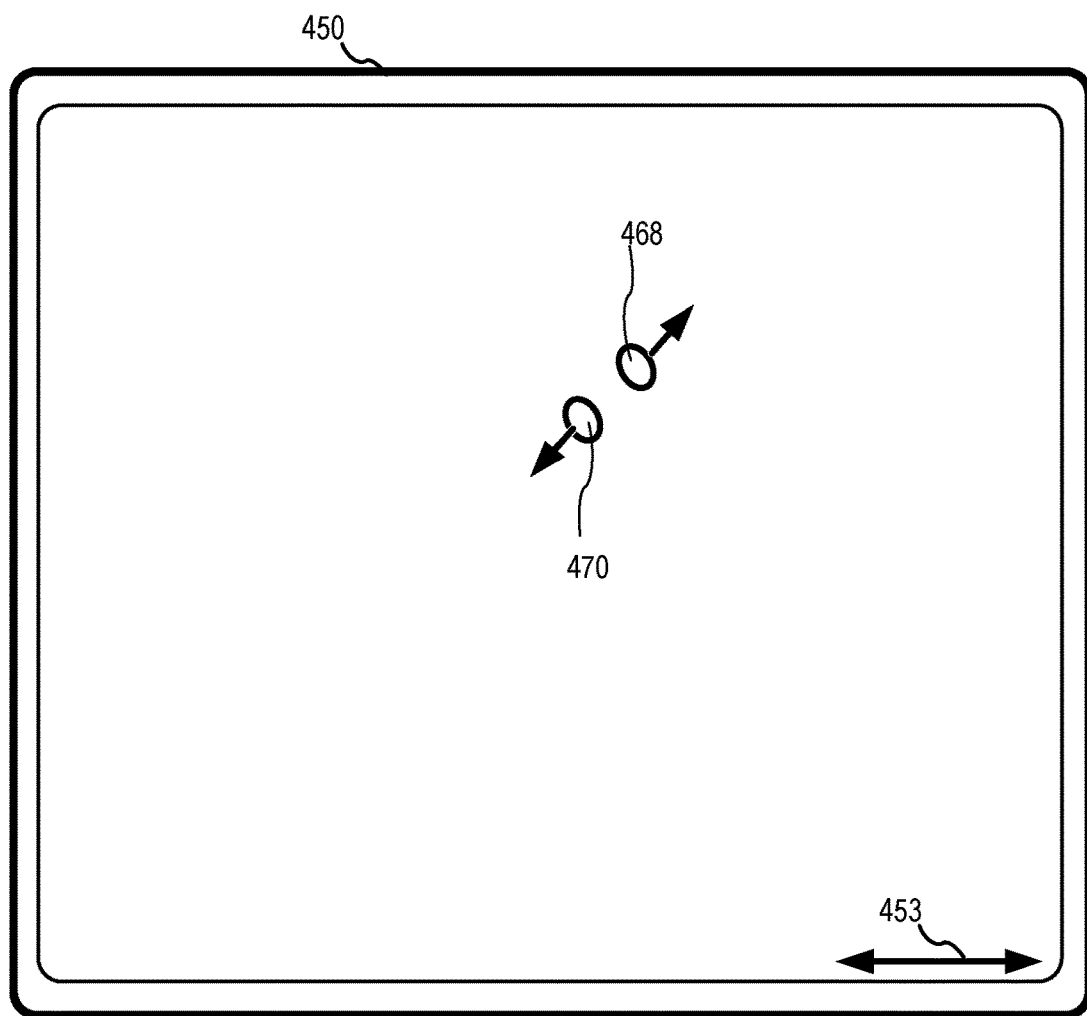
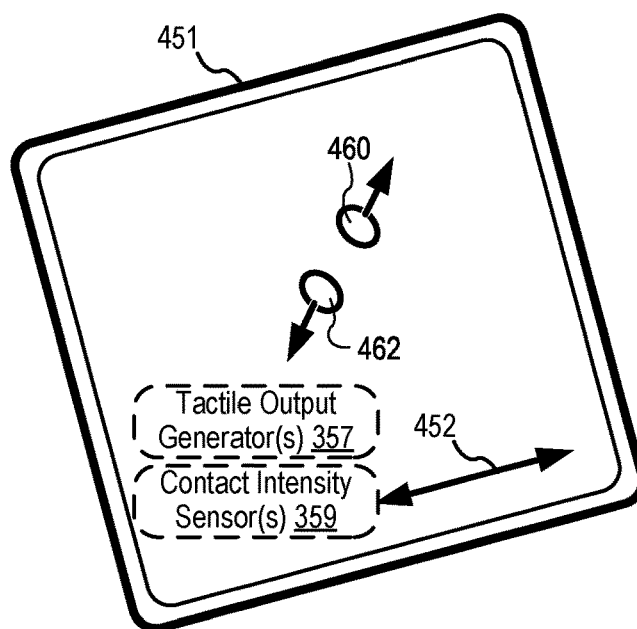
FIG. 4B

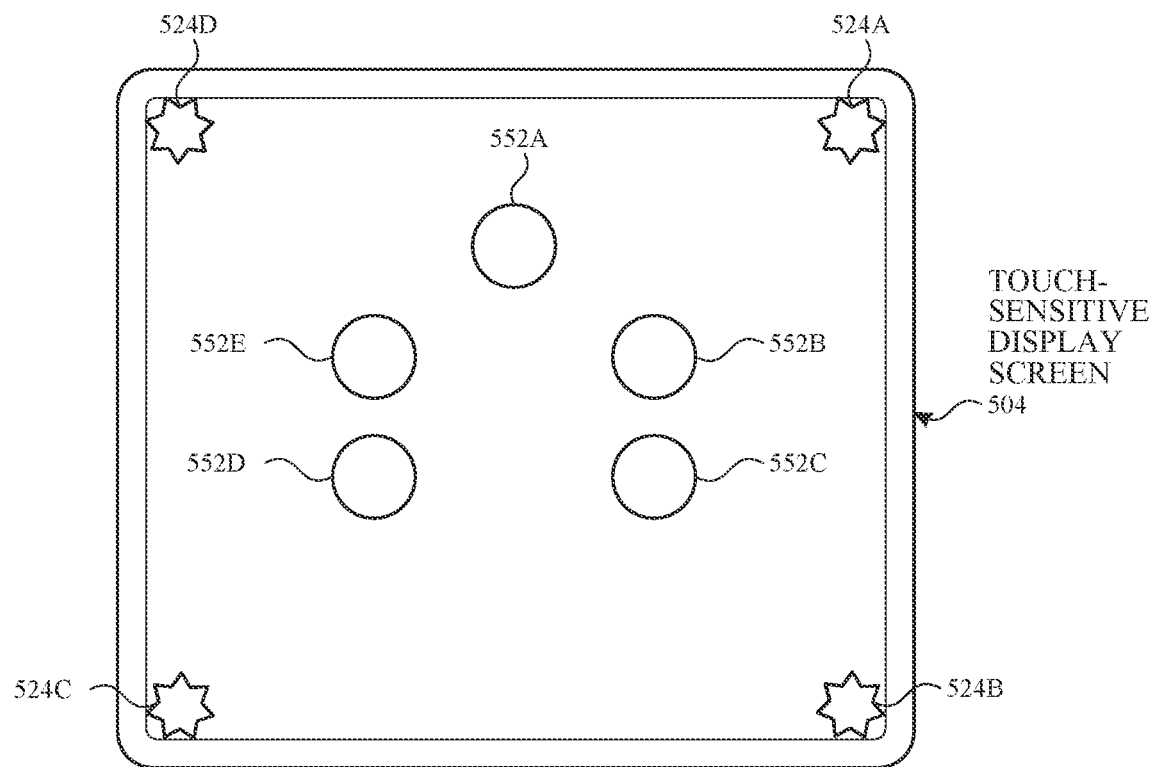
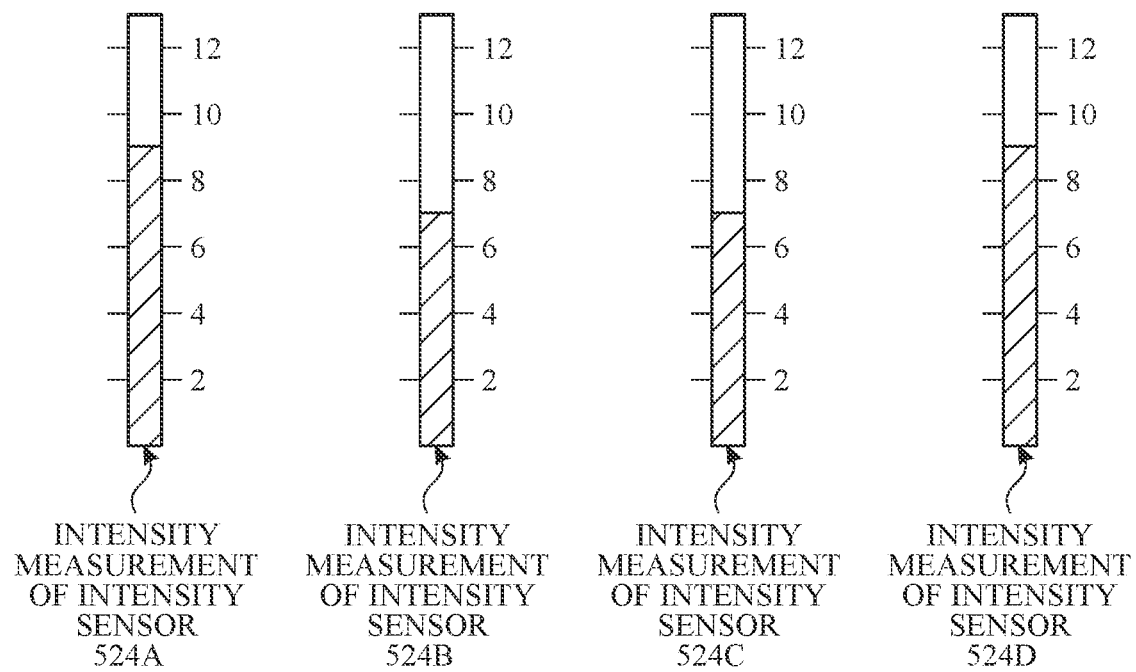
FIG. 5C

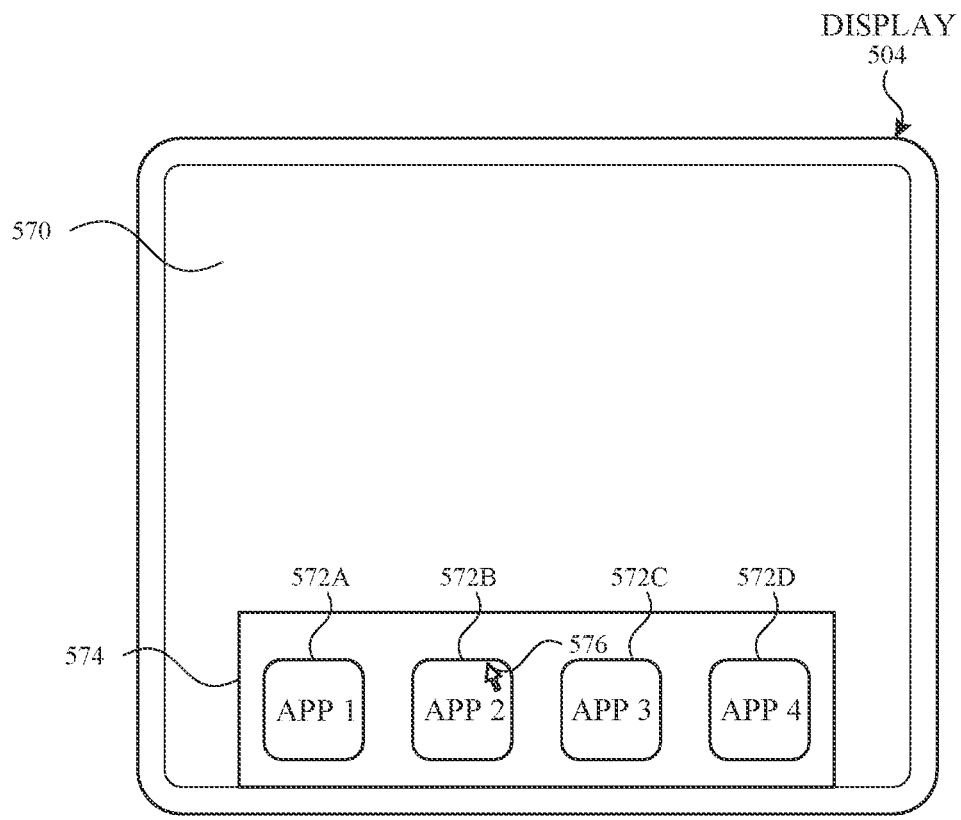
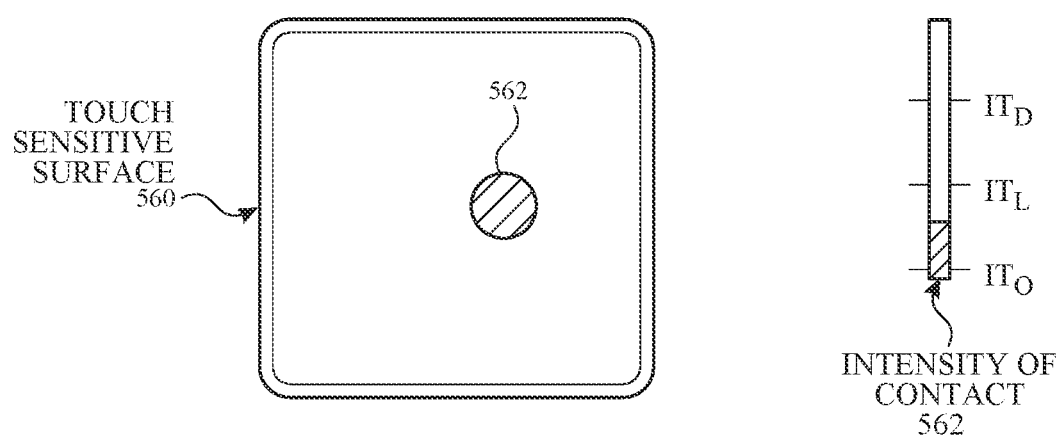
FIG. 5E

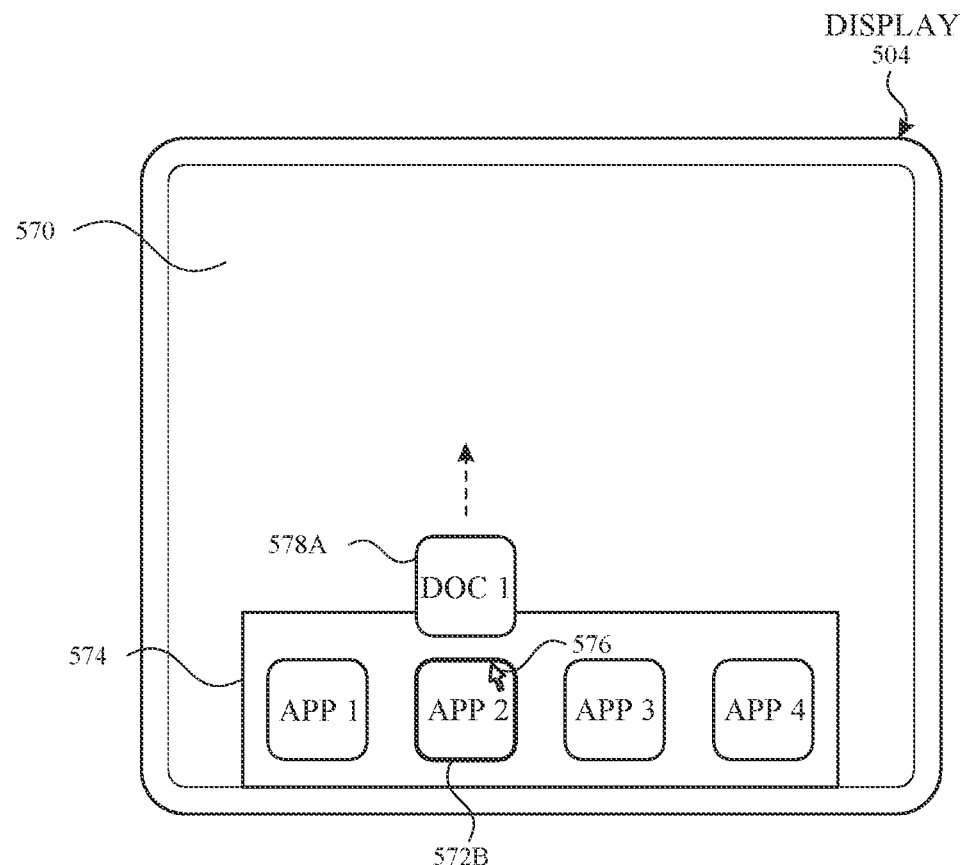
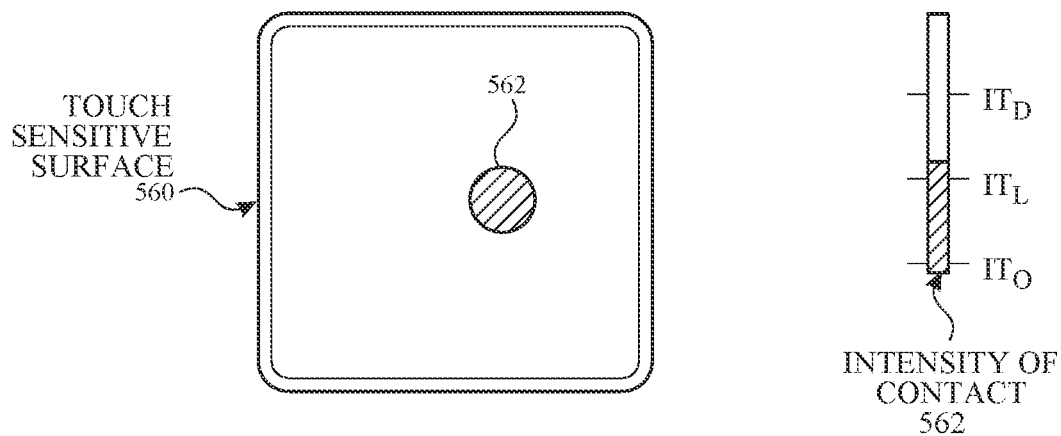
FIG. 5F

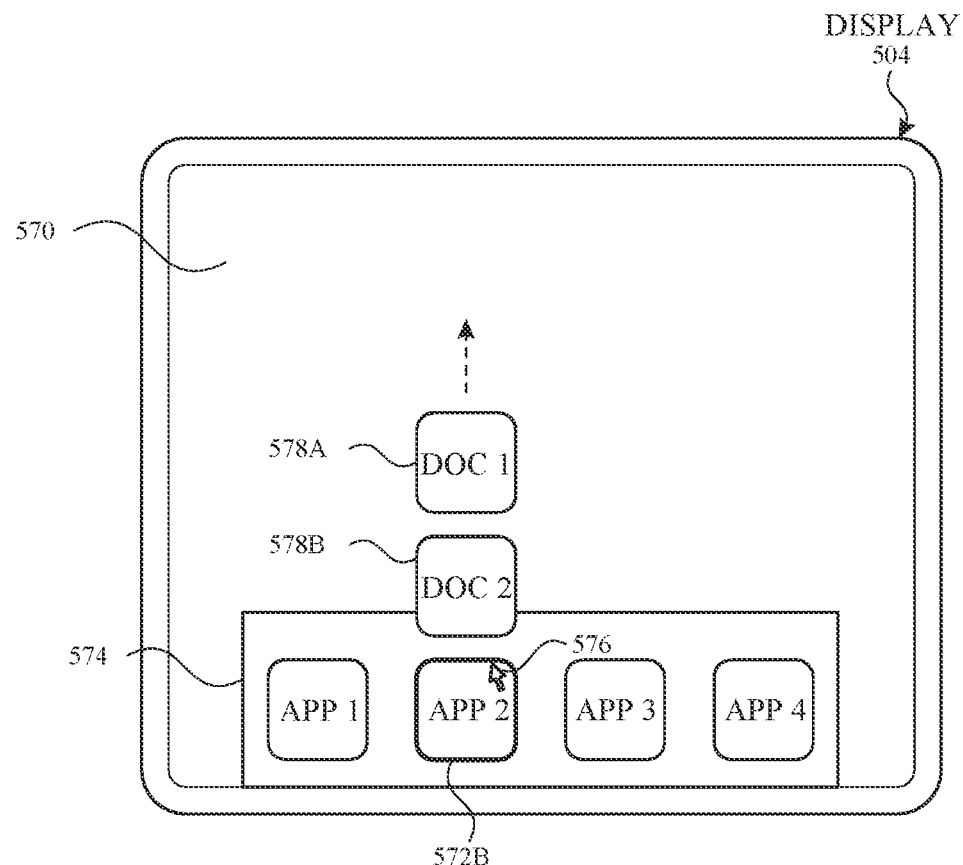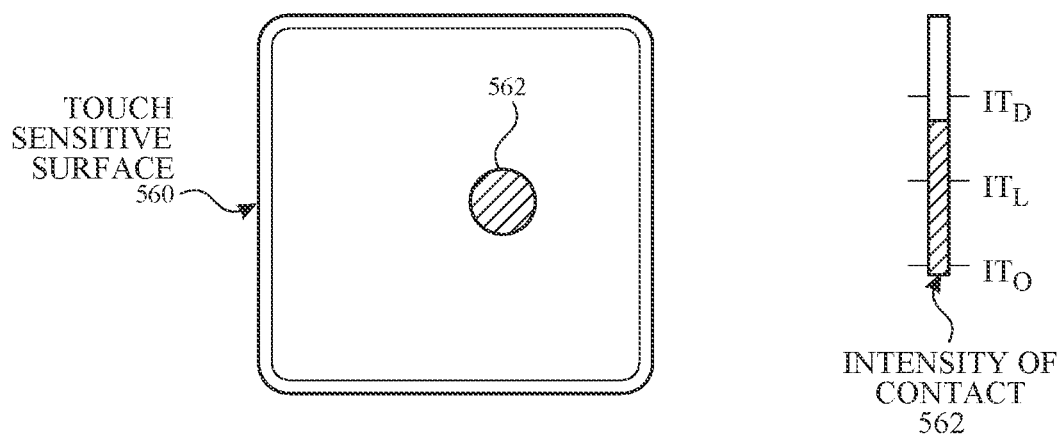
FIG. 5G

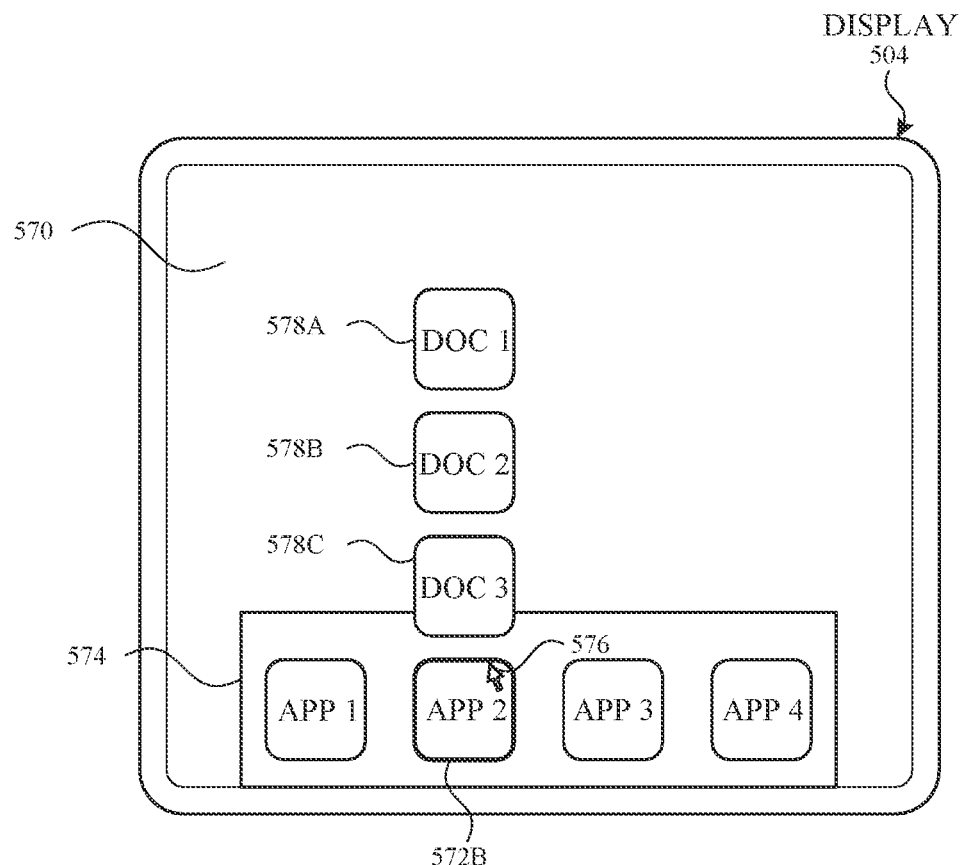
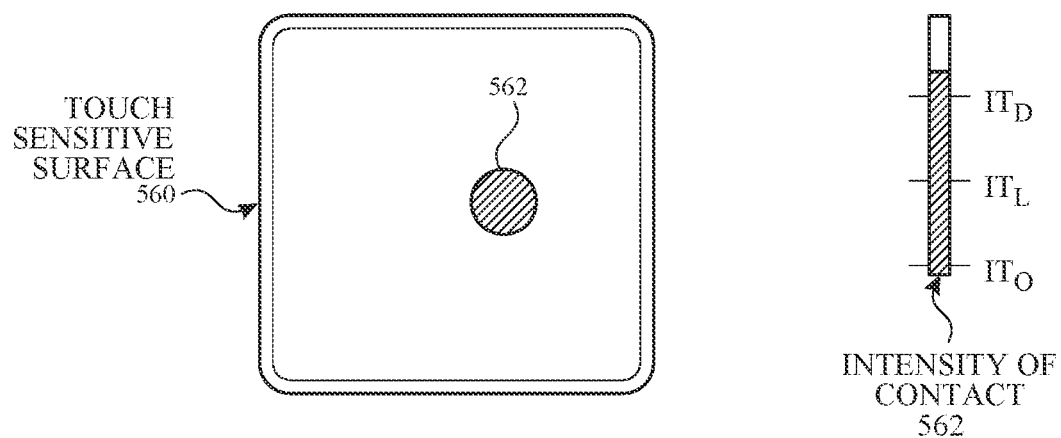
FIG. 5H

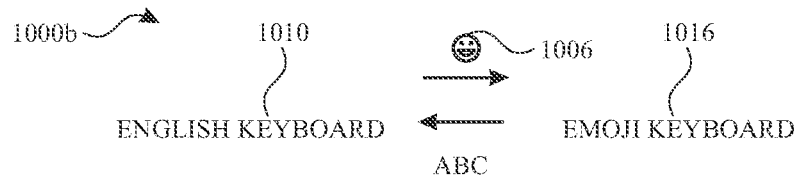
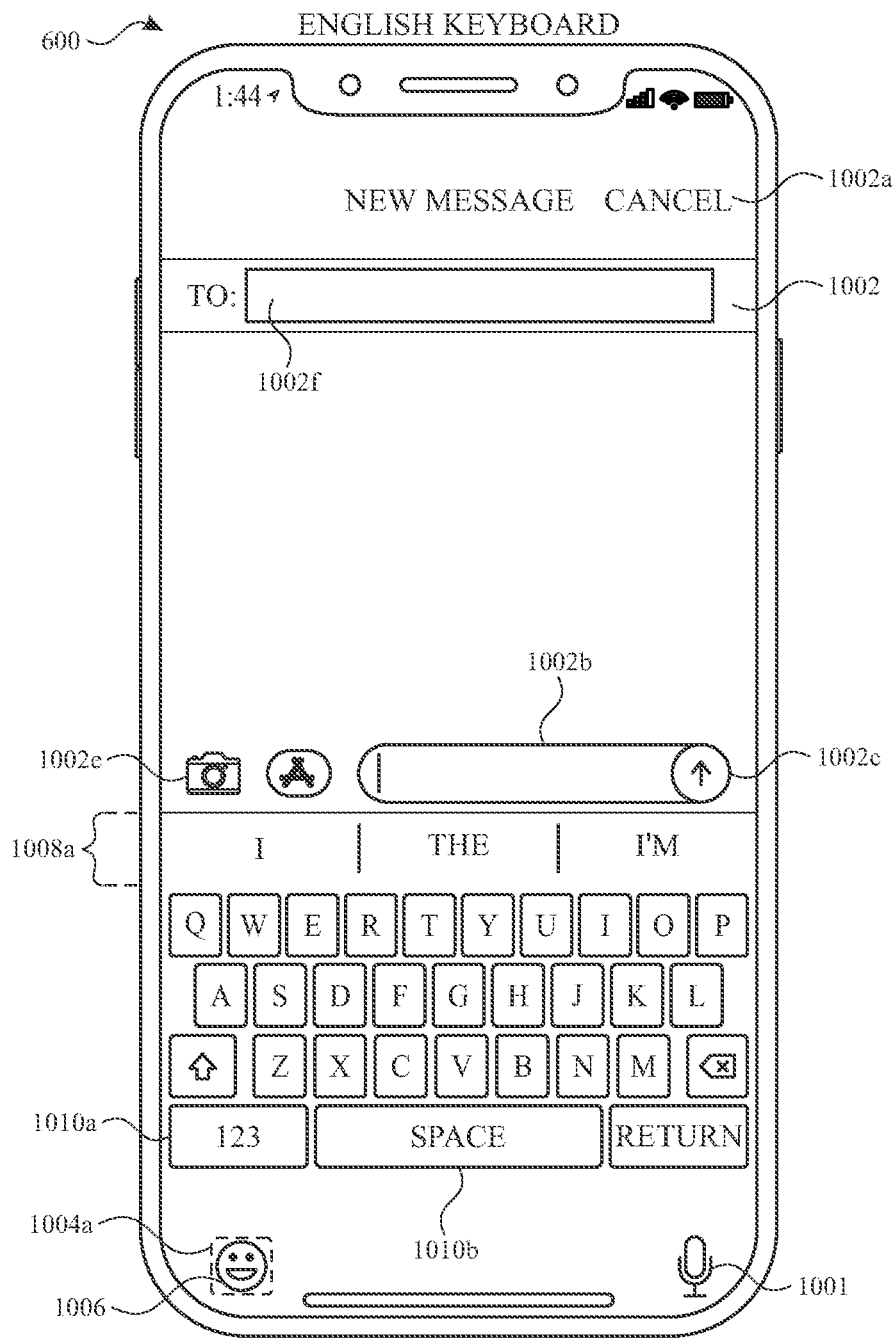
FIG. 10E

1100

1102
Receive a request to display a first keyboard from among a plurality of selected keyboards.

1104
In response to receiving the request to display the first keyboard:

1106
In accordance with a determination that a first set of keyboard configuration criteria are satisfied, the first set of keyboard configuration criteria including a first keyboard configuration criterion that is satisfied when the plurality of selected keyboards includes the first keyboard, a second keyboard of a first type, and a third keyboard:

(A)

1108
In accordance with a determination that a second set of keyboard configuration criteria are satisfied, the second set of keyboard configuration criteria including a second keyboard configuration criterion that is satisfied when the plurality of selected keyboards includes the first keyboard and the second keyboard of the first type without including other keyboards:

1110
Display, on the touchscreen display, the first keyboard using a first configuration, including:

1112
Display, at a first location on the touchscreen display, a first affordance which, when activated, causes display of the third keyboard.

1114
Display, at a second location on the touchscreen display, a second affordance which, when activated, causes display of the second keyboard.

*FIG. 11B*

1120
Display, on the touchscreen display, the first keyboard using a second configuration different from the first configuration, including:

1122
Display, at the first location on the touchscreen display, a third affordance, wherein the third affordance, when activated, causes display of the second keyboard, without displaying, at the second location, an affordance that, when activated, causes display of the second keyboard.

*FIG. 11C*

KEYBOARD MANAGEMENT USER INTERFACES

CROSS-REFERENCE TO RELATED APPLICATIONS

This application claims priority to U.S. Provisional Application No. 62/856,037, filed Jun. 1, 2019, and entitled "KEYBOARD MANAGEMENT USER INTERFACES," the entire contents of which are hereby incorporated by reference.

TECHNICAL FIELD

The present disclosure relates generally to computer user interfaces, and more specifically to techniques for managing keyboard input.

BACKGROUND

Users of smartphones and other personal electronic devices frequently provide displayed keyboards to receive user inputs. Such keyboards can be used, for example, to insert content into messages in a messaging application.

BRIEF SUMMARY

Some techniques for managing keyboard input using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing keyboard input. Such methods and interfaces optionally complement or replace other methods for managing keyboard input. Such methods and interfaces reduce the cognitive burden on a user and produce a more efficient human-machine interface. For battery-operated computing devices, such methods and interfaces conserve power and increase the time between battery charges.

In accordance with some embodiments, a method is described. In some embodiments, the method is performed at an electronic device with a touchscreen display. In some embodiments, the method comprises: concurrently displaying, on the touchscreen display: a text entry area, and a stroke input area at a first size; while displaying the stroke input area at the first size: detecting, using the touchscreen display, a first set of one or more strokes in the stroke input area; in response to detecting the first set of one or more strokes, displaying, in the text entry area on the touchscreen display, a first set of one or more characters determined based on the first set of one or more strokes; while displaying, on the touchscreen display, the first set of one or more characters, detecting a first drag gesture; in response to detecting the first drag gesture, resizing the stroke input area from the first size to a second size that is larger than the first size; while displaying the stroke input area at the second size: detecting, using the touchscreen display, a second set of one or more strokes in the stroke input area; and in response to detecting the second set of one or more strokes, displaying, in the text entry area on the touchscreen display, a second set of one or more characters determined based on the second set of one or more strokes.

In accordance with some embodiments, a non-transitory computer-readable storage medium is described. In some embodiments, the non-transitory computer-readable storage medium stores one or more programs configured to be executed by one or more processors of an electronic device with a touchscreen display, the one or more programs including instructions for: concurrently displaying, on the touchscreen display: a text entry area, and a stroke input area at a first size; while displaying the stroke input area at the first size: detecting, using the touchscreen display, a first set of one or more strokes in the stroke input area; in response to detecting the first set of one or more strokes, displaying, in the text entry area on the touchscreen display, a first set of one or more characters determined based on the first set of one or more strokes; while displaying, on the touchscreen display, the first set of one or more characters, detecting a first drag gesture; in response to detecting the first drag gesture, resizing the stroke input area from the first size to a second size that is larger than the first size; while displaying the stroke input area at the second size: detecting, using the touchscreen display, a second set of one or more strokes in the stroke input area; and in response to detecting the second set of one or more strokes, displaying, in the text entry area on the touchscreen display, a second set of one or more characters determined based on the second set of one or more strokes.

In accordance with some embodiments, a transitory computer-readable storage medium is described. In some embodiments, the transitory computer-readable storage medium stores one or more programs configured to be executed by one or more processors of an electronic device with a touchscreen display, the one or more programs including instructions for: concurrently displaying, on the touchscreen display: a text entry area, and a stroke input area at a first size; while displaying the stroke input area at the first size: detecting, using the touchscreen display, a first set of one or more strokes in the stroke input area; in response to detecting the first set of one or more strokes, displaying, in the text entry area on the touchscreen display, a first set of one or more characters determined based on the first set of one or more strokes; while displaying, on the touchscreen display, the first set of one or more characters, detecting a first drag gesture; in response to detecting the first drag gesture, resizing the stroke input area from the first size to a second size that is larger than the first size; while displaying the stroke input area at the second size: detecting, using the touchscreen display, a second set of one or more strokes in the stroke input area; and in response to detecting the second set of one or more strokes, displaying, in the text entry area on the touchscreen display, a second set of one or more characters determined based on the second set of one or more strokes.

In accordance with some embodiments, an electronic device is described. In some embodiments, the electronic device includes a touchscreen display; one or more processors; and memory storing one or more programs configured to be executed by the one or more processors, the one or more programs including instructions for: concurrently displaying, on the touchscreen display: a text entry area, and a stroke input area at a first size; while displaying the stroke input area at the first size: detecting, using the touchscreen display, a first set of one or more strokes in the stroke input area; in response to detecting the first set of one or more strokes, displaying, in the text entry area on the touchscreen display, a first set of one or more characters determined based on the first set of one or more strokes; while displaying, on the touchscreen display, the first set of one or more characters, detecting a first drag gesture; in response to detecting the first drag gesture, resizing the stroke input area from the first size to a second size that is larger than the first size; while displaying the stroke input area at the second size: detecting, using the touchscreen display, a second set of one or more strokes in the stroke input area; and in response to detecting the second set of one or more strokes, displaying, in the text entry area on the touchscreen display, a second set of one or more characters determined based on the second set of one or more strokes.

In accordance with some embodiments, an electronic device is described. In some embodiments, the electronic device includes: a display device; means for concurrently displaying, on the touchscreen display: a text entry area, and a stroke input area at a first size; means, while displaying the stroke input area at the first size, for: detecting, using the touchscreen display, a first set of one or more strokes in the stroke input area; means, responsive to detecting the first set of one or more strokes, displaying, in the text entry area on the touchscreen display, for a first set of one or more characters determined based on the first set of one or more strokes; means, while displaying, on the touchscreen display, the first set of one or more characters, for detecting a first drag gesture; means, responsive to detecting the first drag gesture, for resizing the stroke input area from the first size to a second size that is larger than the first size; means, while displaying the stroke input area at the second size, for: detecting, using the touchscreen display, a second set of one or more strokes in the stroke input area; and means, responsive to detecting the second set of one or more strokes, for displaying, in the text entry area on the touchscreen display, a second set of one or more characters determined based on the second set of one or more strokes.

In accordance with some embodiments, a method is described. In some embodiments, the method is performed at an electronic device with a display device and a touch-sensitive surface. In some embodiments, the method comprises: concurrently displaying, on the display device: a text entry area, a candidate bar that includes a first candidate and a second candidate, the first candidate and the second candidate displayed in a first row, and a keyboard that includes a plurality of keys; while displaying the candidate bar, detecting, on the touch-sensitive surface, a first user input; and in response to detecting the first user input: continuing to display, on the display device, the first candidate in the first row of the candidate bar; and replacing display, on the display device, of at least a portion of the keyboard with display of a third candidate in a second row of the candidate bar, where the third candidate is different from the first candidate and the second candidate.

In accordance with some embodiments, a non-transitory computer-readable storage medium is described. In some embodiments, the non-transitory computer-readable storage medium stores one or more programs configured to be executed by one or more processors of an electronic device with a display device and a touch-sensitive surface, the one or more programs including instructions for: concurrently displaying, on the display device: a text entry area, a candidate bar that includes a first candidate and a second candidate, the first candidate and the second candidate displayed in a first row, and a keyboard that includes a plurality of keys; while displaying the candidate bar, detecting, on the touch-sensitive surface, a first user input; and in response to detecting the first user input: continuing to display, on the display device, the first candidate in the first row of the candidate bar; and replacing display, on the display device, of at least a portion of the keyboard with display of a third candidate in a second row of the candidate bar, where the third candidate is different from the first candidate and the second candidate.

In accordance with some embodiments, a transitory computer-readable storage medium is described. In some embodiments, the transitory computer-readable storage medium stores one or more programs configured to be executed by one or more processors of an electronic device with a display device and a touch-sensitive surface, the one or more programs including instructions for: concurrently displaying, on the display device: a text entry area, a candidate bar that includes a first candidate and a second candidate, the first candidate and the second candidate displayed in a first row, and a keyboard that includes a plurality of keys; while displaying the candidate bar, detecting, on the touch-sensitive surface, a first user input; and in response to detecting the first user input: continuing to display, on the display device, the first candidate in the first row of the candidate bar; and replacing display, on the display device, of at least a portion of the keyboard with display of a third candidate in a second row of the candidate bar, where the third candidate is different from the first candidate and the second candidate.

In accordance with some embodiments, an electronic device is described. In some embodiments, the electronic device includes a display device; a touch-sensitive surface; one or more processors; and memory storing one or more programs configured to be executed by the one or more processors, the one or more programs including instructions for: concurrently displaying, on the display device: a text entry area, a candidate bar that includes a first candidate and a second candidate, the first candidate and the second candidate displayed in a first row, and a keyboard that includes a plurality of keys; while displaying the candidate bar, detecting, on the touch-sensitive surface, a first user input; and in response to detecting the first user input: continuing to display, on the display device, the first candidate in the first row of the candidate bar; and replacing display, on the display device, of at least a portion of the keyboard with display of a third candidate in a second row of the candidate bar, where the third candidate is different from the first candidate and the second candidate.

In accordance with some embodiments, an electronic device is described. In some embodiments, the electronic device includes: a display device; a touch-sensitive surface; means for concurrently displaying, on the display device: a text entry area, a candidate bar that includes a first candidate and a second candidate, the first candidate and the second candidate displayed in a first row, and a keyboard that includes a plurality of keys; means, while displaying the candidate bar, for detecting, on the touch-sensitive surface, a first user input; and means, responsive to detecting the first user input, for: continuing to display, on the display device, the first candidate in the first row of the candidate bar; and replacing display, on the display device, of at least a portion of the keyboard with display of a third candidate in a second row of the candidate bar, where the third candidate is different from the first candidate and the second candidate.

In accordance with some embodiments, a method is described. In some embodiments, the method is performed at an electronic device with a touchscreen display. In some embodiments, the method comprises: receiving a request to display a first keyboard from among a plurality of selected keyboards; and in response to receiving the request to display the first keyboard: in accordance with a determination that a first set of keyboard configuration criteria are satisfied, the first set of keyboard configuration criteria including a first keyboard configuration criterion that is satisfied when the plurality of selected keyboards includes the first keyboard, a second keyboard of a first type, and a third keyboard: displaying, on the touchscreen display, the first keyboard using a first configuration, including: displaying, at a first location on the touchscreen display, a first affordance which, when activated, causes display of the third keyboard; and displaying, at a second location on the touchscreen display, a second affordance which, when activated, causes display of the second keyboard; and in accordance with a determination that a second set of keyboard configuration criteria are satisfied, the second set of keyboard configuration criteria including a second keyboard configuration criterion that is satisfied when the plurality of selected keyboards includes the first keyboard and the second keyboard of the first type without including other keyboards: displaying, on the touchscreen display, the first keyboard using a second configuration different from the first configuration, including: displaying, at the first location on the touchscreen display, a third affordance, where the third affordance, when activated, causes display of the second keyboard, without displaying, at the second location, an affordance that, when activated, causes display of the second keyboard.

In accordance with some embodiments, a non-transitory computer-readable storage medium is described. In some embodiments, the non-transitory computer-readable storage medium stores one or more programs configured to be executed by one or more processors of an electronic device with a touchscreen display, the one or more programs including instructions for: receiving a request to display a first keyboard from among a plurality of selected keyboards; and in response to receiving the request to display the first keyboard: in accordance with a determination that a first set of keyboard configuration criteria are satisfied, the first set of keyboard configuration criteria including a first keyboard configuration criterion that is satisfied when the plurality of selected keyboards includes the first keyboard, a second keyboard of a first type, and a third keyboard: displaying, on the touchscreen display, the first keyboard using a first configuration, including: displaying, at a first location on the touchscreen display, a first affordance which, when activated, causes display of the third keyboard; and displaying, at a second location on the touchscreen display, a second affordance which, when activated, causes display of the second keyboard; and in accordance with a determination that a second set of keyboard configuration criteria are satisfied, the second set of keyboard configuration criteria including a second keyboard configuration criterion that is satisfied when the plurality of selected keyboards includes the first keyboard and the second keyboard of the first type without including other keyboards: displaying, on the touchscreen display, the first keyboard using a second configuration different from the first configuration, including: displaying, at the first location on the touchscreen display, a third affordance, where the third affordance, when activated, causes display of the second keyboard, without displaying, at the second location, an affordance that, when activated, causes display of the second keyboard.

In accordance with some embodiments, a transitory computer-readable storage medium is described. In some embodiments, the transitory computer-readable storage medium stores one or more programs configured to be executed by one or more processors of an electronic device with a touchscreen display, the one or more programs including instructions for: receiving a request to display a first keyboard from among a plurality of selected keyboards; and in response to receiving the request to display the first keyboard: in accordance with a determination that a first set of keyboard configuration criteria are satisfied, the first set of keyboard configuration criteria including a first keyboard configuration criterion that is satisfied when the plurality of selected keyboards includes the first keyboard, a second keyboard of a first type, and a third keyboard: displaying, on the touchscreen display, the first keyboard using a first configuration, including: displaying, at a first location on the touchscreen display, a first affordance which, when activated, causes display of the third keyboard; and displaying, at a second location on the touchscreen display, a second affordance which, when activated, causes display of the second keyboard; and in accordance with a determination that a second set of keyboard configuration criteria are satisfied, the second set of keyboard configuration criteria including a second keyboard configuration criterion that is satisfied when the plurality of selected keyboards includes the first keyboard and the second keyboard of the first type without including other keyboards: displaying, on the touchscreen display, the first keyboard using a second configuration different from the first configuration, including: displaying, at the first location on the touchscreen display, a third affordance, where the third affordance, when activated, causes display of the second keyboard, without displaying, at the second location, an affordance that, when activated, causes display of the second keyboard.

In accordance with some embodiments, an electronic device is described. In some embodiments, the electronic device includes a touchscreen display; one or more processors; and memory storing one or more programs configured to be executed by the one or more processors, the one or more programs including instructions for: receiving a request to display a first keyboard from among a plurality of selected keyboards; and in response to receiving the request to display the first keyboard: in accordance with a determination that a first set of keyboard configuration criteria are satisfied, the first set of keyboard configuration criteria including a first keyboard configuration criterion that is satisfied when the plurality of selected keyboards includes the first keyboard, a second keyboard of a first type, and a third keyboard: displaying, on the touchscreen display, the first keyboard using a first configuration, including: displaying, at a first location on the touchscreen display, a first affordance which, when activated, causes display of the third keyboard; and displaying, at a second location on the touchscreen display, a second affordance which, when activated, causes display of the second keyboard; and in accordance with a determination that a second set of keyboard configuration criteria are satisfied, the second set of keyboard configuration criteria including a second keyboard configuration criterion that is satisfied when the plurality of selected keyboards includes the first keyboard and the second keyboard of the first type without including other keyboards: displaying, on the touchscreen display, the first keyboard using a second configuration different from the first configuration, including: displaying, at the first location on the touchscreen display, a third affordance, where the third affordance, when activated, causes display of the second keyboard, without displaying, at the second location, an affordance that, when activated, causes display of the second keyboard.

In accordance with some embodiments, an electronic device is described. In some embodiments, the electronic device includes: a display device; means for receiving a request to display a first keyboard from among a plurality of selected keyboards; and means, responsive to receiving the request to display the first keyboard, for: in accordance with a determination that a first set of keyboard configuration criteria are satisfied, the first set of keyboard configuration criteria including a first keyboard configuration criterion that is satisfied when the plurality of selected keyboards includes the first keyboard, a second keyboard of a first type, and a third keyboard: displaying, on the touchscreen display, the first keyboard using a first configuration, including: displaying, at a first location on the touchscreen display, a first affordance which, when activated, causes display of the third keyboard; and displaying, at a second location on the touchscreen display, a second affordance which, when activated, causes display of the second keyboard; and in accordance with a determination that a second set of keyboard configuration criteria are satisfied, the second set of keyboard configuration criteria including a second keyboard configuration criterion that is satisfied when the plurality of selected keyboards includes the first keyboard and the second keyboard of the first type without including other keyboards: displaying, on the touchscreen display, the first keyboard using a second configuration different from the first configuration, including: displaying, at the first location on the touchscreen display, a third affordance, where the third affordance, when activated, causes display of the second keyboard, without displaying, at the second location, an affordance that, when activated, causes display of the second keyboard.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing keyboards and keyboard input, thereby increasing the effectiveness, efficiency, and user satisfaction with such devices. Such methods and interfaces may complement or replace other methods for managing keyboard input.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 10A-10J illustrate exemplary devices and user interfaces for accessing keyboards, in accordance with some embodiments.

FIGS. 11A-11C are a flow diagram illustrating a method for accessing keyboards, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing keyboard input. For examples, users of electronic devices would benefit from handwriting input areas with variable size. For another examples, users of electronic devices would benefit from efficiently accessing predictive text when writing content. For yet another example, users of electronic devices would benefit from quickly accessing different types of keyboards (e.g., different language keyboards) when writing content. Such techniques can reduce the cognitive burden on a user who provides inputs at an electronic device, thereby enhancing productivity. Further, such techniques can reduce processor and battery power otherwise wasted on redundant user inputs.

Figure 8A:
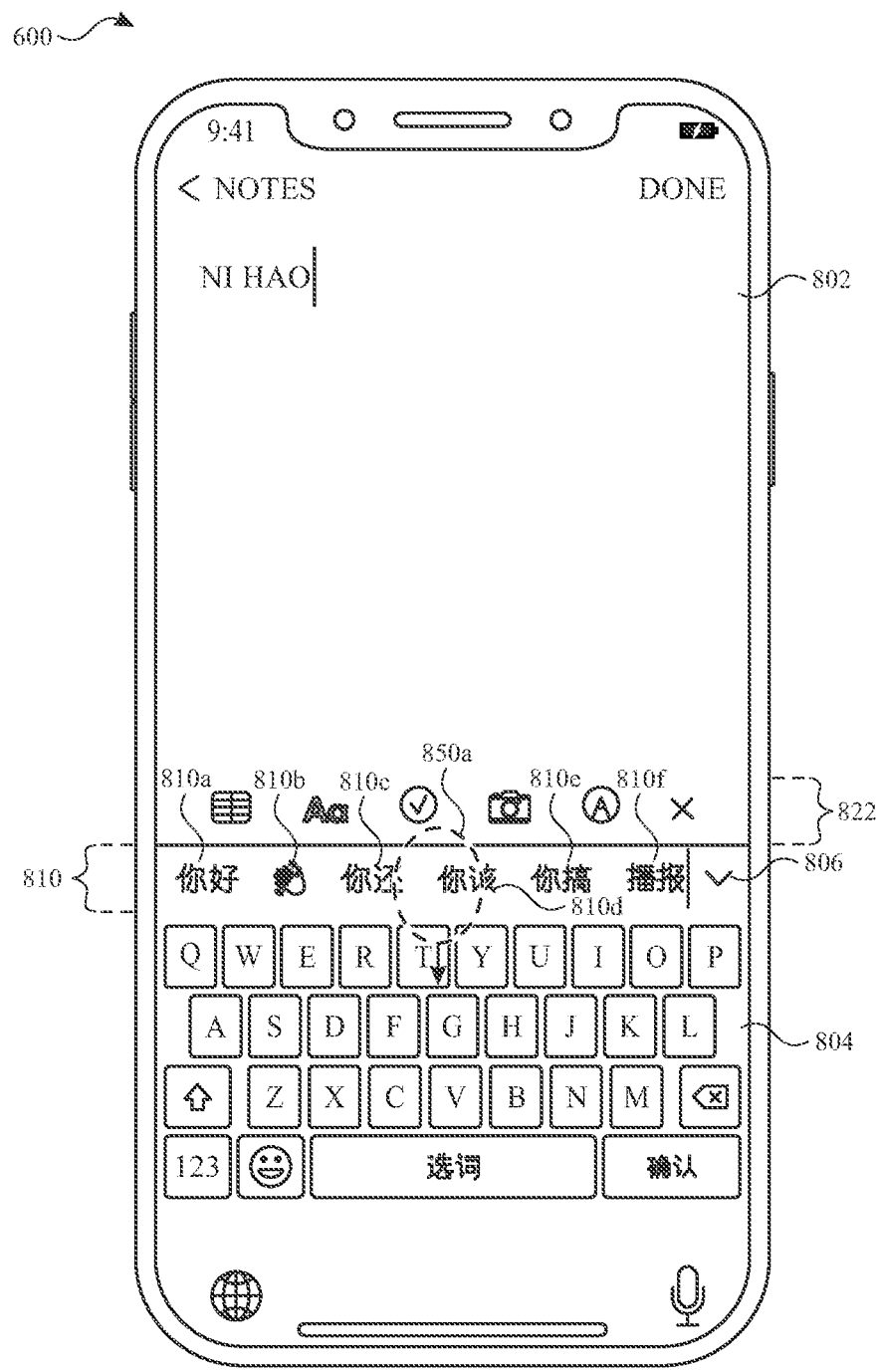
FIGS. 8A-8V illustrate exemplary devices and user interfaces for accessing predictive text candidates, in accordance with some embodiments.
Figure 8V:
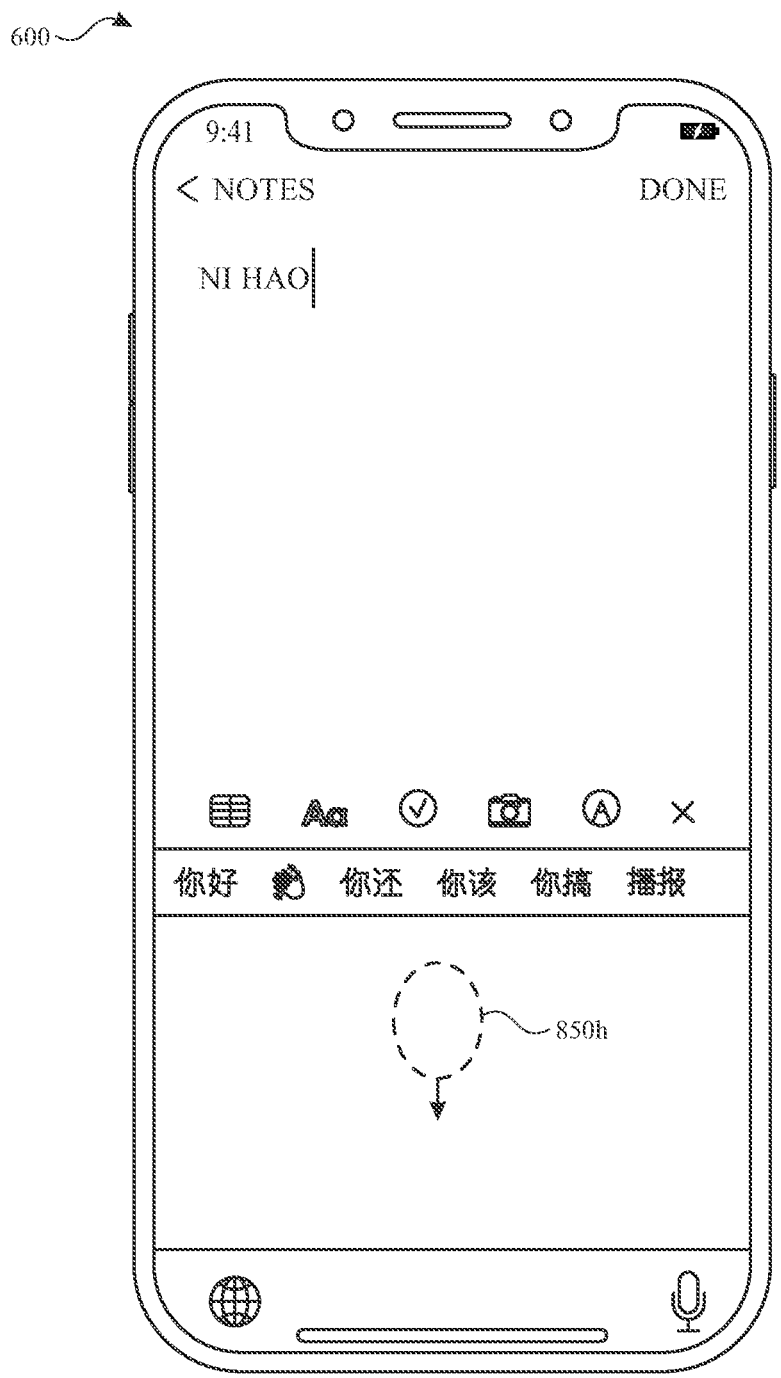
Figure 9A:
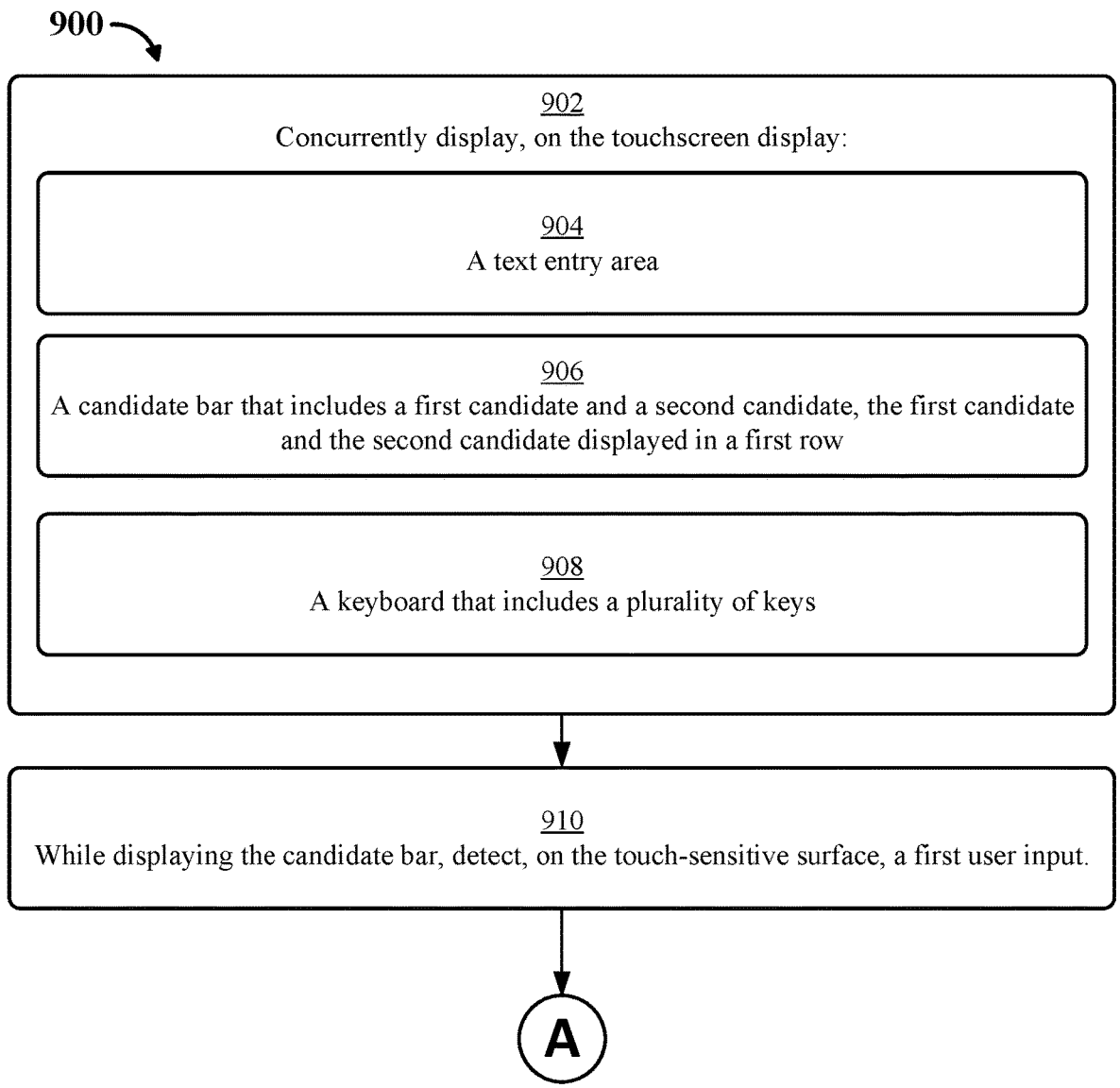
FIGS. 9A-9B are a flow diagram illustrating a method for accessing predictive text candidates, in accordance with some embodiments.
Figure 9B:
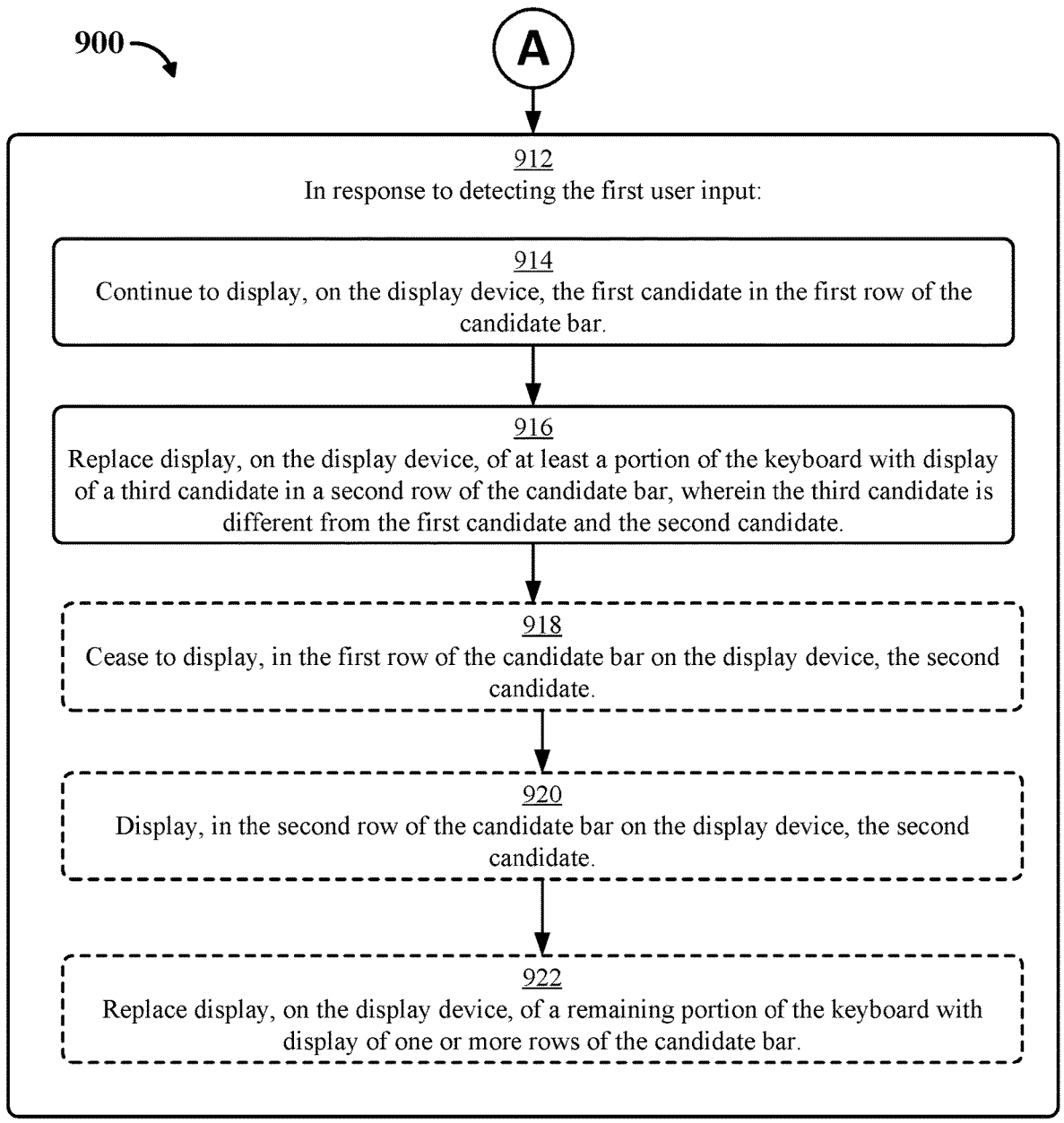

Below, FIGS. 1A-1B, 2, 3, 4A-4B, and 5A-5H provide a description of exemplary devices for performing the techniques for managing keyboard input. FIGS. 6A-6S illustrate exemplary devices and user interfaces for receiving handwriting input, in accordance with some embodiments. FIGS. 7A-7D are a flow diagram illustrating a method for receiving handwriting input, in accordance with some embodiments. The user interfaces in FIGS. 6A-6S are used to illustrate the processes described below, including the processes in FIGS. 7A-7D. FIGS. 8A-8V illustrate exemplary devices and user interfaces for accessing predictive text candidates, in accordance with some embodiments. FIGS. 9A-9B are a flow diagram illustrating a method for accessing predictive text candidates, in accordance with some embodiments. The user interfaces in FIGS. 8A-8V are used to illustrate the processes described below, including the processes in FIGS. 9A-9B. FIGS. 10A-10J illustrate exemplary devices and user interfaces for accessing keyboards, in accordance with some embodiments. FIGS. 11A-11C are a flow diagram illustrating a method for accessing keyboards, in accordance with some embodiments. The user interfaces in FIGS. 10A-10J are used to illustrate the processes described below, including the processes in FIGS. 11A-11C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
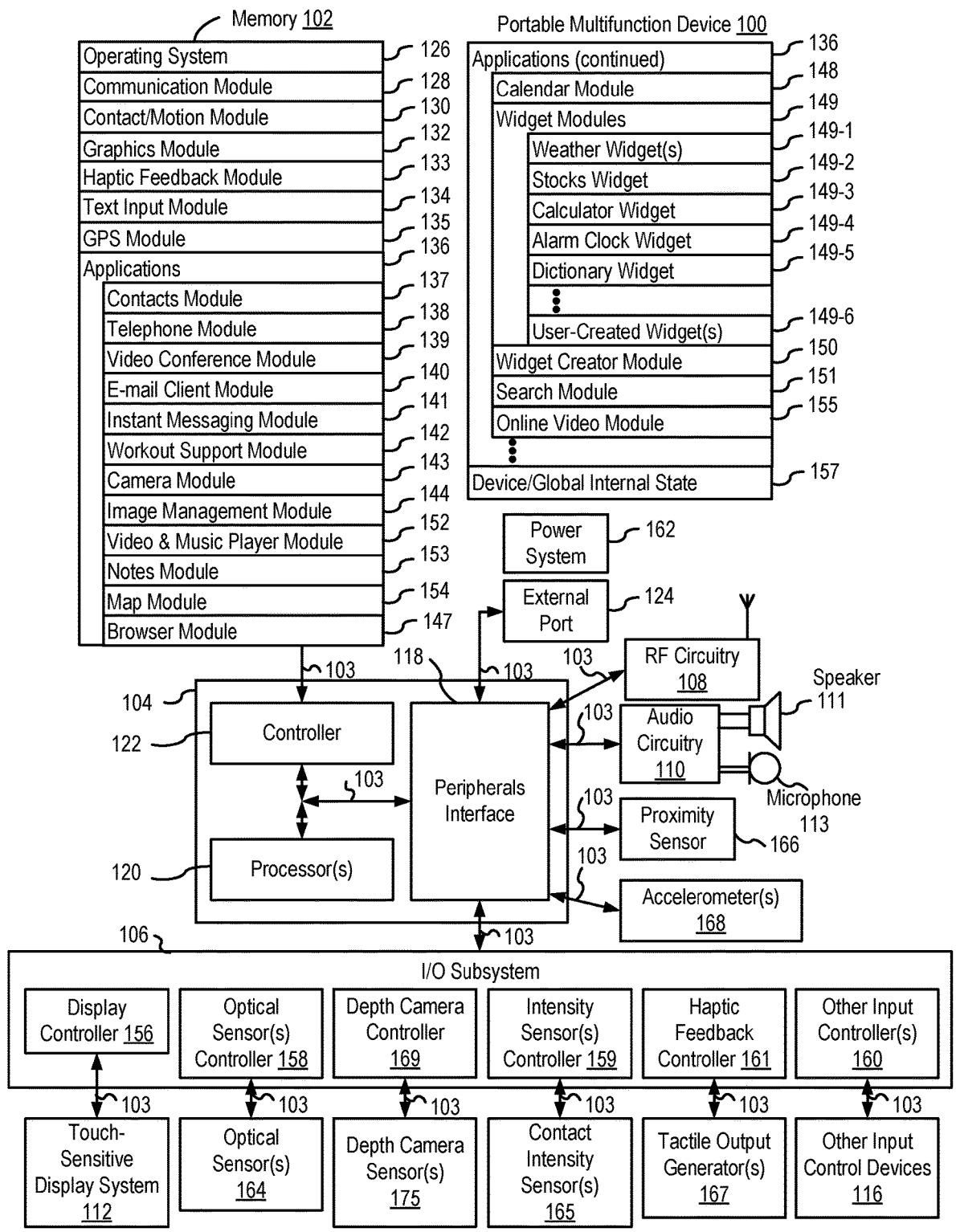
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
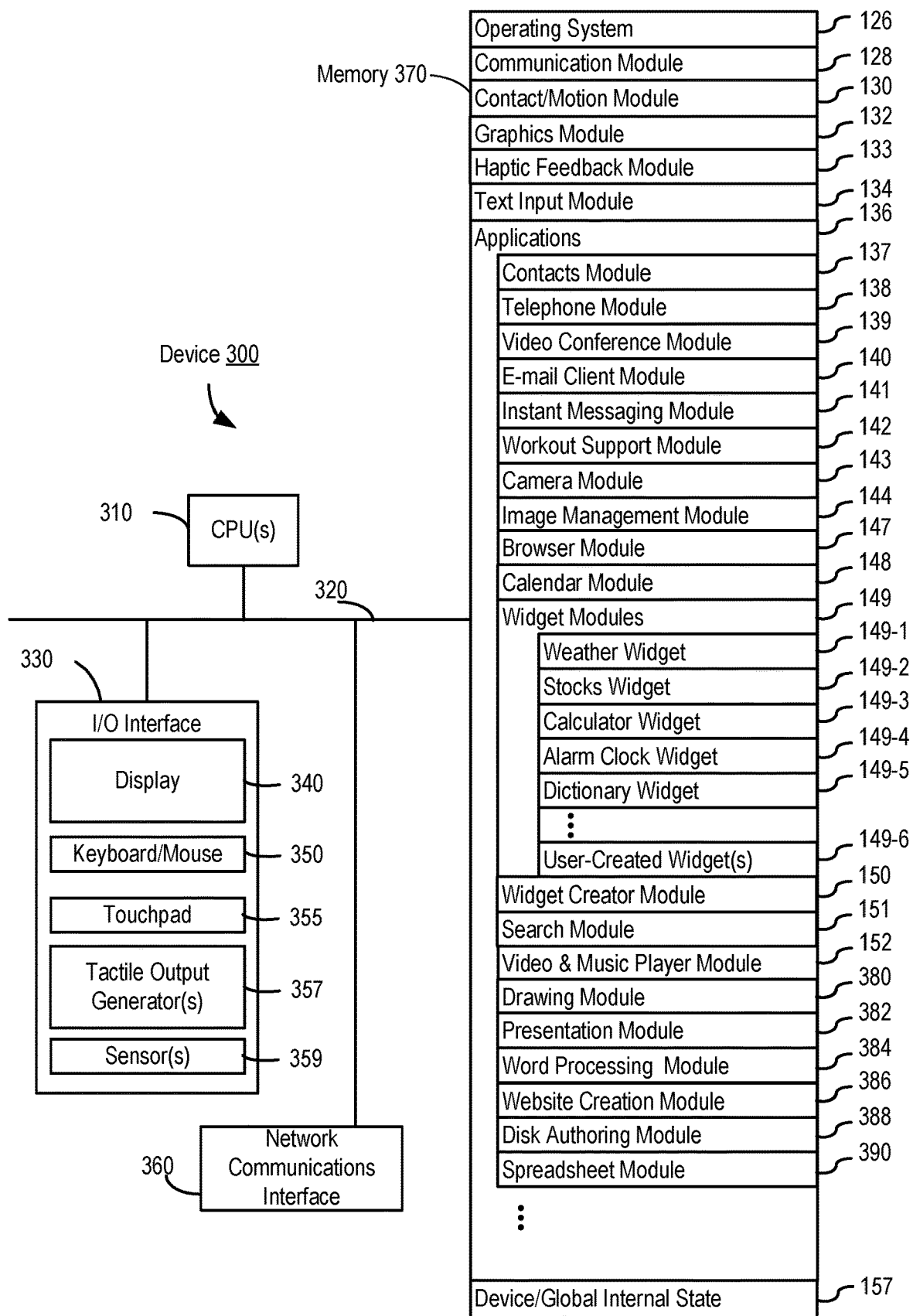
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
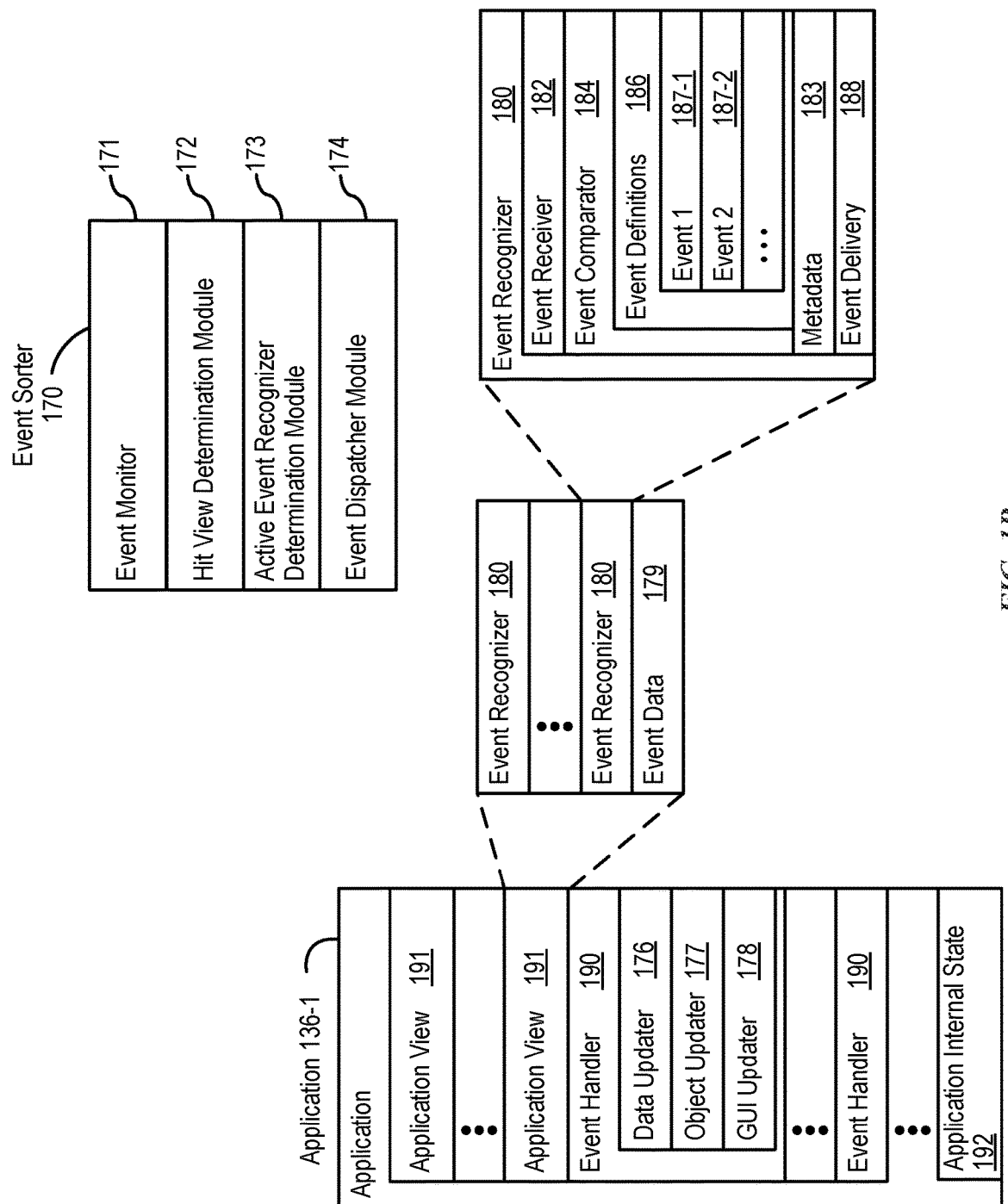
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
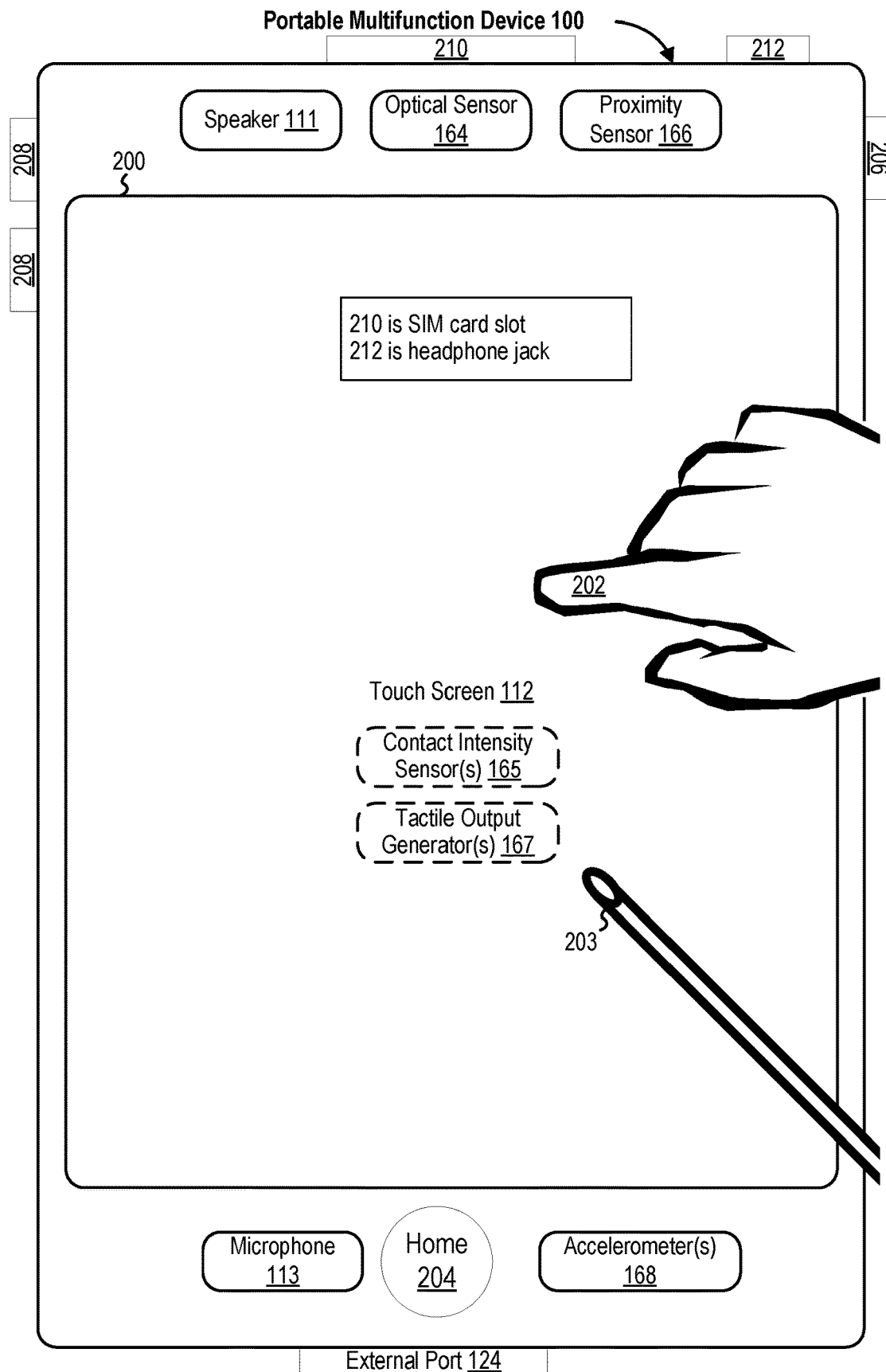
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
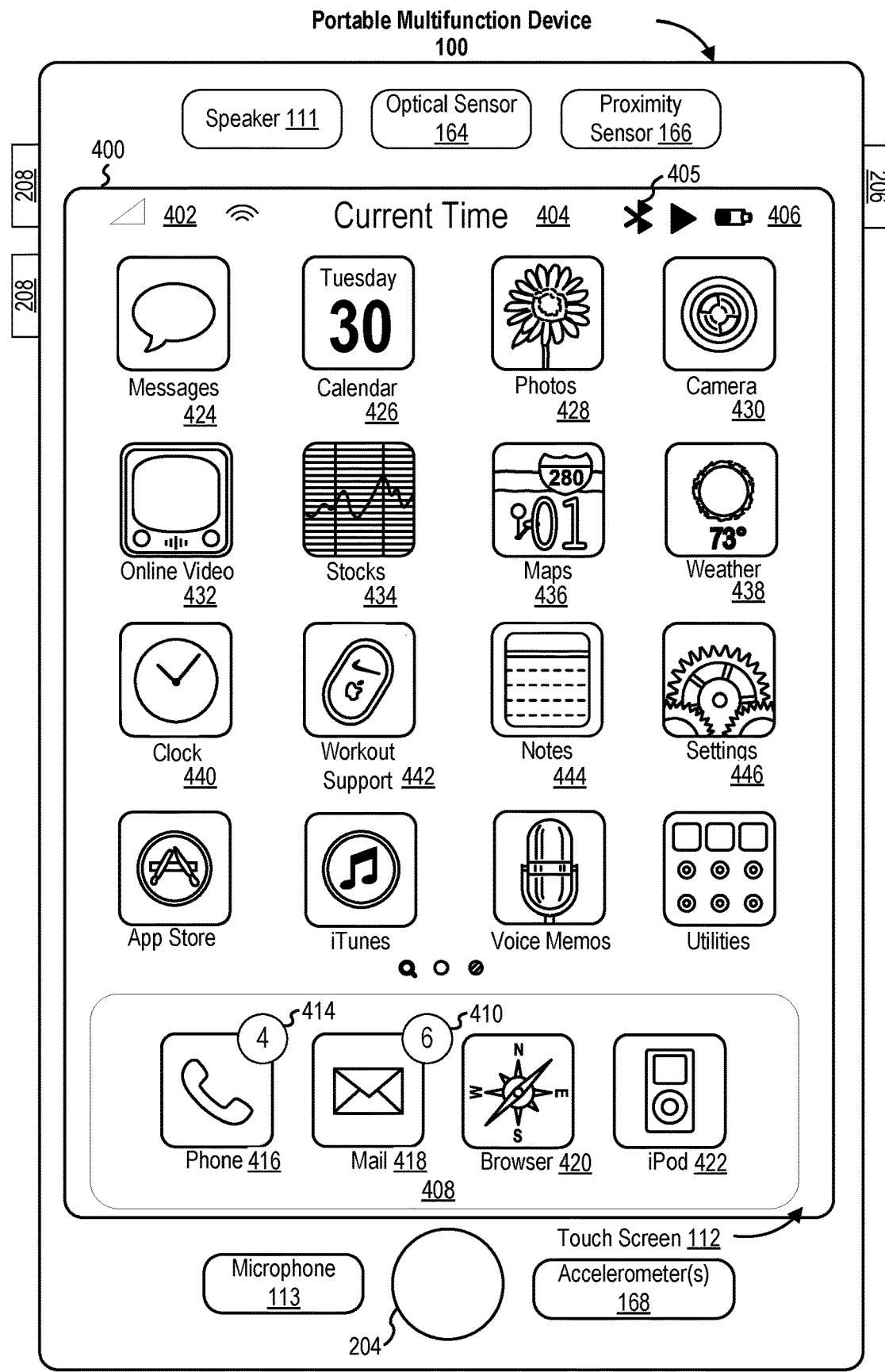
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
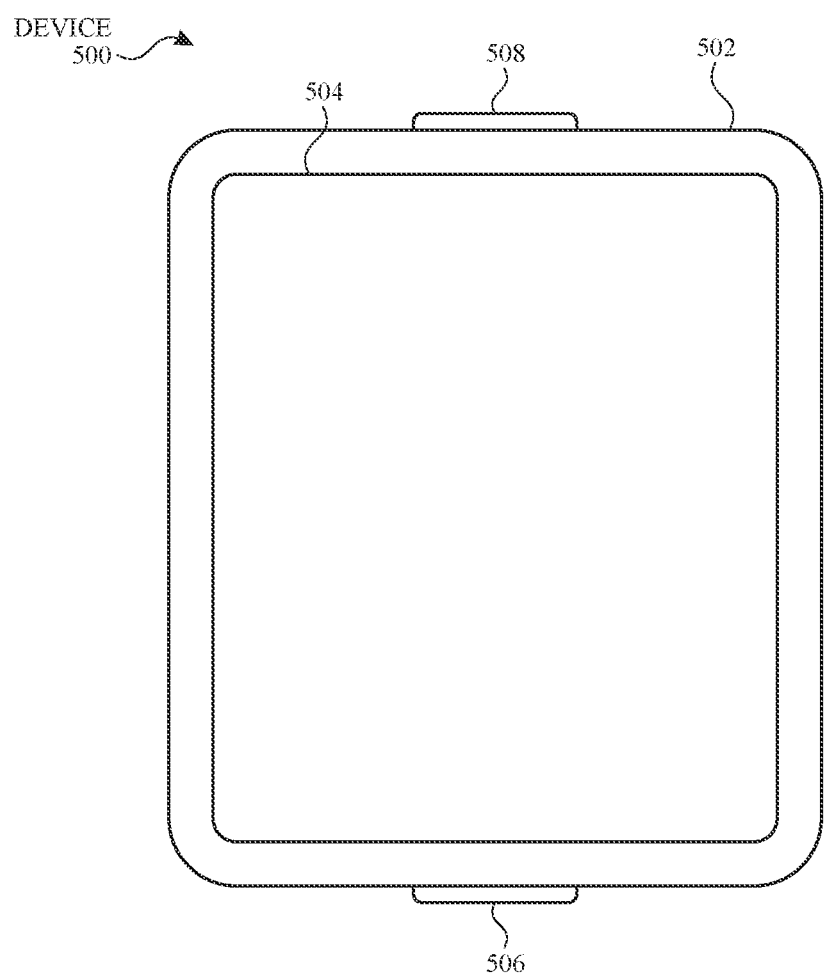
FIG. 5A illustrates a personal electronic device in accordance with some embodiments.
Figure 6A:
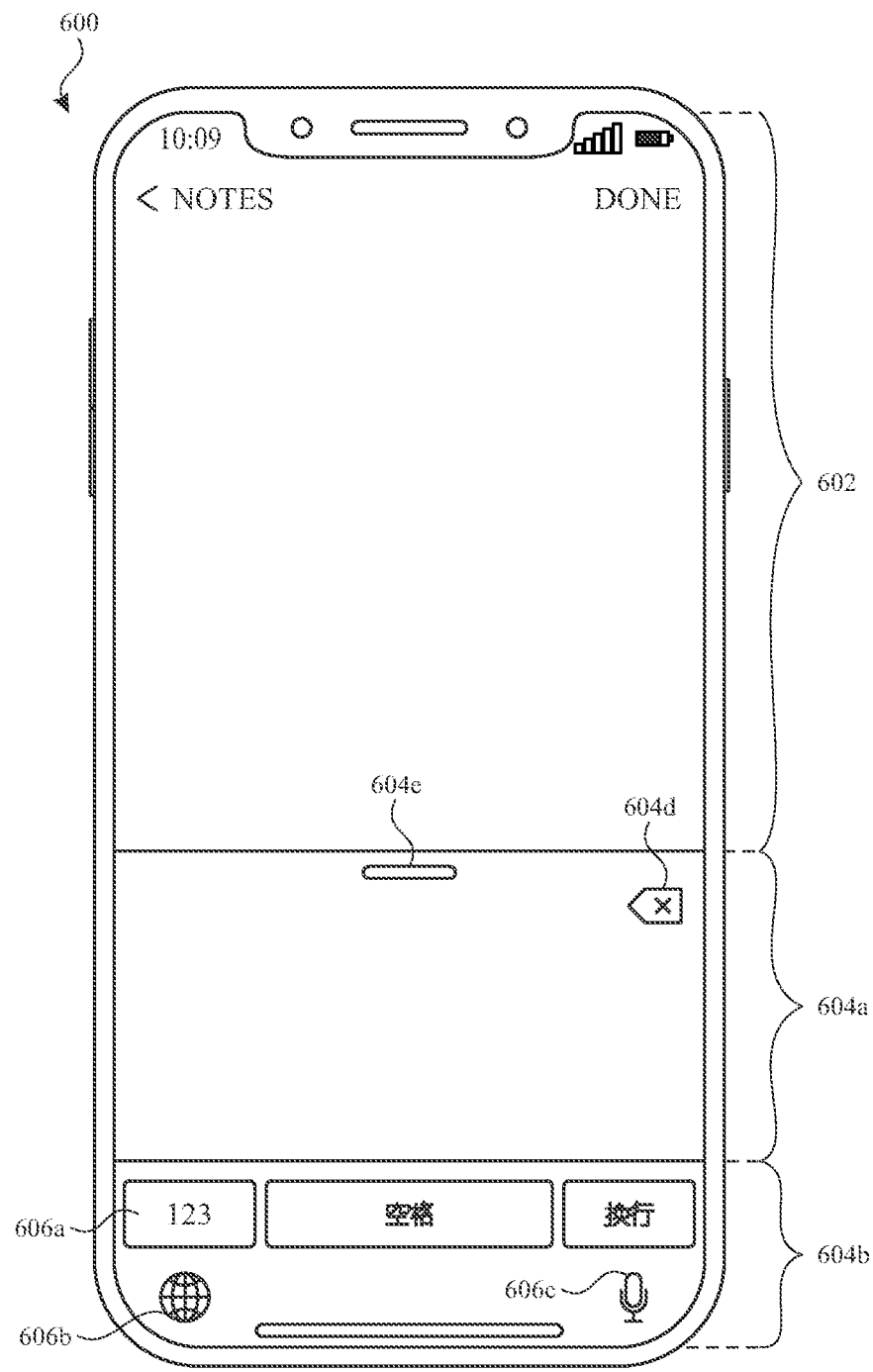
FIGS. 6A-6S illustrate exemplary devices and user interfaces for receiving handwriting input, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
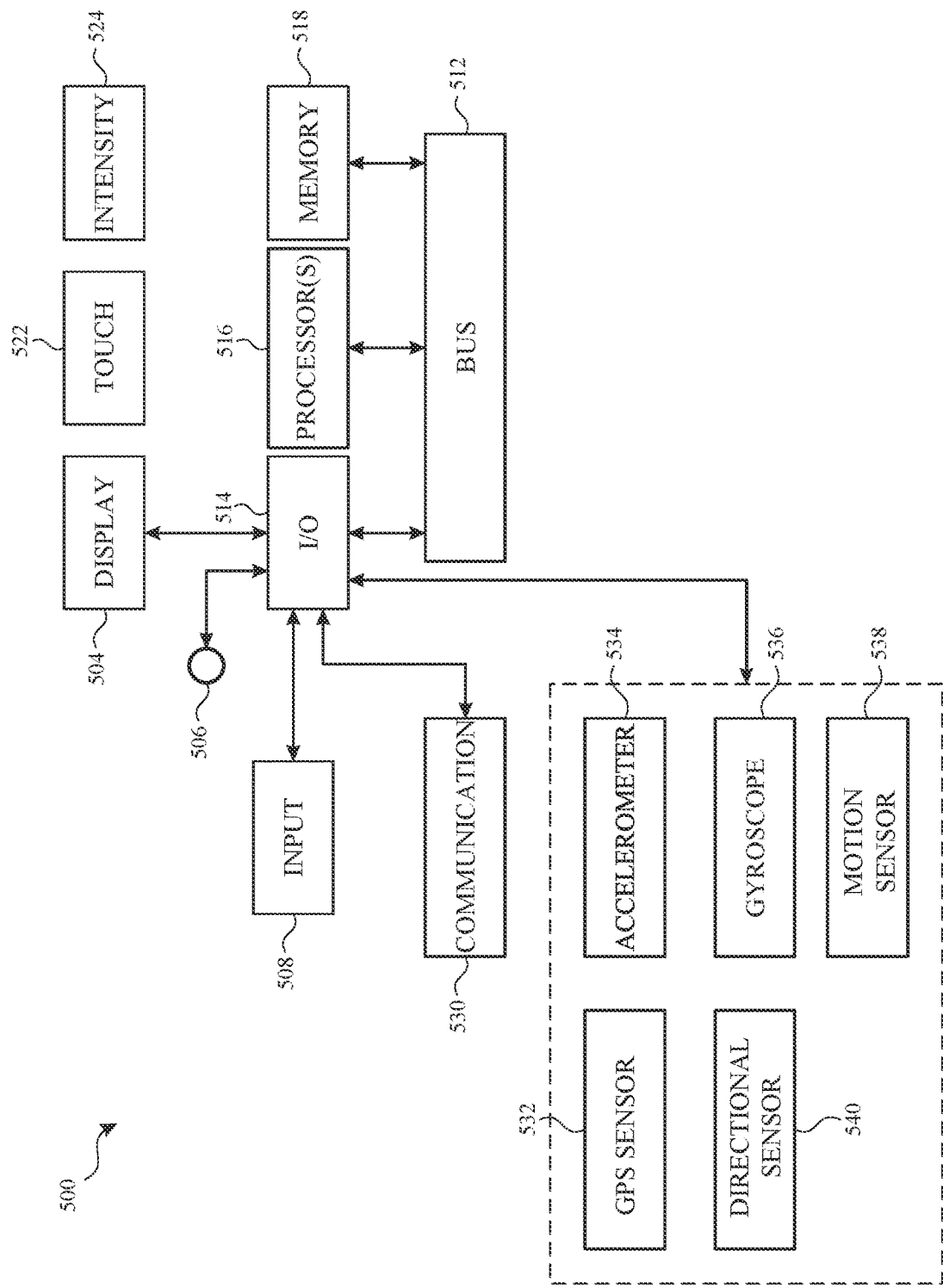
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
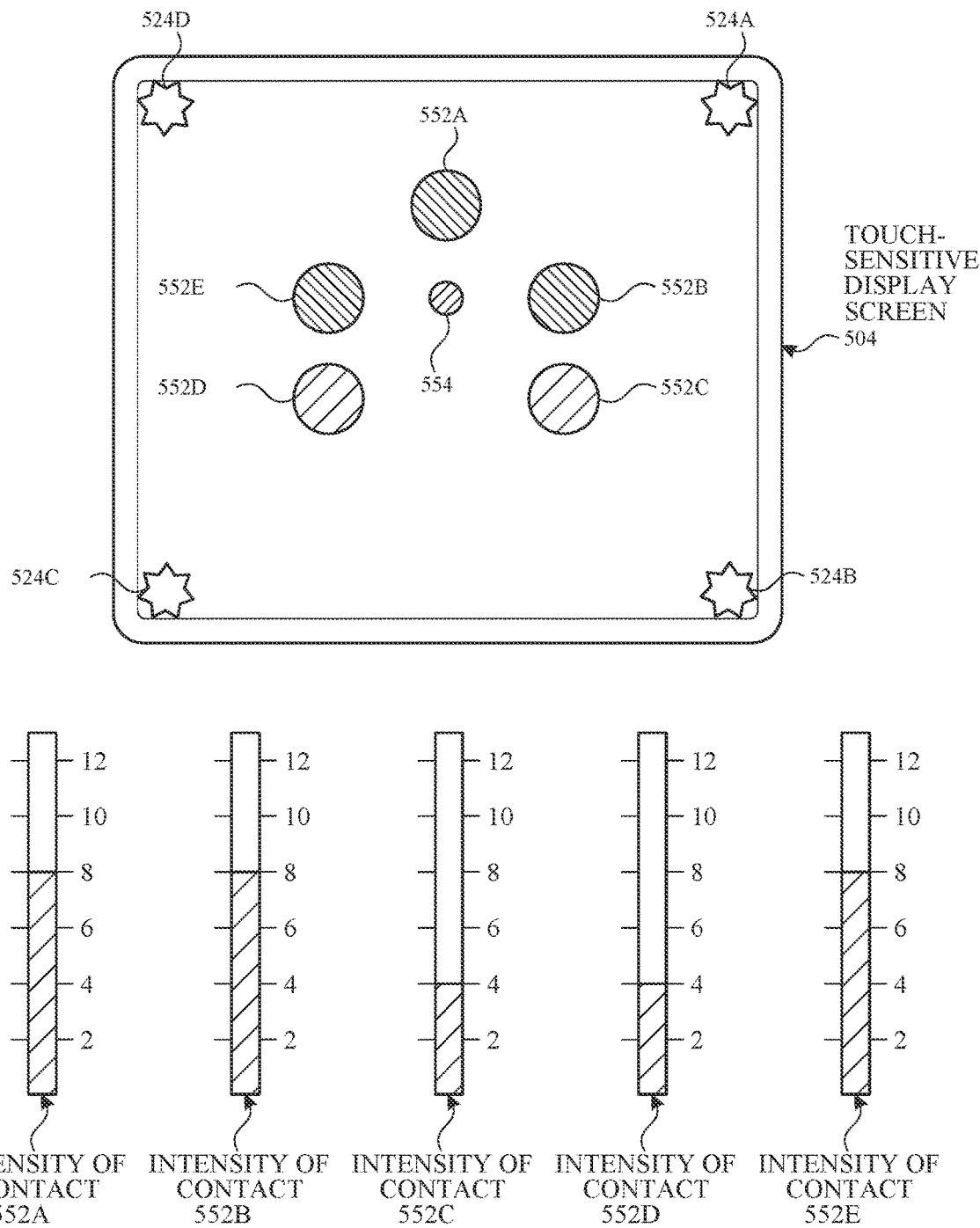

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij = A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6S illustrate exemplary devices and user interfaces for receiving handwriting input, in accordance with some embodiments. The user interfaces in these figures are used to illustrate the processes described below, including the processes in FIGS. 7A-7B.

At FIG. 6A, electronic device 600 is displaying a notes user interface (e.g., in response to detecting activation of a notes icon at a homescreen of device 600). Electronic device 600 includes a touch-sensitive surface and a display, which are arranged into a touch-screen display. The notes user interface includes text entry area 602, stroke input area 604a, and keys area 604b. The stroke input area 604a and the keys area 604b are based on a currently displayed keyboard (e.g., as described in detail below with respect to FIGS. 10A-10J).

At FIG. 6A, a Chinese handwriting keyboard 604 is currently displayed (e.g., same as keyboard 1012). In some embodiments, the Chinese handwriting keyboard includes multiple keyboard planes, including a handwriting plane 604a that enables users to provide handwritten strokes to insert text (e.g., alphanumeric characters, spacing, punctuation) into text entry area 602 and a numerals plane 604c (e.g., as illustrated in FIG. 6J) that enables users to activate various keys to insert text (e.g., alphanumeric characters, spacing, punctuation) into text entry area 602. Text entry area 602 is configured to display text received by device 600, such as the text received in text entry area 604a. Stroke input area 604a is configured to receive strokes (e.g., handwritten strokes, via a finger contact or stylus contact on the touch-screen display), which are recognized as text using various techniques. In some examples, multiple strokes received at stroke input area 604a are combined into a single corresponding character and the character is displayed in text entry area 602. Keys area 606 includes a plurality of keyboard keys which, when activated, perform various functions. For example, activation of numeral key 606a causes display of a numerals keyboard plane of the Chinese handwriting keyboard or display of a numerals keyboard. For another example, activation of switcher key 606b causes the keyboard to be replaced with a different keyboard (e.g., has adaptive behavior), such as described in further detail below with respect to FIGS. 10A-10J. For another example, microphone key 606c initiates a dictation mode whereby device 600 receives audio and transcribes the received audio into text, which is displayed in text entry area 602.

At FIG. 6A, device 600 also displays delete affordance 604d and grabber 604e. Delete affordance 604d, when activated, deletes a character from the text entry area 602 and/or deletes stroke representations displayed in stroke input area 604a. Grabber 604e can be used to resize stroke input area 604a. In these examples, stroke input area 604a can be resized between two predetermined sizes: a small size and a large size (and, optionally, different aspect ratios). For example, FIG. 6A illustrates stroke input area 604a at a small size and a first aspect ratio and FIG. 6F illustrates stroke input area 604a at a large size and a second aspect ratio (different from the first aspect ratio). In some embodiments, stroke input area 604a can be resized among three, four, or more predetermined sizes.

Figure 6B:
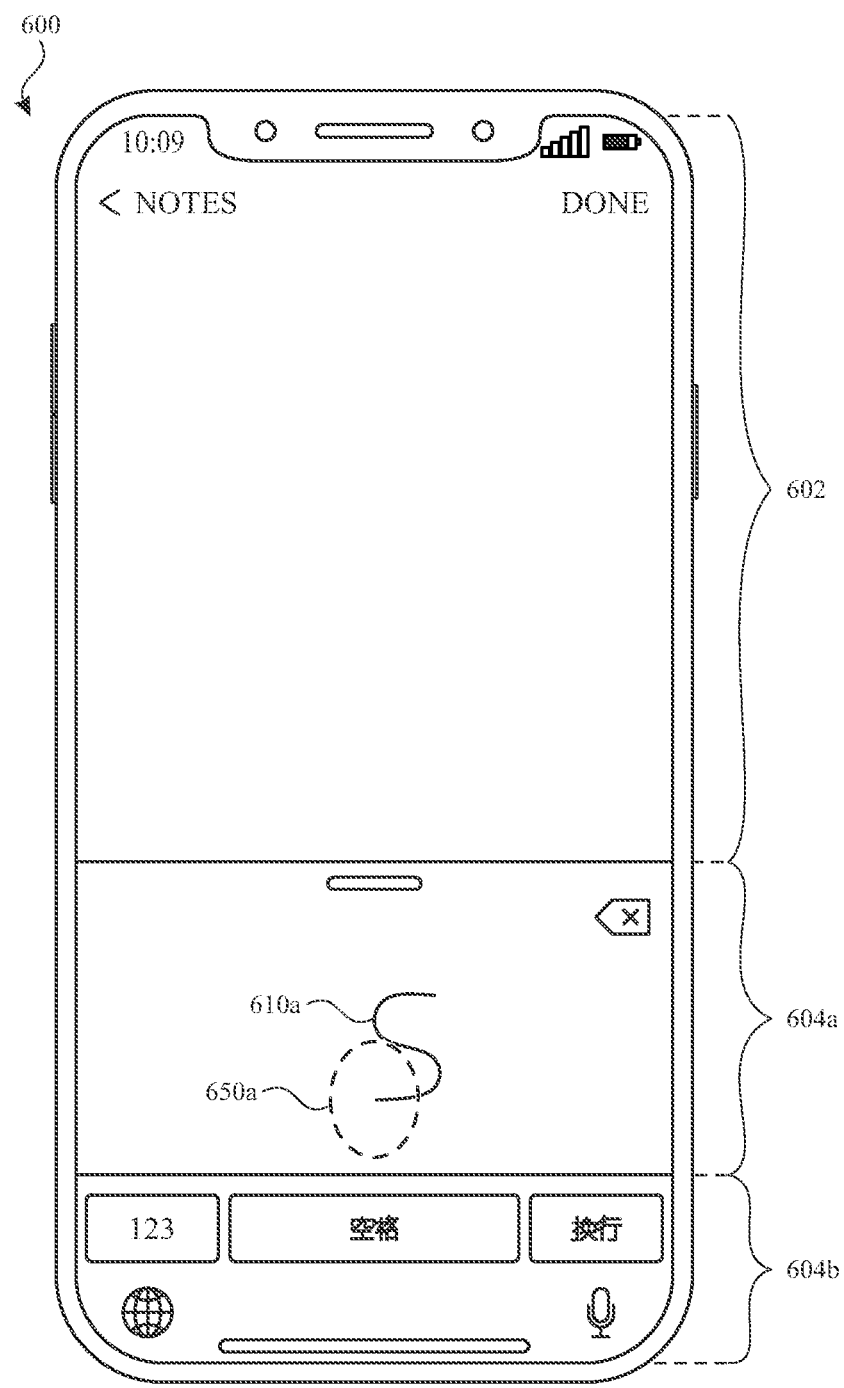

At FIG. 6B, device 600 detects input stroke 650a in stroke input area 604a and, in response, displays a visual representation 610a of input stroke 650a. Representation 610a is displayed over time in conjunction with detecting movement of input stroke 650a over time.

Figure 6C:
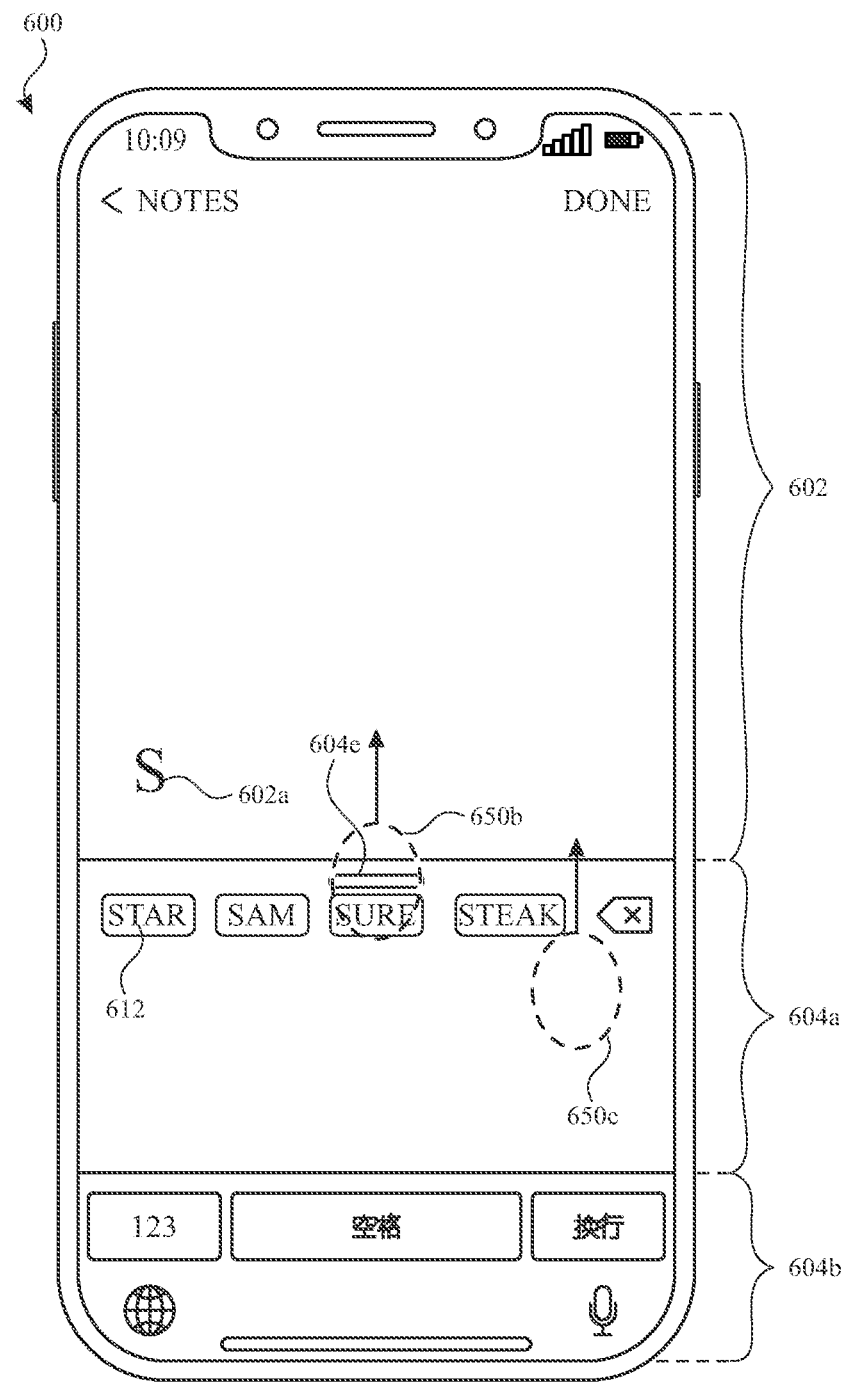

As illustrated in FIG. 6C, in accordance with a determination that a threshold amount of time has elapsed after detection (e.g., after detecting lift-off of the contact) of input stroke 650a, device 600 ceases to display, representation 610a of input stroke 650a and displays (e.g., inserts) character 602a in text entry area 602 (thereby auto-committing (e.g., without requiring additional user input) the handwritten strokes to text entry area 602 after the threshold amount of time has elapsed). Character 602a is a character determined (e.g., by device 600) using handwriting recognition. In some embodiments, device 600 ceases to display representation 610a by fading out the representation over time (e.g., over 1 second).

In some embodiments, the threshold amount of time (e.g., for auto-committing) is determined using measured periods of time between previous sets of strokes. For example, the device determines a first duration between lift-off (from the touchscreen display) of a first contact for a first stroke and touch-down (on the touchscreen display) of a second contact for a second stroke. The device subsequently determines a second duration between lift-off (from the touchscreen display) of the second contact for the second stroke and touch-down (on the touchscreen display) of a third contact for a third stroke. In some embodiments, the threshold amount of time is based on the first duration and the second duration. In some embodiments, the threshold amount of time is based on the average of the first duration and the second duration. In some embodiments, the threshold amount of time is variable and changes as the user writes more quickly (e.g., threshold amount of time reduces because the average duration between lift-off and touch-down is decreased) or as the user writes more slowly (e.g., threshold amount of time increases because the average duration between lift-off and touch-down is increased).

At FIG. 6C, device 600 receives an input (e.g., a gesture, 650b, 650c) at a location that corresponds to Chinese handwriting keyboard 604. In accordance with a determination that the start of the input is received at a location that does not corresponds to grabber 604e, device 600 does not expand stroke input area 604a. For example, device 600 does not expand stroke input area 604a in response to detecting input 650c, even though input 650c is an upward drag gesture.

Figure 6D:
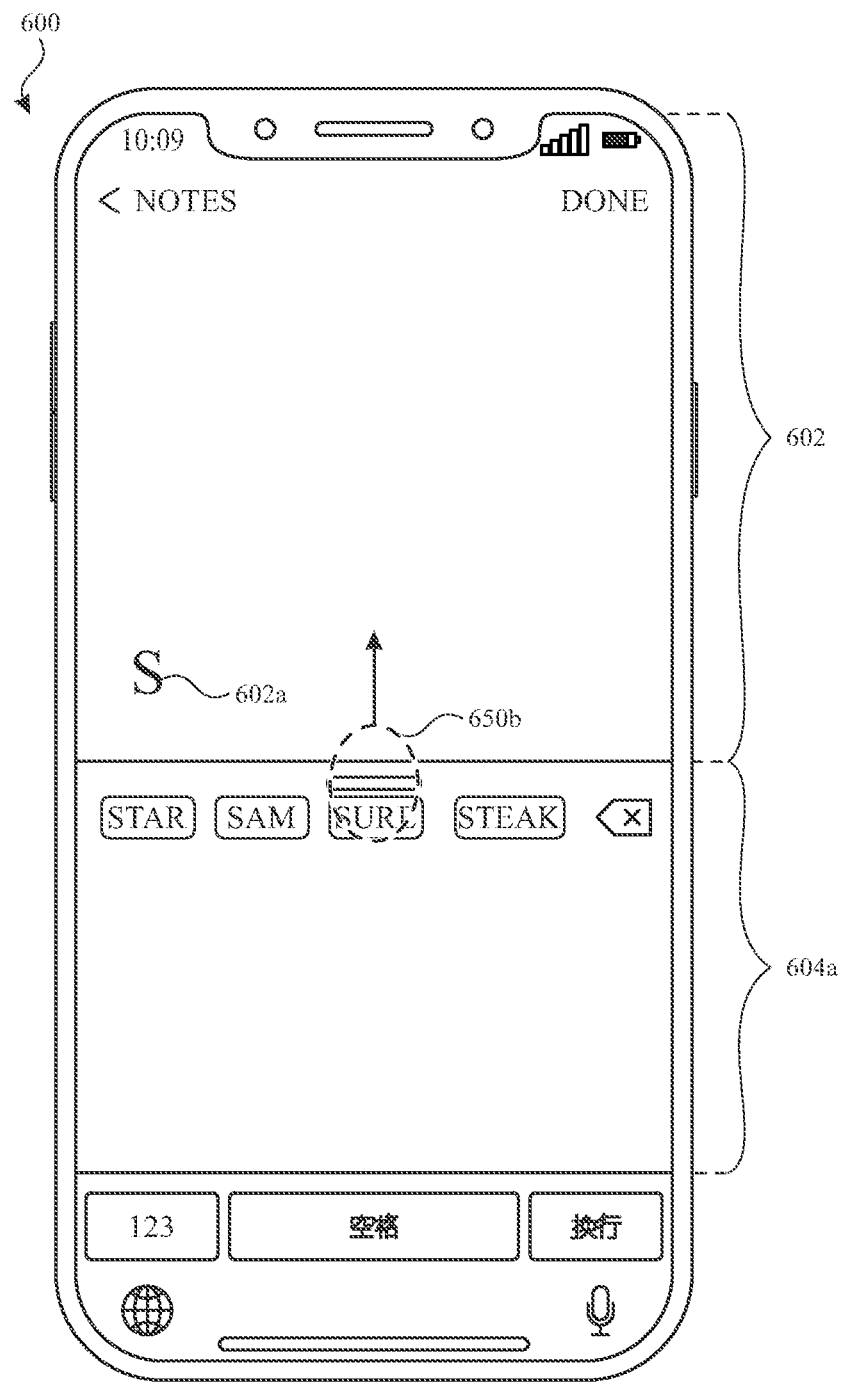
Figure 6E:
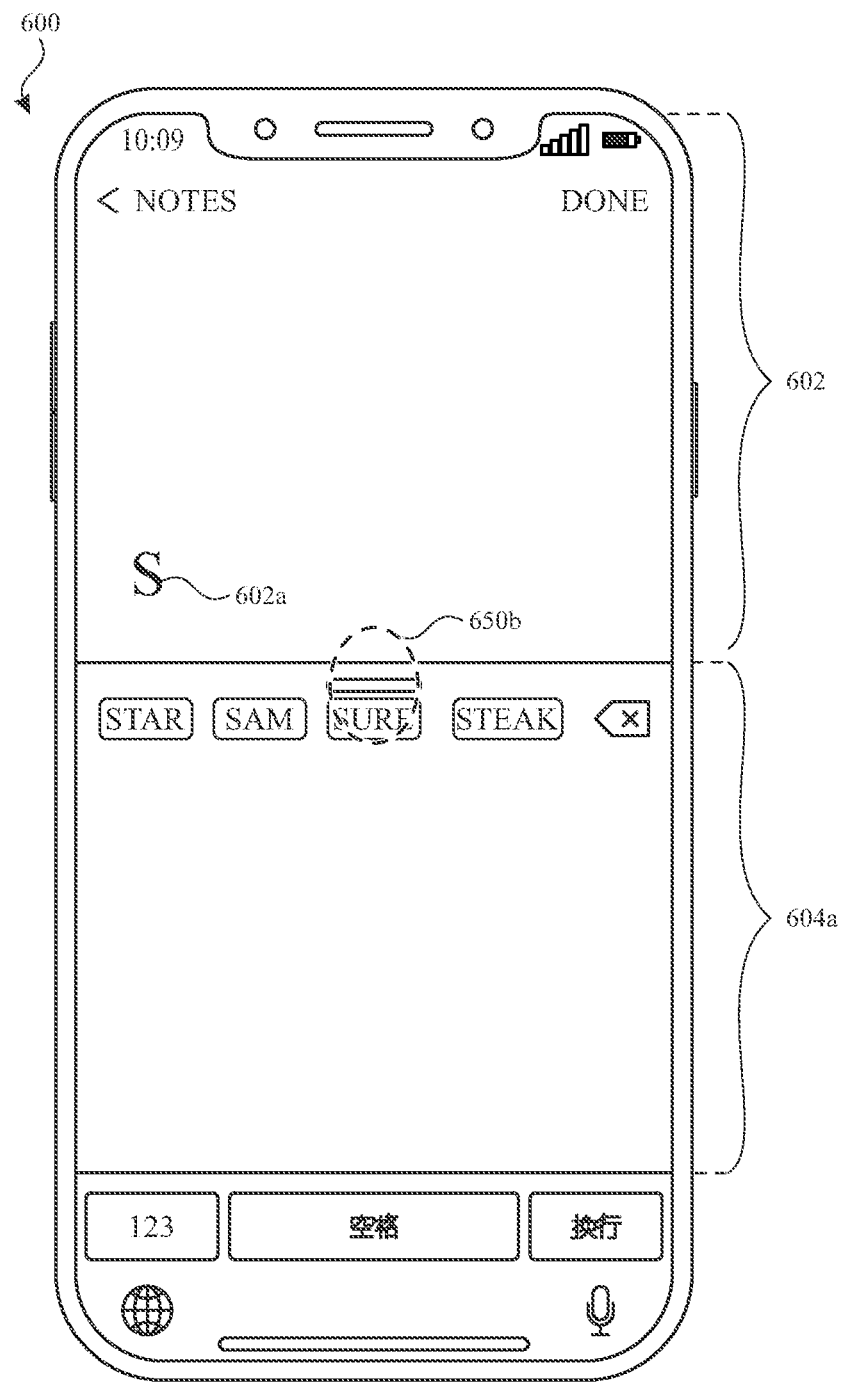
Figure 6F:
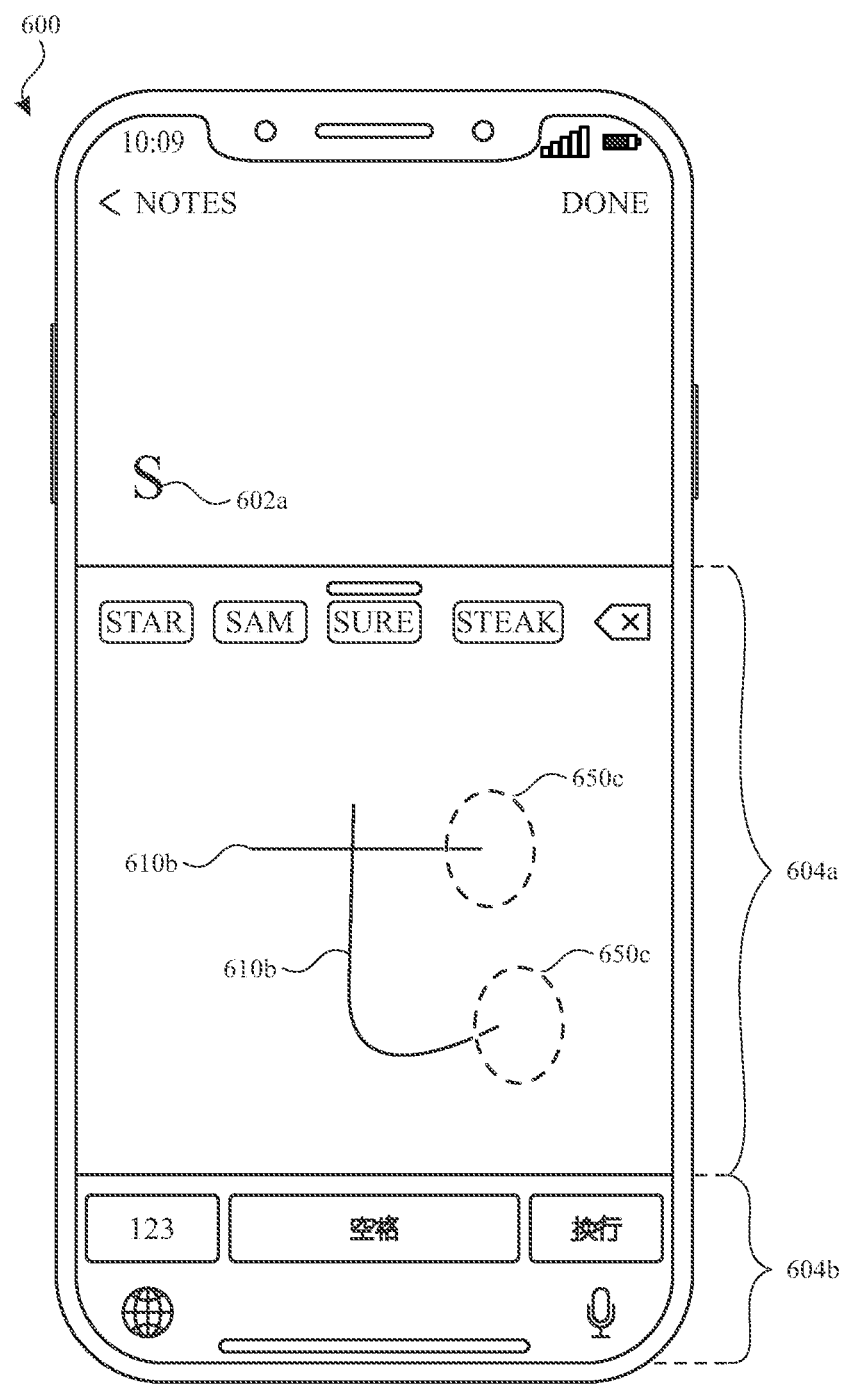

In accordance with a determination that the start of the input (e.g., 650b) is received at a location that corresponds to grabber 604e and that the input includes upward movement (e.g., toward text entry area 602, away from keys area 604b), the device begins to expand stroke input area 604a. For example, input 650b (illustrated in FIGS. 6C-6E), starts (in FIG. 6C) on grabber 604e and moves upward (e.g., in FIGS. 6C-6D). In response, stroke input area 604a expands (e.g., to a bigger size, longer in length but same width) and, optionally, the aspect ratio of stroke input area 604a changes. As illustrated in FIGS. 6C-6E, stroke input area 604a expands in conjunction with movement of input 650b. In addition, as illustrated in FIGS. 6C-6E, content in text entry area 602 optionally moves in the direction of the movement of the input such that the content continues to be displayed after stroke input area 604a is expanded to the large size. In FIGS. 6C-6E, character 602a is sliding upwards and, for example, maintains a fixed amount of distances from stroke input area 604a. In some examples, when stroke input area 604a reaches a maximum size (e.g., the large size), stroke input area 604a no longer expands in conjunction with the upward movement of the input. At FIG. 6D, as input 650b moves, stroke input area 604a expands in size and text entry area 602 concurrently reduces in size.

At FIG. 6E, movement of input 650b has ceased and device 600 continues to detect contact of input 650b on the touchscreen (e.g., without detecting lift-off of input 650b). At FIG. 6E stroke input area 604a is displayed at a size that is smaller than the large size (and larger than the small size).

Device 600 detects lift-off of input 650b from the touchscreen display and, in response to detecting lift-off of input 650b and in accordance with a determination that input 650b has expanded stroke input area 604a to a size bigger than a threshold size, device 600 displays stroke input area 604a (e.g., animates further expansion of stroke input area 604a, snaps to) at the large size, as illustrated at FIG. 6F. The large size (e.g., expanded state) of stroke input area (as shown in FIG. 6F) is bigger than the small size (e.g., unexpanded state) of stroke input area (as shown in FIG. 6A). Further, the stroke input area at the large size has a second aspect ratio that is different from the first aspect ratio of stroke input area 604a at the small size. For example, FIG. 6F illustrates stroke input area 604a at the large size and the second aspect ratio. Alternatively, in response to detecting lift-off of input 650b and in accordance with a determination that input 650b has not expanded stroke input area 604a to a size bigger than the threshold size, device 600 displays stroke input area 604a (e.g., animates reduction of stroke input area 604a, snaps to) returning to the small size.

At FIG. 6F, while displaying stroke input area 604a at the large size, device 600 receives a plurality of input strokes 650c in stroke input area 604a and, in response, displays a visual representations 610b of the plurality of input strokes 650c. Representations 610b are displayed over time in conjunction with detecting movement of input strokes 650c over time.

Figure 6G:
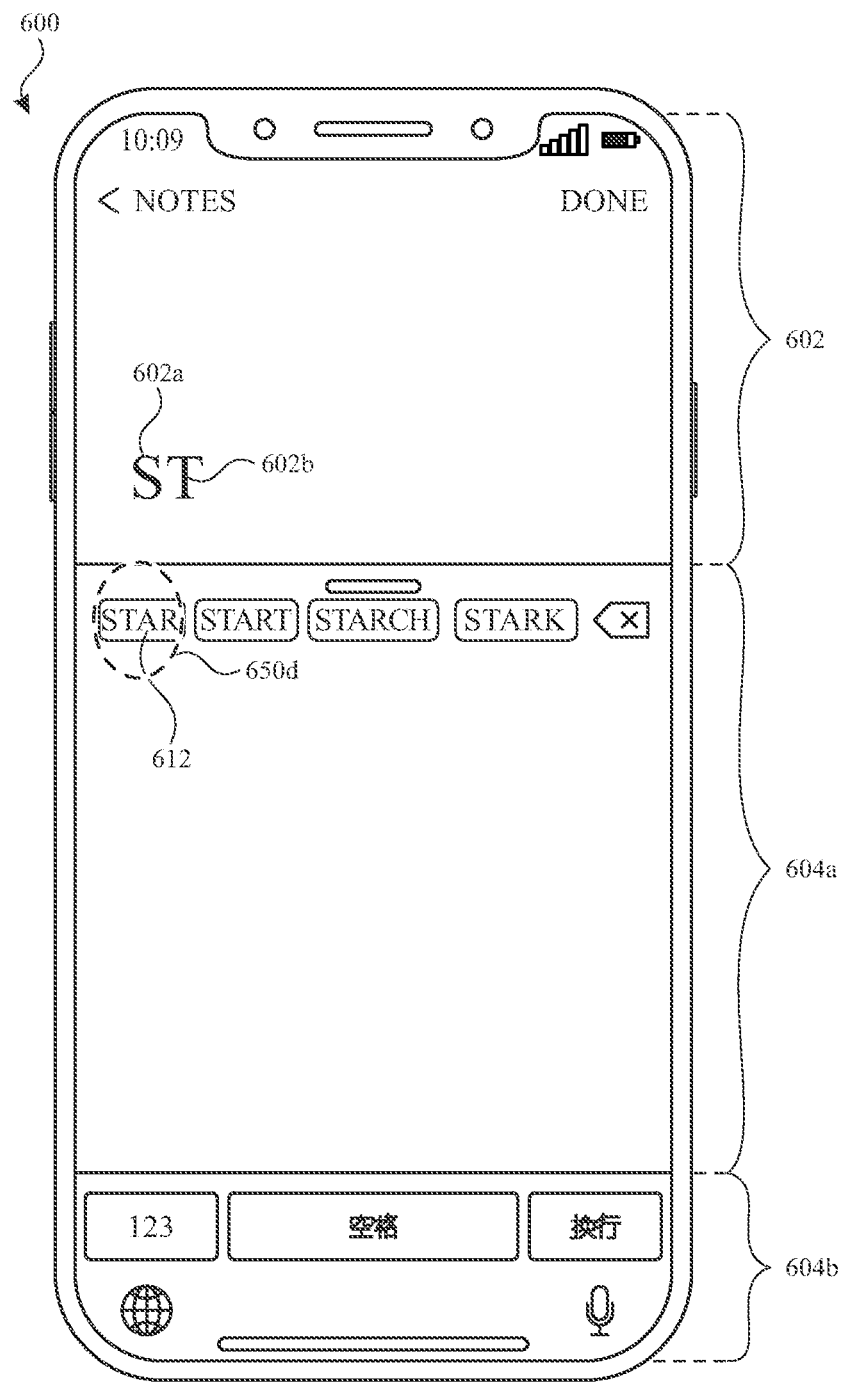

As illustrated in FIG. 6G, in accordance with a determination that a threshold amount of time has elapsed after detection (e.g., after detecting lift-off of the contact) of input strokes 650c, device 600 ceases to display representations 610b of input strokes 650c and displays (e.g., inserts) character 602b in text entry area 602 (thereby auto-committing (e.g., without requiring additional user input) the handwritten strokes to text entry area 602 after the threshold amount of time has elapsed). Character 602b is a character determined (e.g., by device 600) using handwriting recognition. In some embodiments, device 600 ceases to display representations 610b by fading out the representations over time (e.g., over 1 second).

At FIG. 6G, device 600 detects tap 650d on a candidate term (e.g., a suggested word) of a plurality of displayed candidate terms 612. At FIG. 6H, in response to detecting tap 650*d*, device 600 inserts the term into text entry field 602.

Figure 6H:
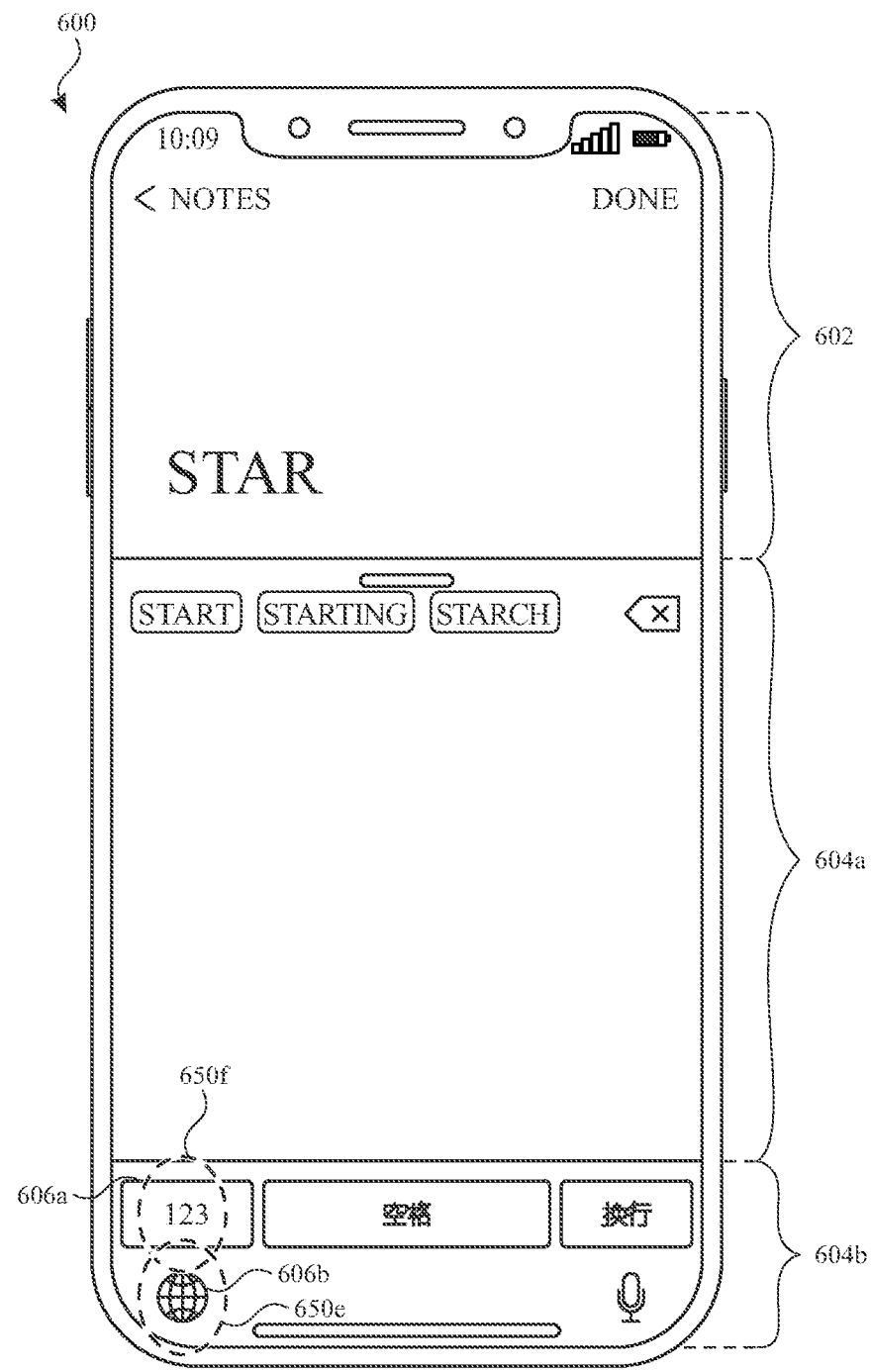

At FIG. 6H, while stroke input area 604*a* is at the large size, device 600 detects an input at a location corresponding to key area 604*b*. In response to detecting the input at the location corresponding to key area 604*b*, in accordance with a determination that the input is on switcher key 606*b*, device 600 replaces Chinese handwriting keyboard 604 with a different keyboard (e.g., as described in detail with respect to FIGS. 10A-10J).

Figure 6I:
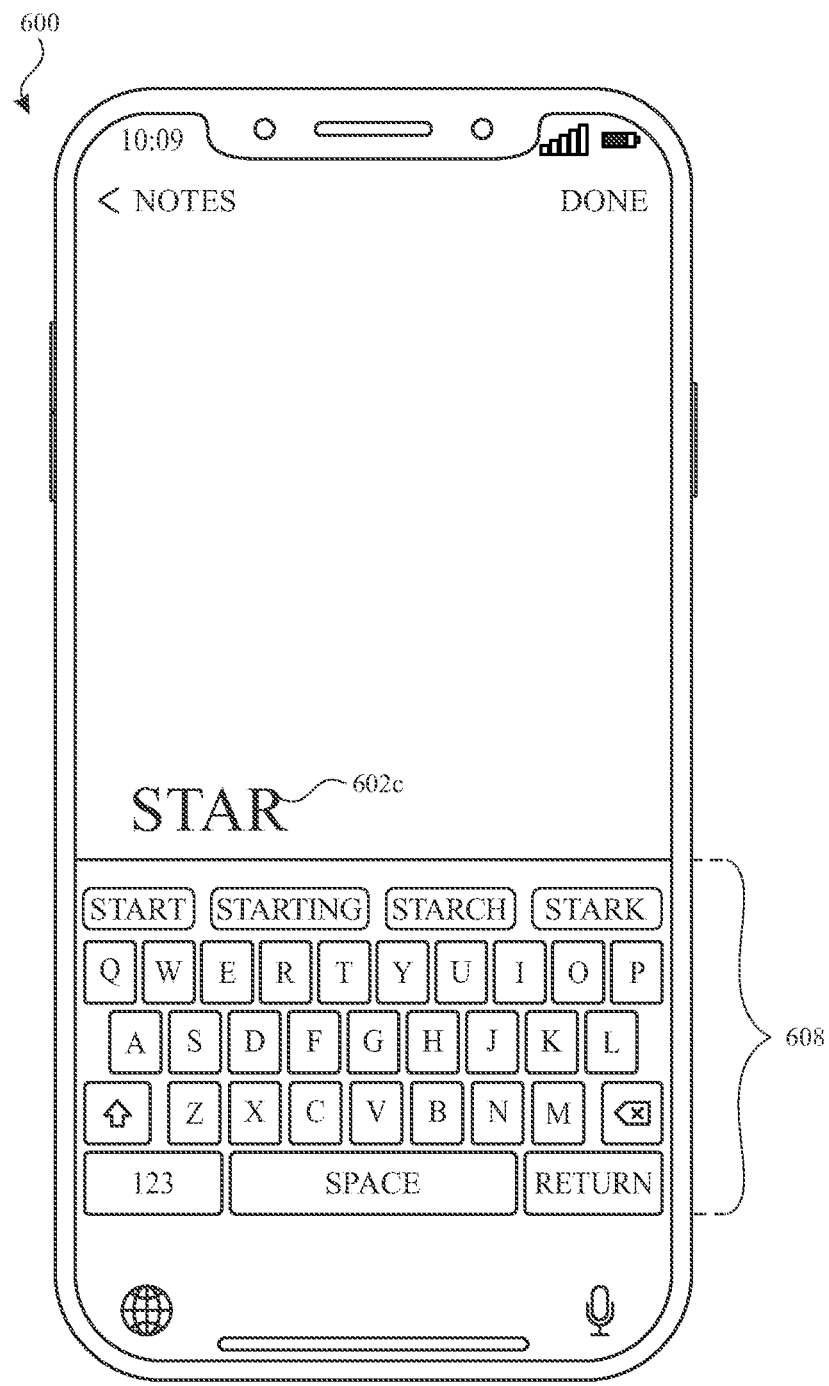
Figure 6J:
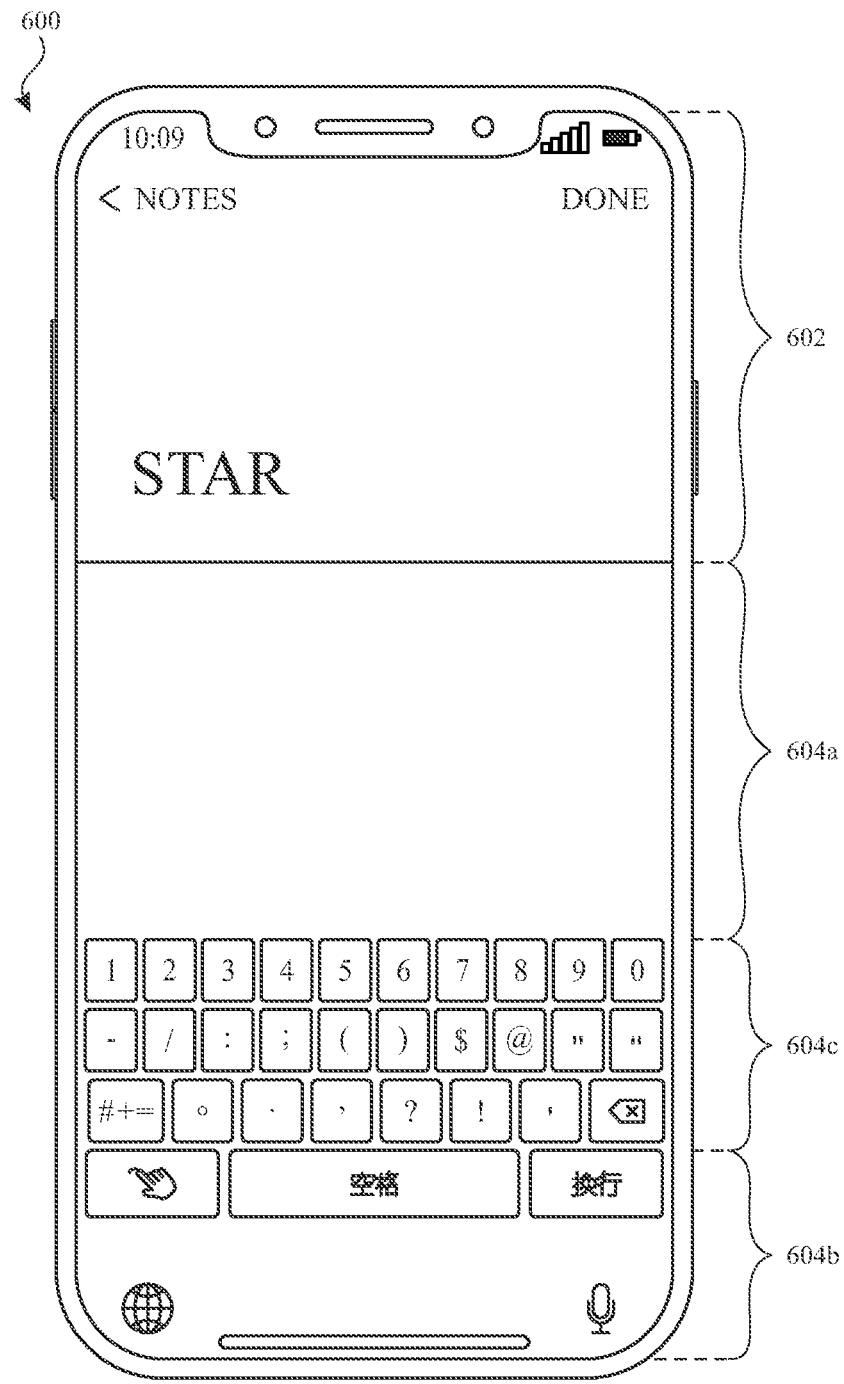

As illustrated in FIG. 6I, activation of switcher key 606*b* by tap 650*e* at FIG. 6H causes English keyboard 608 to be display and for text entry area 602 to expand (e.g., to the same size as in FIG. 6A when stroke input area 604*a* is at the small size), thereby replacing Chinese handwriting keyboard 604 (including replacing all of stroke input area 604*a*). Replacing Chinese handwriting keyboard 604 with English keyboard 608 also optionally causes content 602*c* in text entry area 602 to shift (e.g., slide via animation) down towards the English keyboard 608.

Returning to FIG. 6H, while stroke input area 604*a* is at the large size, device 600 detects the input at a location corresponding to key area 604*b*. In response to detecting the input at the location corresponding to key area 604*b*, in accordance with a determination that the input (e.g., 650*f*) is on numeral key 606*a*, device 600 displays a numeral plane (e.g., including keys corresponding to numbers, punctuation, symbols, non-alphabetical characters) in area 604*c* of Chinese handwriting keyboard 604. For example, device 600 detects tap 650*f* on numeral key 606*a* and, in response, displays (at FIG. 6J) numeral plane 604*c*, which replaces a portion of stroke input area 604*a* (e.g., the device ceases to display a first portion of stroke input area 604*a* while continuing to concurrently display a second portion of stroke input area 604*a* with the numeral plane). Further, in response to detecting the input at the location corresponding to numeral key 606*a*, device 600 ceases to display grabber 604*e* (e.g., thereby disabling the ability to resize the stroke input area (e.g., while remaining in a portrait mode)).

Figure 6K:
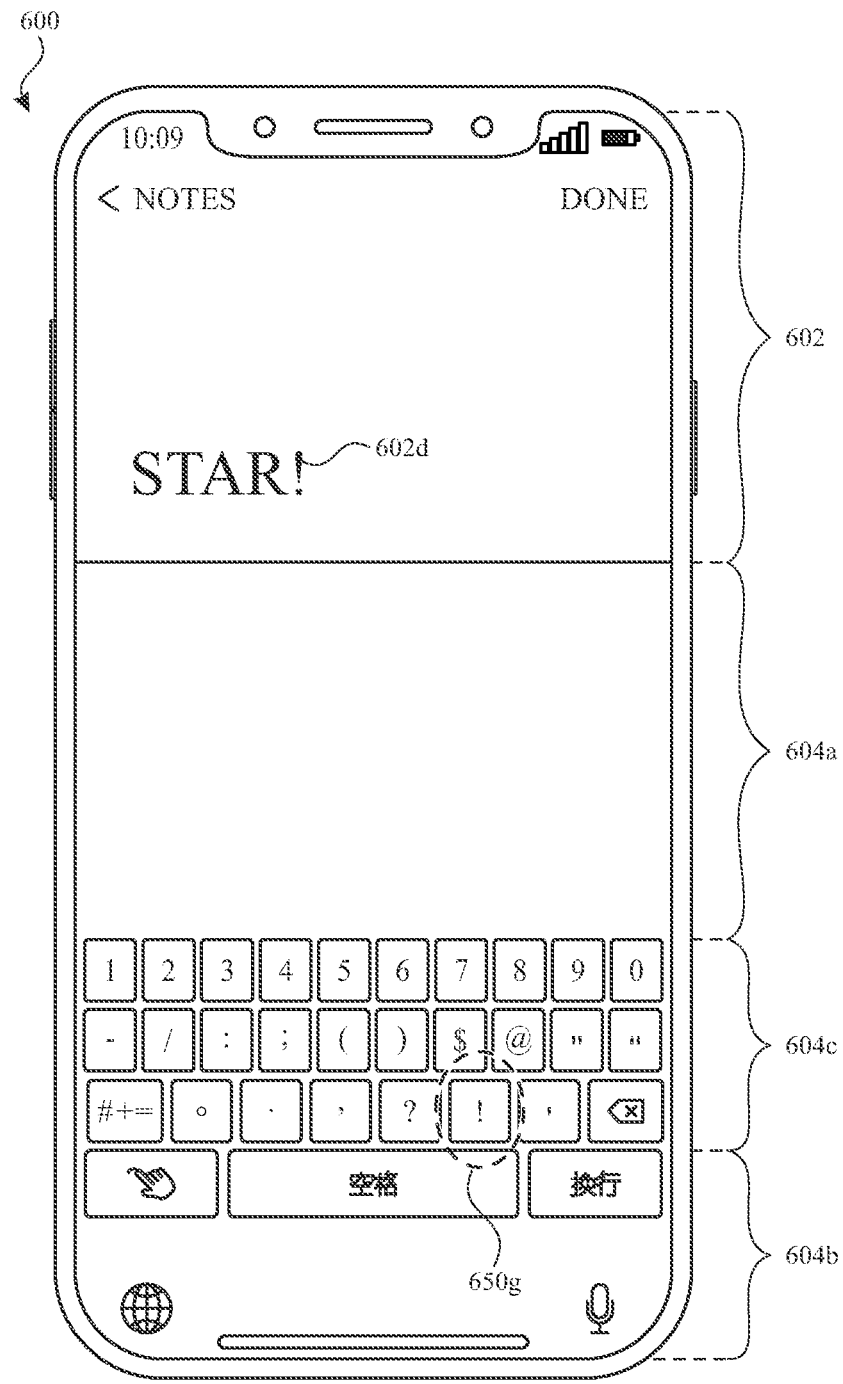

At FIG. 6K, while concurrently displaying numeral plane 604*c* with a portion of stroke input area 604*a*, device 600 detects tap 650*g* on a punctuation key (an exclamation mark, "!") of numeral plane 604*c*. In response to detecting tap 650*g*, device 600 displays (e.g., inserts) the corresponding punctuation character 602*d* in text entry area 602.

Figure 6L:
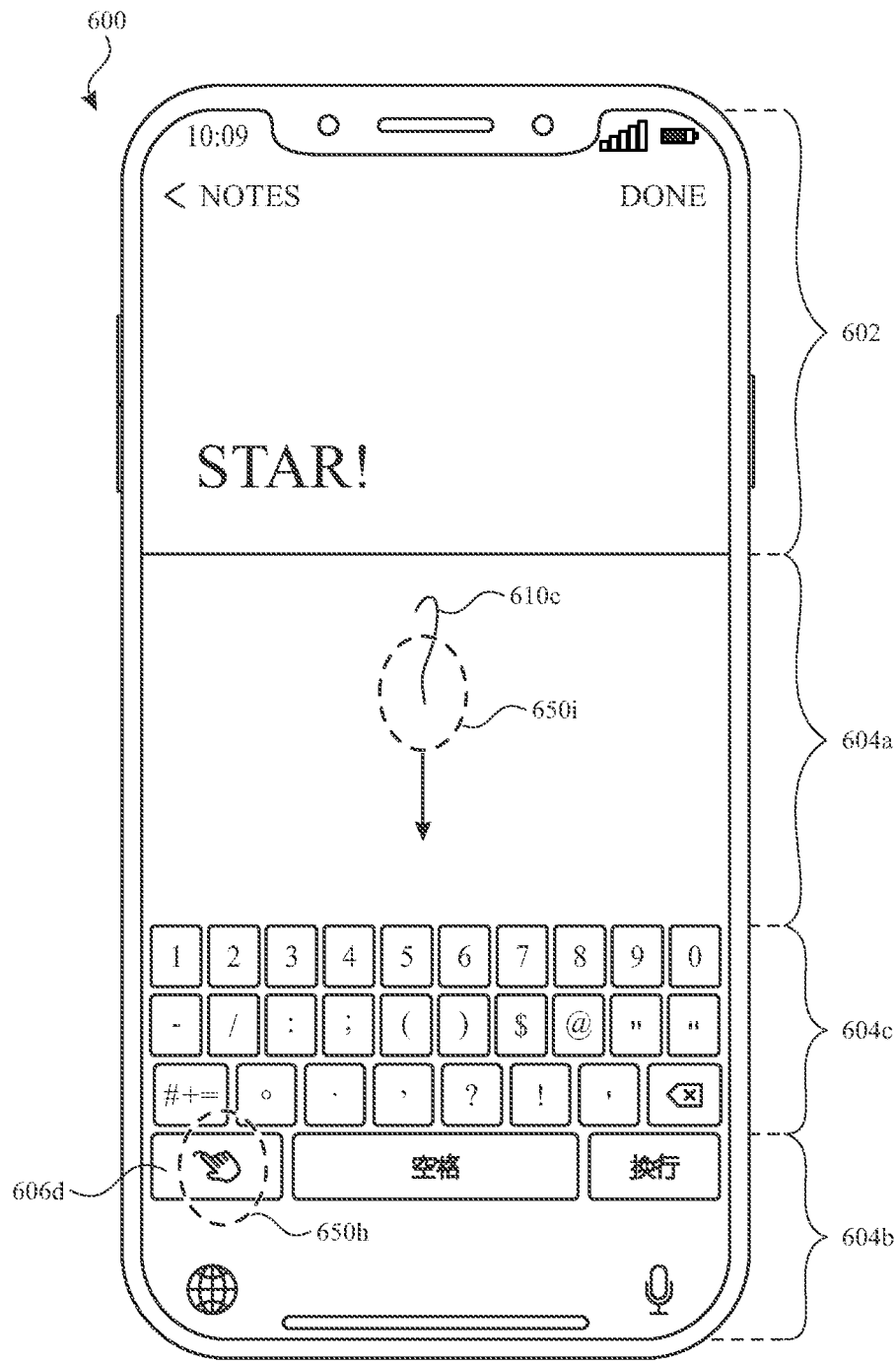
Figure 6M:
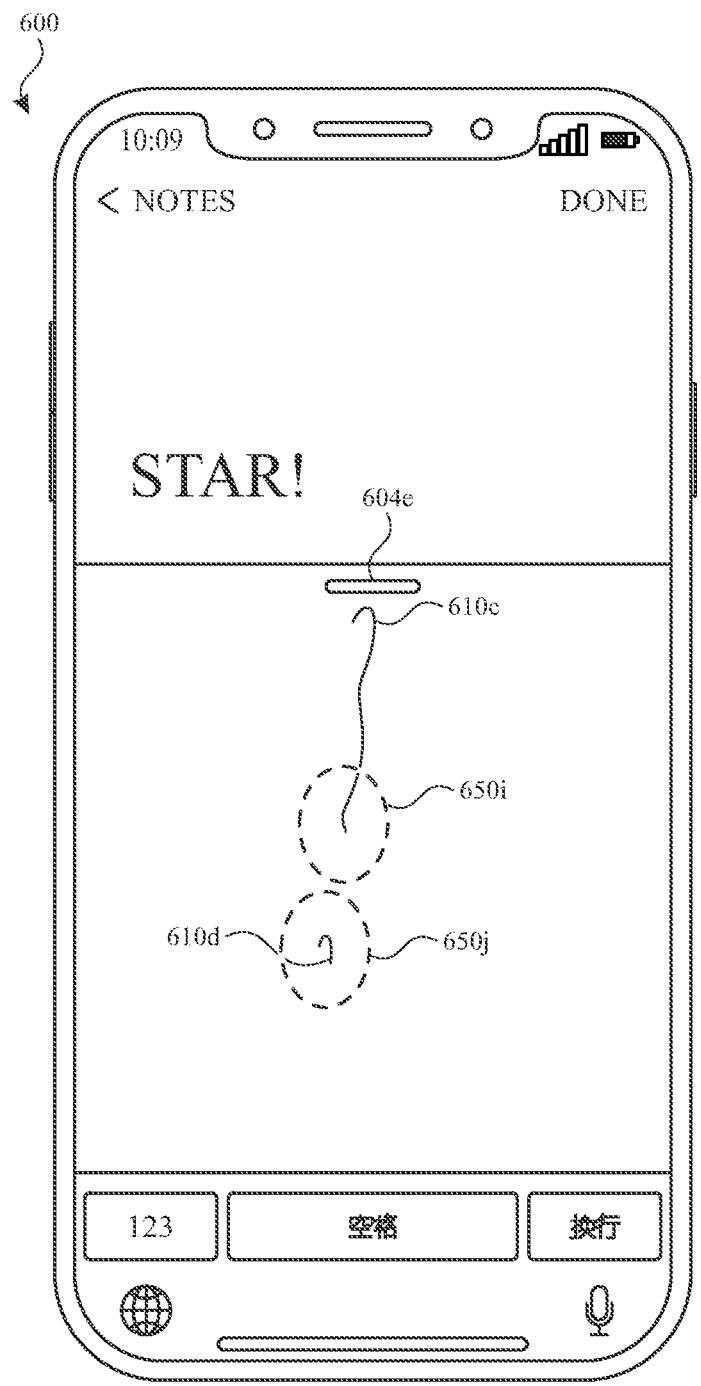
Figure 6N:
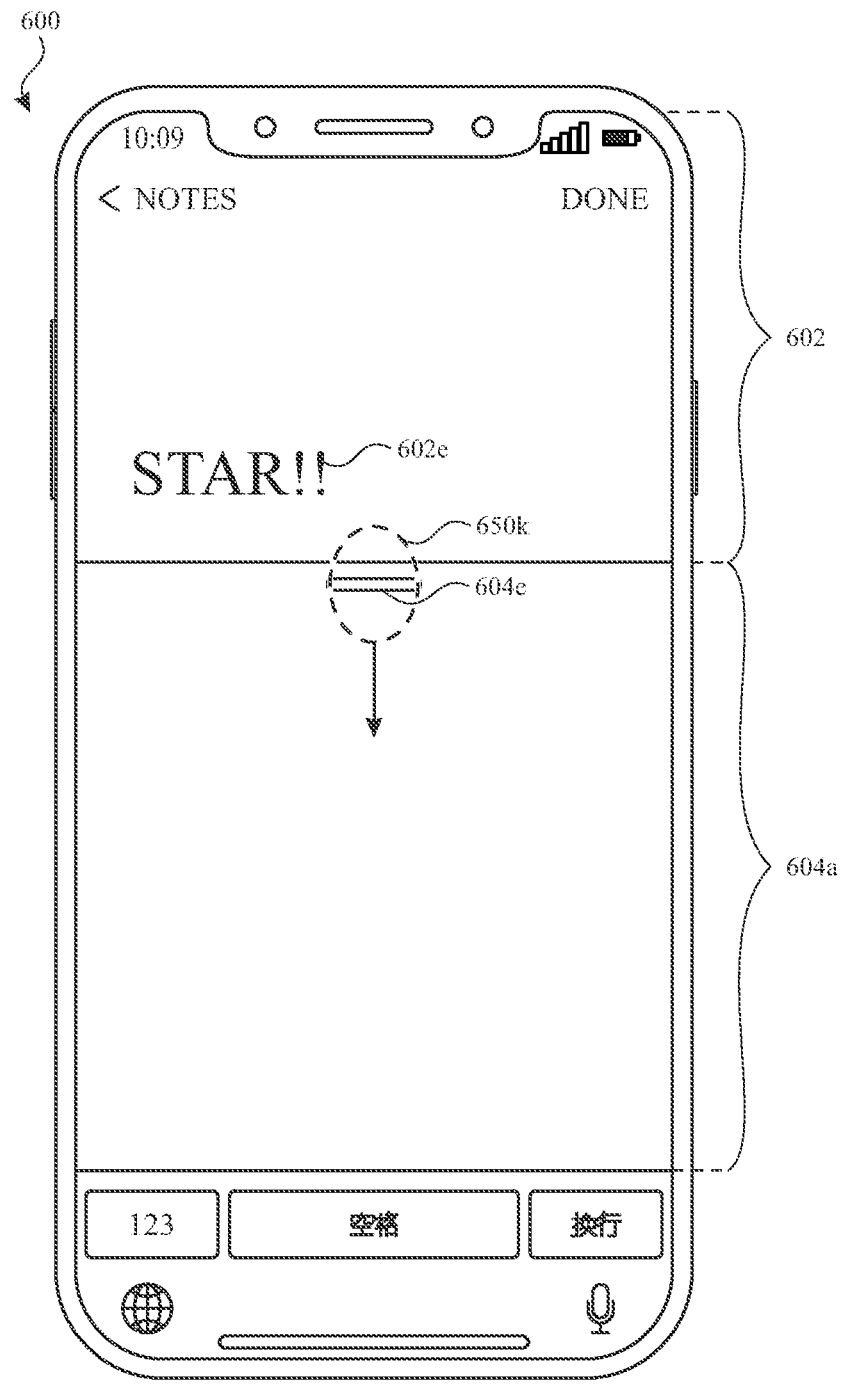
Figure 60:
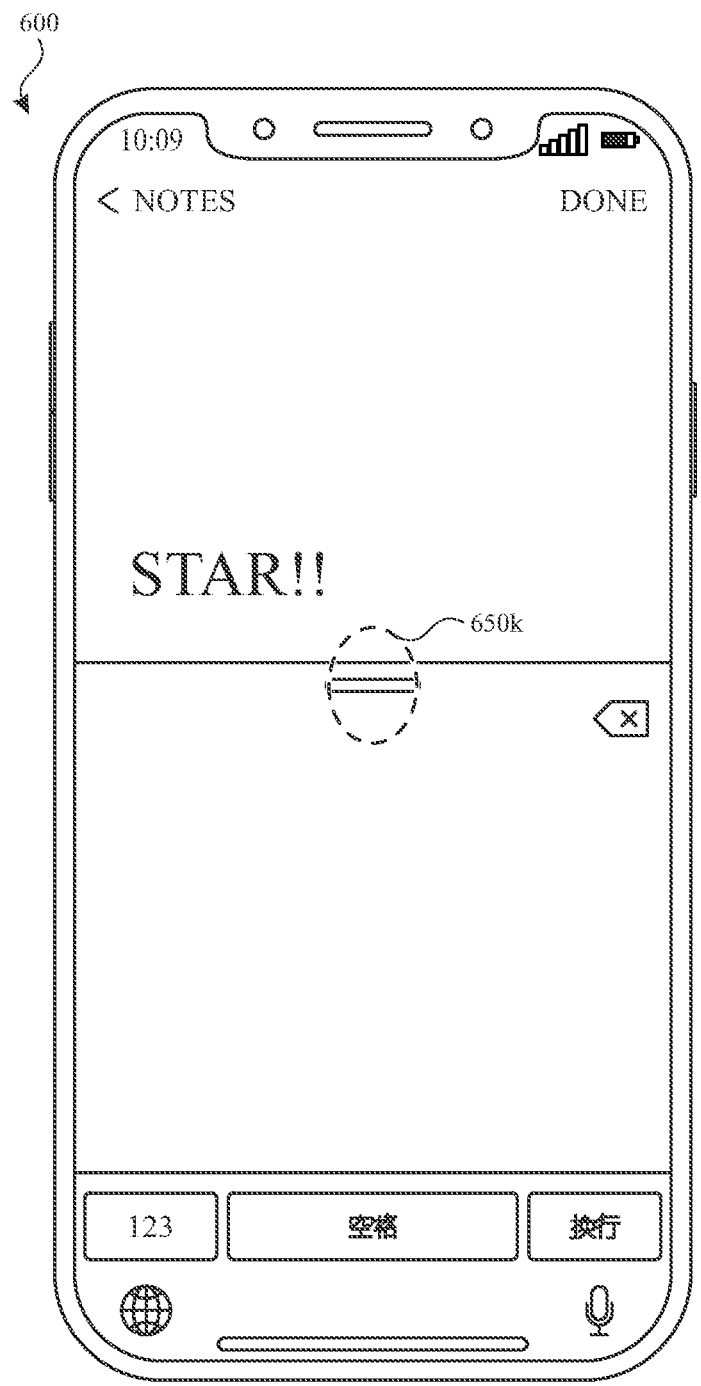

As illustrated in FIG. 6L, there are multiple ways to return to displaying the full stroke input area 604*a* (e.g., both the first portion and the second portion). Tap 650*h* on handwriting key 606*d* causes device 600 to cease displaying the numeral plane 604*c* of Chinese handwriting keyboard 604 and display (e.g., reveal from behind numeral plane 604*c*) the remaining portion of stroke input area 604*a*, as shown in FIG. 6N. As illustrated in FIGS. 6L-6M, detecting an input, such as input stroke 650*i*, in stroke input area 604*a* (while numeral plane 604*c* is displayed) causes the device to cease displaying numeral plan 604*c* (as shown in FIG. 6M) to display (e.g., reveal) the remaining portion of stroke input area 604*a*. Further, in response to detecting input stroke 650*i*, device 600 displays a visual representation 610*c* of input stroke 650*i*. Although illustrated as a downward gesture, device 600 is indifferent to the direction of input stroke 650*i* for displaying the remaining portion of stroke input area 604*a*. In addition, device 600 detects an additional input stroke 650*j*, which causes display of visual representation 610*d* corresponding to the stroke. Visual representations 610*c* and 610*d* are displayed over time in conjunction with detecting movement of corresponding input strokes 650*i* and 650*j* over time. In some embodiments, an input on stroke input area 604*a* while numeral plan 604*c* is displayed causes numeral plan 604*c* to cease being displayed but does not cause a visual representation of the input to be displayed. Displaying the full stroke input area 604*a* (e.g., both the first portion and the second portion) also includes displaying grabber 604*e*.

At FIG. 6N, device 600 determines (e.g., using handwriting recognition) that input strokes 650*i* and 650*j* correspond to an exclamation mark and, in response, device 600 inserts a corresponding exclamation mark 602*e* in text entry area 602. At FIG. 6N, device 600 detects drag gesture 650*k*, which starts on grabber 604*e*. In accordance with a determination that drag gesture 650*k* includes downward movement (e.g., away from the text entry area), device 600 reduces the size of stroke input area (e.g., gradually over time, in conjunction with movement of drag gesture 650*k*).

At FIG. 6O, movement of input 650*k* has ceased and device 600 continues to detect contact of gesture 650*k* on the touchscreen (e.g., without detecting lift-off of input 650*k*). At FIG. 6O, device 600 displays stroke input area 604*a* at a size based on a location of the contact of drag gesture 650*k*. At FIG. 6O stroke input area 604*a* is displayed at a size that is smaller than the large size.

Figure 6P:
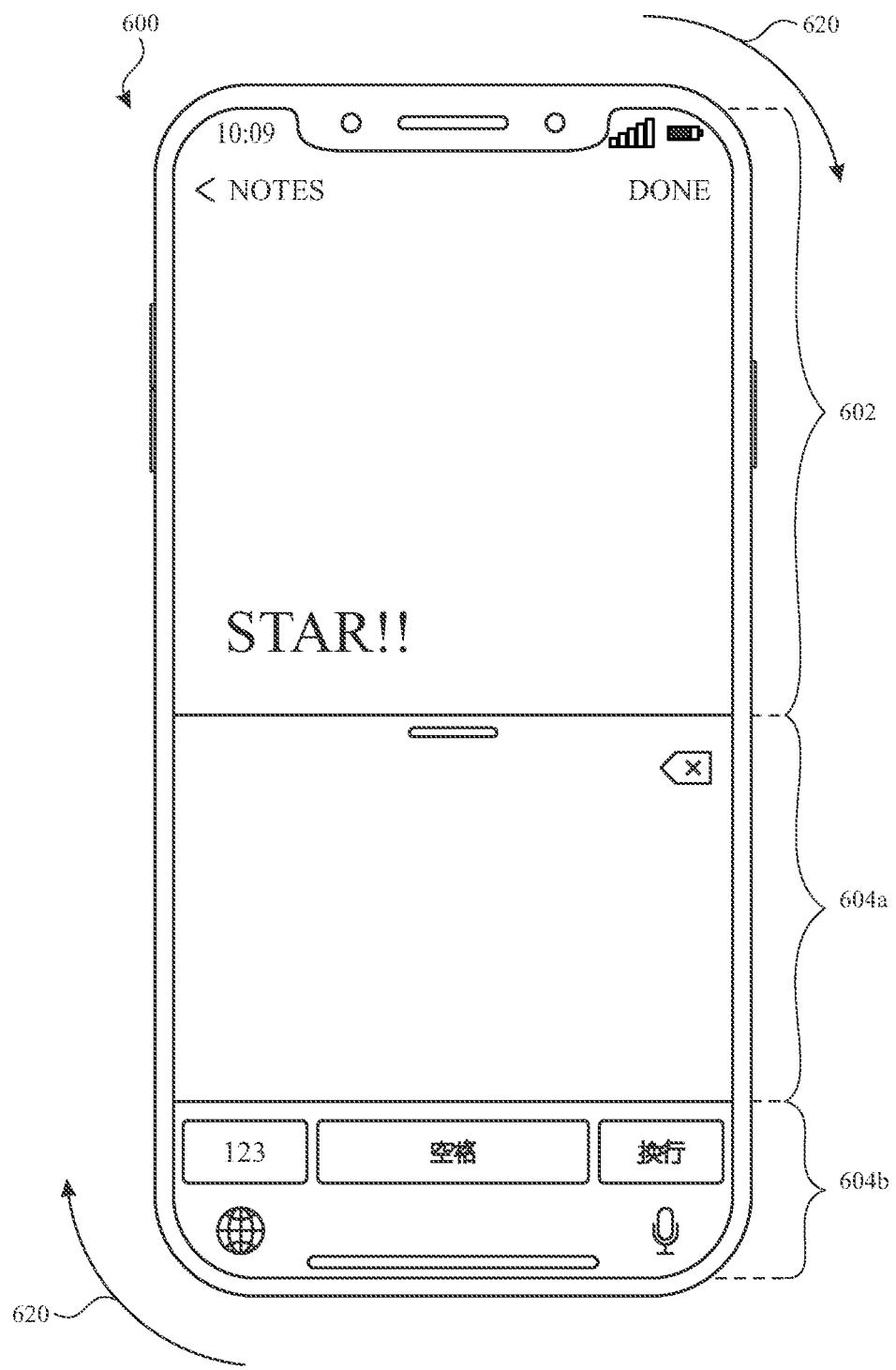

Device 600 detects lift-off of gesture 650*k* from the touchscreen display and, in response to detecting lift-off of gesture 650*k* and in accordance with a determination that gesture 650*k* has reduced stroke input area 604*a* to a size smaller than a second threshold size, device 600 displays stroke input area 604*a* (e.g., animates further reduction of stroke input area 604*a*, snaps to) at the small size, as illustrated at FIG. 6P. Alternatively, in response to detecting lift-off of input 650*k* and in accordance with a determination that input 650*k* has not reduced stroke input area 604*a* to a size smaller than the second threshold size, device 600 displays stroke input area 604*a* (e.g., animates expansion of stroke input area 604*a*, snaps to) at the large size.

At FIG. 6P, while device 600 displays the stroke input area 604*a* at the small size, device 600 transitions from a portrait mode to a landscape mode. In this example, device 600 transitions to landscape mode in response to device 600 detecting rotation 620 of device 600 from portrait orientation to landscape orientation.

Figure 6Q:
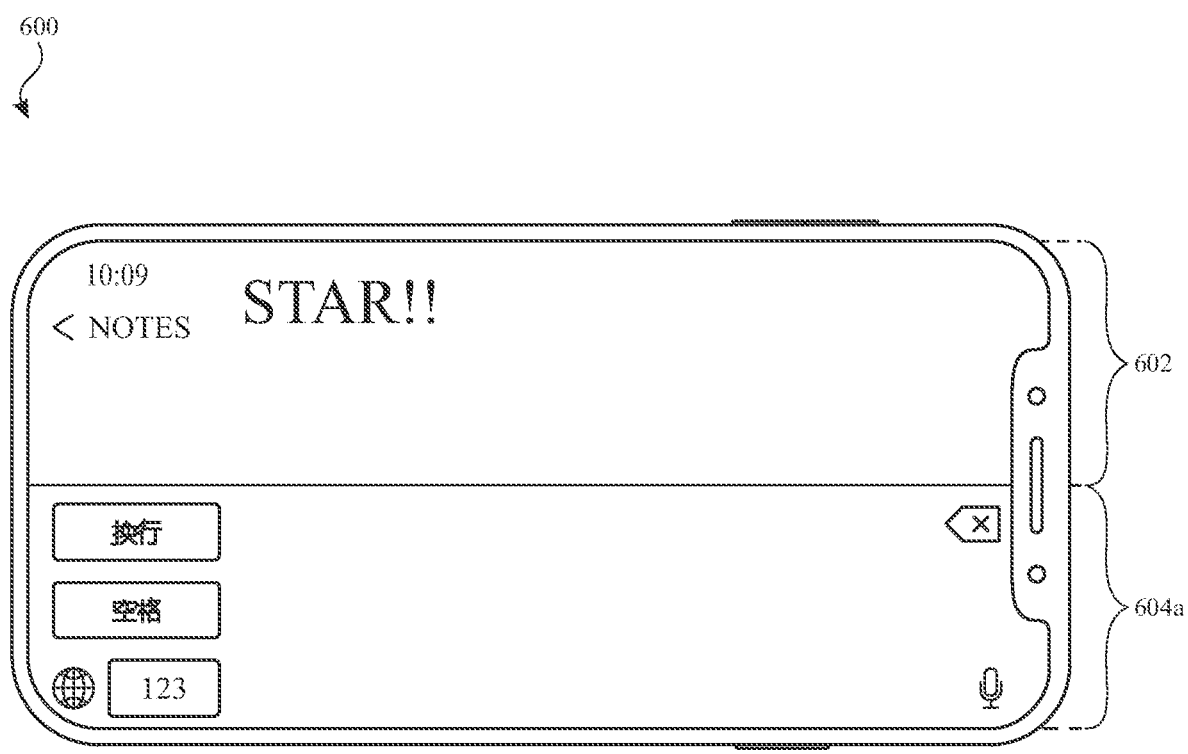
Figure 6R:
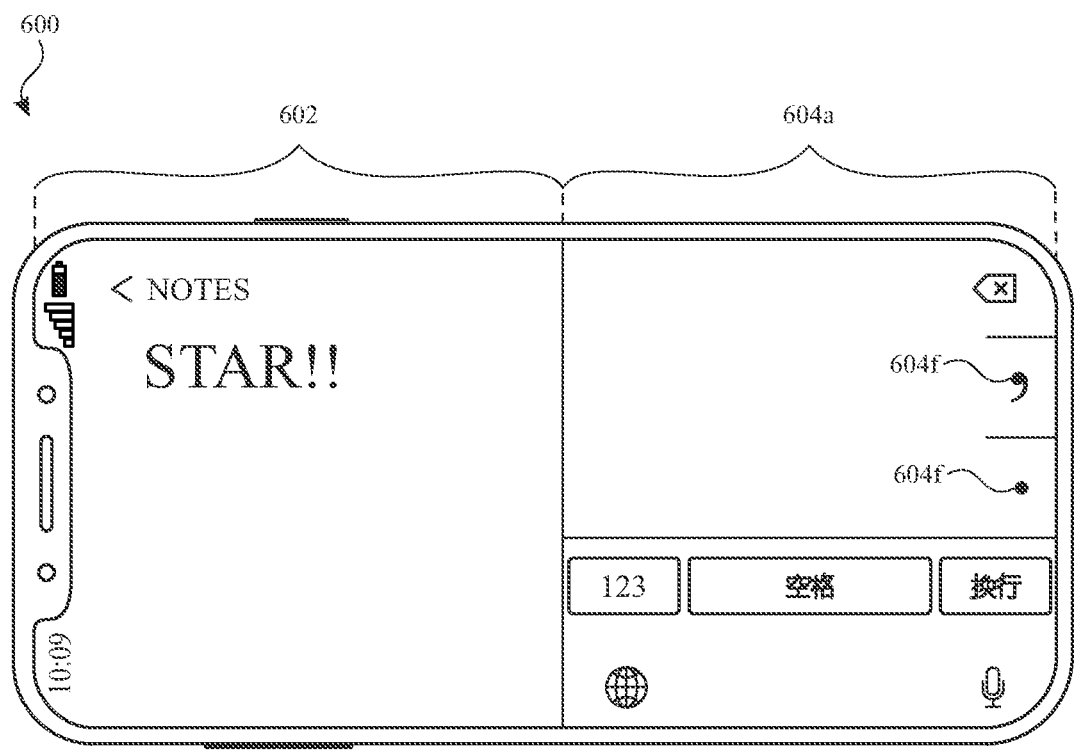
Figure 6S:
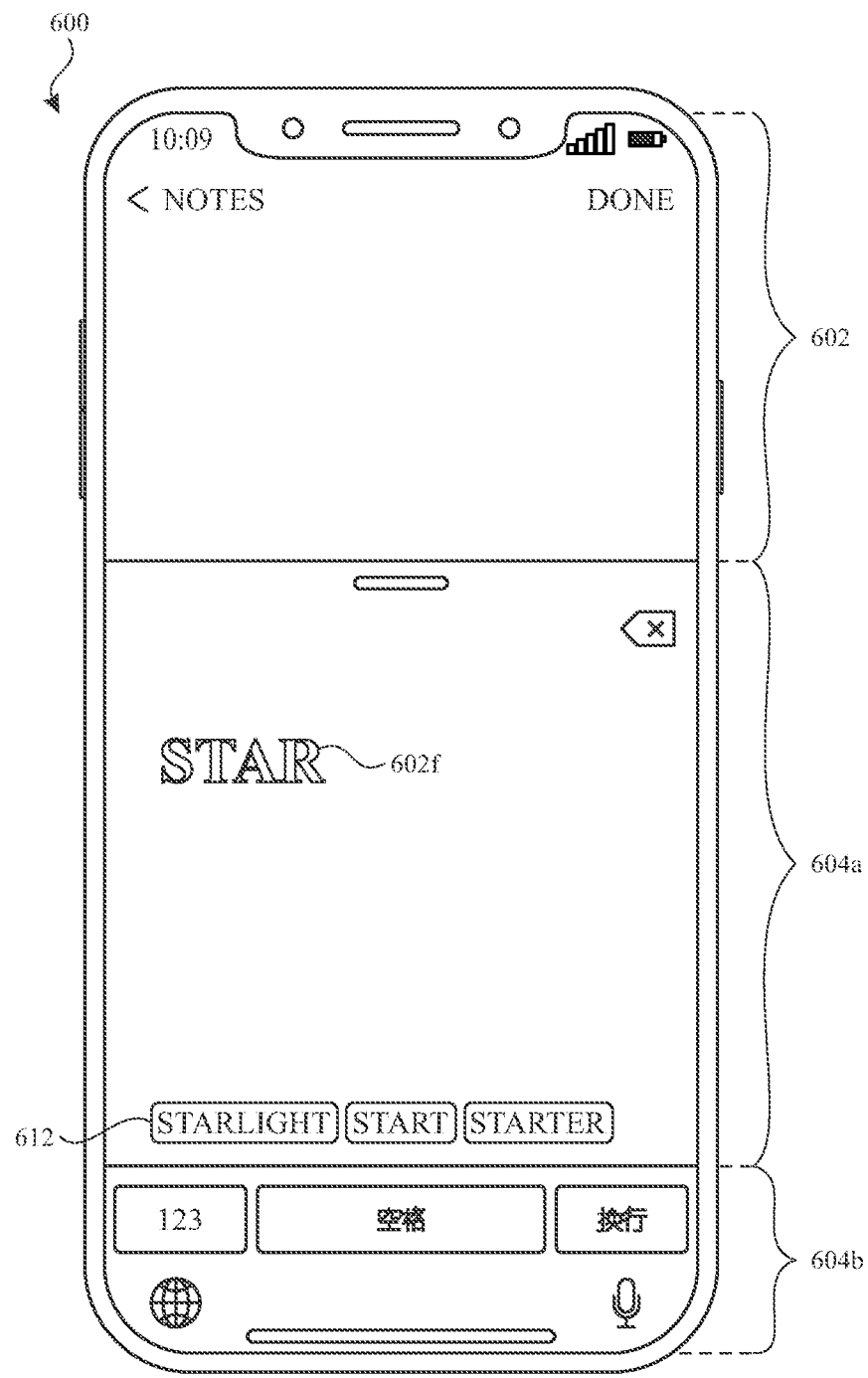
Figure 7A:
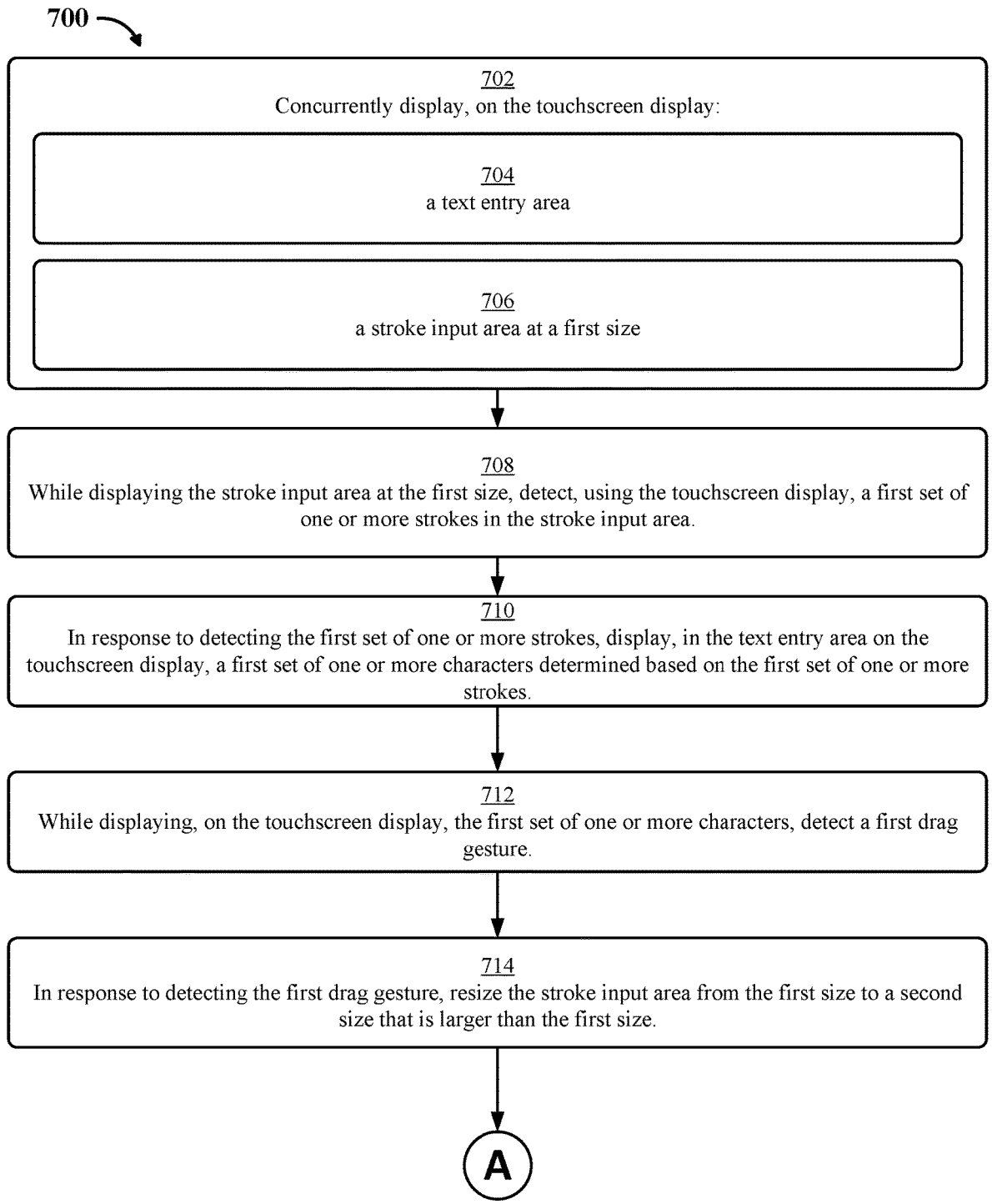
FIGS. 7A-7D are a flow diagram illustrating a method for receiving handwriting input, in accordance with some embodiments.
Figure 7B:
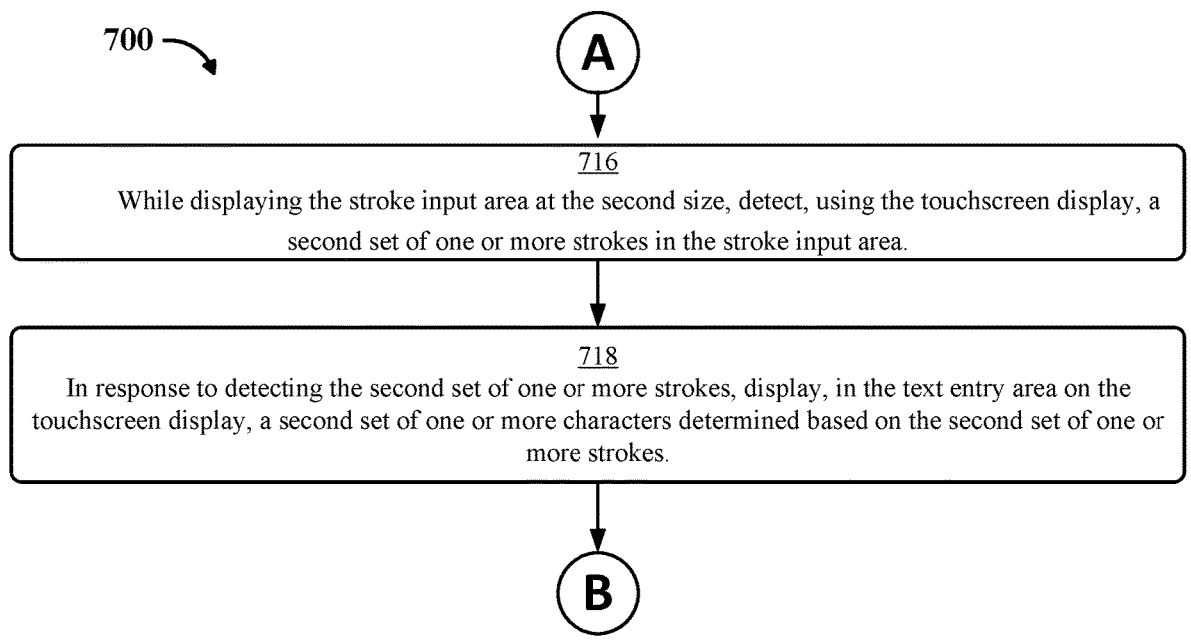
Figure 7C:
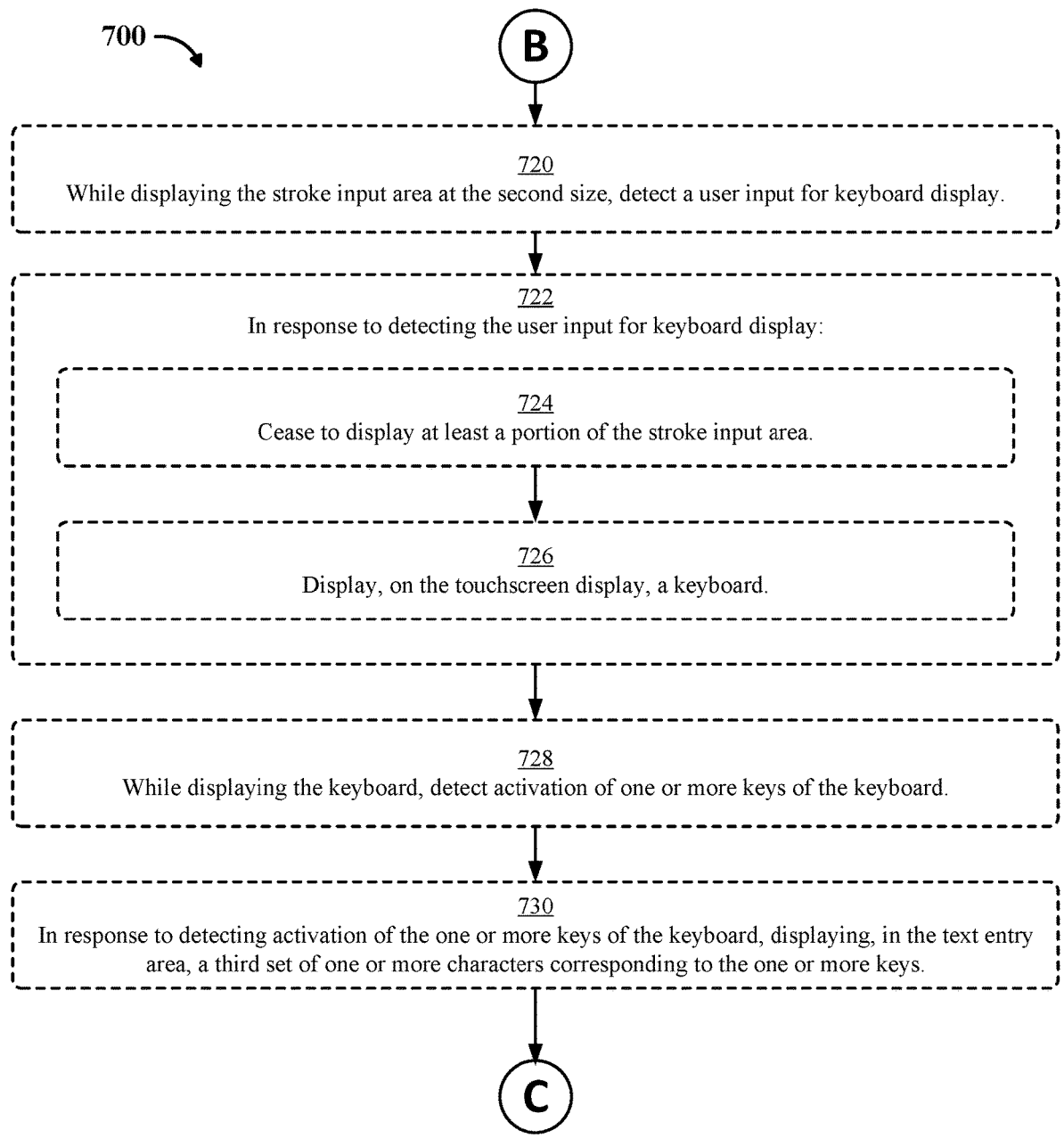
Figure 7D:
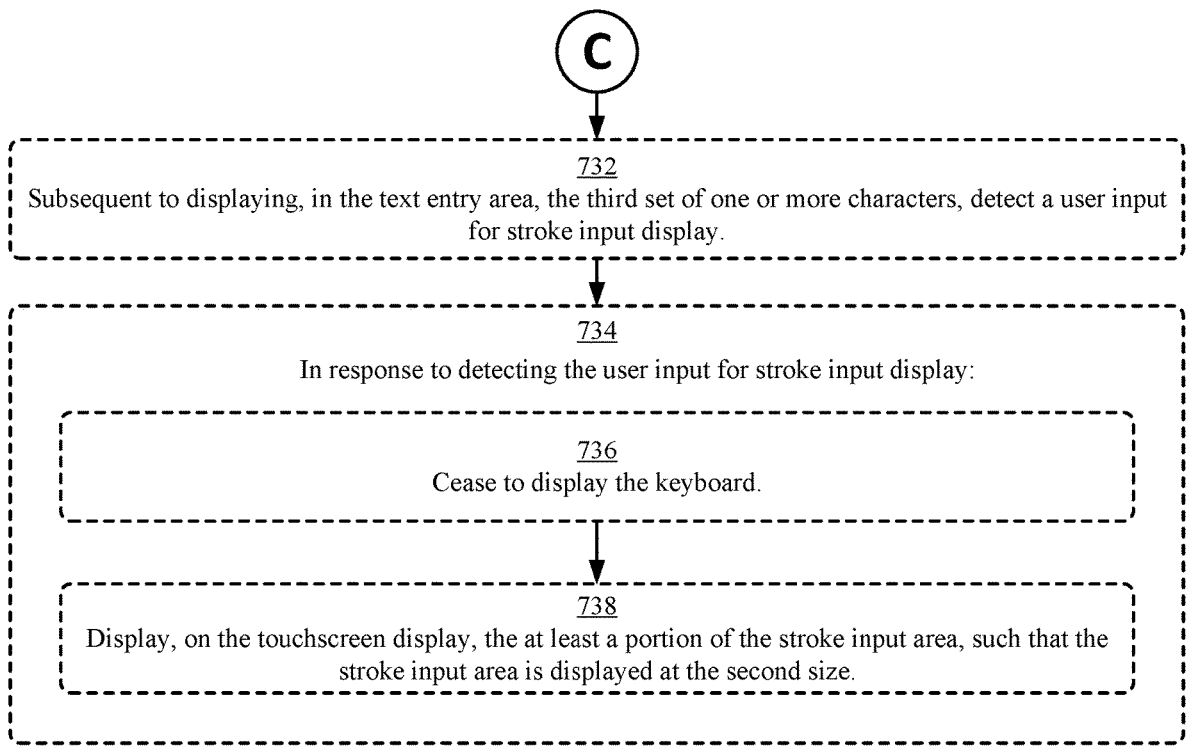

As illustrated in FIG. 6Q, in response to transitioning to landscape mode, device 600 displays stroke input area 604*a* at a size that is larger (e.g., in area) than the large size. FIG. 6Q also illustrates that device 600 ceases to display grabber 604*e*, thereby disabling the ability to resize stroke input area 604*a*. In some examples, device 600 at FIG. 6Q continues to display the FIG. 6R illustrates an alternative user interface to that of FIG. 6Q. In response to transitioning to landscape mode, device 600 displays stroke input area 604*a* on a right-portion of the display while displaying text entry area 602 on a left-portion of the display. Device 600 also displays one or more punctuation keys 604*f* on the right side of the display. Punctuation keys 604*f*, when activated, display a corresponding punctuation mark in text entry area 602.

FIG. 6S illustrates an alternative user interface, whereby expanding the stroke input area does not shift content 602*f* of text entry area up and, as a result, stroke input area 604*a* overlays content 602*f* In some examples, content 602*f* becomes lighter in color when overlaid by stroke input area 604*a*. In this example, candidate terms 612 are displayed near the bottom of the stroke input area 604*a*.

FIGS. 7A-7D are a flow diagram illustrating a method for receiving handwriting input using an electronic device in accordance with some embodiments. Method 700 is performed at a device (e.g., 100, 300, 500, 600) with a touchscreen display. Some operations in method 700 are, optionally, combined, the orders of some operations are, optionally, changed, and some operations are, optionally, omitted.

As described below, method 700 provides an intuitive method for receiving handwriting input. The method reduces the cognitive burden on a user for receiving handwriting input, thereby creating a more efficient human-machine interface. For battery-operated computing devices, enabling a user to access media controls faster and more efficiently conserves power and increases the time between battery charges.

The electronic device (e.g., 600) concurrently displays (702), on the touchscreen display a text entry area (704) (e.g., 602 of FIG. 6A, at an enlarged text entry size) and stroke input area (e.g., 604a of FIG. 6A) at a first size (706) (e.g., a reduced stroke input area size).

While displaying the stroke input area at the first size, the electronic device detects (708), using the touchscreen display, a first set of one or more strokes (e.g., 650a, handwritten strokes which include movement over time on the touch-sensitive surface) in the stroke input area.

In response to detecting the first set of one or more strokes, the electronic device displays (710), in the text entry area on the touchscreen display, a first set of one or more characters (e.g., 602a, alphanumeric characters, emoji characters, Chinese characters, Japanese characters) determined based on the first set of one or more strokes (e.g., using handwriting recognition).

In some embodiments, as a part of displaying, in the text entry area on the touchscreen display, the first set of one or more characters (e.g., 602a) in response to detecting the first set of one or more strokes, the electronic device displays, in the text entry area on the touchscreen display, the first set of one or more characters a variable period of time after detecting (e.g., detecting an end of, detecting a beginning of) the first set of one or more strokes in the stroke input area. In some embodiments, the variable period of time is based on (e.g., an average of, a delay time plus an average of) a plurality of periods of time determined based on (calculated, measured) previously detected ends of strokes and beginnings of subsequent strokes. In some embodiments, as the device detects the user is providing strokes at a faster rate, the device reduces the duration of the variable period of time to accommodate the user's faster writing. Thus, a first period of time between the end of an initial stroke and the beginning of the next stroke is added to the plurality of periods of time for determining the variable period of time before future detected handwriting is committed to the text entry area.

While displaying, on the touchscreen display, the first set of one or more characters, the electronic device detects (712) a first drag gesture (e.g., 650b, a drag up gesture, a drag up gesture starting on a handle object corresponding to the stroke input area).

In some embodiments, in response to detecting the first drag gesture (e.g., 650b) while displaying the first set of one or more characters, the electronic device changes a display location (e.g., scrolling, in the same direction as the direction of the first gesture, scrolling up the same amount as the increase in height of the stroke input area), on the touchscreen display, of the first set of one or more characters (e.g., 602a moving up in FIGS. 6C-6F). In some embodiments, the first drag gesture increases the size (e.g., height) of the stroke input area and causes a corresponding reduction in size (e.g., height) of the text entry area. In some embodiments, the device scrolls up the contents of the text entry area (e.g., removing contents from the top of the text entry area and shifting up contents from the bottom of the text entry area) to continue to display the content at the bottom of the text entry area (e.g., the more recently entered content).

In some embodiments, in response to detecting the first set of one or more strokes (and optionally prior to displaying, in the text entry area on the touchscreen display, the first set of one or more characters), the electronic device displays, on the touchscreen display, a first set of one or more visual strokes (e.g., 610a) in the stroke input area (e.g., 604a) that correspond to the first set of one or more strokes (e.g., at the same location that the strokes were detected) and ceases to display, after a predetermined period of time, the first set of one or more visual strokes. In some embodiments, the first set of one or more characters are displayed in the text entry area in conjunction with ceasing to display the first set of one or more visual strokes. In some embodiments, ceasing to display the first set of one or more visual strokes includes fading out (e.g., over a fade out duration, such as 1 second) the first set of one or more visual strokes.

Displaying visual strokes in the stroke input area provides the user with feedback about the handwritten characters that the device is receiving. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting the first drag gesture, the electronic device resizes (714) the stroke input area from the first size (e.g., 604a of FIG. 6B, a reduced stroke input area size) to a second size (e.g., 604a of FIG. 6E, 6F, an enlarged stroke input area size) that is larger than the first size (and, optionally, reducing the size of the text entry area (e.g., 602) from the enlarged text entry size to a reduced text entry size that is smaller than the enlarged text entry size).

Resizing the stroke input area to be larger provides the user with more display space for providing handwriting strokes, thereby reducing input errors. Reducing input errors enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 600) displays, concurrently with the stroke input area at a first size (e.g., a reduced stroke input area size) on the touchscreen display, a handle object (e.g., 604e, that is positioned at an edge of the stroke input area, that is positioned at the top edge of the stroke input area). In some embodiments, in response to detecting the first drag gesture, the electronic device resizes the stroke input area from the first size (e.g., a reduced stroke input area size) to the second size (e.g., an enlarged stroke input area size) is in accordance with a determination that the first drag gesture starts at a location corresponding to the handle object (and optionally, in accordance with a determination that a magnitude of the first drag gesture exceeds a threshold magnitude). In some embodiments, in accordance with a determination that the first drag gesture does not start at a location corresponding to the handle object (e.g., stroke input 650*c* of FIG. 6C), the electronic device forgoes resizing the stroke input area (e.g., from the first size (e.g., a reduced stroke input area size) to the second size (e.g., an enlarged stroke input area size)). For example, if the start of the first drag gesture is detecting at a location other than the handle object, the first drag gesture results in a different operation, such as inputting a stroke, selecting text in the text entry area, or displaying notifications of the device (e.g., when the first drag gesture starts at a location at or adjacent to the top of the touchscreen display). In some embodiments, while displaying the stroke input area at the first size, the device begins to detect at least a portion of the first drag gesture (including a contact on the touchscreen in a first direction that starts at the handle object) and, while detecting the first drag gesture, the device expands the stroke input area in the first direction to an intermediate size (bigger than the first size, smaller than the second size, size being based on a magnitude of the first drag gesture) and maintains the intermediate size while the device continues to detect the contact on the touchscreen. In some embodiments, in response to detecting liftoff of the contact of the first drag gesture, in accordance with a determination that a magnitude (e.g., distance of travel) of the first drag gesture (e.g., distance of travel upward of the first drag gesture) in the first direction exceeds a threshold magnitude, resizing the stroke input area from the intermediate size to the second size, and in accordance with a determination that the magnitude (e.g., distance of travel) of the first drag gesture (e.g., distance of travel upward of the first drag gesture) in the first direction does not exceed the threshold magnitude (or a second threshold magnitude), resizing the stroke input area from the intermediate size to the first size. Thus, the device determines if the first drag gesture is sufficient to resize the stroke input area to the second size. If it is not sufficient, the device resizes the stroke input area back to the first size.

Resizing the stroke input area provides the user with the flexibility to transition between more display space for the text entry area and more display space for the stroke input area, thereby providing more space as needed to reduce input errors. Reducing input errors enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the stroke input area at the second size, the electronic device detects (716), using the touchscreen display, a second set of one or more strokes (e.g., 650*c*, handwritten strokes which include movement over time on the touch-sensitive surface) in the stroke input area.

In some embodiments, while displaying the stroke input area at the second size (e.g., and while the device is in the second mode), the electronic device detects a second drag gesture (e.g., 650*k*, that is in the opposite direction of the first drag gesture, that starts at a location corresponding to a displayed handle object). In some embodiments, in response to detecting the second drag gesture (e.g., 650*k*), the electronic device resizes the stroke input area from the second size (e.g., an enlarged stroke input area size) to the first size (e.g., a reduced stroke input area size) that is smaller than the second size (and, optionally, increasing the size of the text entry area from the reduced text entry size to the enlarged text entry size that is larger than the reduced text entry size).

In some embodiments, while displaying the stroke input area at the second size, the device begins to detect at least a portion of the second drag gesture (including a contact on the touchscreen in a second direction that starts at the handle object) and, while detecting the second drag gesture, the device reduces the stroke input area in the second direction to a second intermediate size (bigger than the first size, smaller than the second size, size being based on a magnitude of the second drag gesture) and maintains the intermediate size while the device continues to detect the contact on the touchscreen. In response to detecting liftoff of the contact of the second drag gesture, in accordance with a determination that a magnitude (e.g., distance of travel) of the second drag gesture (e.g., distance of travel downward of the second drag gesture) in the second direction exceeds a second threshold magnitude, resizing the stroke input area from the second intermediate size to the first size, and in accordance with a determination that the magnitude (e.g., distance of travel) of the second gesture (e.g., distance of travel downward of the second drag gesture) in the second direction does not exceed the second threshold magnitude, resizing the stroke input area from the second intermediate size to the second size. Thus, the device determines if the second drag gesture is sufficient to resize the stroke input area to the first size. If it is not sufficient, the device resizes the stroke input area back to the second size.

Resizing the stroke input area provides the user with the flexibility to transition between more display space for the text entry area and more display space for the stroke input area, thereby providing more space as needed to reduce input errors. Reducing input errors enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting the second set of one or more strokes, the electronic device displays (718), in the text entry area on the touchscreen display, a second set of one or more characters (e.g., 602*b*, alphanumeric characters, emoji characters, Japanese characters) determined based on the second set of one or more strokes (e.g., using handwriting recognition).

In some embodiments, while displaying the stroke input area at the second size (and optionally displaying the text entry area at the reduced text entry size), the electronic device detects (720) a user input for keyboard display (e.g., 604*c* of FIG. 6J, a request to display a QWERTY keyboard). In some embodiments, in response to (722) detecting the user input for keyboard display, the electronic device: ceases (724) to display at least a portion of the stroke input area (e.g., FIG. 6J, while maintaining display of at least a second portion of the stroke input area) (and optionally ceasing to display the handle object) and displays (726), on the touchscreen display, a keyboard (e.g., 604C of FIG. 6J, at size smaller than the second size) (and optionally continuing to display the text entry area (e.g., 602 at FIG. 6J) at the reduced text entry size, or optionally resizing the text entry area (e.g., to the enlarged text entry size)). In some embodiments, while displaying the keyboard, the electronic device detects (728) activation (e.g., 650*g*) of one or more keys of the keyboard. In some embodiments, in response to detecting activation of the one or more keys of the keyboard, the electronic device displays (730), in the text entry area, a third set of one or more characters (e.g., 602*d*) corresponding to the one or more keys. In some embodiments, subsequent to displaying, in the text entry area, the third set of one or more characters, the electronic device detects (732) a user input (e.g., 650i, 650h) for stroke input display (e.g., a request to display the stroke input area). In some embodiments, in response to (734) detecting the user input for stroke input display, the electronic device ceases (736) to display the keyboard (while continuing to display the third set of one or more characters in the text entry area) and displays (738) (e.g., re-displaying; reintroducing), on the touchscreen display, the at least a portion of the stroke input area, such that the stroke input area is displayed at the second size (and optionally the handle object) (and optionally continuing to display the text entry area at the reduced text entry size). In some embodiments, the size of the stroke input area is persistent. Thus, when the device switches between various input techniques (e.g., stroke input area, QWERTY keyboard, and Chinese keyboard), the size of the previous state of the stroke input area is retained and the stroke input area is displayed at the size of the previous state. In some embodiments, the grabber object is displayed while displaying stroke input area and ceases to be displayed when no longer displaying the stroke input area (e.g., when the QWERTY keyboard is displayed). In some embodiments, the size of the stroke input area is not persistent and, therefore, switching between keyboards resets the size of the stroke input area (e.g., to the first size). In some embodiments, while the keyboard is displayed, the electronic device receives user input (e.g., multiple times) to switch between two configurations of the keyboard (e.g., numbers configuration that shows numbers, alphabetical configuration that shows alphabetical characters). In response to the user input to switch between two configurations of the keyboard, the device does not resize the keyboard and does not resize any stroke input area (e.g., when a portion of the stroke input area is displayed, such as above the keyboard). In some embodiments, the user input for stroke input display includes a second set of one or more strokes (e.g., in a region outside of the keyboard, in a region of the stroke input area). In some embodiments, the user input for stroke input display includes a user input for keyboard dismissal (e.g., an input corresponding to an affordance (e.g., a key of the keyboard) that, when selected, causes the keyboard to be dismissed or replaced with the stroke input area).

In some embodiments, while the electronic device is in a first mode (e.g., a mode corresponding to a portrait orientation of the electronic device, as in FIGS. 6A-6P), the electronic device displays, concurrently with the stroke input area (e.g., at the first size, at the second size) on the touchscreen display, a handle object (e.g., 604e, that is positioned at an edge of the stroke input area, that is positioned at the top edge of the stroke input area), whereby drag gestures (e.g., 650k) that correspond to the handle object (e.g., starting at the handle object), when detected, resize the stroke input area. In some embodiments, the electronic device detects a change in mode of the electronic device from the first mode (e.g., a mode corresponding to a portrait orientation of the electronic device) to a second mode (e.g., a mode corresponding to a landscape orientation of the electronic device) that is different from the first mode. In some examples, the electronic device changes from the first mode to the second mode in response to detecting a change in orientation of the electronic device from a portrait orientation to a landscape orientation. In some embodiments, in response to detecting the change in mode of the electronic device to the second mode, the electronic device ceases to display the handle object while continuing to display the stroke input area (e.g., at the previously displayed size, at a larger size, at a smaller size). In some embodiments, as a part of continuing to display the stroke input area in response to detecting the change in mode of the electronic device to the second mode, the electronic device resizes (e.g., enlarges, expands), on the touchscreen display, the stroke input area to a third size that is larger than the first size (and, optionally, the second size).

Note that details of the processes described above with respect to method 700 (e.g., FIGS. 7A-7D) are also applicable in an analogous manner to the methods described below. For example, methods 900 and 1100 optionally include one or more of the characteristics of the various methods described above with reference to method 700. For brevity, these details are not repeated below.

FIGS. 8A-8V illustrate exemplary devices and user interfaces for accessing predictive text candidates, in accordance with some embodiments. The user interfaces in these figures are used to illustrate the processes described below, including the processes in FIGS. 9A-9B.

At FIG. 8A, electronic device 600 is displaying notes application 802 with keyboard 804 and a row 810 of candidates 810a-810f (e.g., text candidates). In some embodiments, the candidates are predictive text candidates. In some examples, device 600 determines the candidates based on recently (or currently) entered content (e.g., in notes application 802). In some examples, predictive text candidates include a predicted term for the next term that the user may want to enter. In some examples, predictive text candidates include a predicted term that the user may want to use to take the place of another term. In some examples, predictive text candidates include a term to complete a partially entered term. In some examples, predictive text candidates include a predicted emoji character. In some embodiments, predictive text candidates are based on a user's recent activity on device 600 (or other associated devices) and information from applications that have run on device 600. Predictive text candidates allow users to more quickly enter information into device 600, while minimizing (or correcting) typographical errors. At FIG. 8A, device 600 detects the beginning of drag gesture 850a, which starts on first row 810 of the candidates.

Figure 8B:
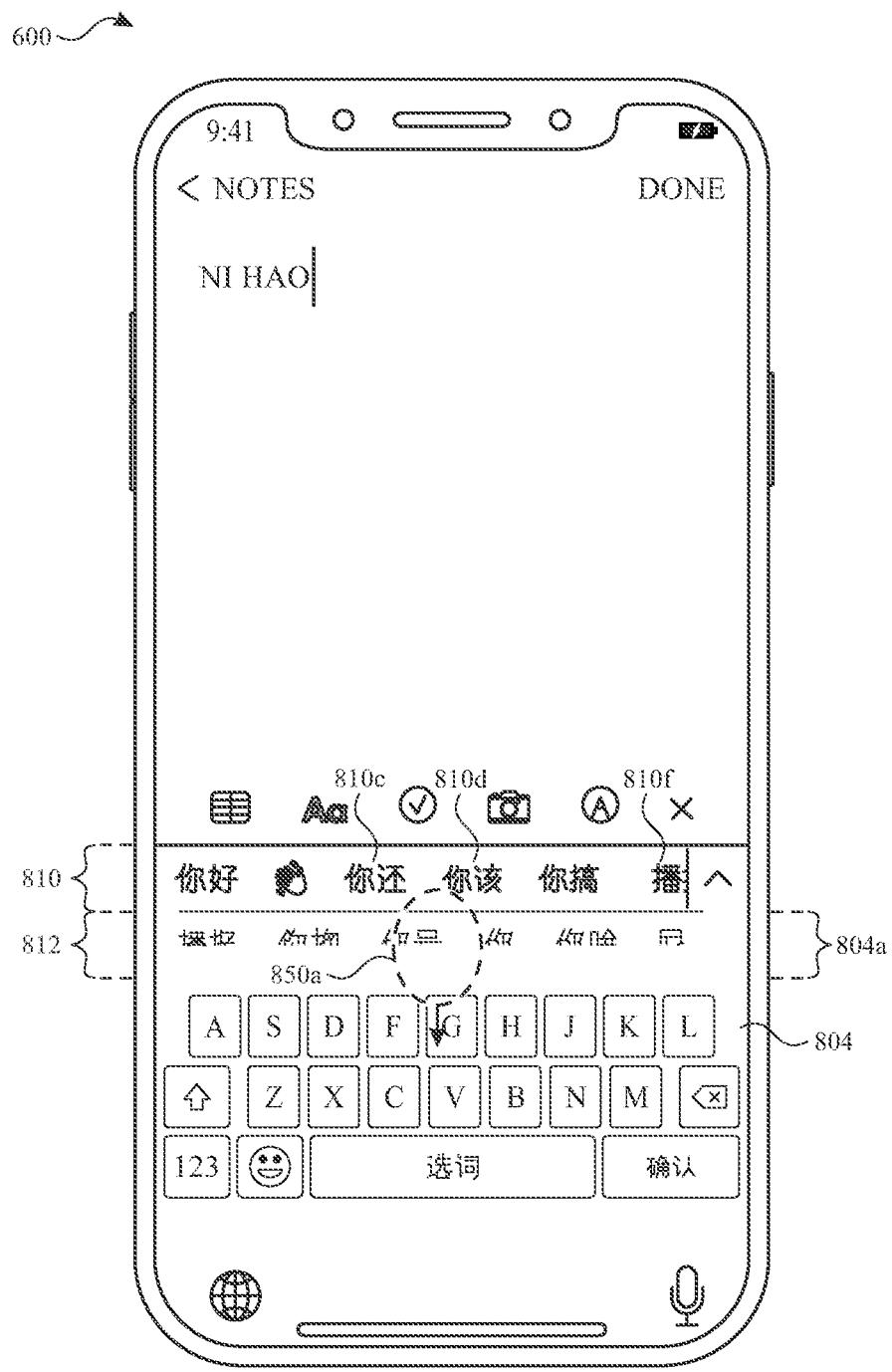

At FIG. 8B, in response to detecting drag gesture 850a, device 600 begins to display a second row 812 of candidates. Second row 812 is displayed progressively. A first portion of second row 812 is displayed before a second portion of row 812 is displayed. In FIG. 8B, a top portion of second row 812 is displayed while a bottom portion of second row 812 is not yet displayed. The progressive display of second row 812 is based on the movement (and location) of drag gesture 850a. As drag gesture 850a progresses downward, progressively more of second row 812 (e.g., lower parts of the row) is displayed. In some embodiments, as drag gesture 850 progresses downward, device 600 progressively ceases to display rows (and portions of rows) of keyboard 804. At FIG. 8B, keyboard row 804a is no longer displayed. In some embodiments, a top portion of keyboard row 804a would cease to be displayed while a bottom portion of keyboard row 804a continues to be displayed, as the second row 812 of candidates is displayed. Thus, the second row 812 of candidates is progressively revealed in conjunction with movement of gesture 850a and the first row 804a of keyboard 804 is progressively concealed (ceased to be displayed) in conjunction with movement of gesture 850a.

At FIG. 8B, in response to detecting drag gesture 850a, device 600 begins to shift (e.g., to the right) one or more of candidates of the first row 810 of candidates. As drag gesture 850a progresses, the spacing between some (e.g., all) candidates of the first row 810 increases. For example, in FIG. 8B, the spacing between candidates 810c and 810d has increased as compared to FIG. 8A. As a result, candidate 810f is sliding to the right as drag gesture 850a progresses. As candidate 810f slides to the right, a portion of candidate 810f is concealed (ceases to be displayed). In FIG. 8B, a right portion of candidate 810f is no longer displayed (as compared to FIG. 8A) while a left portion of candidate 810f continues to be displayed. In these examples, the sizes of the candidates optionally remains constant. At FIG. 8B, an optional layer with a level of opacity (e.g., 50%) has been added over keyboard 804.

Figure 8C:
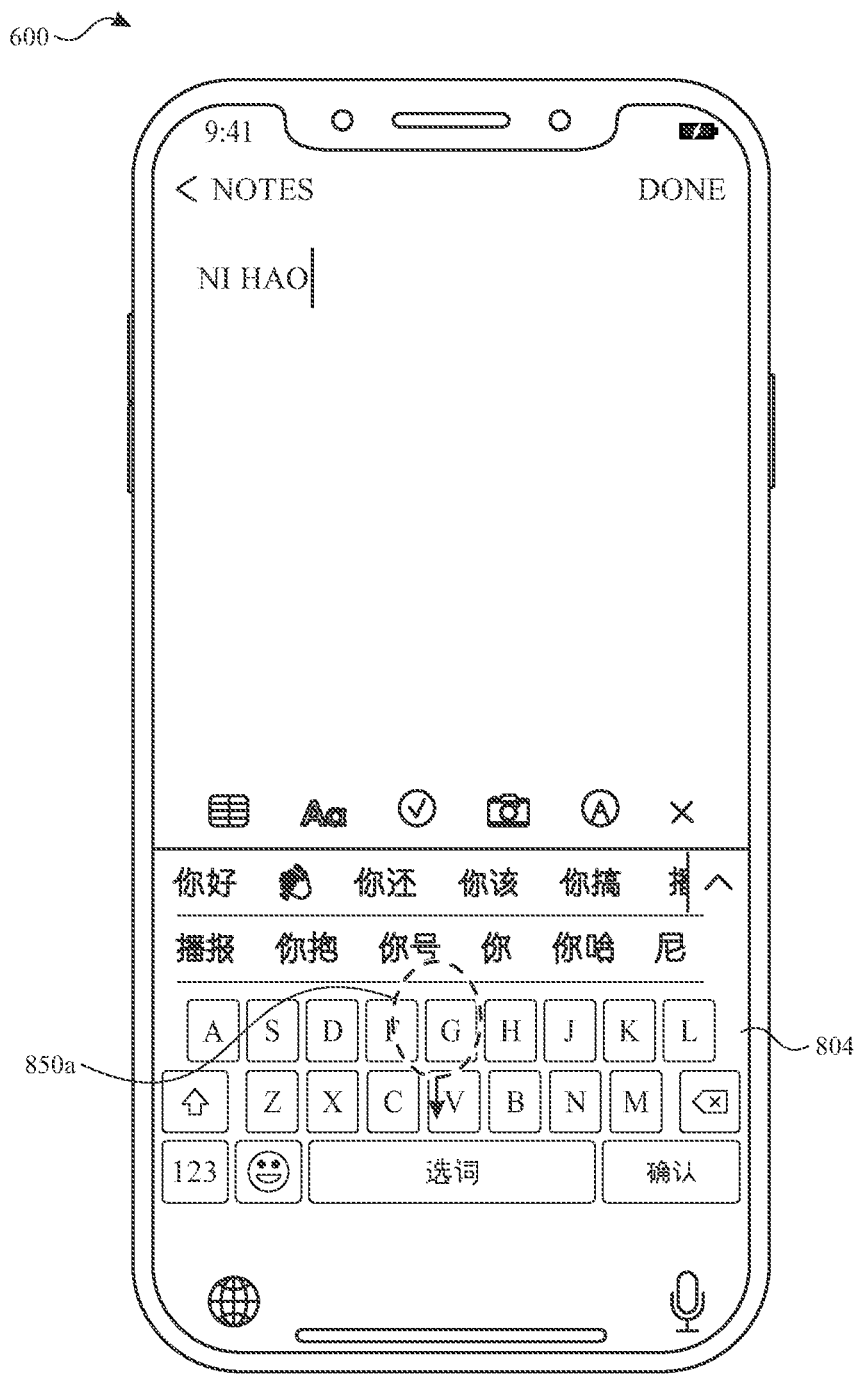

At FIG. 8C, drag gesture 850a has progressed further downward, causing the second row 812 of the candidates to be displayed. In addition, the opacity of the layer over keyboard 804 has increased (e.g., to 75%), causing less of keyboard 804 to be visible. In some examples a gradient (e.g., a linear gradient) is applied to candidate rows as they are revealed.

Figure 8D:
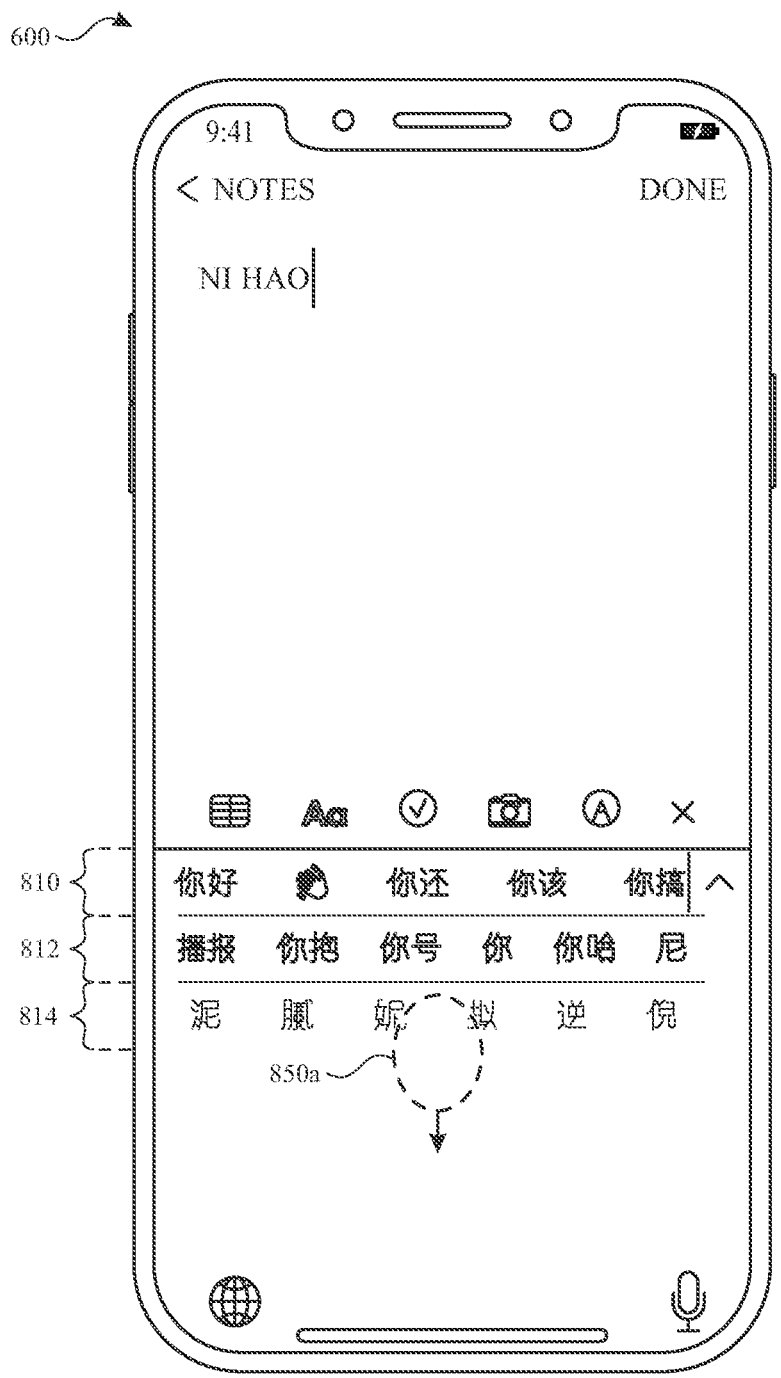

At FIG. 8D, drag gesture 850a has progressed further downward, causing third row 814 of the candidates to be displayed. In addition, the opacity of the layer over keyboard 804 has increased further (e.g., to 100%), causing less (or none) of keyboard 804 (e.g., keys of keyboard 804) to be visible.

Figure 8E:
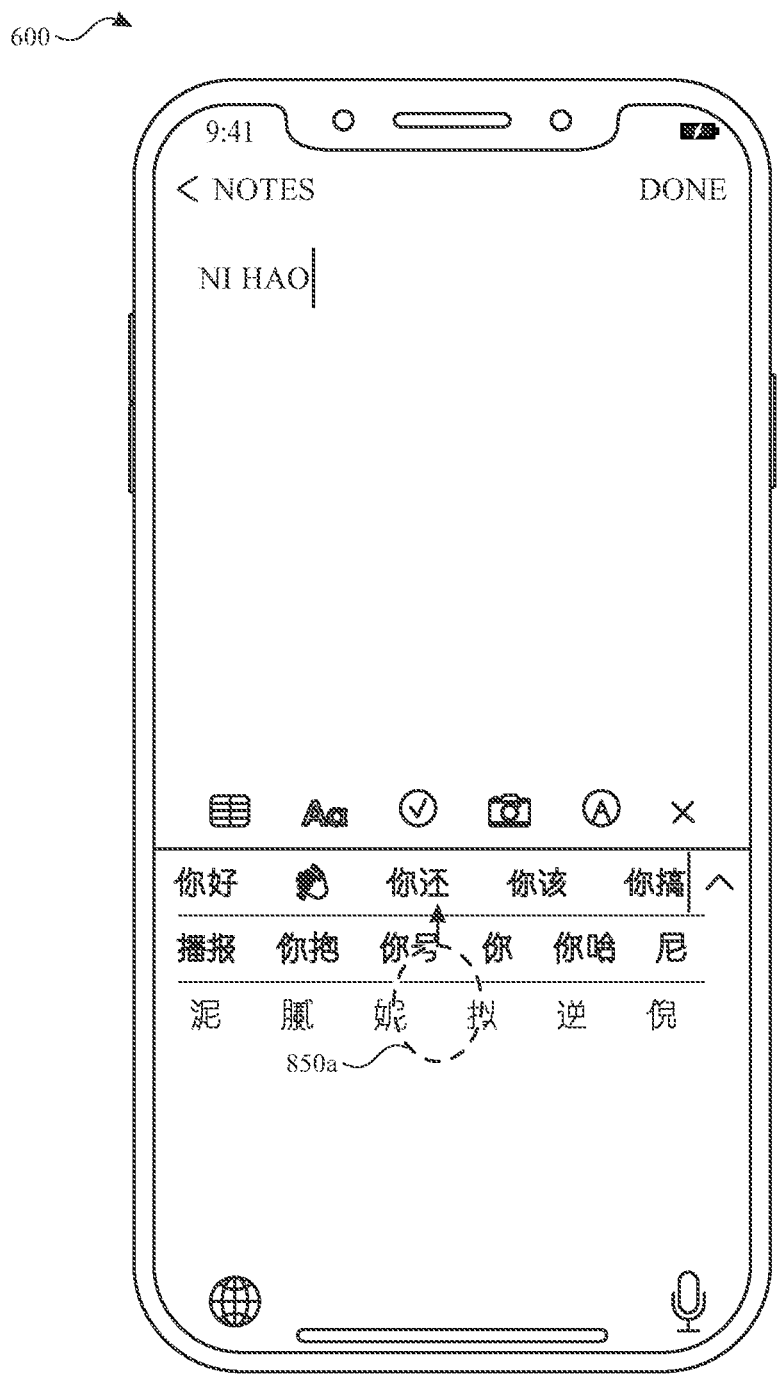
Figure 8F:
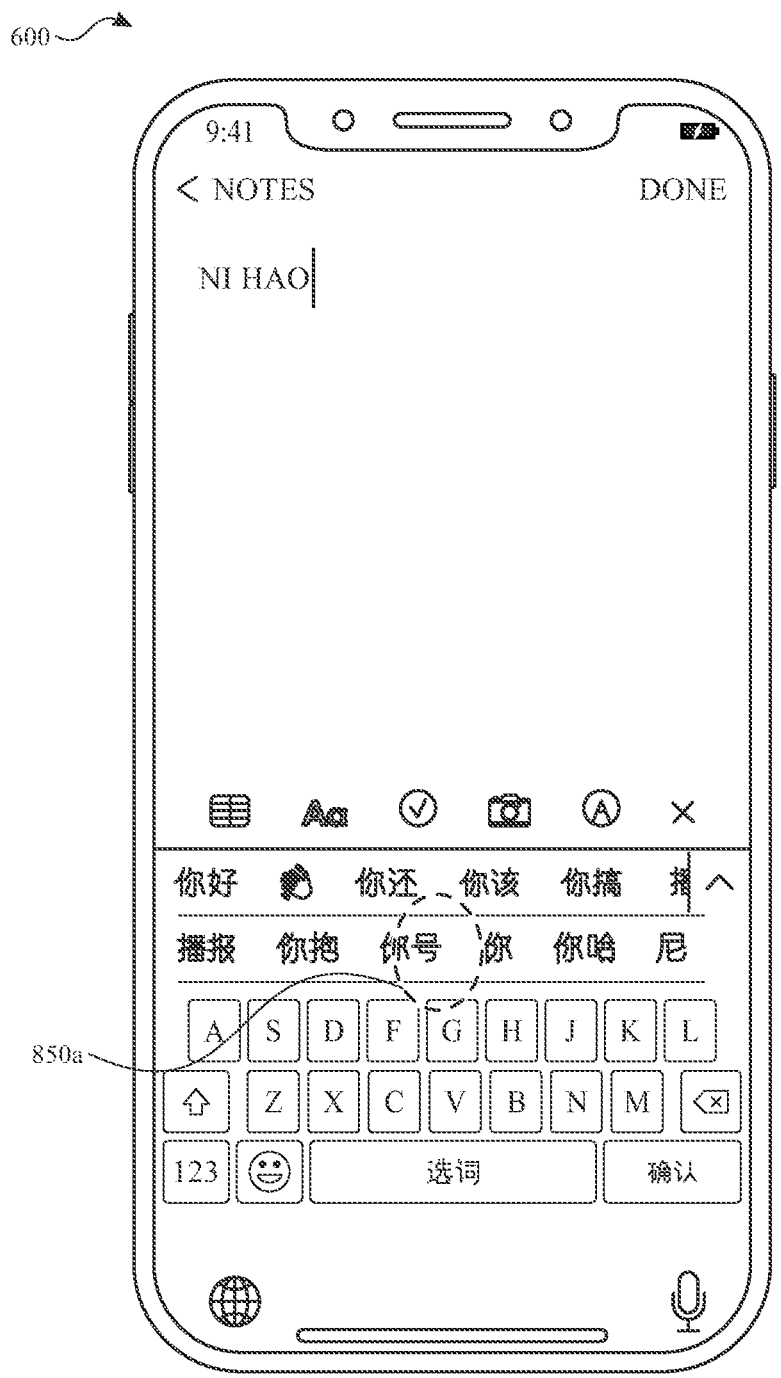
Figure 8G:

At FIG. 8E, drag gesture 850a begins to move upward (in the opposite direction), without device 600 detecting lift-off of the contact of drag gesture 850a. As drag gesture 850a progresses upward, device 600 progressively ceases to display candidate rows (e.g., in conjunction with the upward movement of drag gesture 850a). As shown in FIGS. 8E-8H, individual rows are also progressively ceased to be displayed. As drag gesture 850a progresses upwards, a bottom portion of a respective row ceases to be displayed while a top portion of the row continues to be displayed, then the top portion of the respective row also ceases to be displayed in conjunction with the upward movement of drag gesture 850a. Further, as drag gesture 850a progresses upwards, device 600 reduces the distance among some (or all) candidates of first row 810, thereby causing candidate 810f to slide back into view. In addition, the opacity of the layer over keyboard 804 progressively decreases in junction with the upward movement of drag gesture 850a, causing more (or all) of keyboard 804 (e.g., keys of keyboard 804) to become visible.

Figure 8H:
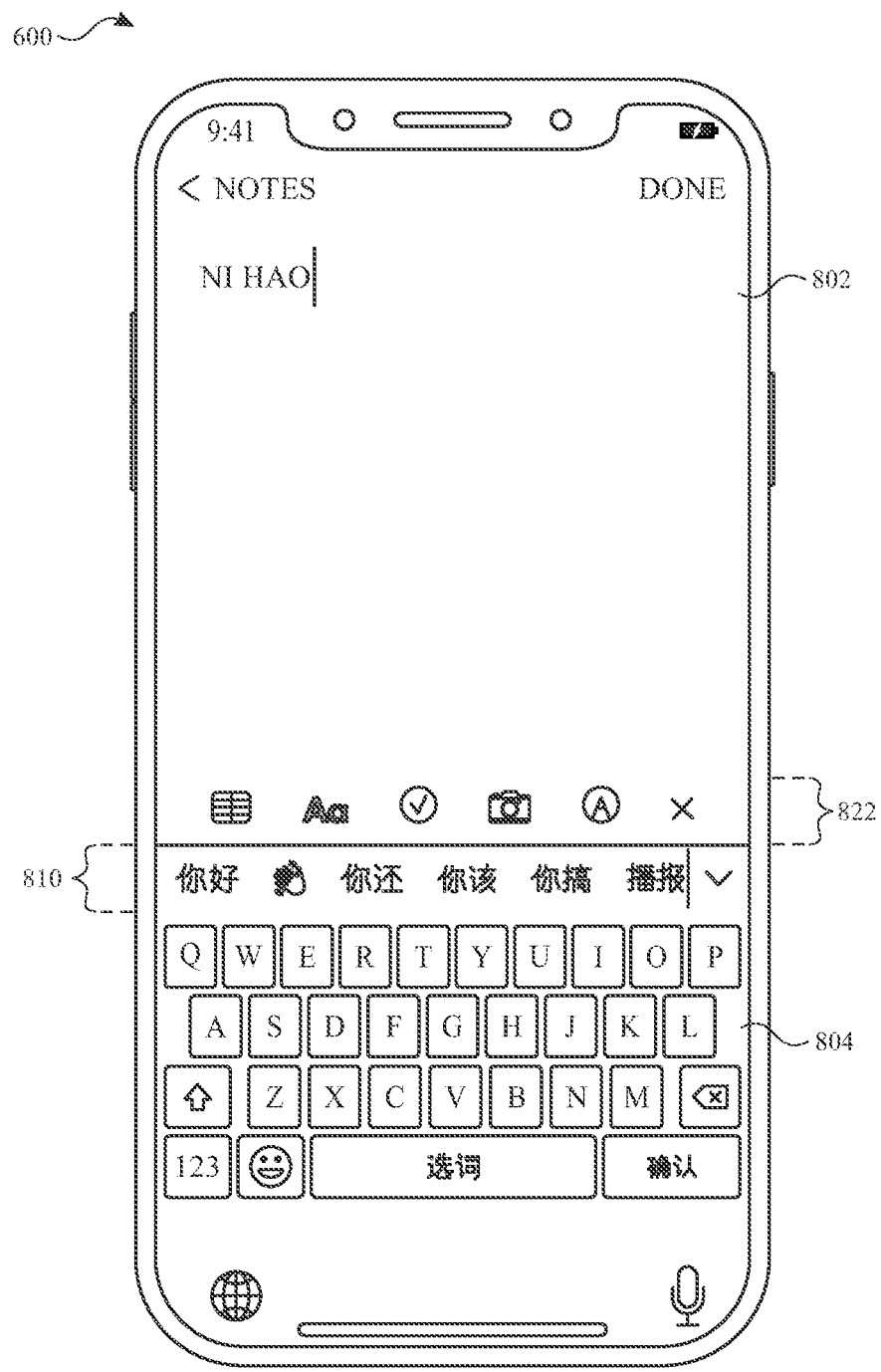

At FIG. 8H, device 600 detects lift-off of drag gesture 850a and, in response, in accordance with a determination that the location of drag gesture 850a on lift-off is above a threshold location (e.g., close to the first row 810 of candidates), device 600 ceases to display the second row 812 (and subsequent rows) of candidates.

Figure 8I:
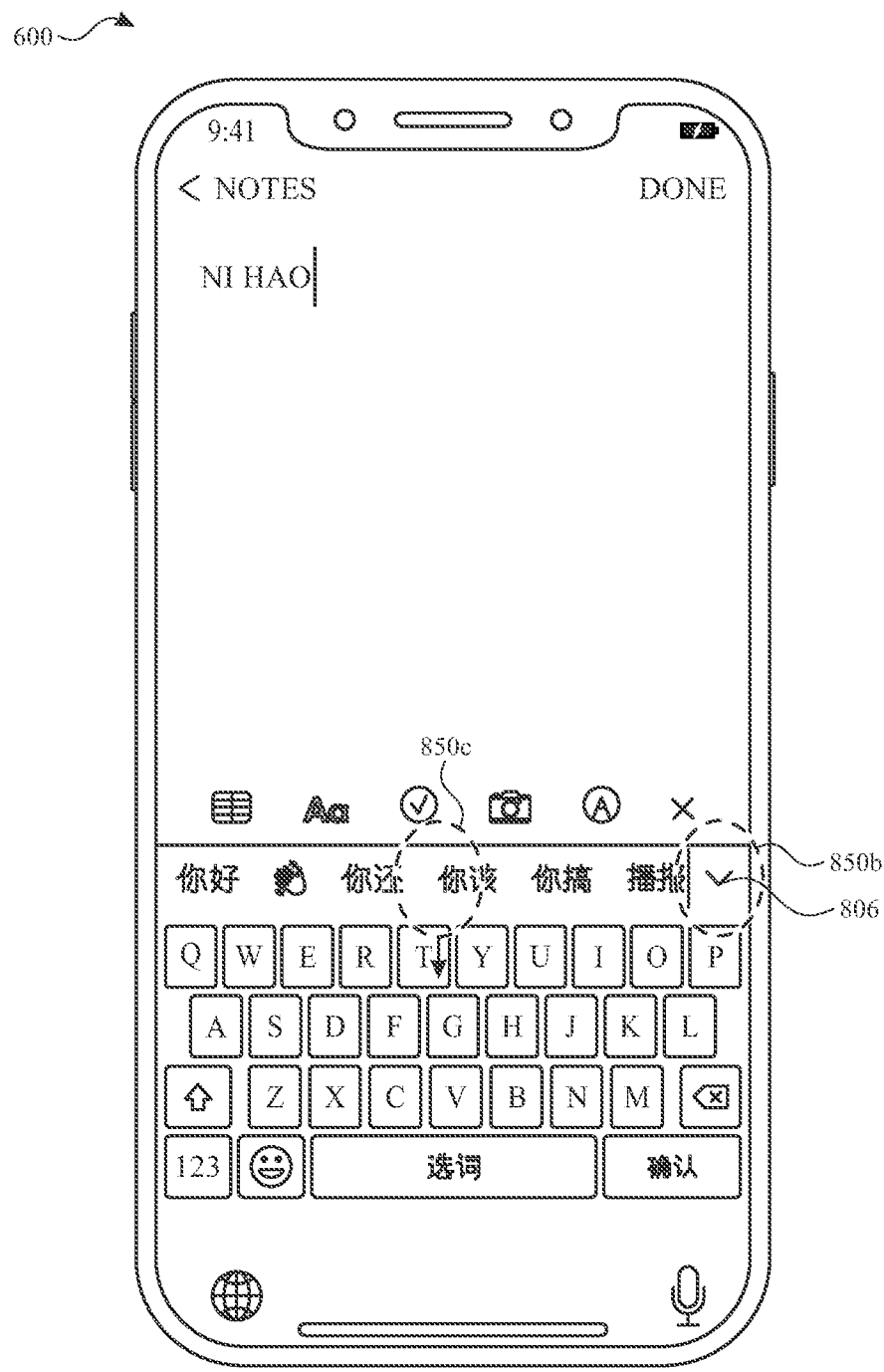
Figure 8J:
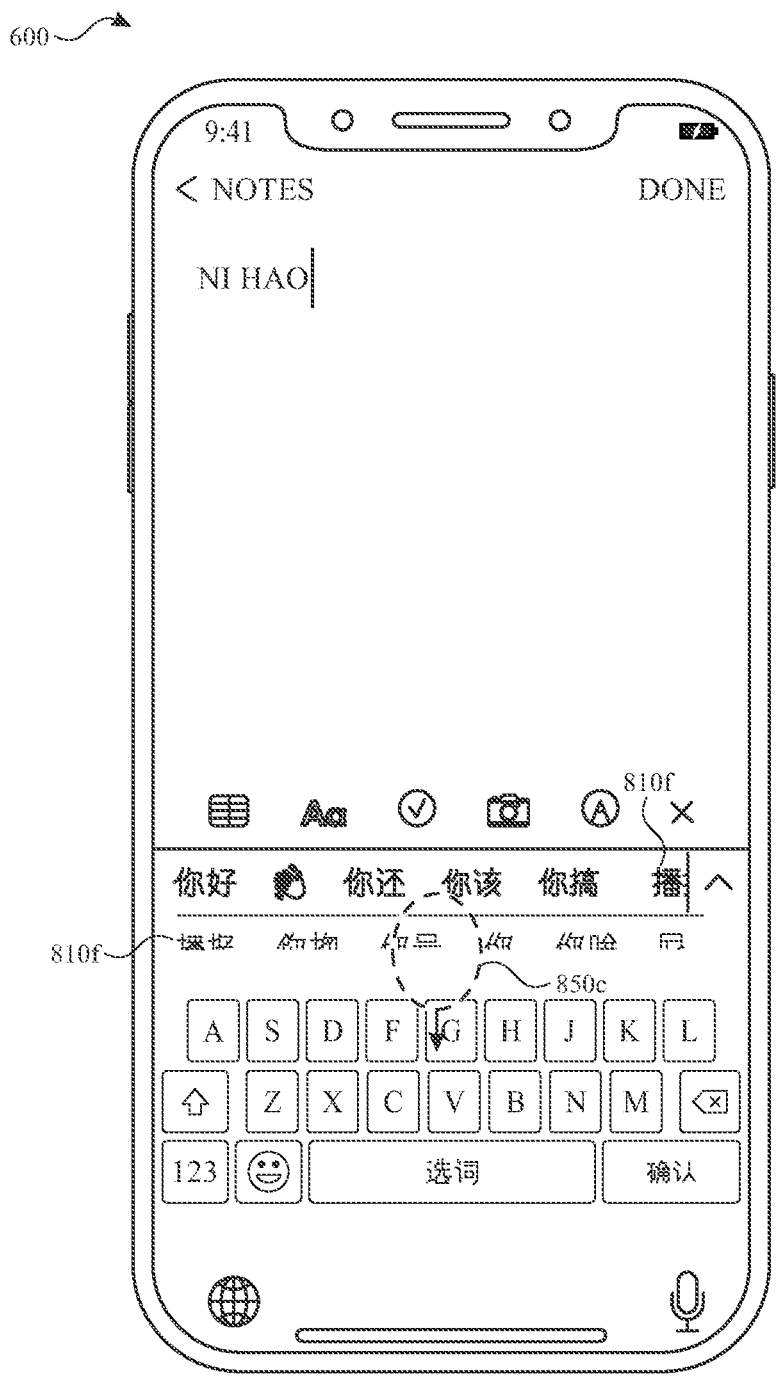
Figure 8K:
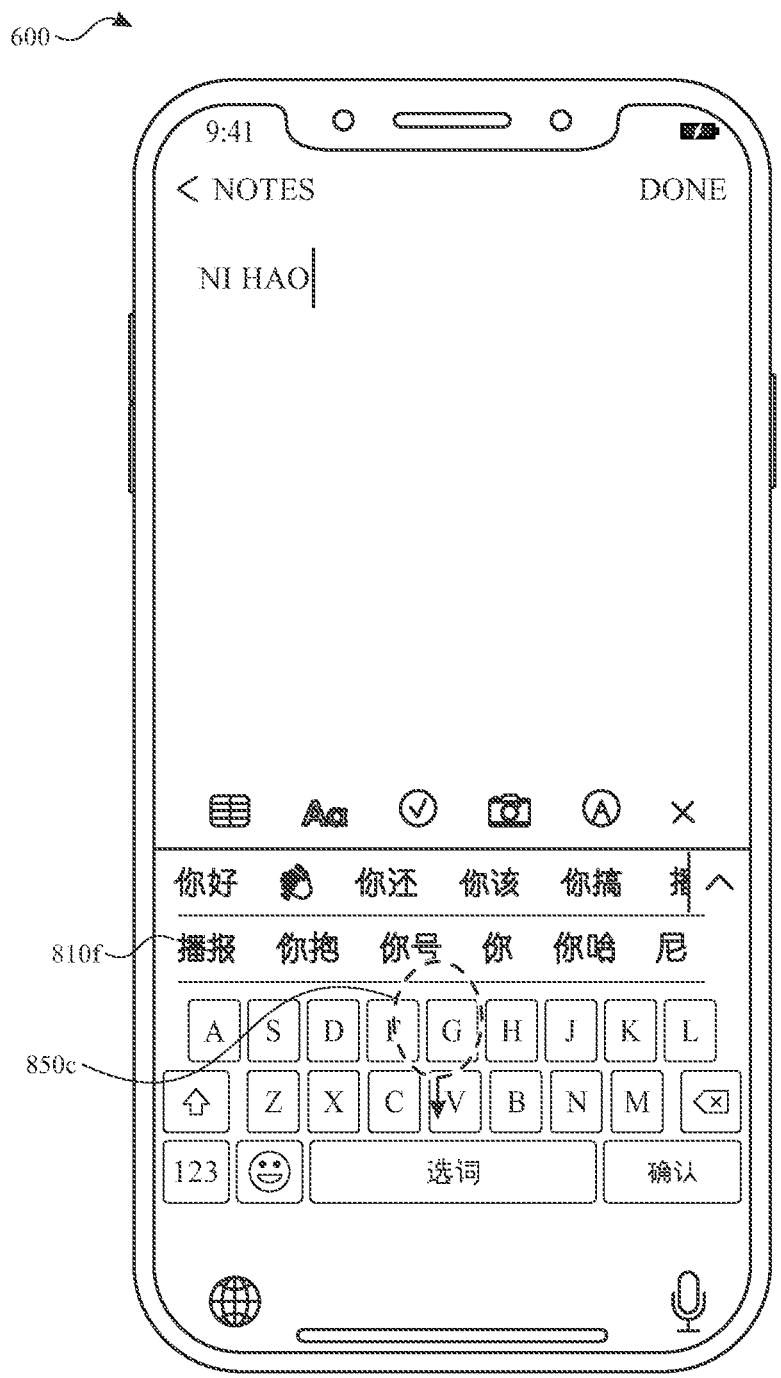
Figure 8L:
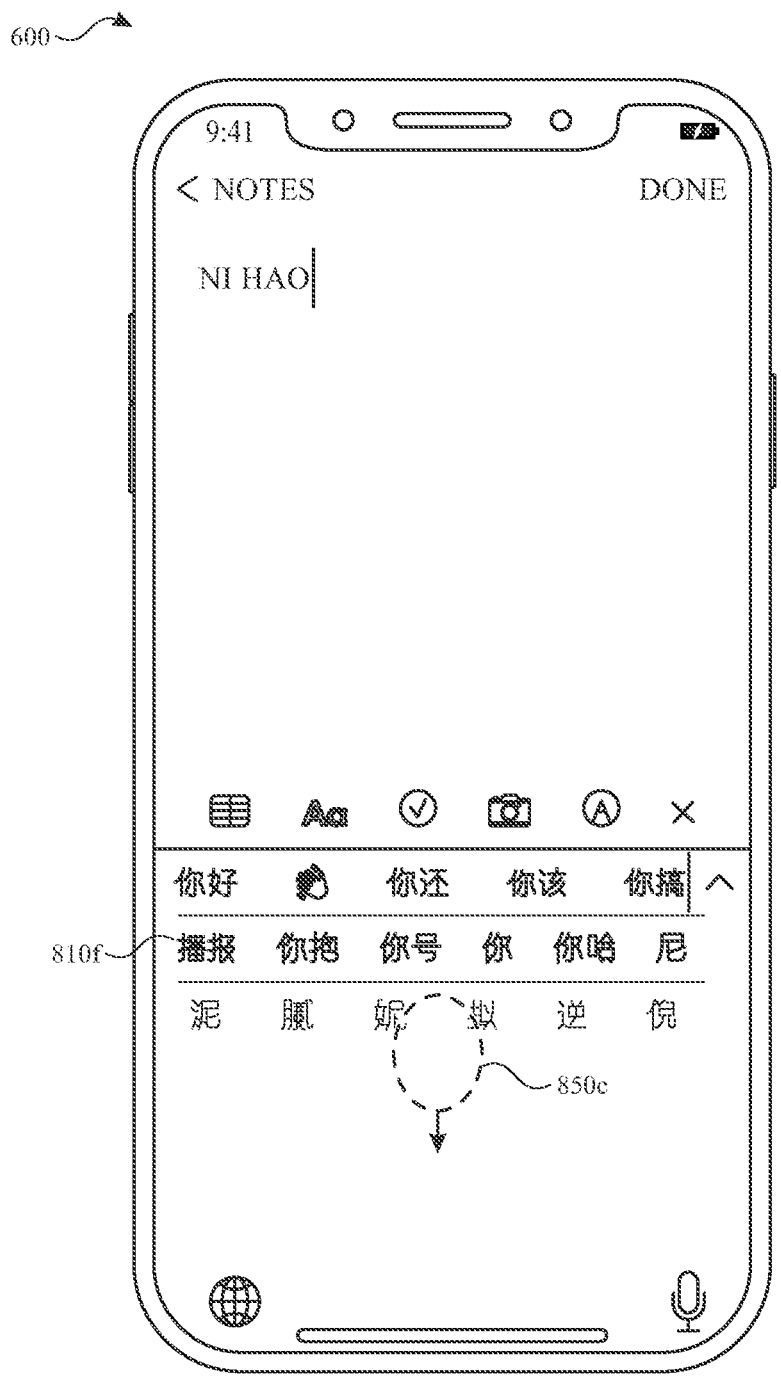
Figure 8M:
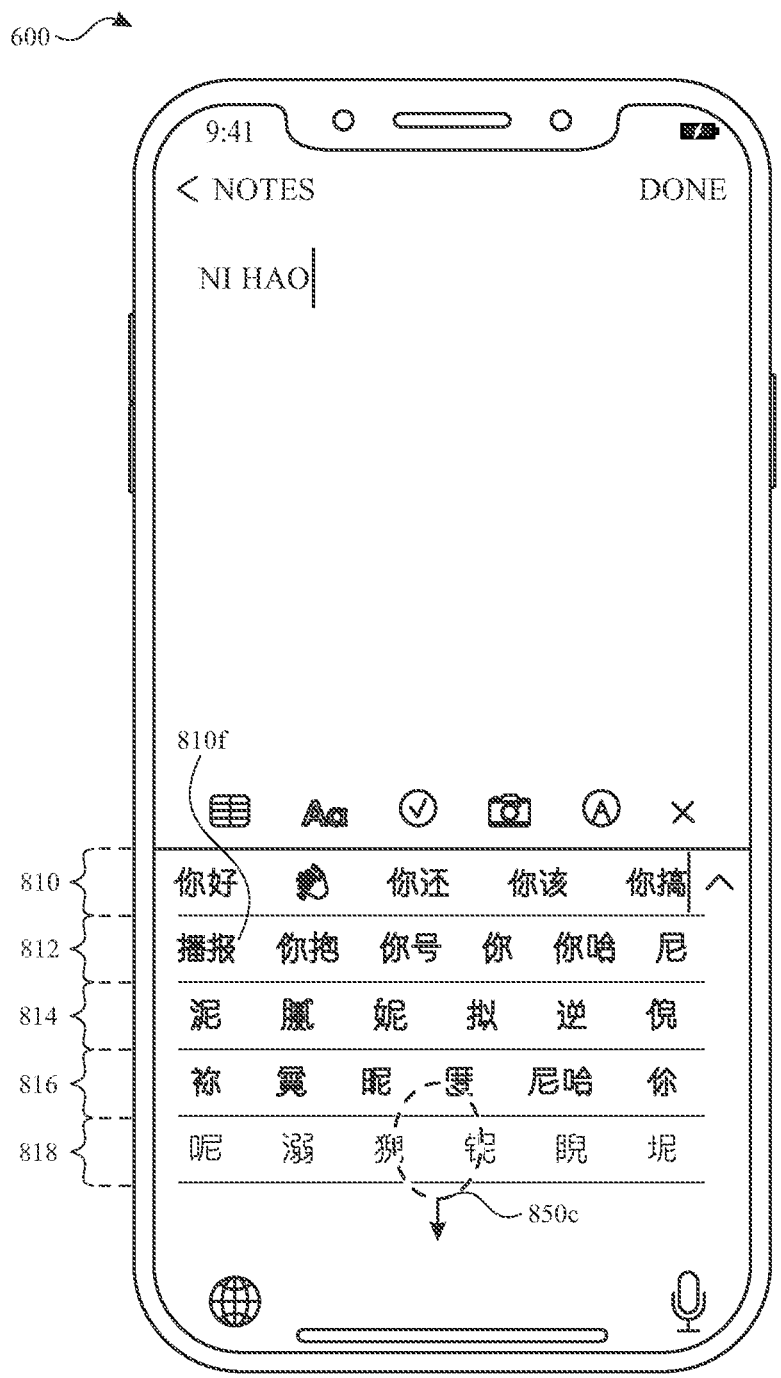

At FIG. 8I, chevron 806 is pointing down (prior to being tapped on). Chevron 806 is displayed in line with first row 810 of candidates. At FIG. 8I, device 600 detects tap 850b on chevron 806. In response to detecting tap 850b on chevron 806, device 600 changes chevron 806 to face up and begins an animation to progressively reveal multiple candidate rows, by revealing the rows sequentially and, revealing a top part of a row before revealing a bottom part of the row. As a result, device 600 transitions to replace keyboard 804 based in response to tap 850b. Tap 850b does not have a movement component or device 600 does not use any movement of tap 850b to adjust the duration of the animation to cause display of the additional rows, such as the transition from FIGS. 8I to 8N.

Returning to FIG. 8I, in response to detecting drag gesture 850c (in the downward direction, toward keyboard 804), device 600 again begins to progressively displaying additional candidate rows in conjunction with movement of drag gesture 850c, as discussed above with respect to drag gesture 850a. Drag gesture 850c progresses through FIGS. 8I to 8M, and the device detects liftoff of drag gesture 850c at FIG. 8N. As illustrated in FIGS. 8B-8H and 8J-8O, candidate 810f (the far right candidate in first row 810) progressively ceases to be displayed as additional candidate rows are revealed and the same candidate 810f is progressively revealed (displayed) in the second row (the far left candidate in second row 810).

Figure 8N:
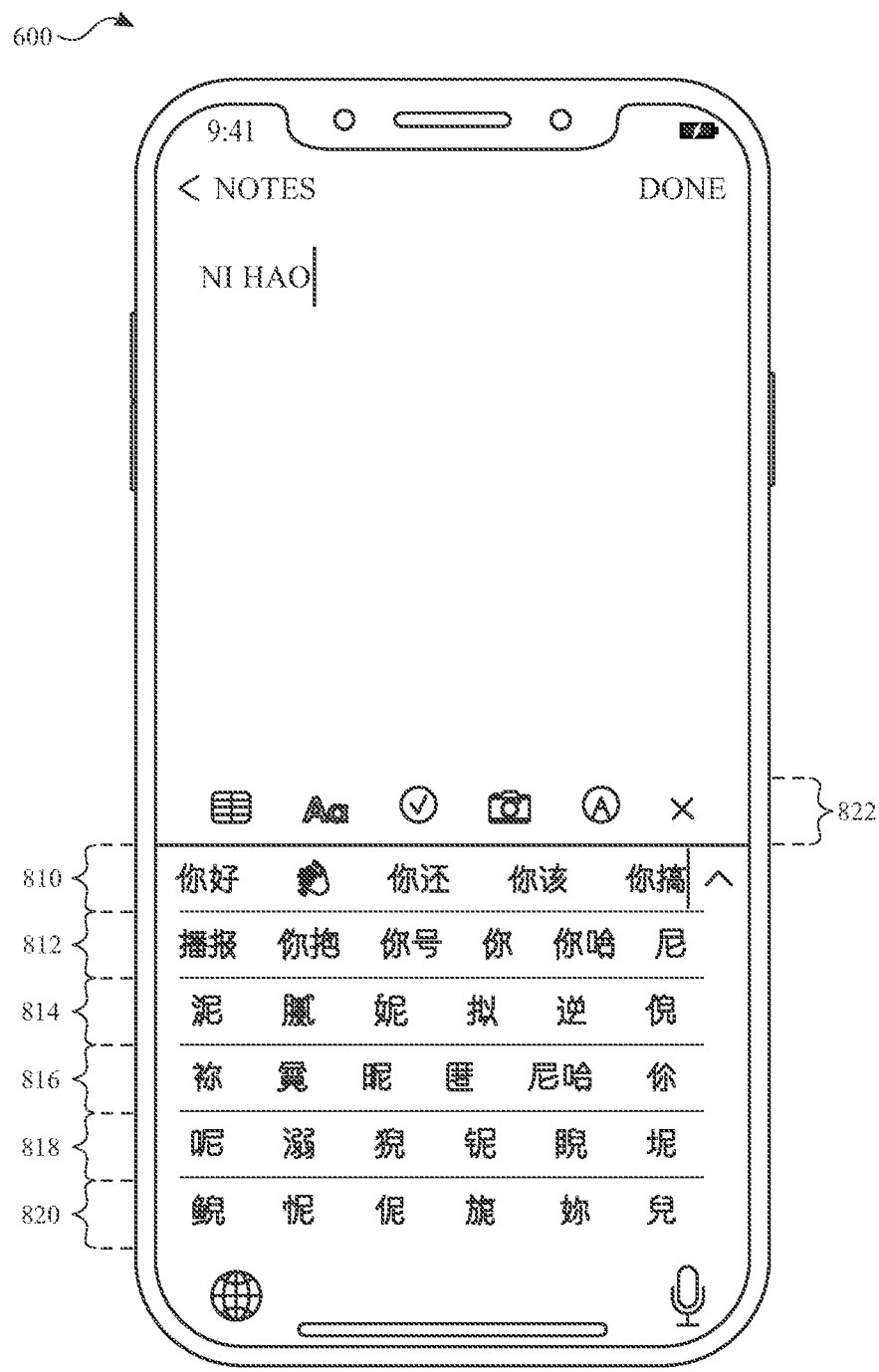

At FIG. 8N, activation (e.g., tap on) a respective candidate of a candidate row causes the respective candidate to be inserted into a text entry area of notes application 802. The candidate rows have fully replaced keyboard 804.

At FIG. 8N, device 600 detects lift-off of drag gesture 850c and, in response, in accordance with a determination that the location of drag gesture 850c on lift-off is not above the threshold location (e.g., is not close to the first row 810 of candidates), device 600 displays the plurality of rows 808-820 of candidates (and does not cease to display the second row 812 (and subsequent rows) of candidates).

Figure 8O:
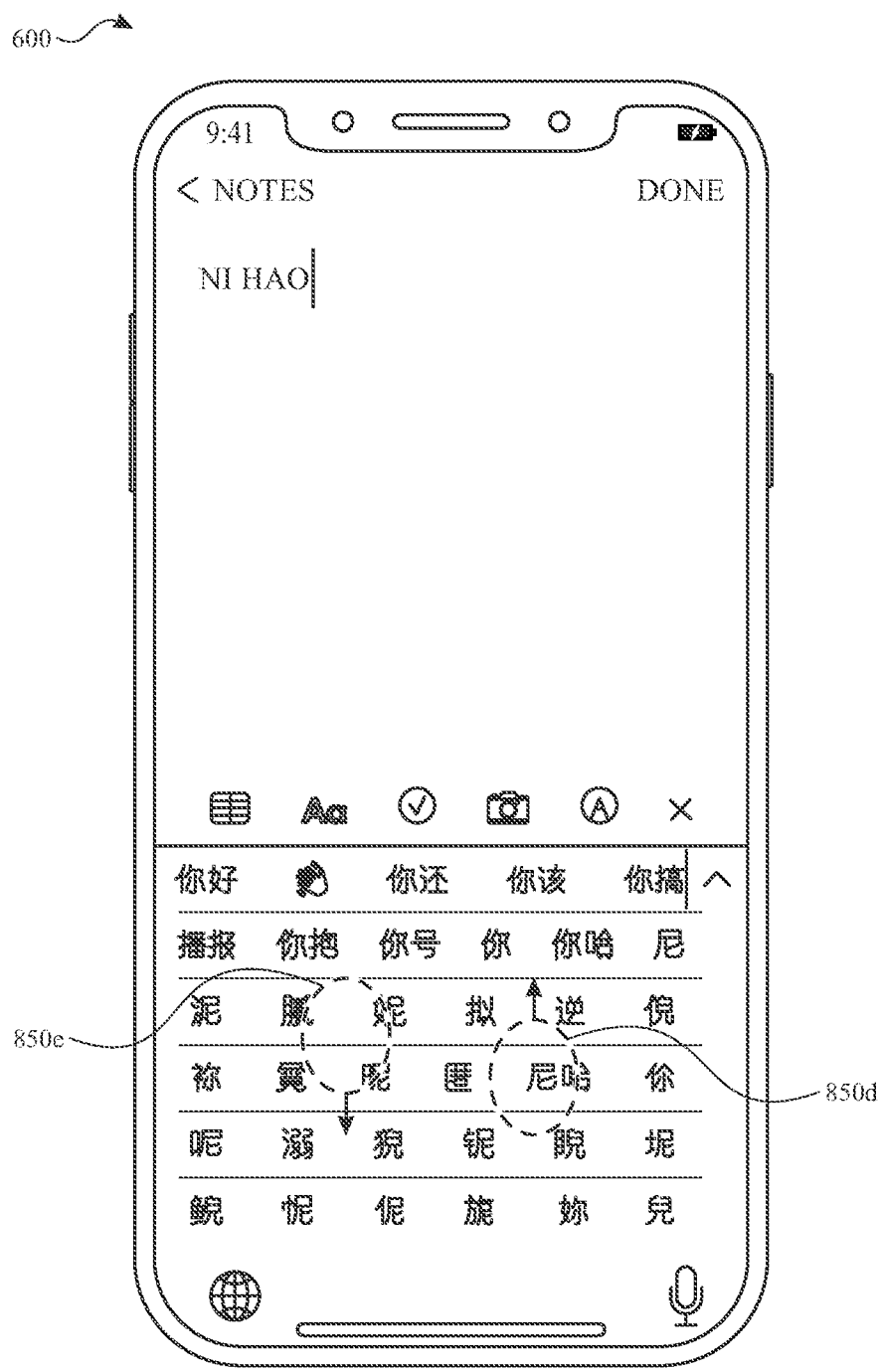
Figure 8P:
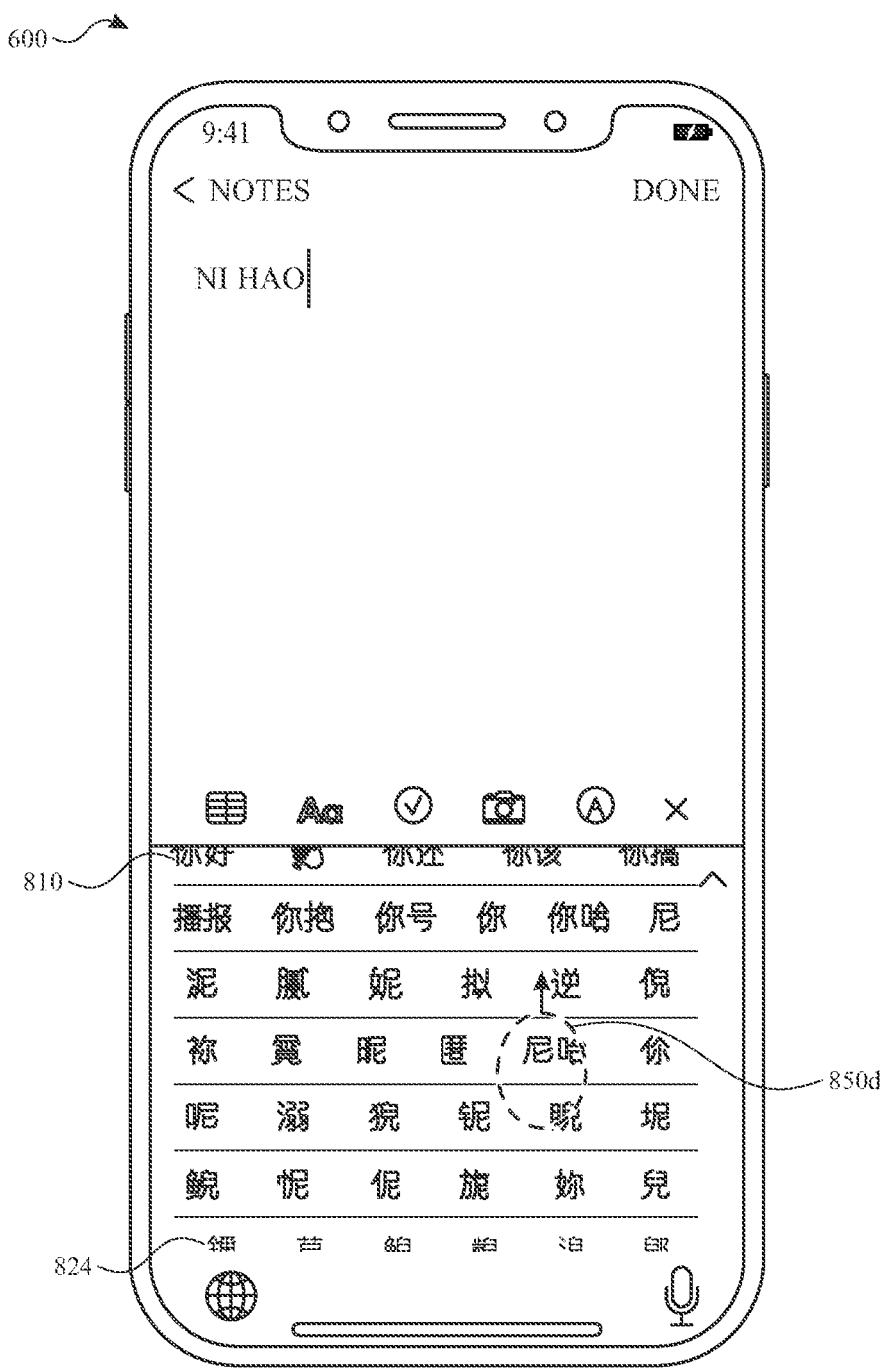
Figure 8Q:
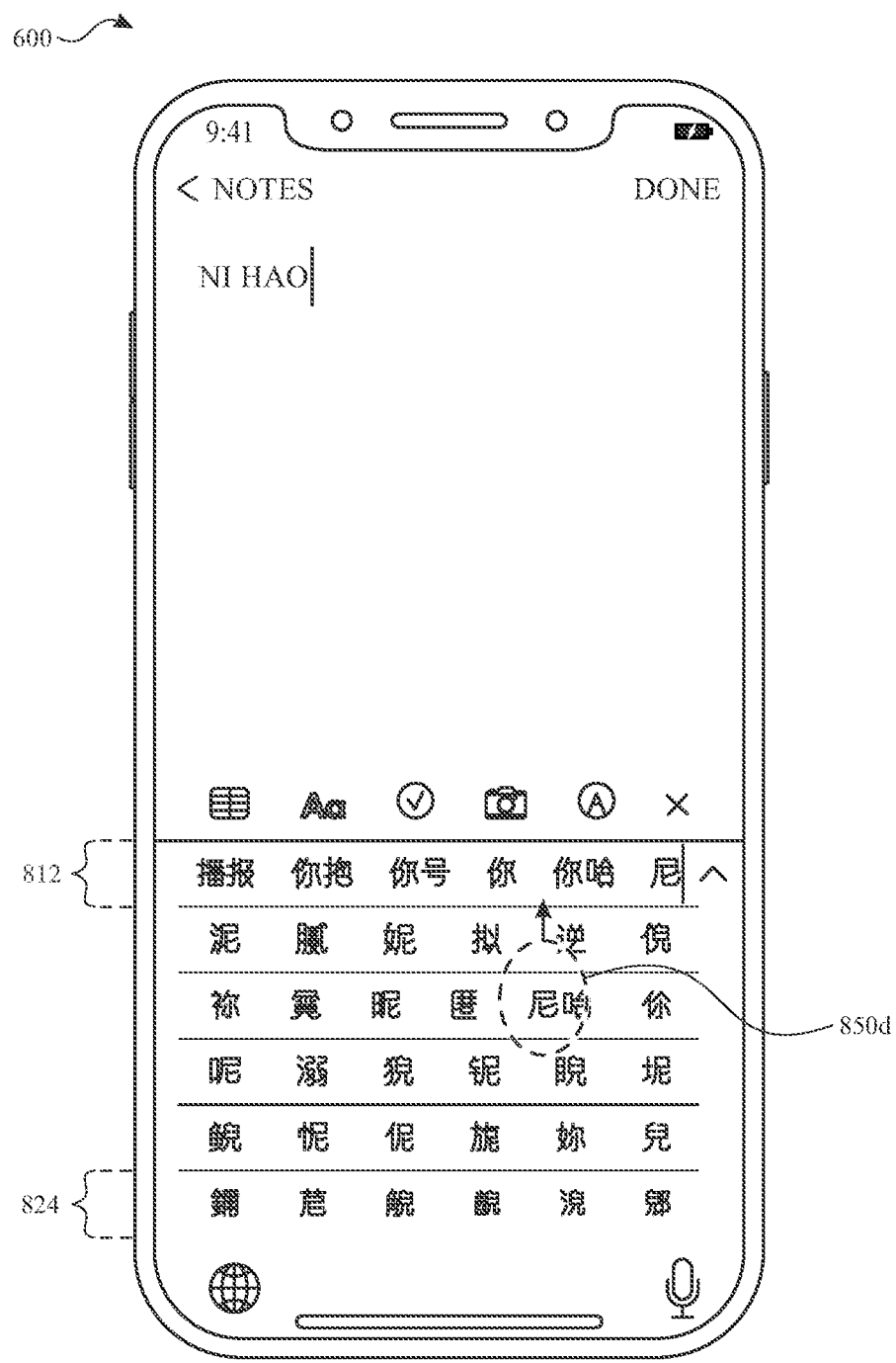

As illustrated in FIGS. 8O-8Q, while the candidate rows are expanded, device 600 detects swipe up gesture 850d. In response to detecting swipe up gesture 850d, as illustrated in FIGS. 8P-8Q, device 600 ceases to display first row 808 (by scrolling first row 808 under function bar 822) and displays an additional row 824 of candidates (e.g., including additional candidates not previously displayed in rows 810-820). Respective keys of function bar 822, when activated, initiate respective processes for editing text (e.g., highlighting, underlining, italicizing), inserting photos, inserting tables, etc.

Figure 8R:
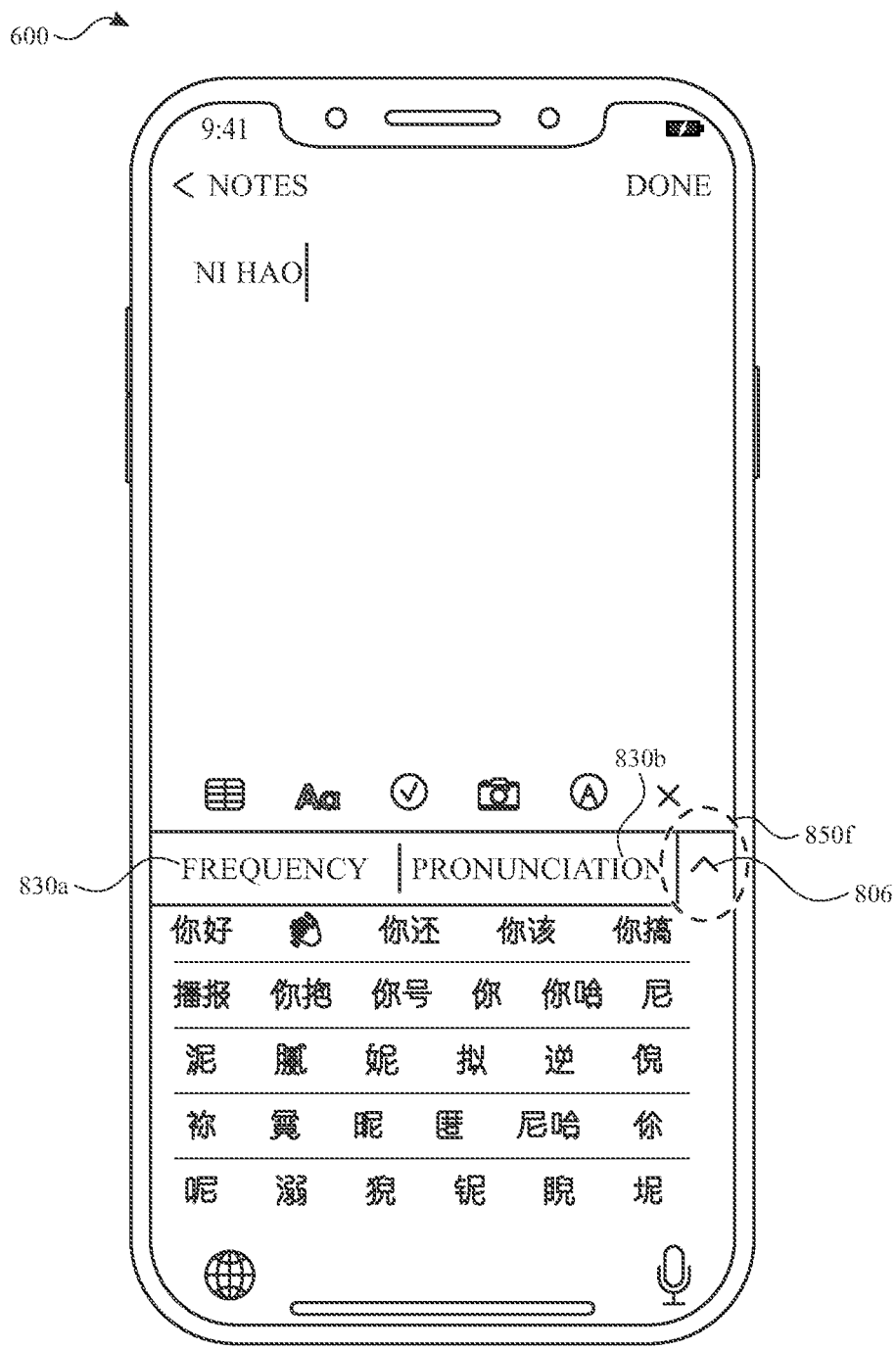

Returning to FIG. 8O, while the candidate rows are expanded, device 600 detects swipe down gesture 850e. In response to detecting swipe down gesture 850e, as illustrated in FIG. 8R, device 600 scrolls the candidate rows down, thereby ceasing to display last row 820 (by scrolling last row 820 down) and displays an additional row that includes a first option 830a for sorting the candidates of the rows based on first criteria (e.g., frequency of use) and a second option 830b for sorting the candidates of the rows based on second criteria (e.g., pronunciation) different from the first criteria. Respective options of first option 830 and second option 830b, when activated, changes the ordering of the candidates in the candidate rows.

Figure 8S:
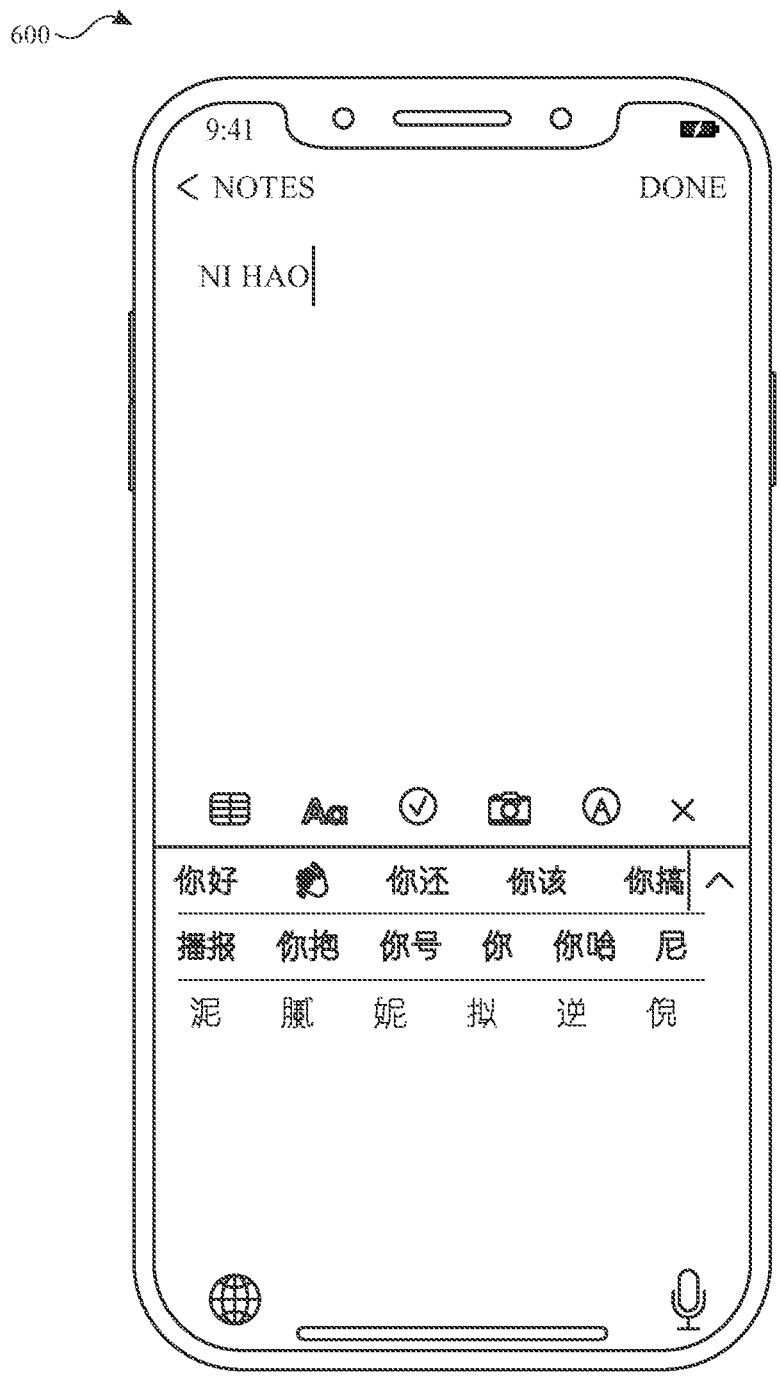
Figure 8T:
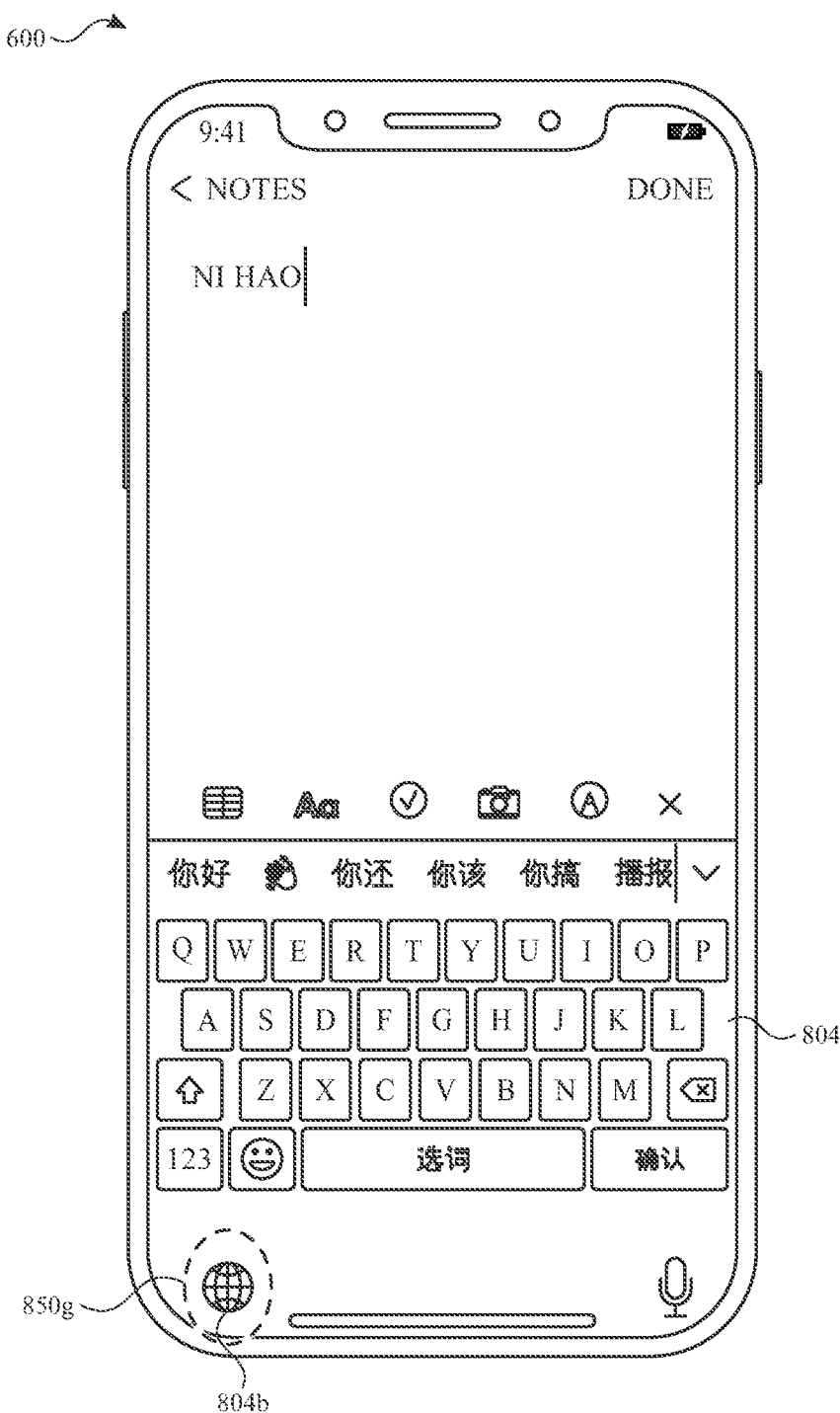

At FIG. 8P, device 600 detects tap 850f on chevron 806 and, in response, device 600 progressively ceases to display the additional rows of candidates, as illustrated in FIGS. 8R-8T.

Figure 8U:
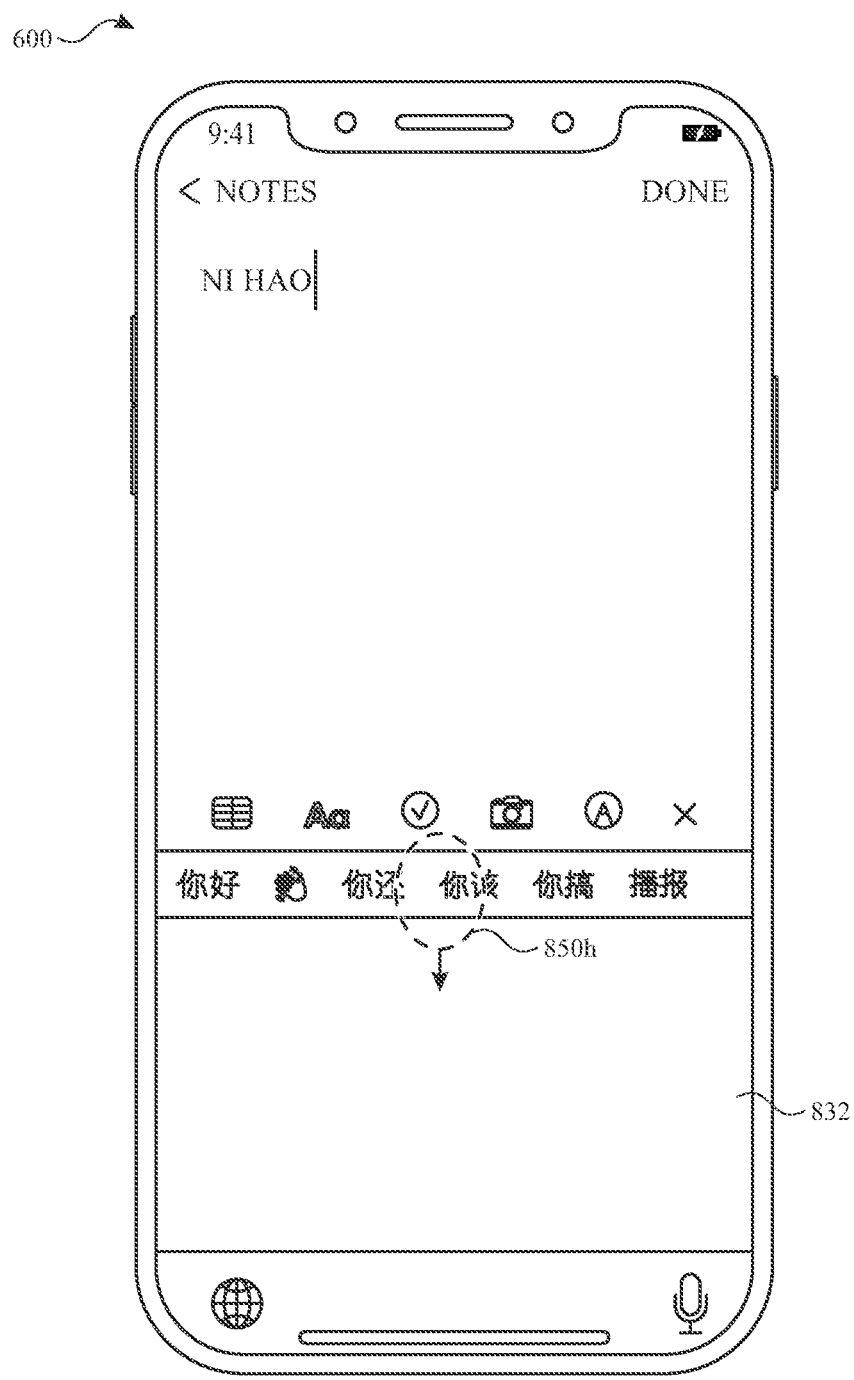

At FIG. 8T, device 600 detects tap 850g on keyboard switcher key 804b and, in response, keyboard 804 is replaced with handwriting input keyboard 832. At FIGS. 8U-8V, while displaying handwriting input keyboard 832, device 600 detects the drag gesture 850h, which starts on first row 810 of the candidates. However, device 600 forgoes initiating the process to display second row 812 of candidates (or other rows), as illustrated in FIG. 8V. In some embodiments, the handwriting input keyboard 832 of FIG. 8V includes a grabber (e.g., grabber 604e of FIGS. 6A-6H) and the handwriting input keyboard 832 can be resized, as described above with respect to FIGS. 6A-6S.

FIGS. 9A-9B are a flow diagram illustrating a method for accessing predictive text candidates using an electronic device in accordance with some embodiments. Method 900 is performed at a device (e.g., 100, 300, 500, 600) with a display device and a touch-sensitive surface. Some operations in method 900 are, optionally, combined, the orders of some operations are, optionally, changed, and some operations are, optionally, omitted.

As described below, method 900 provides an intuitive way for accessing predictive text candidates. The method reduces the cognitive burden on a user for accessing predictive text candidates, thereby creating a more efficient human-machine interface. For battery-operated computing devices, enabling a user to access media controls faster and more efficiently conserves power and increases the time between battery charges.

The electronic device (e.g., 600) concurrently displays (902), on the display device: a text entry area (904) (e.g., 802), a candidate bar (e.g., 810) that includes a first candidate (e.g., 810*a*, a first word, a first character, a first Chinese character, a first kanji character) and a second candidate (e.g., 810*f*, a second word, a second character, a second Chinese character, a second kanji character, different from the first candidate), the first candidate and the second candidate displayed in a first row (906) (e.g., 810, a first row of the candidate bar; a top-most row of the plurality of rows, a bottom-most row of a plurality of rows), and a keyboard that includes a plurality of keys (908). In some embodiments, the candidates (e.g., 810*a*-810*f*) are determined based on text previously input into the text entry area (e.g., predictive text, are suggestions for inserting new text into the text entry area, are suggestions for completing words already partially entered in the text entry area). In some embodiments, the first candidate (e.g., 810*a*) and the second candidate (e.g., 810*f*) are displayed without displaying (e.g., anywhere on the display device) a third candidate (e.g., a candidate from one of rows 814-818, a third word, a third character, a third Chinese character, a third kanji character). In some embodiments, when the device detects activation of a key of the keyboard, the device inserts the corresponding character into the text entry area and updates (e.g., replaces) the plurality of candidates based on the inserted character.

While displaying the candidate bar (e.g., 810 at FIGS. 8A and 8I, that includes the first candidate and the second candidate, and does not include the third candidate), the electronic device detects (910), on the touch-sensitive surface, a first user input (e.g., 850*a*, 850*c*).

In some embodiments, the electronic device displays, on the display device concurrently with the candidate bar, a switching affordance (e.g., 806). In some embodiments, as a part of detecting the first user input, the electronic device detects activation of the switching affordance (e.g., 806, detecting a tap input at a location that corresponds to the switching affordance). In some embodiments, activating the switching affordance expands the candidate bar (e.g., to display 2, 3, or more additional rows) to replace (e.g., fully replace) the keyboard. In some embodiments, activating the switching affordance (e.g., 806) changes the visual appearance (e.g., from a downward facing chevron to an upward facing chevron) of the switching affordance to indicate the state of the candidate bar (expanded or not expanded).

In some embodiments, as a part of detecting the first user input, the electronic device detects a swipe gesture (e.g., 850*a*, 850*c*, a swipe down gesture) starting at a location that corresponds to the candidate bar. In some embodiments, swiping down on the candidate bar expands the candidate bar to replace the keyboard. In some embodiments, the additional rows (e.g., 812-818) of the candidate bar are revealed sequentially in conjunction with the movement of the swipe down gesture (e.g., faster swipe reveals rows faster, slower swipe reveals rows slower, shorter swipe reveals less rows, tracking the location of the contact of the swipe gesture). In some embodiments, the candidates of each row (e.g., the second row, any additional rows) are revealed progressively as the gesture is detected, starting from the top of the row and progressing to the bottom of that same row. In some embodiments, the rows (e.g., 812-818) are revealed progressively as the gesture is detected, such as started from the second row, proceeding to the third row, and continuing to additional rows.

In response to (912) detecting the first user input (e.g., 850*a*), the electronic device continues (914) to display, on the display device, the first candidate (e.g., 810*a*) in the first row of the candidate bar (and optionally maintaining the location of the first row on the display device).

In response to (912) detecting the first user input (e.g., 850*a*), the electronic device replaces (916) display, on the display device, of at least a portion of the keyboard (e.g., a top row, several rows, all rows of keyboard keys 804) with display of a third candidate in a second row (e.g., 812) of the candidate bar (and optionally additional rows of candidates, without displaying a first sorting option), whereby the third candidate is different from the first candidate and the second candidate. In some embodiments, in response to detecting the first user input (e.g., 850*a*), the candidate bar expands to show additional rows with additional candidates (e.g., as shown in FIG. 6K-6N). In some embodiments, the third candidate is determined based on text previously input into the text entry area (e.g., predictive text, is a suggestion for inserting new text into the text entry area, is a suggestion for completing words already partially entered in the text entry area). In some embodiments, in response to detecting the first user input, the first candidate and second candidates are maintained in the first row.

Expanding the candidate bar provides the user with more candidate options to select from, thereby reducing the need for the user to enter numerous characters to arrive at the desired text. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device, as part of replacing display, on the display device, of at least the portion of the keyboard (e.g., a top row, several rows, all rows of keyboard keys) with display of a third candidate in the second row of the candidate bar, displays a top portion of one or more characters (e.g., all characters) of the third candidate prior to displaying a bottom portion of the one or more characters of the third candidate (e.g., row 812 as shown in FIGS. 8B and 8J). In some embodiments, the candidates of each row (e.g., the second row, any additional rows) are revealed progressively, starting from the top of the row and progressing to the bottom of that same row (e.g., as shown in row 812 as shown in FIGS. 8B and 8J). In some embodiments, the rows are revealed progressively, such as started from the second row, proceeding to the third row, and continuing to additional rows.

In some embodiments, in response to (912) detecting the first user input, the electronic device ceases (918) to display (e.g., by sliding to the right and out of view), in the first row of the candidate bar on the display device, the second candidate (e.g., 810*f* shifting off in FIGS. 8J-8L), and displays (920), in the second row of the candidate bar on the display device, the second candidate (e.g., 810*f* in FIGS. 8K-8M). In some embodiments, as the second row of the candidate bar is revealed, one (or more) candidates are removed from the first row of the candidate bar and are instead displayed in the second row. In some embodiments, as the one (or more) candidates are removed from the first row of the candidate bar, the spacing among the remaining candidates in the first row is increased.

By removing the second candidate from the first row, the device spreads out the remaining candidates such that the user is less likely to make an error selecting a desired candidate, thereby reducing the number of inputs need to correctly pick the desired candidate. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to (912) detecting the first user input, the electronic device replaces (922) display, on the display device, of a remaining portion of the keyboard (e.g., the rest of keyboard 804, as shown in FIG. 8N) with display of one or more rows of the candidate bar (and optionally additional rows of candidates, without displaying a first sorting option). In some embodiments, the first user input results in a plurality of additional rows of the candidate bar to be displayed (second row+additional rows), which fully cover the keyboard that was displayed when the beginning of the first user input was detected.

In some embodiments, while displaying a plurality (e.g., 2, 3, 4, or more) of rows of the candidate bar (e.g., while the candidate bar is expanded, after detecting liftoff of the first user input from the touch-sensitive surface, while candidate bar has fully replaced the keyboard), the electronic device detects a second swipe gesture (e.g., 850d, a swipe up gesture, starting from a third row and moving towards the first row of the candidate bar) starting at a location on the plurality of rows of the candidate bar. In some embodiments, in response to detecting the second swipe gesture, the electronic device redisplays the at least a portion of the keyboard (and optionally, scroll additional rows of candidates onto the display while scrolling rows of candidates off of the display). In some embodiments, when the first user input is a swipe down gesture to reveal the expanded candidate bar (including the second row) and the device further detects a swipe up gesture (without detecting liftoff of the first user input that is the swipe down), the device contracts the candidate bar back to a single row (ceases to display the second row).

In some embodiments, while displaying a plurality (e.g., 2, 3, 4, or more) of rows of the candidate bar (e.g., while the candidate bar is expanded, after detecting liftoff of the first user input from the touch-sensitive surface, while candidate bar has full replaced the keyboard, without displaying a first sorting option), the electronic device detects a third swipe gesture (e.g., a swipe down gesture (e.g., 850e), starting from the second row and moving towards the third row of the candidate bar) starting at a location on the plurality of rows of the candidate bar. In some embodiments, in response to detecting the third swipe gesture, the electronic device scrolls down, on the display device, the first row (and optionally all other rows) of the candidate bar and displays (e.g., in a row above the first row, adjacent to the first row) a first sorting option (e.g., 830a) for the candidates of the candidate bar (and optionally a second sorting option for the candidates of the candidate bar). In some embodiments, activation of the first sorting option changes the display order of the candidates of the candidate bar using a first sorting technique.

In some embodiments, while displaying the keyboard that includes the plurality of keys, the electronic device detects a user input request for stroke input display (e.g., 850g, a request to display a stroke input area or a handwriting input area). In some embodiments, the electronic device, in response to detecting the user input request for stroke input display, replaces display of the keyboard with display of a stroke input area (e.g., 832). In some embodiments, the electronic device displays, on the display device concurrently with the stroke input area, a second candidate bar that includes a fourth candidate (e.g., a fourth word, a fourth character, a fourth Chinese character, a fourth kanji character) and a fifth candidate (e.g., a fifth word, a fifth character, a fifth Chinese character, a fifth kanji character, different from the fourth candidate), the fourth candidate and the fifth candidate displayed in a first row of the second candidate bar. In some embodiments, while displaying the second candidate bar that includes the fourth candidate and the fifth candidate, the electronic device detects a swipe down gesture (e.g., 850h) on the second candidate bar. In some embodiment, in response to detecting the swipe down gesture, the electronic device forgoes displaying additional rows for the second candidate bar (and forgoing displaying additional candidates in the second candidate bar).

In some embodiments, while the candidate bar is expanded, device 600 detects activation of a displayed candidate and, in response, inserts the activated candidate and ceases to display the expanded candidate bar (e.g., revealing the previously replaced keyboard with a single row of new candidates).

Note that details of the processes described above with respect to method 900 (e.g., FIGS. 9A-9B) are also applicable in an analogous manner to the methods described below. For example, methods 700 and 1100 optionally include one or more of the characteristics of the various methods described above with reference to method 900. For brevity, these details are not repeated below.

FIGS. 10A-10J illustrate exemplary devices and user interfaces for accessing various keyboards, in accordance with some embodiments. The user interfaces in these figures are used to illustrate the processes described below, including the processes in FIGS. 11A-11B.

Throughout FIGS. 10A-10J, keyboard status 1000 is illustrated for ease of understanding of the concepts described below. Keyboard status 1000 is not part of the user interface of electronic device 600.

At FIGS. 10A-10D, keyboard status 1000a illustrates a first scenario, whereby multiple keyboards (e.g., 1010, 1012, 1014, 1016) are active (e.g., installed, enabled, turned on, and/or selected to be in a plurality of selected keyboards) on device 600. For example, the user of device 600 has accessed a settings user interface and enabled English keyboard 1010, Chinese simplified handwriting keyboard 1012, Chinese simplified Pinyin keyboard 1014, and emoji keyboard 1016, such that these are the (e.g., only) keyboards enabled on device 600. The English keyboard 1010, Chinese simplified handwriting keyboard 1012, and Chinese simplified Pinyin keyboard 1014 are in the ordered set (e.g., that is cyclical) and are active on device 600 (e.g., are selected to be in the plurality of selected keyboards), as illustrated by the ordering of 1000a. As illustrated by keyboard status 1000a, emoji keyboard 1016 is not in the (e.g., cyclical) ordered set because it is of an emoji keyboard type, but is active on device 600 (e.g., is selected to be in the plurality of selected keyboards). In accordance with device 600 determining that an emoji keyboard is active along with a plurality of other keyboards, device 600 provides the keyboards using particular layouts, as discussed in detail below.

Figure 10A:
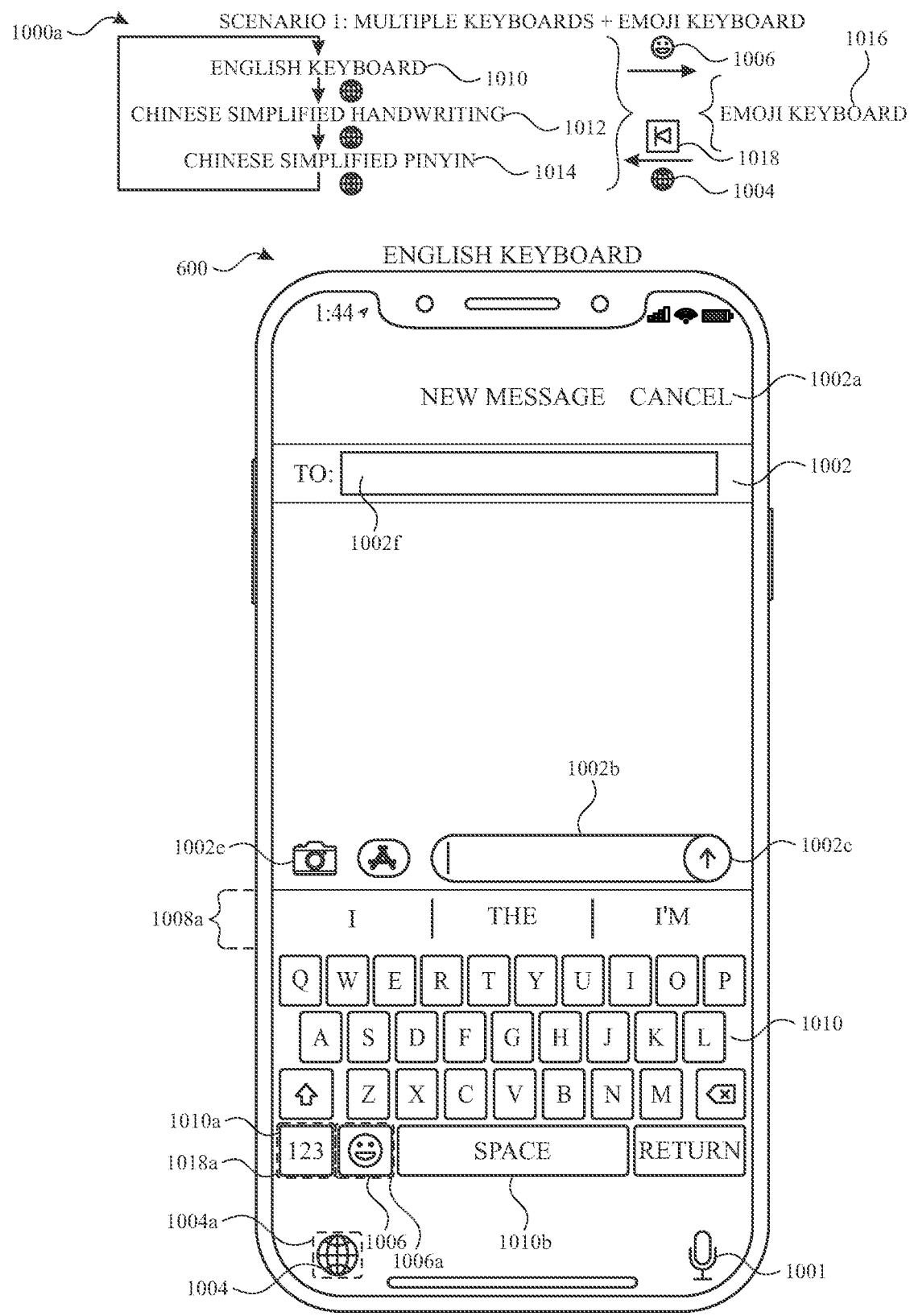

At FIG. 10A, in the first scenario, device 600 is displaying message interface 1002 and English keyboard 1010. Message interface 1002 is an interface for composing and sending a message (e.g., an instant message, an SMS) to a specified recipient. Messages interface 1002 includes cancel button 1002a, which, when activated, cancels the message sending process and causes device 600 to cease to display message interface 1002. Recipient field 1002f is a text entry field where device 600 receives and displays information (e.g., name, phone number) identifying the recipient of the message. While recipient field 1002f is activated (e.g., cursor is in the field), device 600 receives input on (e.g., activation of keys of) a keyboard (e.g., 1010, 1012, 1014, 1016) and, in response, populates recipient field 1002f Camera button 1002e is a button which, when activated, causes device 600 to display a camera interface to capturing an image (e.g., using a camera sensor) to be sent and/or for selecting an image (e.g., previously captured) to be sent. Input field 1002b is an input field where device 600 receives and displays information (e.g., content of message) to be sent as part of the message. While input field 1002b is activated (e.g., cursor is in the field), device 600 receives input on (e.g., activation of keys of) a displayed keyboard (e.g., 1010, 1012, 1014, 1016) and, in response, populates input field 1002b with corresponding content. Candidate row 1008 includes a plurality of displayed candidate terms. Activation of a respective candidate inserts the candidate into an activated field (e.g., input field 1002b)

At FIG. 10A, in the first scenario, device 600 is displaying English keyboard 1010. English keyboard 1010 includes multiple planes, including an alphabetical plane (as shown in FIG. 10A) and a numerical plane, which is displayed (e.g., thereby replacing the alphabetical plane) when device 600 detects activation of numeral affordance 1010a. English keyboard 1010 also includes spacebar 1010b which, when activated, inserts a space character into a selected field. Emoji key 1006 is displayed between (and adjacent to both of) numeral key 1010a and spacebar 1010b. When device 600 detects activation of emoji key 1006 (e.g., detects a tap gesture at a location corresponding to (e.g., on) emoji key 1006), device 600 replaces display of English keyboard 1010 with display of emoji keyboard 1016 (e.g., as shown in FIG. 10D).

Microphone key 1001, when activated, initiates a dictation mode whereby device 600 receives audio and transcribes the received audio into text, which is displayed in a field (e.g., input field 1002b). Switcher key 1004, when activate, replaces the current keyboard (e.g., English keyboard 1010 in FIG. 10A) with the next keyboard in the ordered set (e.g., switching from English keyboard 1010 to Chinese simplified handwriting keyboard 1012). Generally, when switcher key 1004 is activated, device 600 proceeds to displaying the next keyboard in the ordered set (e.g., 1010, 1012, 1014). In some embodiments, in the first scenario, switcher key 1004 includes adaptive behavior, as described in detail below.

At FIG. 10A, in the first scenario, device 600 is displaying switcher key 1004 at first location 1004a on the display and emoji key 1006 at a second location 1006a on the display.

At FIG. 10A, in the first scenario, device 600 detects activation of switcher key 1004. In response to detecting activation of switcher key 1004, device 600 replaces display of English keyboard 1010 with display of Chinese simplified handwriting keyboard 1012 because Chinese simplified handwriting keyboard 1012 is the next non-emoji active keyboard, as shown in FIG. 10B.

Figure 10B:
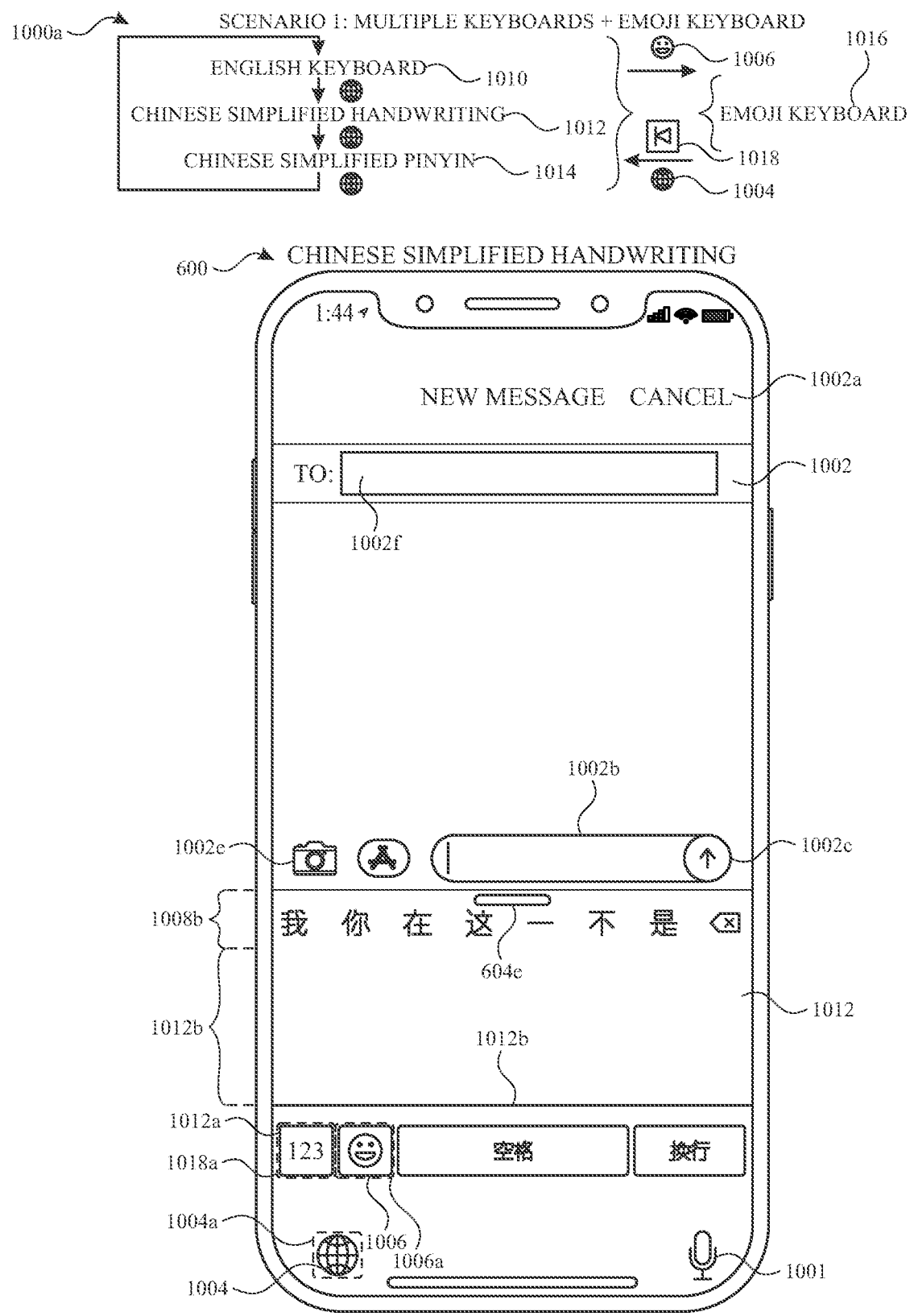

At FIG. 10B, in the first scenario, device 600 is displaying Chinese simplified handwriting keyboard 1012. In some examples, Chinese simplified handwriting keyboard 1012 includes many or all the characteristics and features of the handwriting keyboard described with respect to FIGS. 6A-6S. For example, Chinese simplified handwriting keyboard 1012 optionally includes grabber 604e for expanding and retracting stroke input area 1012b (e.g., corresponding to 604a).

Chinese simplified handwriting keyboard 1012 includes multiple planes, including a handwriting plane (as shown in FIG. 10B) and a numerical plane, which is displayed (e.g., thereby replacing the handwriting plane) in response to device 600 detecting activation of numeral affordance 1012a. Chinese simplified handwriting keyboard 1012 also includes spacebar 1012b which, when activated, inserts a space character into a selected field (e.g., input field 1002b). Emoji key 1006 is displayed between (and adjacent to both of) numeral key 1012a and spacebar 1012b. When device 600 detects activation of emoji key 1006 (e.g., detects a tap gesture at a location corresponding to (e.g., on) emoji key 1006), device 600 replaces display of Chinese simplified handwriting keyboard 1012 with display of emoji keyboard 1016 (e.g., as shown in FIG. 10D).

At FIG. 10B, in the first scenario, device 600 is displaying switcher key 1004 at first location 1004a on the display and emoji key 1006 at second location 1006a on the display.

At FIG. 10B, in the first scenario, device 600 detects activation of switcher key 1004. In response to detecting activation of switcher key 1004, device 600 replaces display of Chinese simplified handwriting keyboard 1012 with display of Chinese simplified pinyin keyboard 1014 because Chinese simplified pinyin keyboard 1014 is the next non-emoji active keyboard, as shown in FIG. 10C.

Figure 10C:
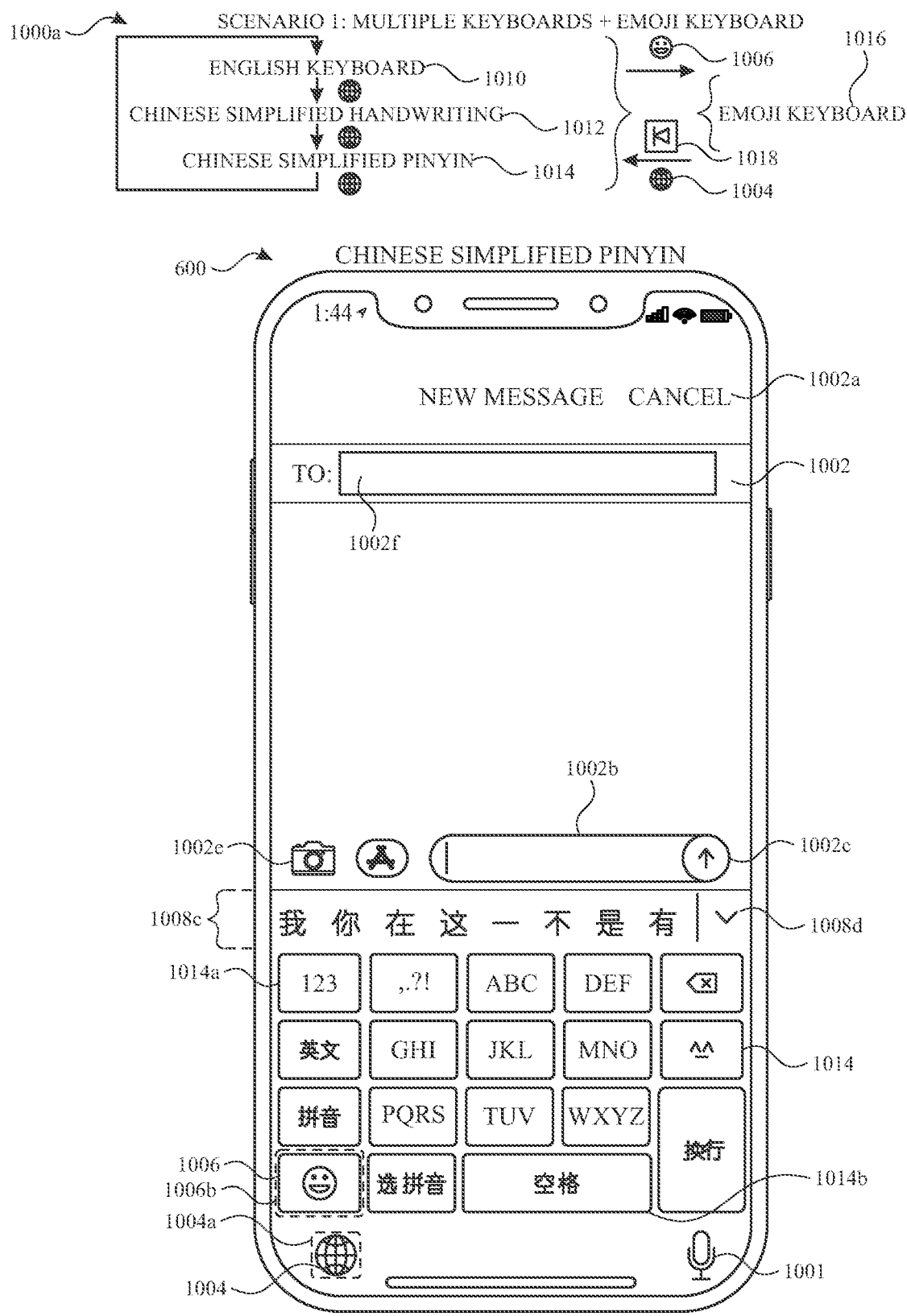
Figure 10D:
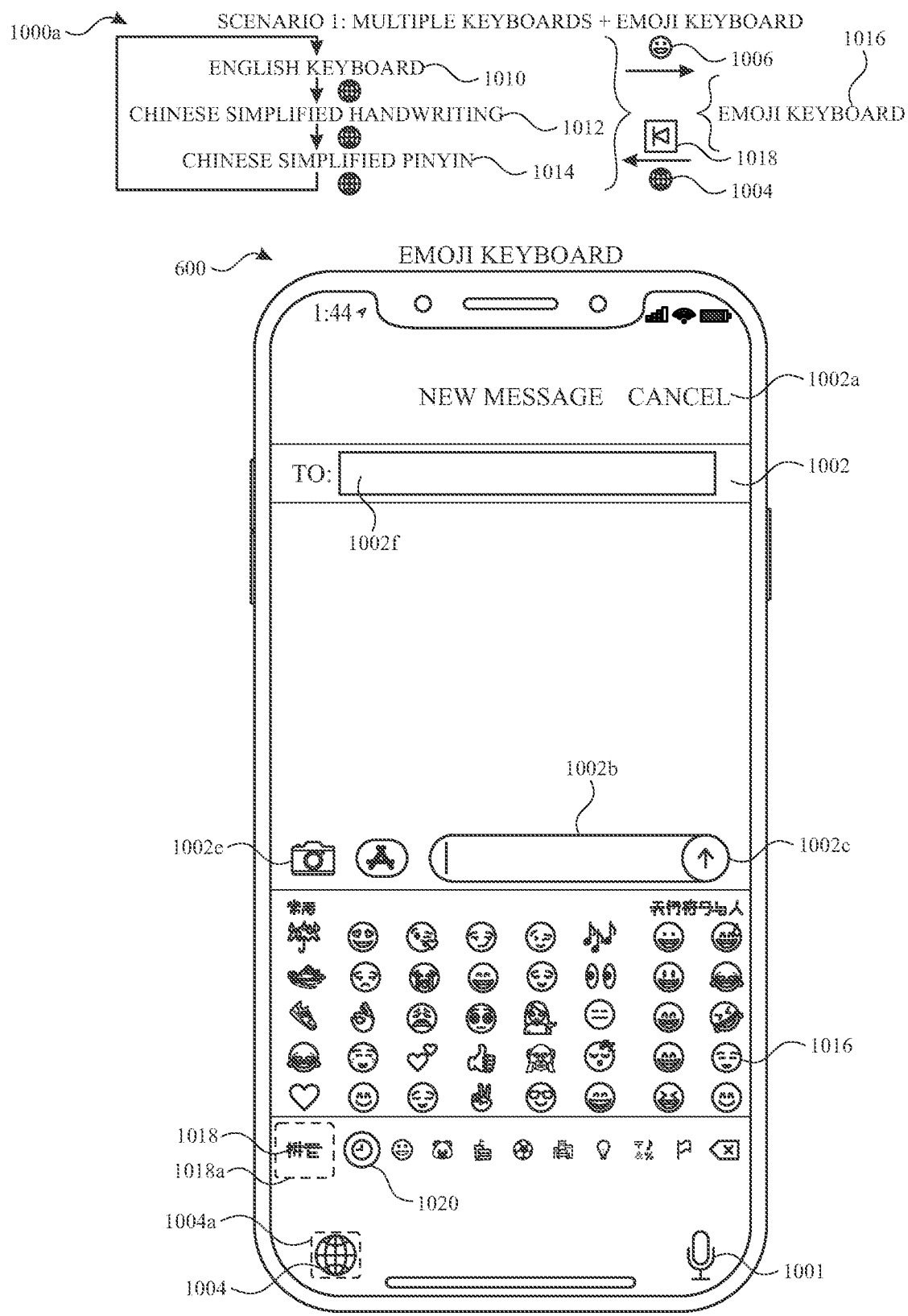

At FIG. 10C, in the first scenario, device 600 is displaying Chinese simplified pinyin keyboard 1014. Chinese simplified pinyin keyboard 1014 includes multiple planes, including an alphabetical plane (as shown in FIG. 10C) and a numerical plane, which is displayed (e.g., thereby replacing the alphabetical plane) in response to device 600 detecting activation of numeral affordance 1014a. Chinese simplified pinyin keyboard 1014 also includes spacebar 1014b which, when activated, inserts a space character into a selected field (e.g., input field 1002b). Emoji key 1006 is displayed below (though not adjacent to) numeral key 1014a and above (and adjacent to) spacebar 1014b. Candidate row 1008c includes a plurality of displayed candidate terms. In some examples, candidate row 1008c includes many or all the characteristics and features of the row 810 of candidates, as described above with respect to FIGS. 8A-8V. For example, a swipe down gesture on candidate row 1008c causes candidate row 1008c to expand (e.g., in conjunction with the swipe down gesture) to replace (e.g., partially or fully) keyboard 1014. For another example, a tap gesture (e.g., that does not include movement) on chevron 1008d (e.g., corresponding to chevron 806) causes candidate row 1008 to expand to replace (e.g., partially or fully) keyboard 1014.

At FIG. 10C, in the first scenario, device 600 is displaying switcher key 1004 at first location 1004a on the display and emoji key 1006 at third location 1006b, which encompasses location 1018a and at least partially overlaps with second location 1006a, on the display.

In FIG. 10C, in the first scenario, when device 600 detects activation of emoji key 1006 (e.g., detects a tap gesture at a location corresponding to (e.g., on) emoji key 1006), device 600 replaces display of Chinese simplified pinyin keyboard 1014 with display of emoji keyboard 1016 (e.g., as shown in FIG. 10D).

At FIG. 10C, in the first scenario, device 600 detects activation of switcher key 1004. In response to detecting activation of switcher key 1004, device 600 replaces display of Chinese simplified pinyin keyboard 1014 with display of English keyboard 1010 because English keyboard 1010 is the next non-emoji active keyboard, as shown in FIG. 10A.

At FIG. 10D, in the first scenario, device 600 is displaying emoji keyboard 1016. Emoji keyboard 1016 includes a plurality of keys which, when activated, cause device 600 to insert a corresponding emoji into a selected field (e.g., input field 1002b). Device 600 also displays adaptive key 1018, which includes an indication of the previously accessed keyboard (the keyboard displayed prior to displaying emoji keyboard 1016). In FIG. 10D, adaptive key 1018 includes an indication (e.g., the name of) of Chinese simplified pinyin keyboard 1014. Adaptive key 1018, when activated, causes device 600 to replace display of emoji keyboard 1016 with display of the keyboard displayed prior to displaying emoji keyboard 1016.

In the example where emoji key 1006 is activated at FIG. 10C (while Chinese simplified pinyin keyboard 1014 is displayed), resulting in display of emoji keyboard 1016, adaptive key 1018 of the displayed emoji keyboard 1016 includes an indication of (e.g., includes the name of) Chinese simplified pinyin keyboard 1014. Further in the example, activation of adaptive key 1018 that includes the indication of Chinese simplified pinyin keyboard 1014 causes device 600 to replace display of emoji keyboard 1016 with display of Chinese simplified pinyin keyboard 1014, as illustrated in FIG. 10C. In some embodiments, activation of switcher key 1004 of the emoji keyboard also causes device 600 to replace display of emoji keyboard 1016 with display of the keyboard displayed prior to displaying emoji keyboard 1016 (e.g., Chinese simplified pinyin keyboard 1014), as described in further detail below.

In another example where emoji key 1006 is activated at FIG. 10B (while Chinese simplified handwriting keyboard 1012 is displayed), resulting in display of emoji keyboard 1016, adaptive key 1018 of the displayed emoji keyboard 1016 includes an indication of (e.g., includes the name of) Chinese simplified handwriting keyboard 1012. Further in the example, activation of adaptive key 1018 that includes the indication of Chinese simplified handwriting keyboard 1012 causes device 600 to replace display of emoji keyboard 1016 with display of Chinese simplified handwriting keyboard 1012, as illustrated in FIG. 10B. In some embodiments, activation of switcher key 1004 of the emoji keyboard also causes device 600 to replace display of emoji keyboard 1016 with display of the keyboard displayed prior to displaying emoji keyboard 1016 (e.g., Chinese simplified handwriting keyboard 1012), as described in further detail below.

In another example where emoji key 1006 is activated at FIG. 10A (while English keyboard 1010 is displayed), resulting in display of emoji keyboard 1016, adaptive key 1018 of the displayed emoji keyboard 1016 includes an indication of (e.g., includes the name of) English keyboard 1010. Further in the example, activation of adaptive key 1018 that includes the indication of English keyboard 1010 causes device 600 to replace display of emoji keyboard 1016 with display of English keyboard 1010, as illustrated in FIG. 10A. In some embodiments, activation of switcher key 1004 of the emoji keyboard also causes device 600 to replace display of emoji keyboard 1016 with display of the keyboard displayed prior to displaying emoji keyboard 1016 (e.g., English keyboard 1010), as described in further detail below.

In some embodiments, when device 600 detects that multiple keyboards are active (e.g., first scenario, second scenario), the functionality of switcher key 1004 (e.g., while displayed for keyboards 1010, 1012, 1014, 1016) changes (e.g., while a respective keyboard is displayed) based on whether a criterion of a set of switching criteria is satisfied, thereby giving switcher key 1004 adaptive behavior. The set of switching criteria includes a first switching criterion that is satisfied when a currently displayed keyboard has been displayed for more than a predetermined (non-zero) amount of time (e.g., 2.5 seconds). The set of switching criteria includes a second switching criterion that is satisfied when the electronic device has detected activation of a key of the currently keyboard that causes entry of a character into a text entry area. In some embodiments, when either the first switching criterion or the second switching criterion (or both) is satisfied, activation of the switcher key 1004 causes device 600 to display the keyboard displayed prior to displaying the current keyboard (e.g., takes the user back to the last keyboard they were viewing). In some embodiments, when neither the first switching criterion nor the second switching criterion is satisfied, activation of the switcher key 1004 causes device 600 to display the next keyboard in the ordered set (e.g., takes the user to the next keyboard). Thus, when a user quickly taps the switcher key 1004 multiple times, the device cycles through different keyboards. When a user taps the switcher key 1004, inserts a character using the newly displayed keyboard and then taps switcher key 1004 again, device 600 returns the user to the keyboard they were previously using. When a user taps the switcher key 1004 and waits at least the predetermined amount of time before tapping switcher key 1004 again, device 600 returns the user to the keyboard they were previously using. In some embodiments, when device 600 switches to displaying a keyboard, the name of the currently displayed keyboard is displayed with (e.g., in) the keyboard (e.g., in spacebar key 1010b) for the predetermined amount of time, thereby indicating to the user whether the predetermined amount of time has lapsed and whether activation of switcher key 1004 will cause the next keyboard or the previously-displayed keyboard to be displayed.

In some embodiments, switcher key 1004 of keyboards 1010, 1012, 1014, and 1016 include this adaptive behavior.

Figure 10F:
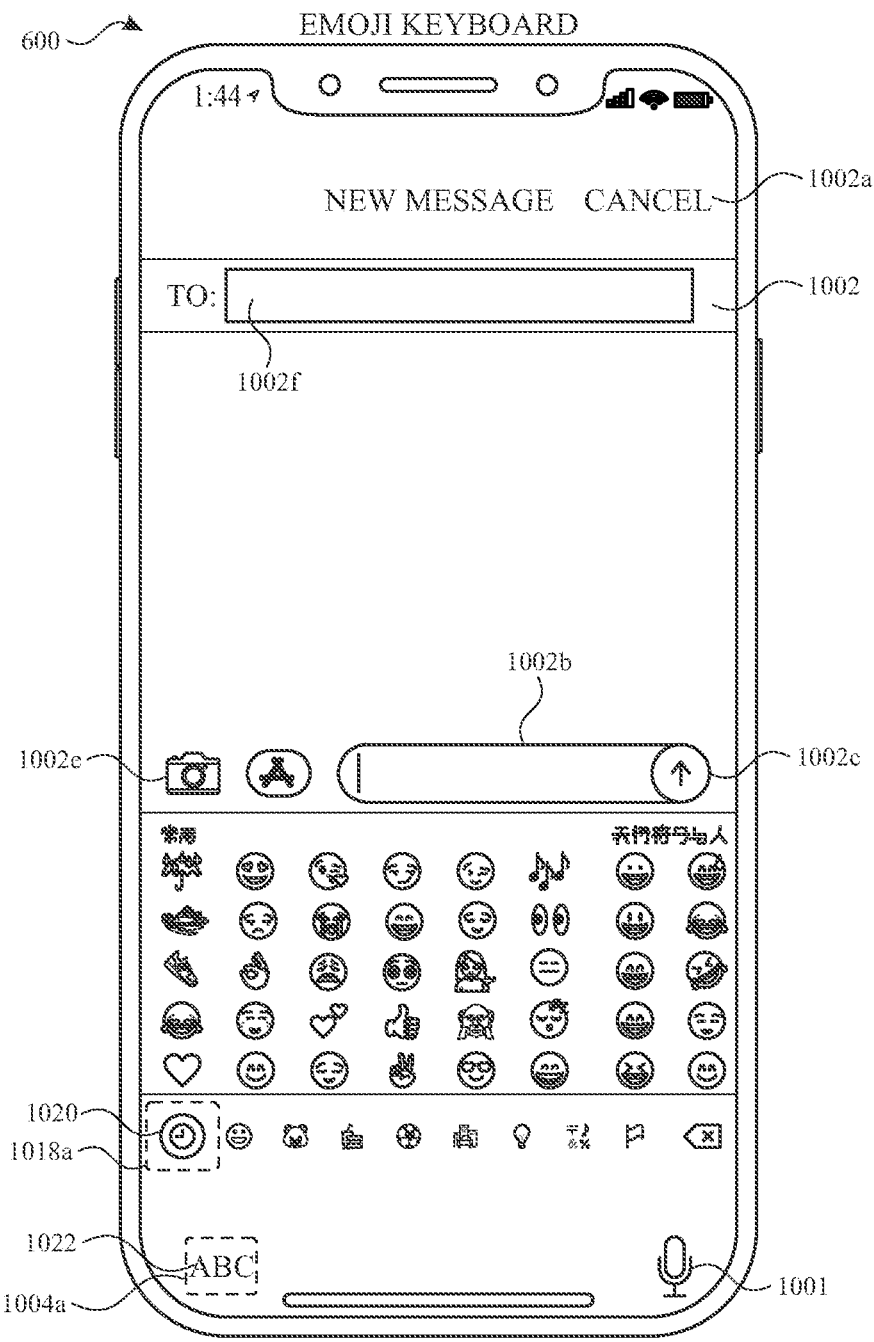

At FIGS. 10E-10F, keyboard status 1000b illustrates a second scenario, whereby two keyboards (e.g., 1010, 1016, an emoji keyboard and a non-emoji keyboard) are active (e.g., installed, enabled, turned on, and/or selected to be in a plurality of selected keyboards) on device 600. For example, the user of device 600 has accessed a settings user interface and enabled English keyboard 1010 and emoji keyboard 1016, such that these are the (e.g., only) keyboards enabled on device 600. In accordance with the device determining that an emoji keyboard is active along with only one other (no-emoji) keyboard, device 600 provides the keyboards using particular layouts, as discussed in detail below.

At FIG. 10E, in the second scenario, device 600 is displaying message interface 1002 and English keyboard 1010. Numeral key 1010a at FIG. 10E is displayed with a larger width than numeral key 1010a at FIG. 10A. At FIG. 10E, numeral key 1010a is displayed such that it encompasses both locations 1018a and 1006a. At FIG. 10E, emoji key 1006 is displayed below numeral key 1010a. Emoji key 1006 is not adjacent to spacebar 1010b. As illustrated in FIG.

10E, there is no switcher key 1004 displayed. Emoji key 1006, when activated (e.g., tap on), causes display of emoji keyboard 1016, as illustrated in FIG. 10F.

At FIG. 10F, in the second scenario, device 600 is displaying message interface 1002 and emoji keyboard 1016. At FIG. 10F, emoji keyboard 1016 does not include adaptive key 1018. Instead, emoji keyboard 1016 includes, at location 1018*a*, frequently-used key 1020 which, when activated, causes display of frequently-used emojis in keyboard 1016. At FIG. 10F, English keyboard key 1022 is displayed at location 1004*a*. English keyboard key 1022, when activated, causes display of English keyboard 1010, as shown in FIG. 10E.

Figure 10G:
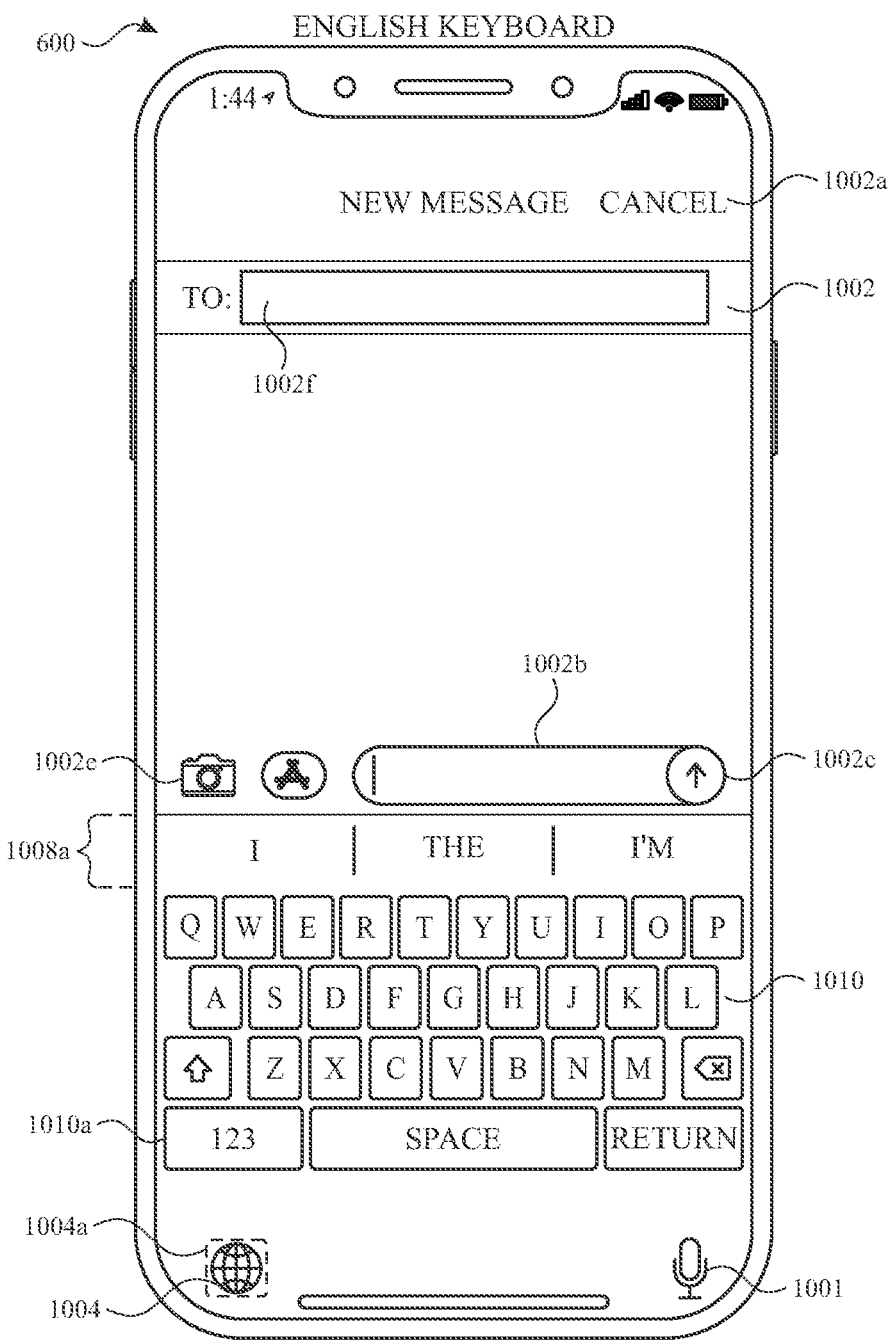
Figure 10H:
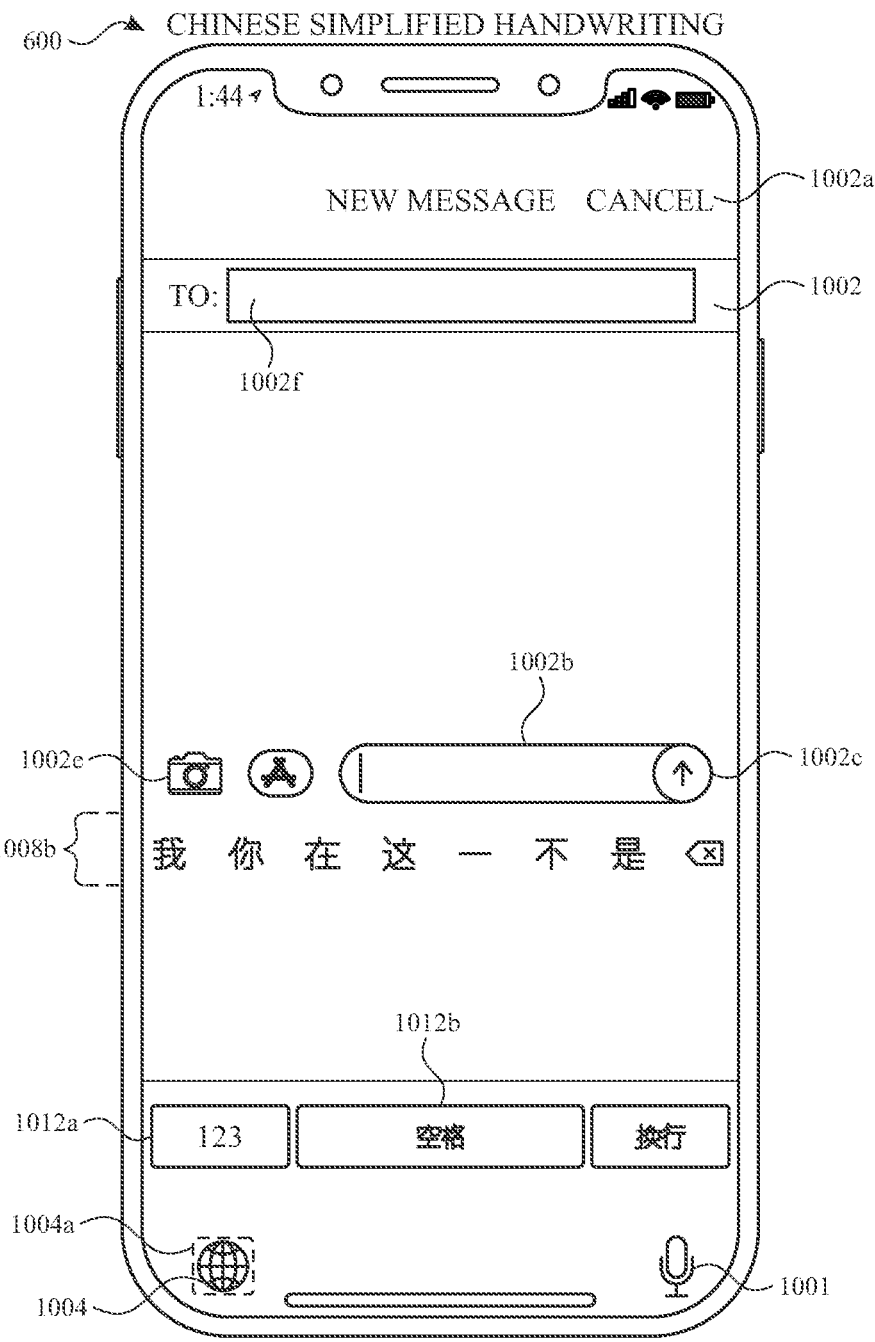
Figure 10I:
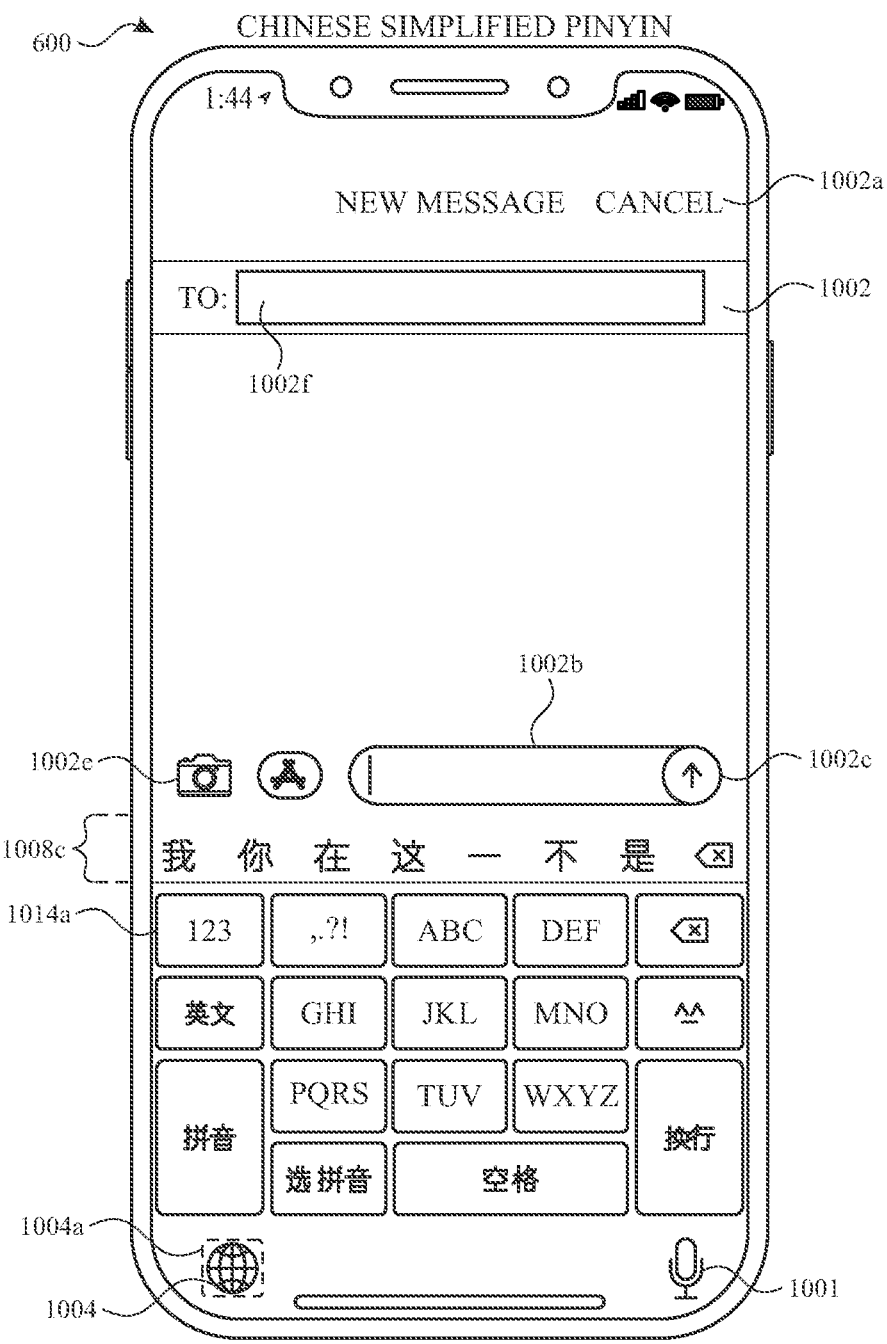

At FIGS. 10G-10I, keyboard status 1000*c* illustrates a third scenario, whereby a plurality of keyboards (e.g., 1010, 1012, 1014) are active (e.g., installed, enabled, turned on, and/or selected to be in a plurality of selected keyboards) on device 600. For example, the user of device 600 has accessed a settings user interface and enabled English keyboard 1010, Chinese simplified handwriting keyboard 1012, and Chinese simplified pinyin keyboard 1014, such that these are the (e.g., only) keyboards enabled on device 600 (e.g., no emoji keyboard). In accordance with the device determining that a plurality of keyboards are active, but no emoji keyboard is active, device 600 provides the keyboards using particular layouts, as discussed in detail below.

At FIG. 10G, in the third scenario, device 600 is displaying message interface 1002 and English keyboard 1010. Numeral key 1010*a* is displayed adjacent to spacebar key 1010*b*. At FIG. 10G, numeral key 1010*a* is displayed such that it encompasses both locations 1018*a* and 1006*a*. Switcher key 1004 is displayed at first location 1004*a*. Device 600 at FIG. 10G does display emoji key 1006. In some embodiments, in the third scenario, switcher key 1004 includes adaptive behavior, as described in detail above.

At FIG. 10G, in the third scenario, device 600 detects activation of switcher key 1004. In response to detecting activation of switcher key 1004, device 600 replaces display of English keyboard 1010 with display of Chinese simplified handwriting keyboard 1012, as shown in FIG. 10H, because Chinese simplified handwriting keyboard 1012 is the next active keyboard.

At FIG. 10H, in the third scenario, Chinese simplified handwriting keyboard 1012 includes numeral key 1012*a* displayed adjacent to spacebar key 1012*b*. At FIG. 10H, numeral key 1010*a* is displayed such that it encompasses both locations 1018*a* and 1006*a*. Switcher key 1004 is displayed at first location 1004*a*. Device 600 at FIG. 10G does not display emoji key 1006. In some embodiments, in the third scenario, switcher key 1004 includes adaptive behavior, as described in detail above.

At FIG. 10H, in the third scenario, device 600 detects activation of switcher key 1004. In response to detecting activation of switcher key 1004, device 600 replaces display of Chinese simplified handwriting keyboard 1012 with display of Chinese simplified pinyin keyboard 1014, as shown in FIG. 10I, because Chinese simplified pinyin keyboard 1014 is the next active keyboard.

At FIG. 10I, in the third scenario, Chinese simplified pinyin keyboard 1014 does not include emoji key 1006. Switcher key 1004 is displayed at first location 1004*a*. At FIG. 10I, in the third scenario, device 600 detects activation of switcher key 1004. In response to detecting activation of switcher key 1004, device 600 replaces display of Chinese simplified pinyin keyboard 1014 with display of English keyboard 1010, as shown in FIG. 10G, because English keyboard 1010 is the next active keyboard.

Figure 10J:
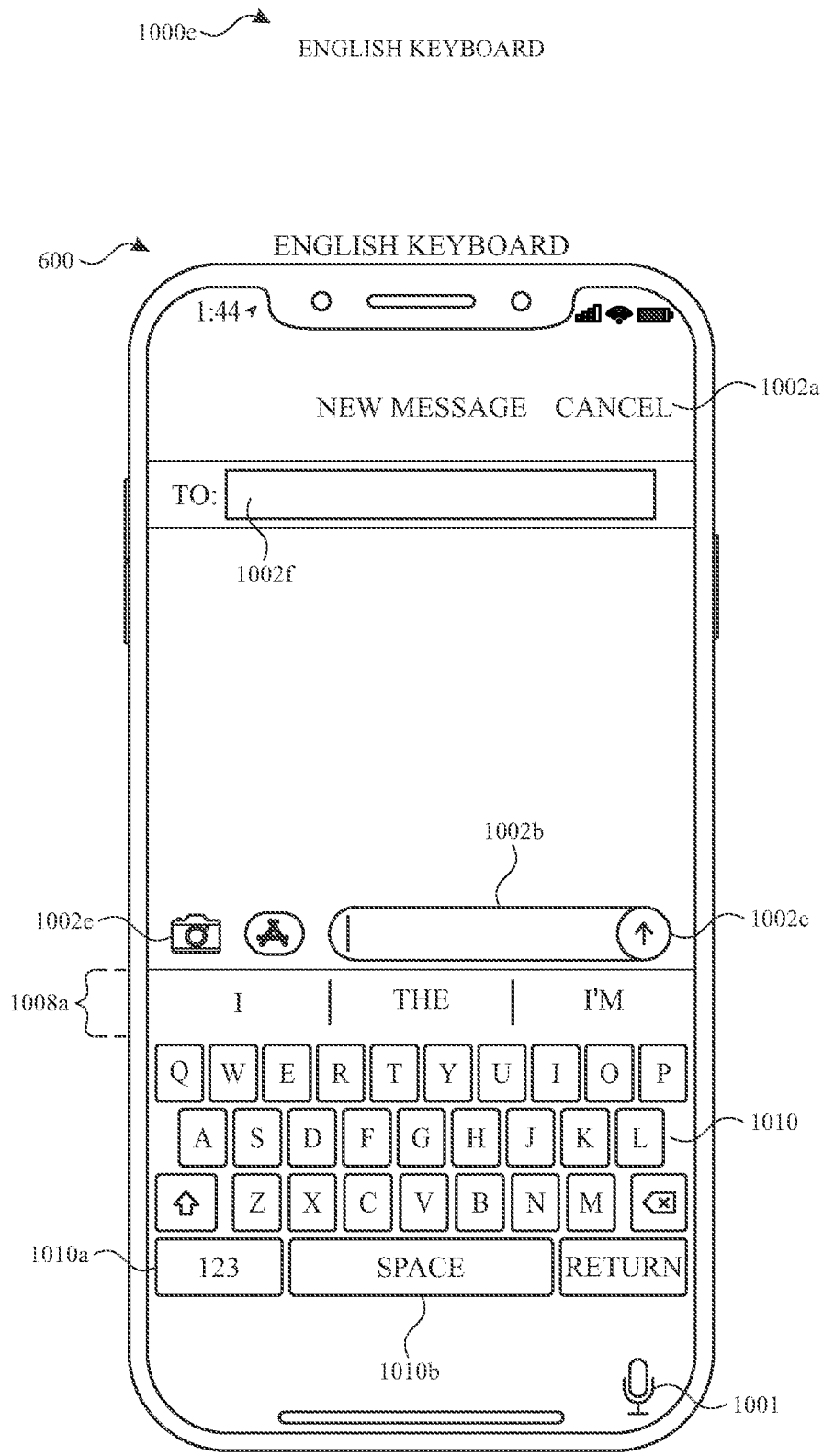

At FIG. 10J, keyboard status 1000*e* illustrates a fourth scenario, whereby only one keyboard (e.g., 1010) is active (e.g., installed, enabled, turned on, and/or selected to be in a plurality of selected keyboards) on device 600. For example, the user of device 600 has accessed a settings user interface and enabled English keyboard 1010, such that English keyboard 1010 is the only keyboard enabled on device 600. In accordance with the device determining that a single keyboard is active and that the active keyboard is not an emoji keyboard, device 600 provides the keyboard using a particular layout, as discussed in detail below.

At FIG. 10J, in the fourth scenario, device 600 is displaying message interface 1002 and English keyboard 1010. Numeral key 1010*a* at FIG. 10J is displayed with a larger width than numeral key 1010*a* at FIG. 10A. At FIG. 10J, numeral key 1010*a* is displayed such that it encompasses both locations 1018*a* and 1006*a*. Numeral key 1010*a* is displayed adjacent to spacebar 1010*b*. At FIG. 10J, device 600 does not display emoji key 1006 and does not display switcher key 1004.

FIGS. 11A-11C are a flow diagram illustrating a method for accessing keyboards using an electronic device in accordance with some embodiments. Method 1100 is performed at a device (e.g., 100, 300, 500, 600) with a touchscreen display. Some operations in method 1100 are, optionally, combined, the orders of some operations are, optionally, changed, and some operations are, optionally, omitted.

As described below, method 1100 provides an intuitive way for accessing keyboards. The method reduces the cognitive burden on a user for accessing keyboards, thereby creating a more efficient human-machine interface. For battery-operated computing devices, enabling a user to access media controls faster and more efficiently conserves power and increases the time between battery charges.

The electronic device (e.g., 600) receives (1102) a request to display a first keyboard (e.g., an English QWERTY keyboard, including English alphabetical keys, a keyboard not of the first type) from among a plurality of selected keyboards. In some embodiments, the plurality of selected keyboards are keyboards that are enabled for alternative display (e.g., via the selection of one or more keyboard switching affordances). In some embodiments, the device receives user input to add and/or remove keyboards from the plurality of selected keyboards, such as through a keyboard configuration user interface.

In response to (1104) receiving the request to display the first keyboard, the electronic device, in accordance with a determination (1106) that a first set of keyboard configuration criteria are satisfied, the first set of keyboard configuration criteria including a first keyboard configuration criterion that is satisfied (e.g., scenario 1 of FIGS. 10A-10D) when the plurality of selected keyboards includes the first keyboard (e.g., an English QWERTY keyboard, not of the first type, not an emoji keyboard), a second keyboard of a first type (e.g., an emoji keyboard), and a third keyboard (e.g., a Japanese keyboard, a Chinese keyboard, a keyboard not of the first type), displays (1110), on the touchscreen display, the first keyboard using a first configuration (e.g., English keyboard 1010 of FIG. 10A).

In some embodiments, in response to receiving the request to display the first keyboard, the electronic device, in accordance with a determination that a third set of keyboard configuration criteria are satisfied (e.g., scenario 3 of FIGS. 10G-10I), the third set of keyboard configuration criteria including a third keyboard configuration criterion that is satisfied when the plurality of selected keyboards includes the first keyboard (e.g., an English QWERTY keyboard, not of the first type, not an emoji keyboard) and the third keyboard (e.g., a Japanese keyboard, a Chinese keyboard, a keyboard not of the first type) without including the second keyboard of the first type (e.g., an emoji keyboard; without including any keyboards of the first type), displays, on the touchscreen display, the first keyboard using a third configuration (e.g., English keyboard 1010 of FIG. 10G). In some embodiments, as a part of displaying, on the touchscreen display, the first keyboard using a third configuration, the electronic device displays, at the first location on the touchscreen display, the first affordance (e.g., same as the third affordance, different from the third affordance) which, when activated (e.g., via a light press), causes display of the third keyboard (e.g., when activated, cycles to a next keyboard of the plurality of selected keyboards). In some embodiments, as a part of displaying, on the touchscreen display, the first keyboard using a third configuration, the electronic device, without displaying, at the second location on the touchscreen, displays an affordance (e.g., an emoji affordance) that, when activated (e.g., via a light press), causes display of the second keyboard (e.g., the emoji keyboard). In some embodiments, when the second keyboard is not included in the plurality of selected keyboards, the electronic device displays the first keyboard in the third configuration that does not include an affordance to display the second keyboard.

As a part of displaying, on the touchscreen display, the first keyboard using a first configuration, the electronic device displays (1112), at a first location (e.g., 1004a) on the touchscreen display, a first affordance (e.g., 1004, same as the third affordance, different from the third affordance) which, when activated (e.g., via a light press), causes display of the third keyboard (e.g., when activated, cycles to a next keyboard of the plurality of selected keyboards other than the second keyboard).

In some embodiments, while displaying, on the touchscreen display, the first keyboard using the first configuration, the electronic device detects, using the touchscreen display, a first input (e.g., a single-contact input), the first input having a first characteristic intensity. In some embodiments, in response to detecting the first input at the first location (e.g., 1004a), the electronic device, in accordance a determination that the first input was detected at the first location and that the characteristic intensity of the first input exceeds a first intensity threshold, displays a keyboard menu that includes the plurality of selected keyboards; In some embodiments, activation (e.g., light press) of a respective option of the keyboard menu cause the current keyboard to be replaced with the respective selected keyboard. In some embodiments, in response to detecting the first input at the first location, the electronic device, in accordance with a determination that the first input was detected at the first location and that the characteristic intensity of the first input does not exceed the first intensity threshold, the electronic device replaces display of the first keyboard with display of the third keyboard (e.g., display the next keyboard of the plurality of selected keyboards, while skipping over the second keyboard). In some embodiments, in accordance a determination that the first input was detected at the second location and that the characteristic intensity of the first input exceeds the first intensity threshold, the electronic device forgoes displaying the keyboard menu. In some embodiments, in accordance with a determination that the first input was detected at the second location and that the characteristic intensity of the first input does not exceed the first intensity threshold, the electronic device replaces display of the first keyboard with display of the second keyboard (e.g., display the second keyboard, regardless of what is the next keyboard of the plurality of selected keyboards, without determining which keyboard is the next keyboard of the plurality of selected keyboards).

As a part of displaying, on the touchscreen display, the first keyboard using a first configuration, the electronic device displays (1114), at a second location (e.g., 1006a of FIG. 10A) on the touchscreen display, a second affordance (e.g., 1006, an emoji affordance) which, when activated (e.g., via a light press), causes display of the second keyboard (e.g., the emoji keyboard 1016).

In some embodiments, the first keyboard (e.g., 1010) and the third keyboard (e.g., 1012) (but not the second keyboard (e.g., 1016)) are in an ordered set. In some embodiments, as a part of displaying, in accordance with a determination that the first set of keyboard configuration criteria are satisfied, a respective keyboard (e.g., each keyboard) of the plurality of selected keyboards (e.g., the first keyboard, the second keyboard, the third keyboard), the electronic device displays, at the first location on the touch-sensitive display, the first affordance, which, when activated (e.g., via a light press, when no criterion of the set of switching criteria is satisfied) replaces display of a currently displayed keyboard with display of a next keyboard in the ordered set (e.g., display the next keyboard of the ordered set of keyboards, which doesn't include the second keyboard). In some embodiments, the first set of keyboard configuration criteria include a criterion that is satisfied when the respective keyboard has been displayed for a threshold duration of time before the device detects activation of the first affordance at the first location.

In response to (1104) receiving the request to display the first keyboard, the electronic device, in accordance with a determination (1108) that a second set of keyboard configuration criteria are satisfied (e.g., and not the first set of keyboard configuration criteria, scenario 2 of FIGS. 10E-10F), the second set of keyboard configuration criteria including a second keyboard configuration criterion that is satisfied when the plurality of selected keyboards includes the first keyboard (e.g., an English QWERTY keyboard, a keyboard not of the first type) and the second keyboard of the first type (e.g., an emoji keyboard) without including other keyboards, displays (1120), on the touchscreen display, the first keyboard using a second configuration different from the first configuration.

As a part of displaying, on the touchscreen display, the first keyboard using a second configuration different from the first configuration, the electronic device displays (1122), at the first location on the touchscreen display, a third affordance (e.g., an emoji affordance, same as the second affordance, different from the second affordance). In some embodiments the third affordance, when activated (e.g., via a light press), causes display of the second keyboard (e.g., the emoji keyboard), without displaying, at the second location, an affordance that, when activated, causes display of the second keyboard (or any other keyboard).

In some embodiments, the first keyboard and the third keyboard (but not the second keyboard) are in an ordered set. In some embodiments, the electronic device detects activation (e.g., via a light press) of (e.g., tap on the touch-sensitive surface at a location corresponding to) the second affordance (e.g., an emoji affordance) of the first keyboard in the first configuration. In some embodiments, the second affordance is being displayed at the second location on the touchscreen display. In some embodiments, in response to detecting activation of (e.g., tap on the touch-sensitive surface at a location corresponding to) the second affordance (e.g., an emoji affordance) of the first keyboard in the first configuration (and while the first set of keyboard configuration criteria are satisfied), the electronic device replaces display of the first keyboard in the first configuration with display of the second keyboard. In some embodiments, display of the second keyboard includes: the electronic device displaying, at the first location on the touchscreen display, the first affordance which, when activated (e.g., via a light press), cycles to a next keyboard of the ordered set; and displaying, at a third location on the touchscreen display, a switcher affordance (e.g., same as the first affordance) which, when activated (e.g., via a light press), causes the second keyboard to be replaced with a most recently previously displayed keyboard (e.g., the device determines which keyboard (that is not currently displayed) was most recently displayed and displays that keyboard when the key is activated, the first keyboard in the first configuration). In some embodiments, the third location is different from the first location and the second location.

In some embodiments, the plurality of selected keyboards include a fourth keyboard. In some embodiments, the first keyboard, the third keyboard, and the fourth keyboard (but not the second keyboard) are in an ordered set (e.g., the ordered set being, for example: first keyboard, third keyboard, and then fourth keyboard, then cycling again to the first keyboard, etc.). In some embodiments, while the first set of keyboard configuration criteria are satisfied, the electronic device detects user input (e.g., on the first affordance of the third keyboard). In some embodiments, while the first set of keyboard configuration criteria are satisfied, in response to detecting the user input, and in accordance with a determination that the fourth keyboard is next in the ordered set of the plurality of keyboards, the electronic device displays, at a first display time on the touchscreen display, the fourth keyboard of the plurality of keyboards that includes display of the first affordance at the first location. In some embodiments, while the first set of keyboard configuration criteria are satisfied and while displaying the fourth keyboard of the plurality of keyboards (e.g., before or after having detected activation of any character keys (e.g., keys that cause input into a text entry area) of the initial keyboard), the electronic device detects activation of the first affordance that is displayed at the first location on the touchscreen display. In some embodiments, while the first set of keyboard configuration criteria are satisfied and in response to detecting activation of the first affordance, the electronic device, in accordance with a determination that at least a criterion of a set of switching criteria is satisfied, replaces display of the fourth keyboard with display of the third keyboard. In some embodiments, the set of switching criteria includes a first switching criterion that is satisfied when more than a predetermined (non-zero) amount of time (e.g., 2.5 seconds) has elapsed from the first display time, and a second switching criterion that is satisfied when the electronic device has detected, since the first display time, activation of a key of the fourth keyboard that causes entry of a character into a text entry area. In some embodiments, while the first set of keyboard configuration criteria are satisfied and in response to detecting activation of the first affordance, the electronic device, in accordance with a determination that no criterion of the set of switching criteria is satisfied, replaces display of the fourth keyboard with display of the first keyboard. In some embodiments, when a respective keyboard is displayed (at a certain time), the electronic device monitors the time elapsed and monitors keys of the keyboard (e.g., character keys, keys that cause insertion of a character into a text entry area). In response to detecting activation of the first affordance (at the first location) of the respective keyboard, when the electronic device determines that either (1) a predetermined amount of time has elapsed since the respective keyboard was displayed or (2) a key of the keyboard (e.g., character key, keys that cause insertion of a character into a text entry area) has been activated since the respective keyboard was displayed, the device replaces display of the respective keyboard with display of a previous keyboard (the keyboard that was displayed previous to the respective keyboard, the keyboard that precedes the respective keyboard in the ordered set that does not include the second keyboard). In response to detecting activation of the first affordance (at the first location) of the respective keyboard, when the decide determines that (1) the predetermined amount of time has not elapsed since the respective keyboard was displayed and (2) no key of the keyboard (e.g., character key, keys that cause insertion of a character into a text entry area) has been activated since the respective keyboard was displayed, the device replaces display of the respective keyboard with display of a next keyboard (the keyboard that is next in the ordered set that does not include the second keyboard).

In some embodiments, as a part of displaying, at the first display time on the touchscreen display, the fourth keyboard of the plurality of keyboards, the electronic device displays (e.g., in a key of the fourth keyboard) an identifier (e.g., as shown in 1012*b*) of the fourth keyboard (e.g., the name of the keyboard, "Chinese Keyboard", "Japanese Keyboard", the name of the keyboard in a key (e.g., the space bar) of the keyboard). In some embodiments, in accordance with a determination that more than a predetermined (non-zero) amount of time (e.g., 2.5 seconds) has elapsed from the first display time, the electronic device ceases to display the identifier of the fourth keyboard. In some embodiments, the identifier of the fourth keyboard is displayed on a key of the fourth keyboard (e.g., the spacebar key). In some embodiments, the identifier of the fourth keyboard is text that includes the name and/or language of the keyboard. In some embodiments, the device ceases to display the identifier of the fourth keyboard in conjunction with the predetermined amount of time being reached, which is optionally also a condition for the functionality (e.g., with keyboard is displayed as a result) of the first affordance to change.

Note that details of the processes described above with respect to method 1100 (e.g., FIGS. 11A-11C) are also applicable in an analogous manner to the methods described below. For example, methods 700 and 900 optionally include one or more of the characteristics of the various methods described above with reference to method 1100. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve input techniques for electronic devices. The present disclosure contemplates that in some instances, this gathered data may include personal information data, such as which keyboard languages are used.

The present disclosure recognizes that the use of such personal information data, in the present technology, can be used to the benefit of users. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data, and the technology remains operable when personal information is not collected.

What is claimed is:

1. An electronic device, comprising:
a touchscreen display;
one or more processors; and
memory storing one or more programs configured to be executed by the one or more processors, the one or more programs including instructions for:
concurrently displaying, on the touchscreen display:
a text entry area, and
a stroke input area at a first size;
while displaying the stroke input area at the first size:
detecting, using the touchscreen display, a first set of one or more strokes in the stroke input area;
in response to detecting the first set of one or more strokes, displaying, in the text entry area on the touchscreen display, a first set of one or more characters determined based on the first set of one or more strokes;
while displaying, on the touchscreen display, the first set of one or more characters, detecting a first drag gesture;
in response to detecting the first drag gesture, resizing the stroke input area from the first size to a second size that is larger than the first size;
while displaying the stroke input area at the second size:
detecting, using the touchscreen display, a second set of one or more strokes in the stroke input area; and
in response to detecting the second set of one or more strokes, displaying, in the text entry area on the touchscreen display, a second set of one or more characters determined based on the second set of one or more strokes.

2. The electronic device of claim 1, the one or more programs further including instructions for:
displaying, concurrently with the stroke input area at a first size on the touchscreen display, a handle object;
wherein, in response to detecting the first drag gesture, resizing the stroke input area from the first size to the second size is in accordance with a determination that the first drag gesture starts at a location corresponding to the handle object; and
in accordance with a determination that the first drag gesture does not start at a location corresponding to the handle object, forgoing resizing the stroke input area.

3. The electronic device of claim 1, the one or more programs further including instructions for:
while the electronic device is in a first mode, displaying, concurrently with the stroke input area on the touchscreen display, a handle object, wherein drag gestures that correspond to the handle object, when detected, resize the stroke input area;
detecting a change in mode of the electronic device from the first mode to a second mode that is different from the first mode; and
in response to detecting the change in mode of the electronic device to the second mode, ceasing to display the handle object while continuing to display the stroke input area.

4. The electronic device of claim 3, wherein continuing to display the stroke input area in response to detecting the change in mode of the electronic device to the second mode includes:
resizing, on the touchscreen display, the stroke input area to a third size that is larger than the first size.

5. The electronic device of claim 1, the one or more programs further including instructions for:
while displaying the stroke input area at the second size, detecting a second drag gesture; and in response to detecting the second drag gesture, resizing the stroke input area from the second size to the first size that is smaller than the second size.

6. The electronic device of claim 1, the one or more programs further including instructions for:
while displaying the stroke input area at the second size, detecting a user input for keyboard display;
in response to detecting the user input for keyboard display:
ceasing to display at least a portion of the stroke input area, and
displaying, on the touchscreen display, a keyboard;
while displaying the keyboard, detecting activation of one or more keys of the keyboard;
in response to detecting activation of the one or more keys of the keyboard, displaying, in the text entry area, a third set of one or more characters corresponding to the one or more keys;
subsequent to displaying, in the text entry area, the third set of one or more characters, detecting a user input for stroke input display; and
in response to detecting the user input for stroke input display:
ceasing to display the keyboard, and
displaying, on the touchscreen display, the at least a portion of the stroke input area, such that the stroke input area is displayed at the second size.

7. The electronic device of claim 6, wherein the user input for stroke input display includes a second set of one or more strokes.

8. The electronic device of claim 6, wherein the user input for stroke input display includes a user input for keyboard dismissal.

9. The electronic device of claim 1, the one or more programs further including instructions for:
in response to detecting the first drag gesture while displaying the first set of one or more characters:
changing a display location, on the touchscreen display, of the first set of one or more characters.

10. The electronic device of claim 1, the one or more programs further including instructions for:
in response to detecting the first set of one or more strokes:
displaying, on the touchscreen display, a first set of one or more visual strokes in the stroke input area that correspond to the first set of one or more strokes; and
ceasing to display, after a predetermined period of time, the first set of one or more visual strokes.

11. The electronic device of claim 1, wherein displaying, in the text entry area on the touchscreen display, the first set of one or more characters in response to detecting the first set of one or more strokes includes:
displaying, in the text entry area on the touchscreen display, the first set of one or more characters a variable period of time after detecting the first set of one or more strokes in the stroke input area; and
wherein the variable period of time is based on a plurality of periods of time determined based on previously detected ends of strokes and beginnings of subsequent strokes.

12. A non-transitory computer-readable storage medium storing one or more programs configured to be executed by one or more processors of an electronic device with a touchscreen display, the one or more programs including instructions for:
concurrently displaying, on the touchscreen display:
a text entry area, and
a stroke input area at a first size;
while displaying the stroke input area at the first size:
detecting, using the touchscreen display, a first set of one or more strokes in the stroke input area;
in response to detecting the first set of one or more strokes, displaying, in the text entry area on the touchscreen display, a first set of one or more characters determined based on the first set of one or more strokes;
while displaying, on the touchscreen display, the first set of one or more characters, detecting a first drag gesture;
in response to detecting the first drag gesture, resizing the stroke input area from the first size to a second size that is larger than the first size;
while displaying the stroke input area at the second size:
detecting, using the touchscreen display, a second set of one or more strokes in the stroke input area; and
in response to detecting the second set of one or more strokes, displaying, in the text entry area on the touchscreen display, a second set of one or more characters determined based on the second set of one or more strokes.

13. A method, comprising:
at an electronic device with a touchscreen display:
concurrently displaying, on the touchscreen display:
a text entry area, and
a stroke input area at a first size;
while displaying the stroke input area at the first size:
detecting, using the touchscreen display, a first set of one or more strokes in the stroke input area;
in response to detecting the first set of one or more strokes, displaying, in the text entry area on the touchscreen display, a first set of one or more characters determined based on the first set of one or more strokes;
while displaying, on the touchscreen display, the first set of one or more characters, detecting a first drag gesture;
in response to detecting the first drag gesture, resizing the stroke input area from the first size to a second size that is larger than the first size;
while displaying the stroke input area at the second size:
detecting, using the touchscreen display, a second set of one or more strokes in the stroke input area; and
in response to detecting the second set of one or more strokes, displaying, in the text entry area on the touchscreen display, a second set of one or more characters determined based on the second set of one or more strokes.

14. The non-transitory computer-readable storage medium of claim 12, the one or more programs further including instructions for:
displaying, concurrently with the stroke input area at a first size on the touchscreen display, a handle object;
wherein, in response to detecting the first drag gesture, resizing the stroke input area from the first size to the second size is in accordance with a determination that the first drag gesture starts at a location corresponding to the handle object; and
in accordance with a determination that the first drag gesture does not start at a location corresponding to the handle object, forgoing resizing the stroke input area.

15. The non-transitory computer-readable storage medium of claim 12, the one or more programs further including instructions for:
while the electronic device is in a first mode, displaying, concurrently with the stroke input area on the touchscreen display, a handle object, wherein drag gestures that correspond to the handle object, when detected, resize the stroke input area;
detecting a change in mode of the electronic device from the first mode to a second mode that is different from the first mode; and
in response to detecting the change in mode of the electronic device to the second mode, ceasing to display the handle object while continuing to display the stroke input area.

16. The non-transitory computer-readable storage medium of claim 15, wherein continuing to display the stroke input area in response to detecting the change in mode of the electronic device to the second mode includes:
resizing, on the touchscreen display, the stroke input area to a third size that is larger than the first size.

17. The non-transitory computer-readable storage medium of claim 12, the one or more programs further including instructions for:
while displaying the stroke input area at the second size, detecting a second drag gesture; and
in response to detecting the second drag gesture, resizing the stroke input area from the second size to the first size that is smaller than the second size.

18. The non-transitory computer-readable storage medium of claim 12, the one or more programs further including instructions for:
while displaying the stroke input area at the second size, detecting a user input for keyboard display;
in response to detecting the user input for keyboard display:
ceasing to display at least a portion of the stroke input area, and
displaying, on the touchscreen display, a keyboard;
while displaying the keyboard, detecting activation of one or more keys of the keyboard;
in response to detecting activation of the one or more keys of the keyboard, displaying, in the text entry area, a third set of one or more characters corresponding to the one or more keys;
subsequent to displaying, in the text entry area, the third set of one or more characters, detecting a user input for stroke input display; and
in response to detecting the user input for stroke input display:
ceasing to display the keyboard, and
displaying, on the touchscreen display, the at least a portion of the stroke input area, such that the stroke input area is displayed at the second size.

19. The non-transitory computer-readable storage medium of claim 18, wherein the user input for stroke input display includes a second set of one or more strokes.

20. The non-transitory computer-readable storage medium of claim 18, wherein the user input for stroke input display includes a user input for keyboard dismissal.

21. The non-transitory computer-readable storage medium of claim 12, the one or more programs further including instructions for:
in response to detecting the first drag gesture while displaying the first set of one or more characters:
changing a display location, on the touchscreen display, of the first set of one or more characters.

22. The non-transitory computer-readable storage medium of claim 12, the one or more programs further including instructions for:
in response to detecting the first set of one or more strokes:
displaying, on the touchscreen display, a first set of one or more visual strokes in the stroke input area that correspond to the first set of one or more strokes; and
ceasing to display, after a predetermined period of time, the first set of one or more visual strokes.

23. The non-transitory computer-readable storage medium of claim 12, wherein displaying, in the text entry area on the touchscreen display, the first set of one or more characters in response to detecting the first set of one or more strokes includes:
displaying, in the text entry area on the touchscreen display, the first set of one or more characters a variable period of time after detecting the first set of one or more strokes in the stroke input area; and
wherein the variable period of time is based on a plurality of periods of time determined based on previously detected ends of strokes and beginnings of subsequent strokes.

24. The method of claim 13, further comprising:
displaying, concurrently with the stroke input area at a first size on the touchscreen display, a handle object;
wherein, in response to detecting the first drag gesture, resizing the stroke input area from the first size to the second size is in accordance with a determination that the first drag gesture starts at a location corresponding to the handle object; and
in accordance with a determination that the first drag gesture does not start at a location corresponding to the handle object, forgoing resizing the stroke input area.

25. The method of claim 13, further comprising:
while the electronic device is in a first mode, displaying, concurrently with the stroke input area on the touchscreen display, a handle object, wherein drag gestures that correspond to the handle object, when detected, resize the stroke input area;
detecting a change in mode of the electronic device from the first mode to a second mode that is different from the first mode; and
in response to detecting the change in mode of the electronic device to the second mode, ceasing to display the handle object while continuing to display the stroke input area.

26. The method of claim 25, wherein continuing to display the stroke input area in response to detecting the change in mode of the electronic device to the second mode includes:
resizing, on the touchscreen display, the stroke input area to a third size that is larger than the first size.

27. The method of claim 13, further comprising:
while displaying the stroke input area at the second size, detecting a second drag gesture; and
in response to detecting the second drag gesture, resizing the stroke input area from the second size to the first size that is smaller than the second size.

28. The method of claim 13, further comprising:
while displaying the stroke input area at the second size, detecting a user input for keyboard display;
in response to detecting the user input for keyboard display:
ceasing to display at least a portion of the stroke input area, and
displaying, on the touchscreen display, a keyboard;
while displaying the keyboard, detecting activation of one or more keys of the keyboard;

in response to detecting activation of the one or more keys of the keyboard, displaying, in the text entry area, a third set of one or more characters corresponding to the one or more keys;

subsequent to displaying, in the text entry area, the third set of one or more characters, detecting a user input for stroke input display; and in response to detecting the user input for stroke input display:
ceasing to display the keyboard, and
displaying, on the touchscreen display, the at least a portion of the stroke input area, such that the stroke input area is displayed at the second size.

29. The method of claim 28, wherein the user input for stroke input display includes a second set of one or more strokes.

30. The method of claim 28, wherein the user input for stroke input display includes a user input for keyboard dismissal.

31. The method of claim 13, further comprising:
in response to detecting the first drag gesture while displaying the first set of one or more characters:
changing a display location, on the touchscreen display, of the first set of one or more characters.

32. The method of claim 13, further comprising:
in response to detecting the first set of one or more strokes:
displaying, on the touchscreen display, a first set of one or more visual strokes in the stroke input area that correspond to the first set of one or more strokes; and
ceasing to display, after a predetermined period of time, the first set of one or more visual strokes.

33. The method of claim 13, wherein displaying, in the text entry area on the touchscreen display, the first set of one or more characters in response to detecting the first set of one or more strokes includes:
displaying, in the text entry area on the touchscreen display, the first set of one or more characters a variable period of time after detecting the first set of one or more strokes in the stroke input area; and
wherein the variable period of time is based on a plurality of periods of time determined based on previously detected ends of strokes and beginnings of subsequent strokes.

* * * * *